US011328380B2

(12) United States Patent
Pinter et al.

(10) Patent No.: US 11,328,380 B2
(45) Date of Patent: May 10, 2022

(54) MACHINE VISION SYSTEMS, ILLUMINATION SOURCES FOR USE IN MACHINE VISION SYSTEMS, AND COMPONENTS FOR USE IN THE ILLUMINATION SOURCES

(71) Applicants: Gilbert Pinter, Muskegon, MI (US); Edward Brandel, Norton Shores, MI (US); Jeremy Brodersen, Grand Rapids, MI (US)

(72) Inventors: Gilbert Pinter, Muskegon, MI (US); Edward Brandel, Norton Shores, MI (US); Jeremy Brodersen, Grand Rapids, MI (US)

(*) Notice: Subject to any disclaimer, the term of this patent is extended or adjusted under 35 U.S.C. 154(b) by 47 days.

(21) Appl. No.: 16/664,806

(22) Filed: Oct. 26, 2019

(65) Prior Publication Data
US 2020/0134773 A1    Apr. 30, 2020

Related U.S. Application Data

(60) Provisional application No. 62/751,561, filed on Oct. 27, 2018.

(51) Int. Cl.
| | |
|---|---|
| *G06T 1/00* | (2006.01) |
| *G06T 7/00* | (2017.01) |
| *G06T 7/521* | (2017.01) |
| *G01B 11/25* | (2006.01) |
| *G06T 7/514* | (2017.01) |
| *G01N 21/55* | (2014.01) |
| *H04N 5/225* | (2006.01) |
| *G01N 21/88* | (2006.01) |

(52) U.S. Cl.
CPC ............ *G06T 1/0014* (2013.01); *G01B 11/25* (2013.01); *G01N 21/55* (2013.01); *G01N 21/88* (2013.01); *G01N 21/8806* (2013.01); *G06T 7/0006* (2013.01); *G06T 7/514* (2017.01); *G06T 7/521* (2017.01); *H04N 5/2256* (2013.01); *G01N 2021/8829* (2013.01); *G06T 2207/10012* (2013.01); *G06T 2207/30121* (2013.01)

(58) Field of Classification Search
CPC ....... G06T 1/0014; G06T 7/514; G06T 7/521; G06T 7/0006; G06T 2207/10012; G06T 2207/30121; G01B 11/25; G01N 21/55; G01N 21/88; G01N 21/8806; G01N 2021/8829; H04N 5/2256
USPC ............ 356/600, 601, 603, 604, 612, 237.1, 356/237.2
See application file for complete search history.

(56) References Cited

U.S. PATENT DOCUMENTS

| | | | |
|---|---|---|---|
| 10,591,285 B2* | 3/2020 | Ando | G01B 11/2527 |
| 2013/0188012 A1* | 7/2013 | Bellis | H04N 5/2251 |
| | | | 348/42 |
| 2016/0025591 A1* | 1/2016 | Risner | F24S 40/90 |
| | | | 348/93 |
| 2016/0078610 A1* | 3/2016 | Rudd | G06T 7/0004 |
| | | | 348/87 |

(Continued)

*Primary Examiner* — Roy M Punnoose
(74) *Attorney, Agent, or Firm* — James E. Shultz

(57) ABSTRACT

The present disclosure generally relates to machine vision systems, illumination sources for use in machine vision systems, and components for use in the illumination sources. More specifically, the present disclosure relates to machine vision systems incorporating multi-function illumination sources, multi-function illumination sources, and components for use in multi-function illumination sources.

22 Claims, 65 Drawing Sheets

(56) References Cited

U.S. PATENT DOCUMENTS

| | | | |
|---|---|---|---|
| 2017/0132801 A1* | 5/2017 | Trenholm | G06T 7/514 |
| 2017/0227471 A1* | 8/2017 | Cilip | H04N 7/183 |
| 2018/0347970 A1* | 12/2018 | Sasaki | G01B 11/2527 |
| 2018/0348146 A1* | 12/2018 | Ando | G06T 7/0004 |
| 2018/0350060 A1* | 12/2018 | Nakao | G06T 7/194 |
| 2019/0226836 A1* | 7/2019 | Rudd | G01B 11/2513 |
| 2020/0158498 A1* | 5/2020 | Loferer | H04N 5/2351 |

* cited by examiner

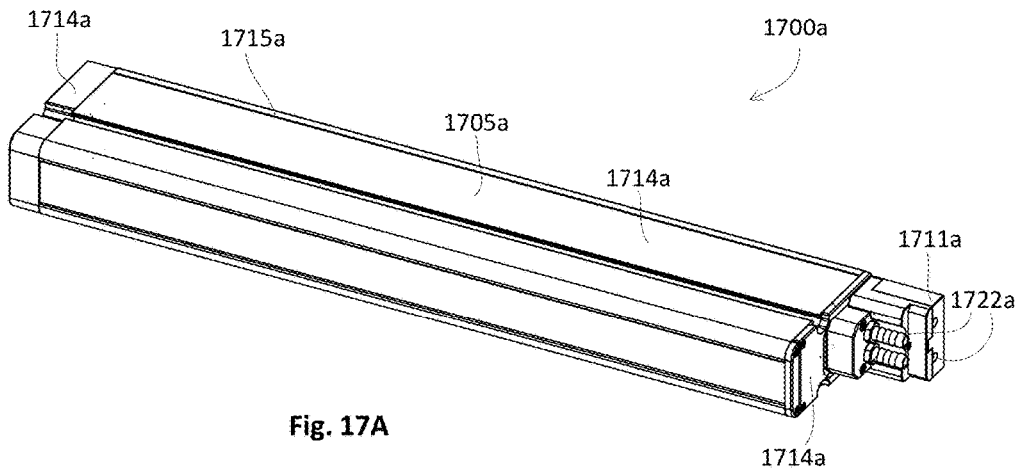
Fig. 17A
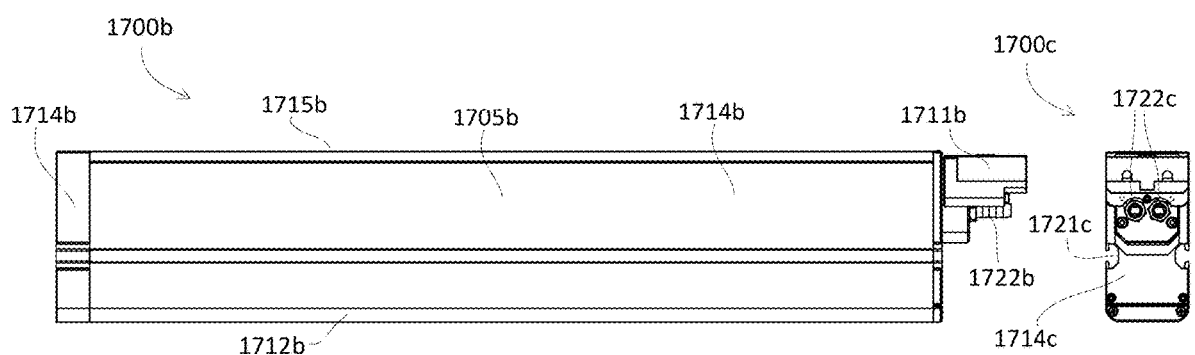
Fig. 17B  Fig. 17C
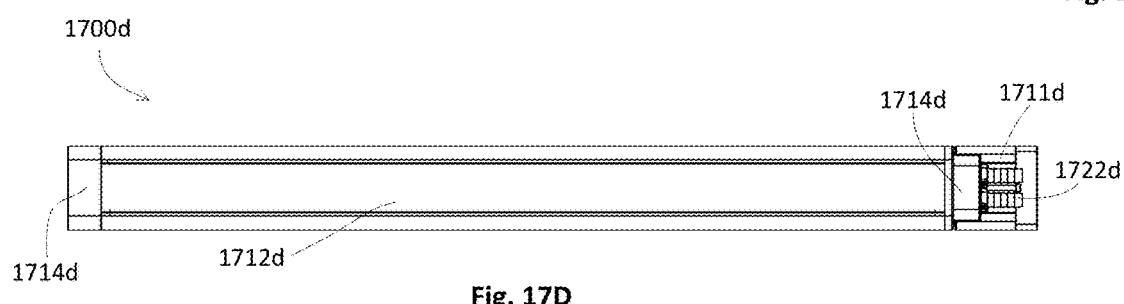
Fig. 17D
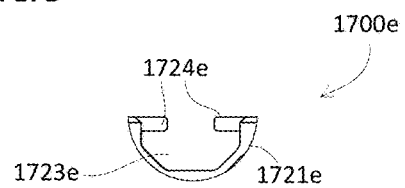
Fig. 17E

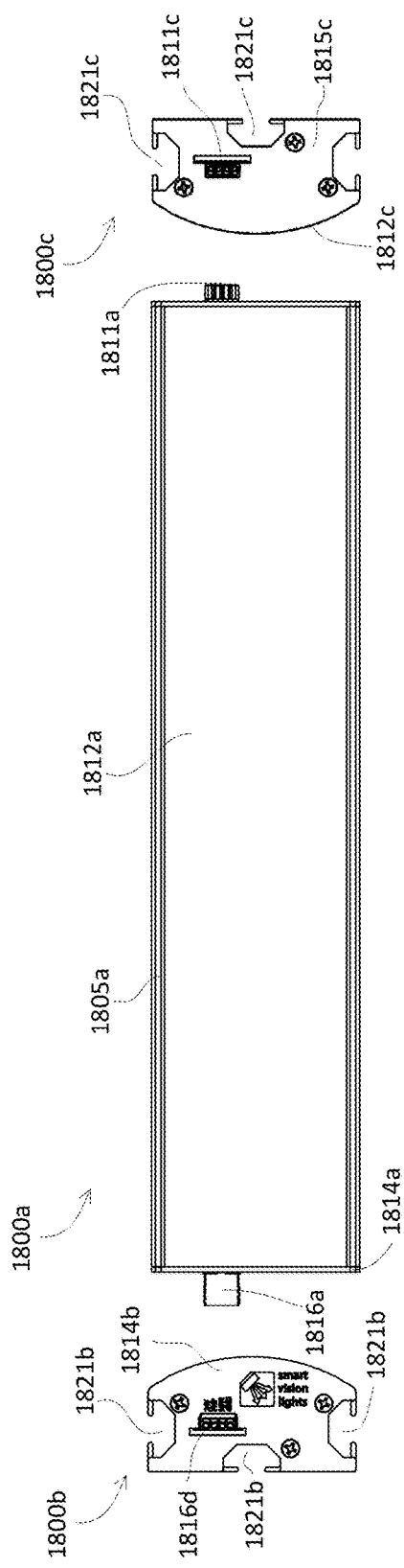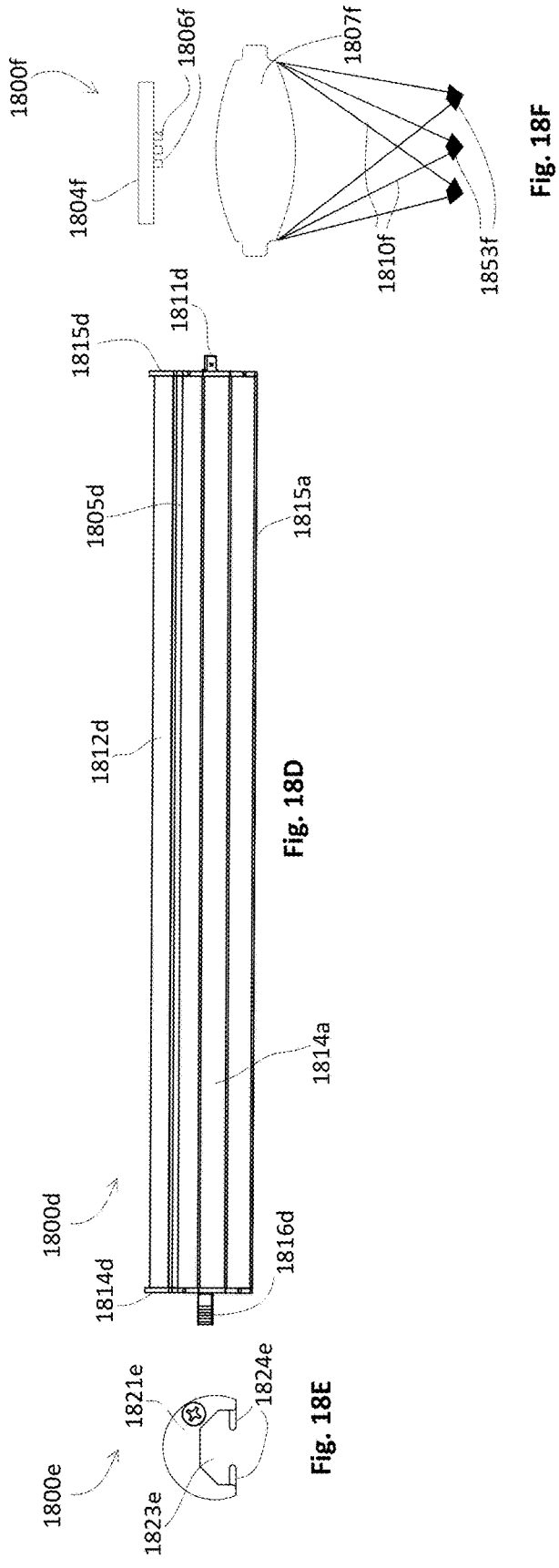

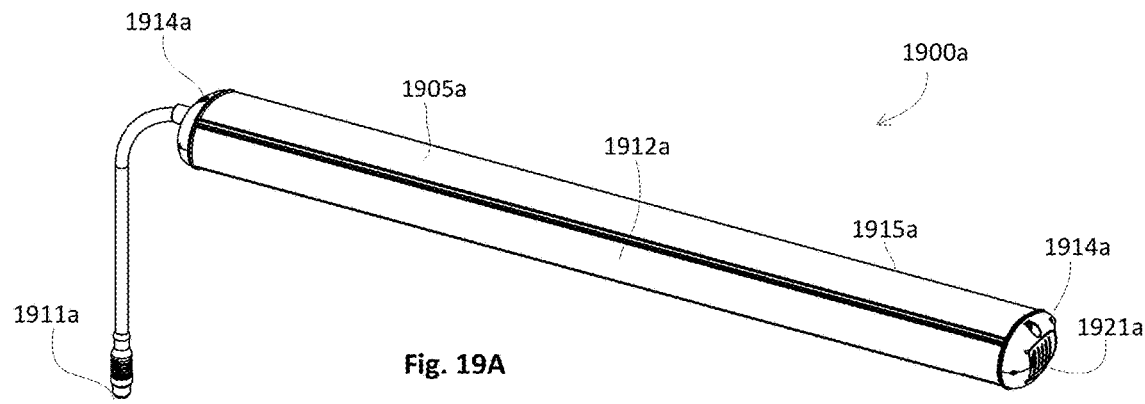
Fig. 19A
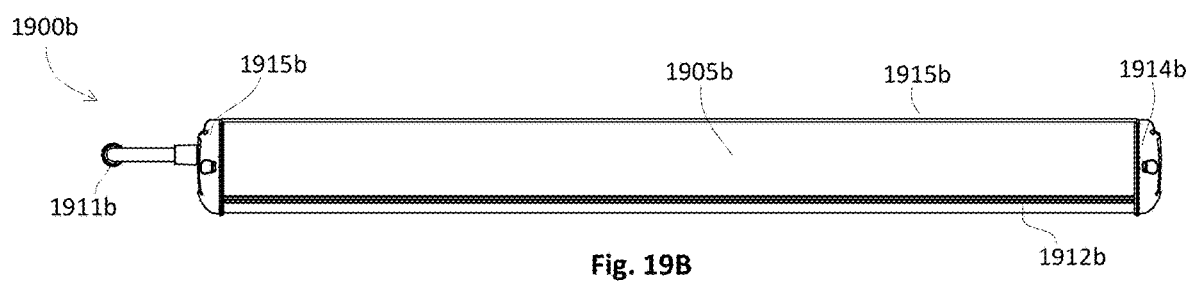
Fig. 19B
Fig. 19C
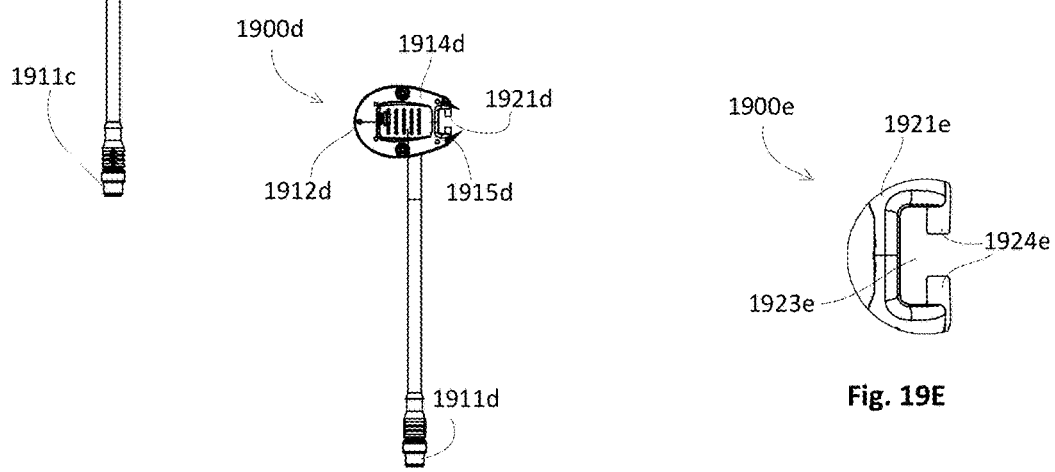
Fig. 19D
Fig. 19E

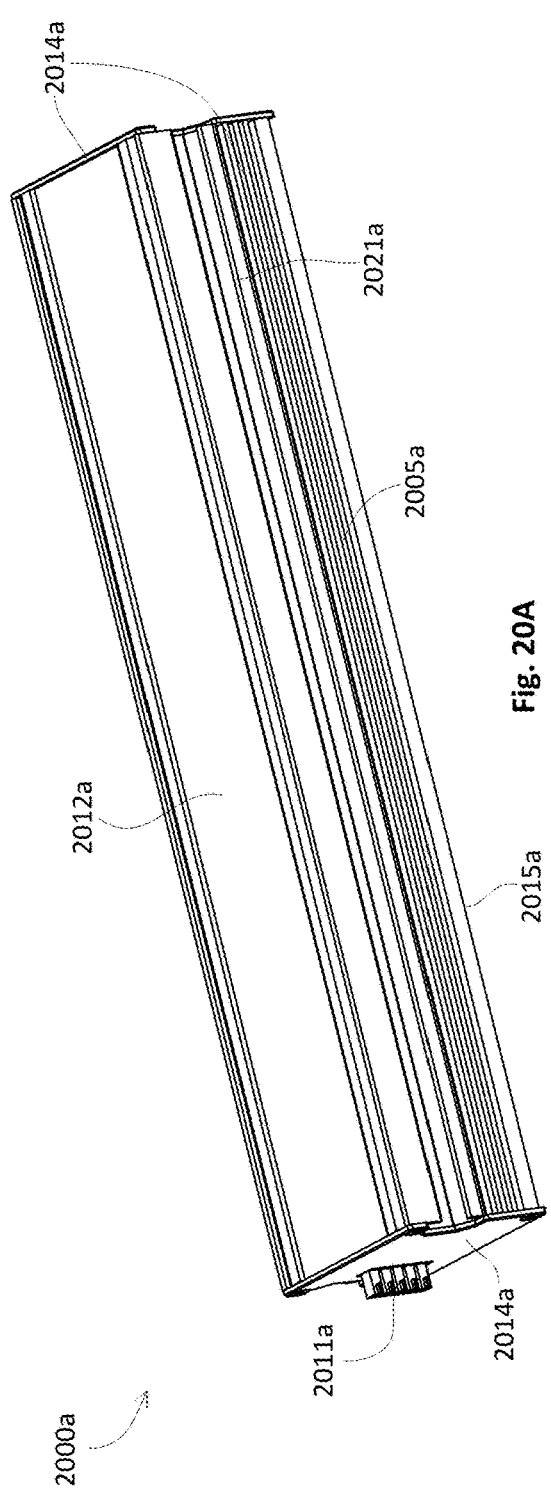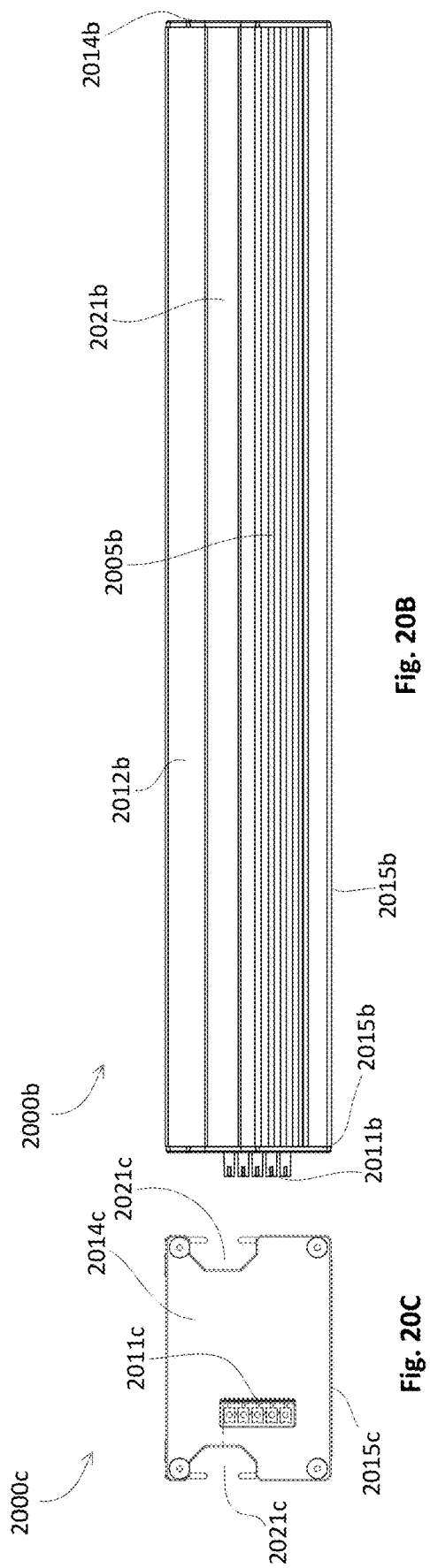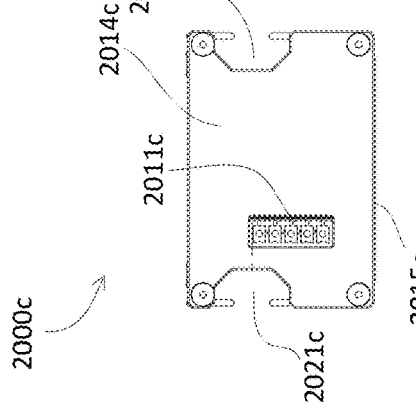

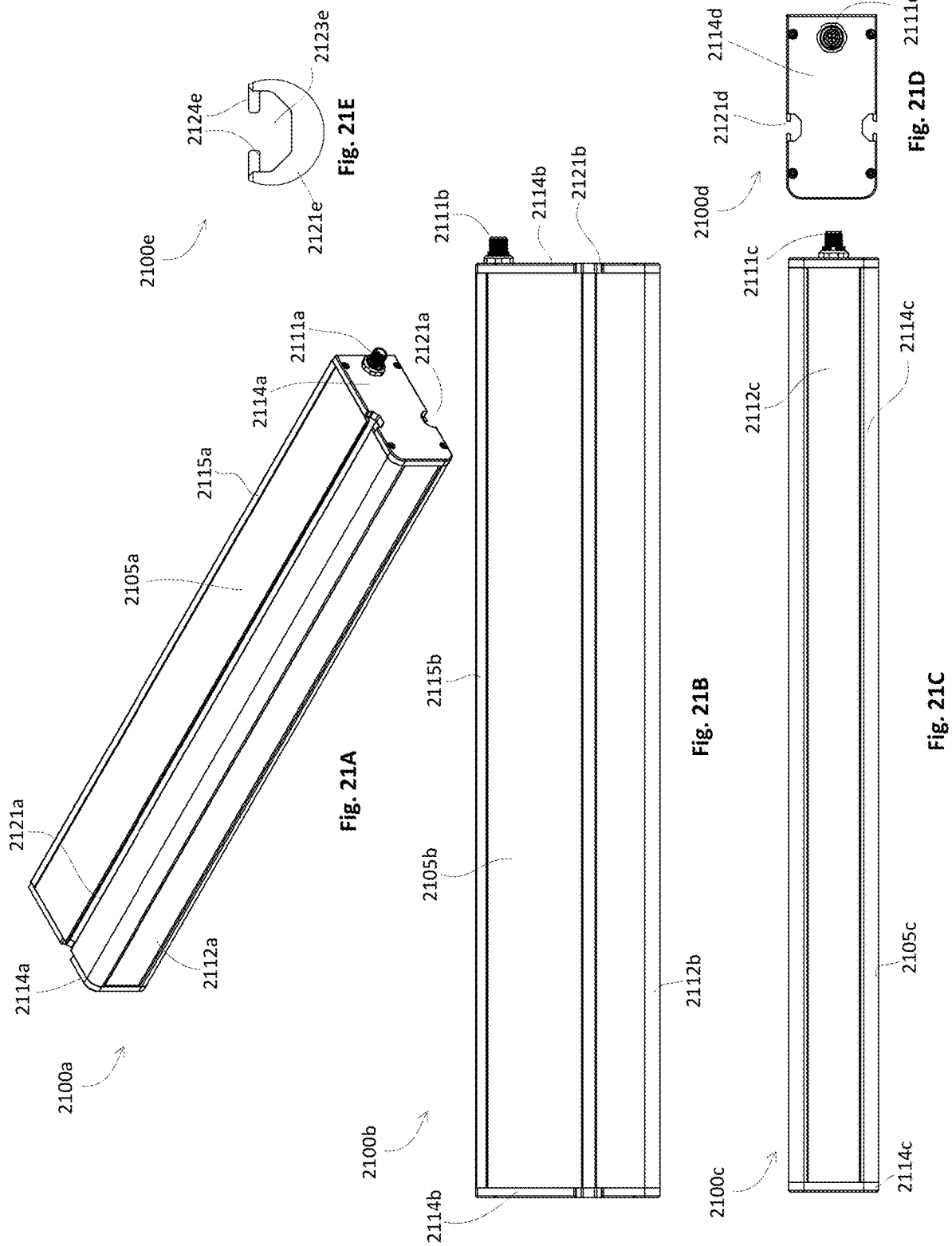

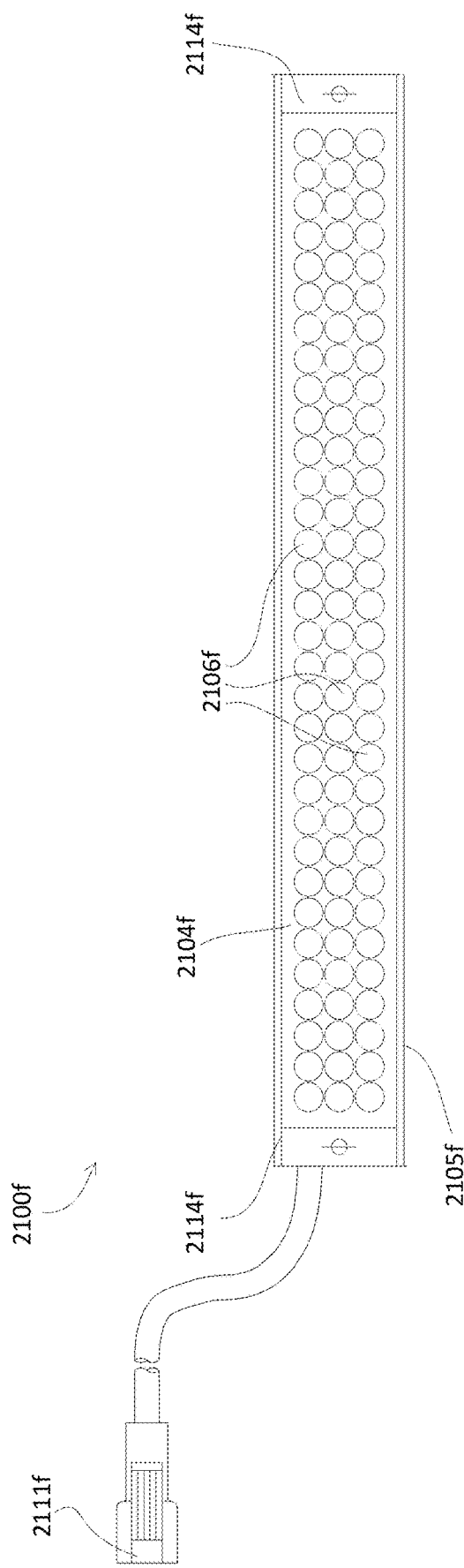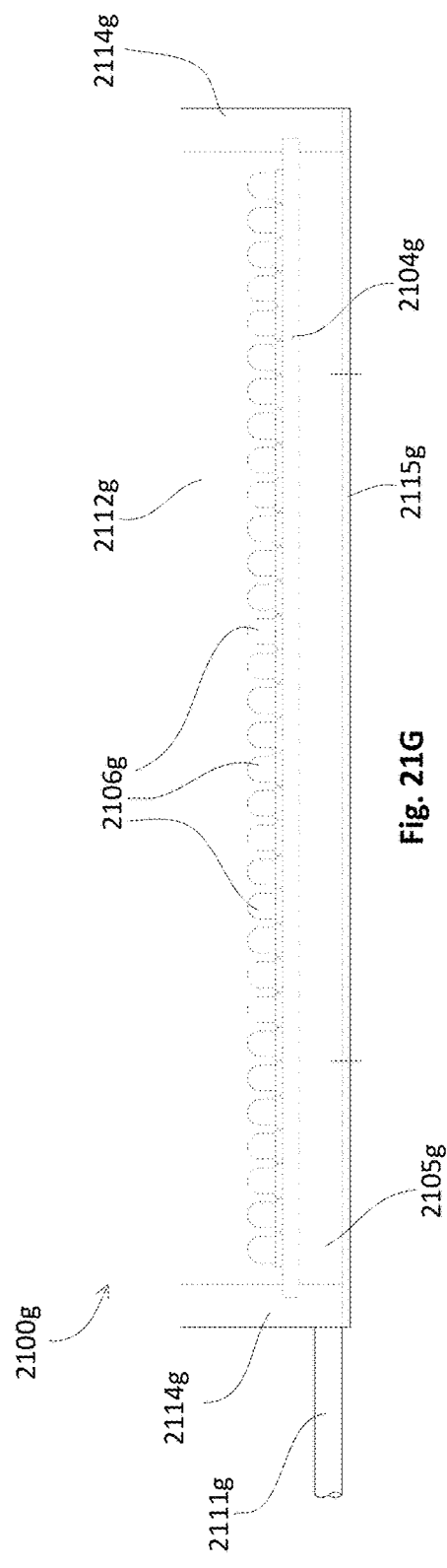

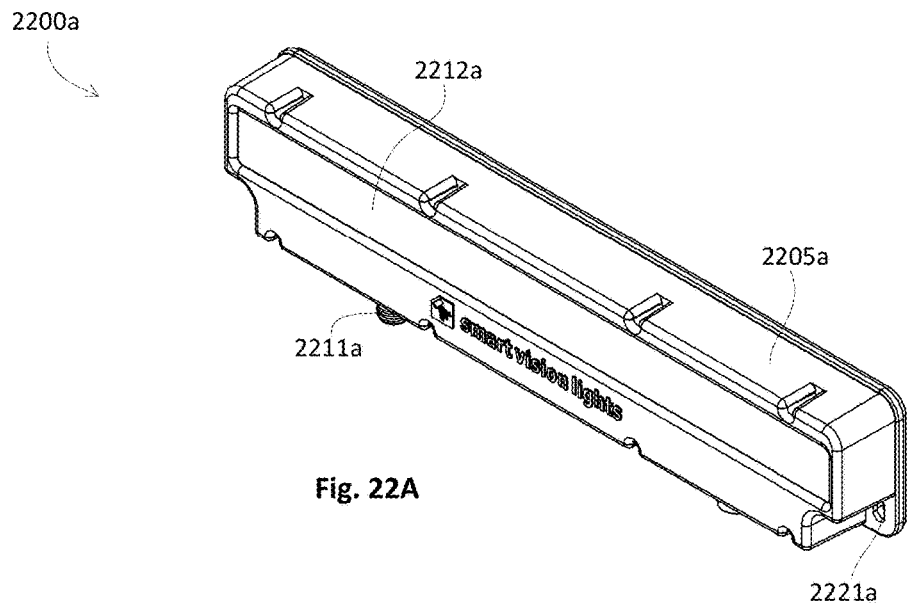
Fig. 22A
Fig. 22B
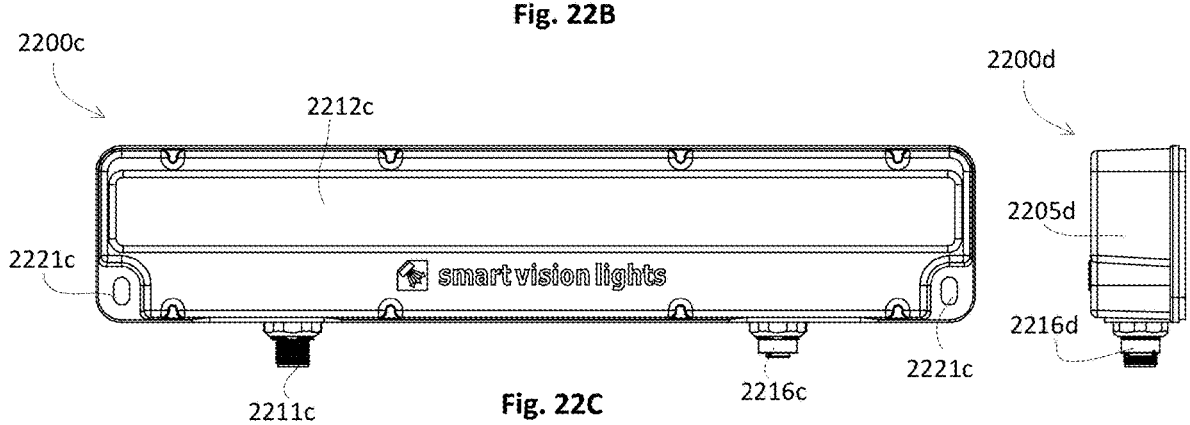
Fig. 22C
Fig. 22D
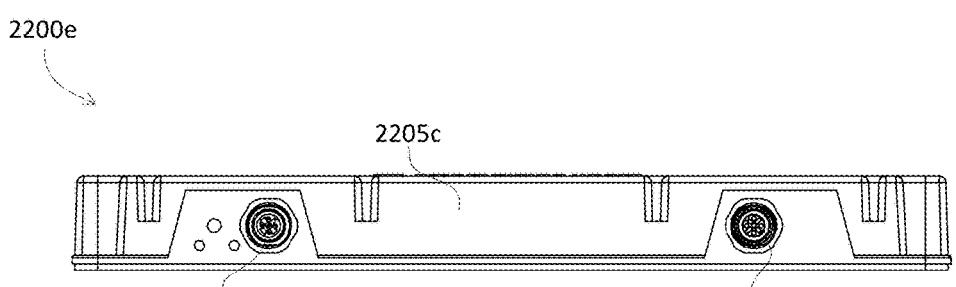
Fig. 22E

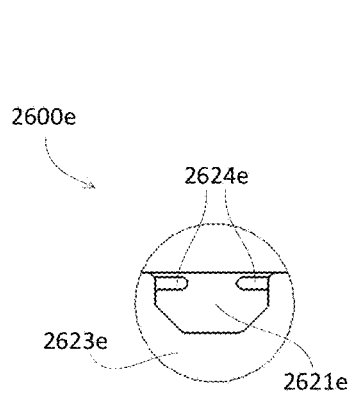
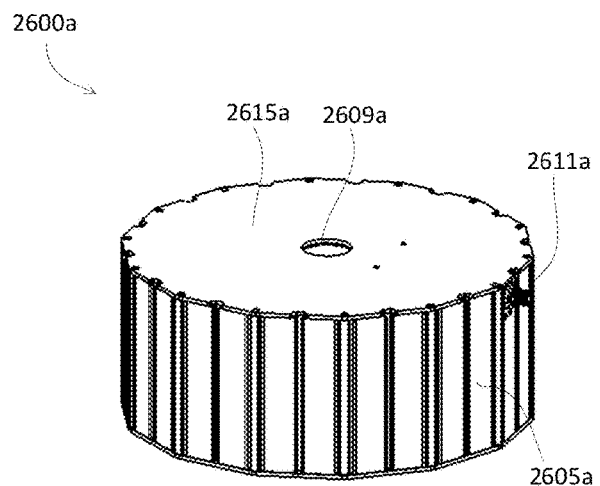
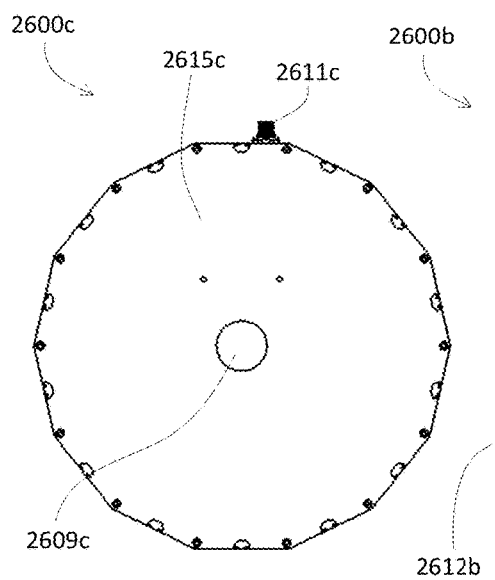
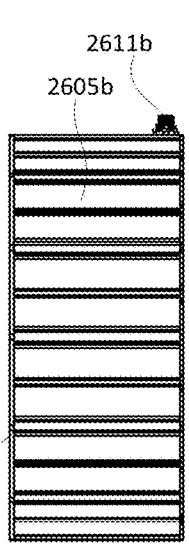
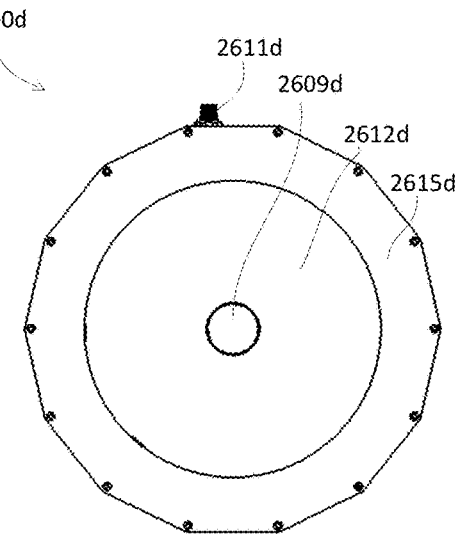
Fig. 26E
Fig. 26A
Fig. 26C
Fig. 26B
Fig. 26D

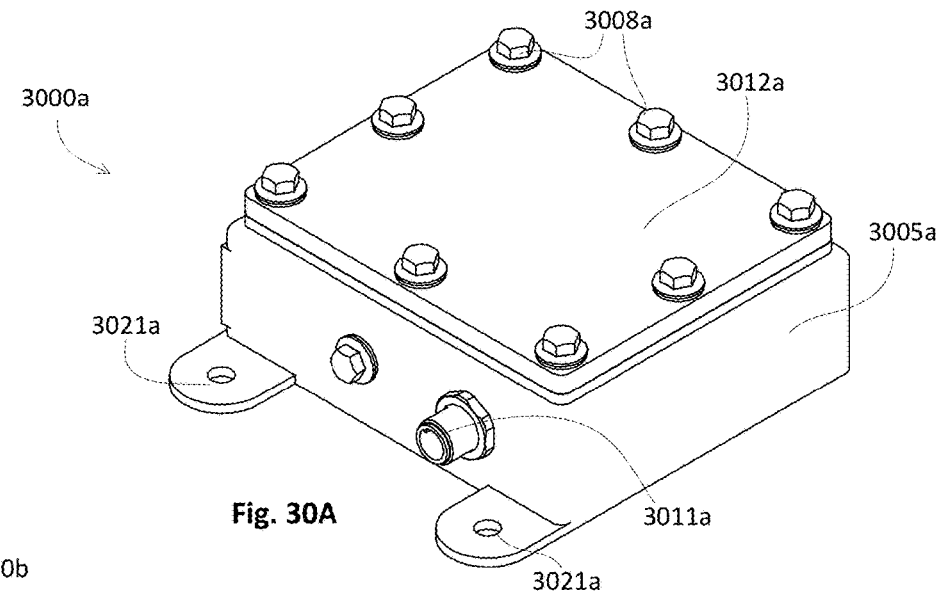
Fig. 30A
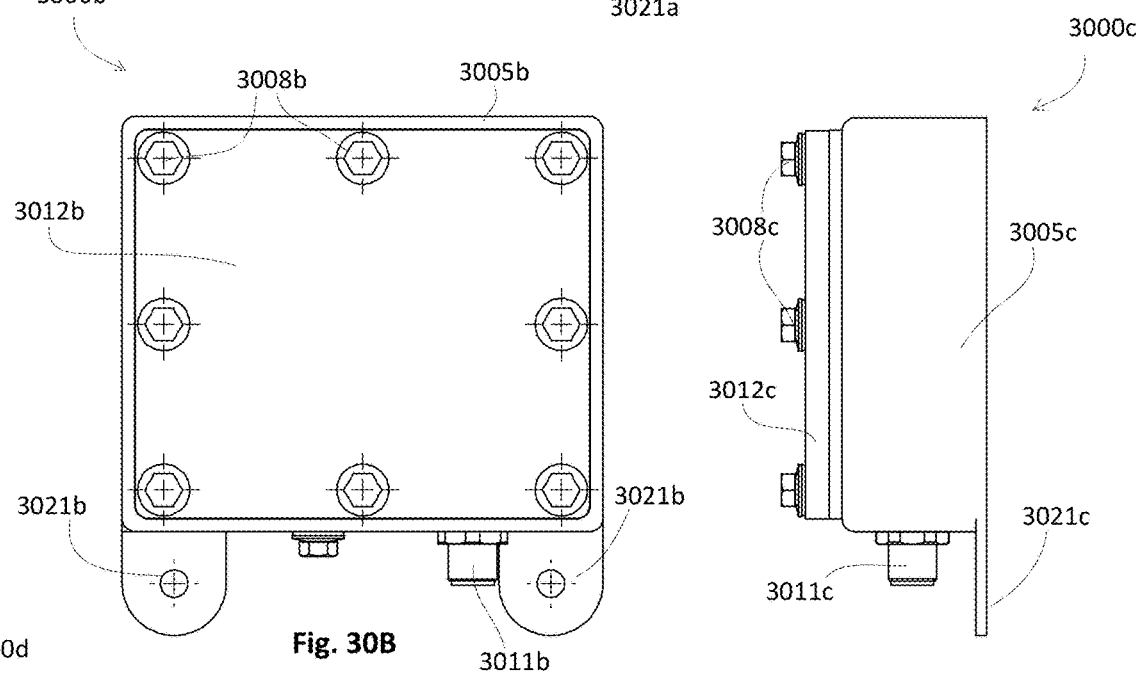
Fig. 30B
Fig. 30C
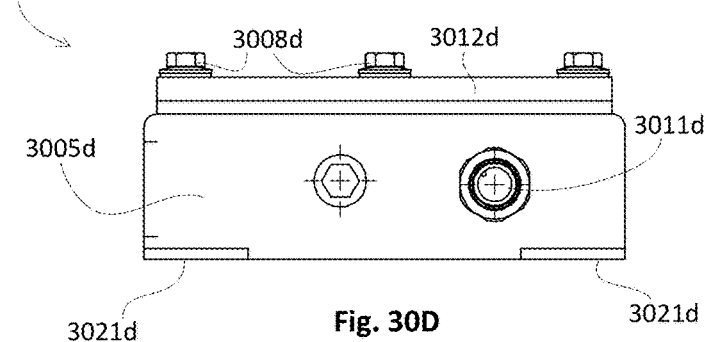
Fig. 30D

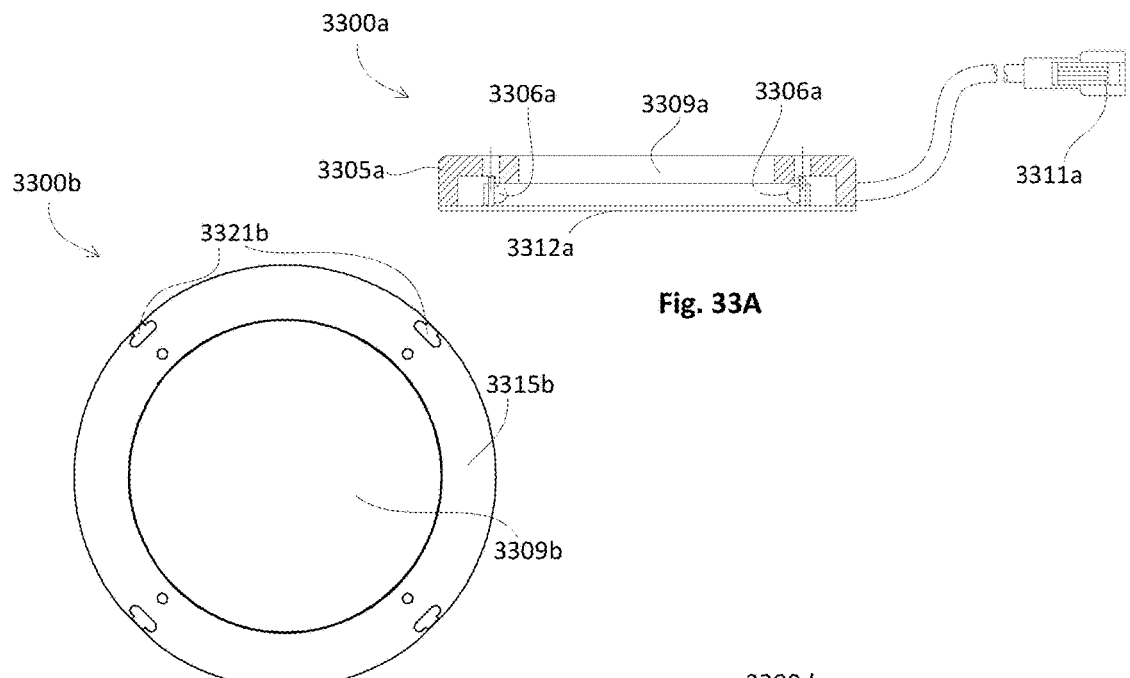
Fig. 33A
Fig. 33B
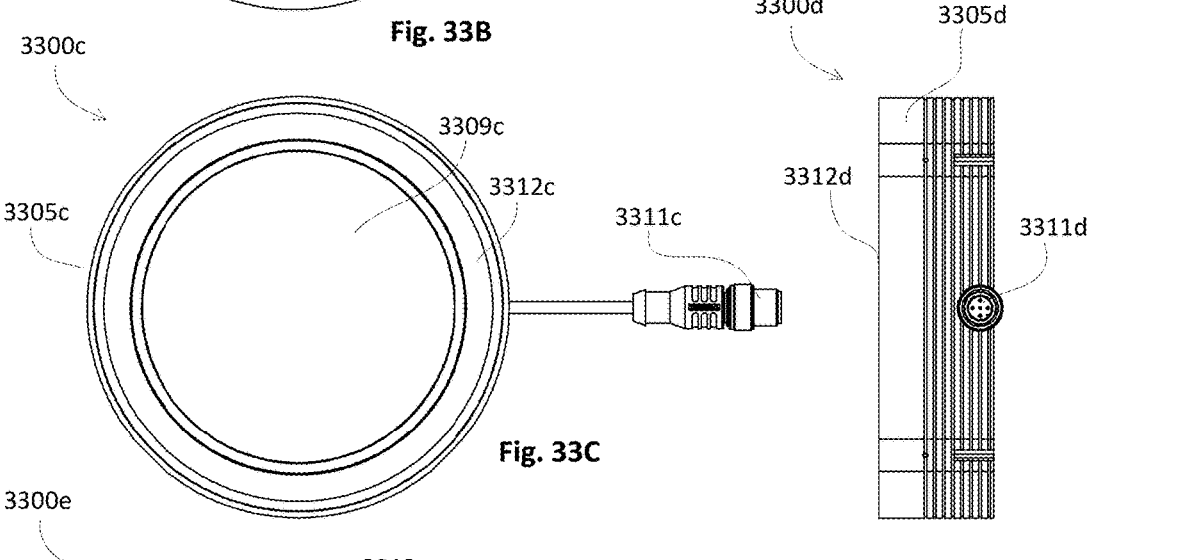
Fig. 33C
Fig. 33D
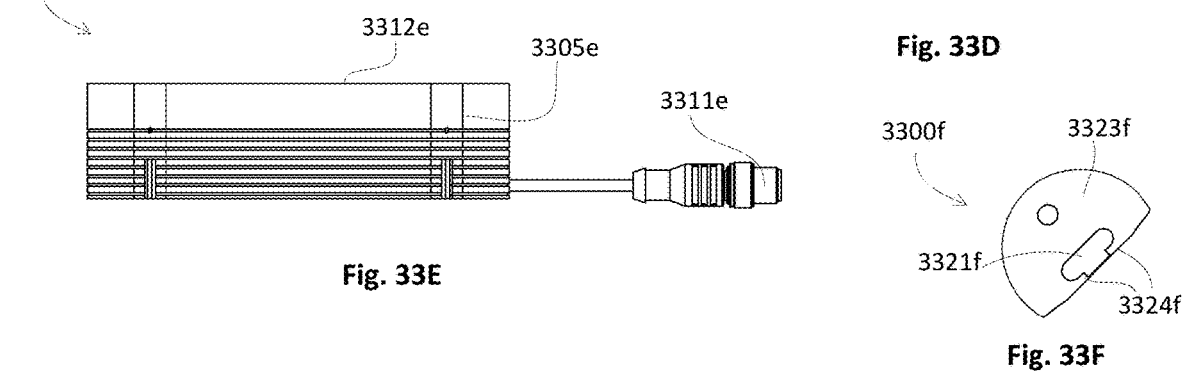
Fig. 33E
Fig. 33F

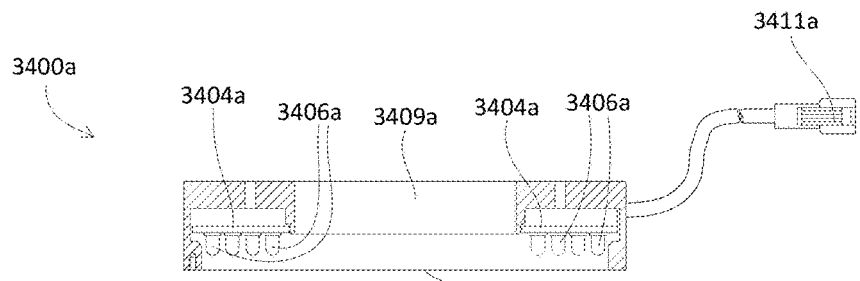
Fig. 34A
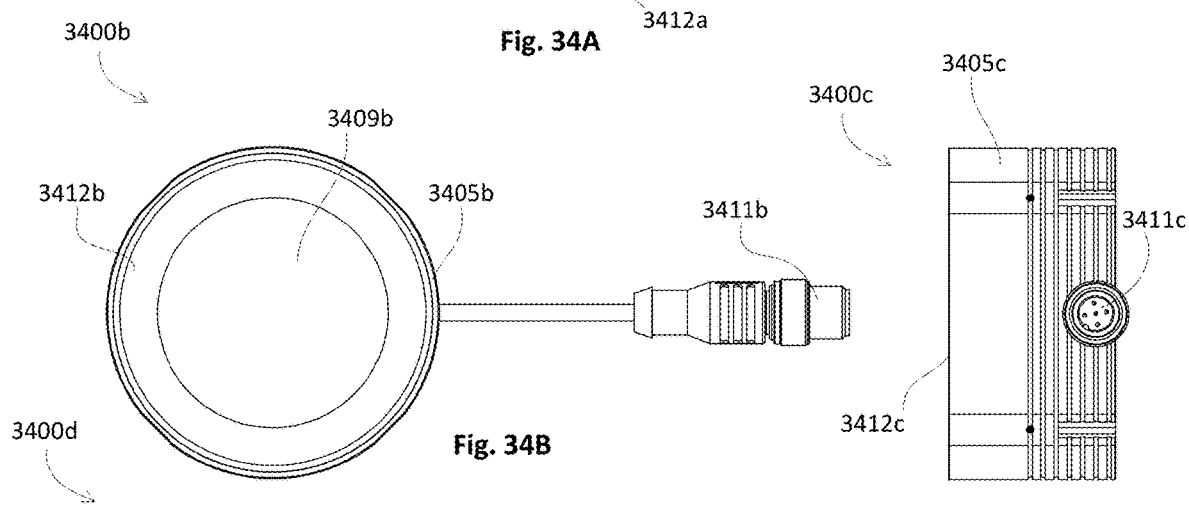
Fig. 34B
Fig. 34C
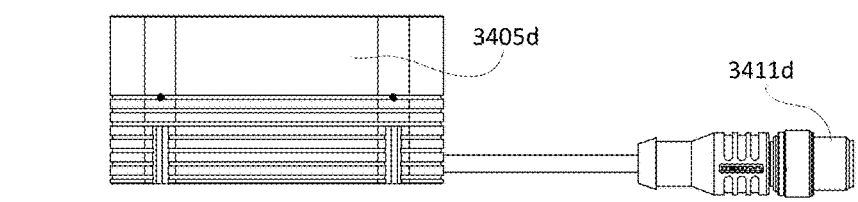
Fig. 34D
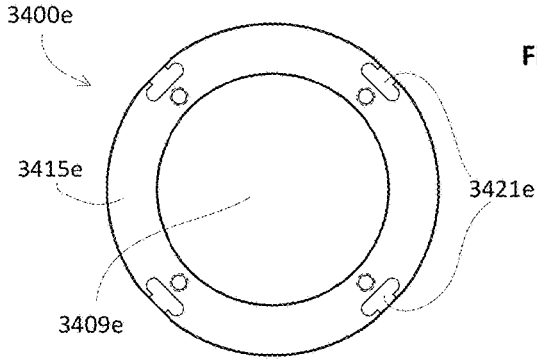
Fig. 34E

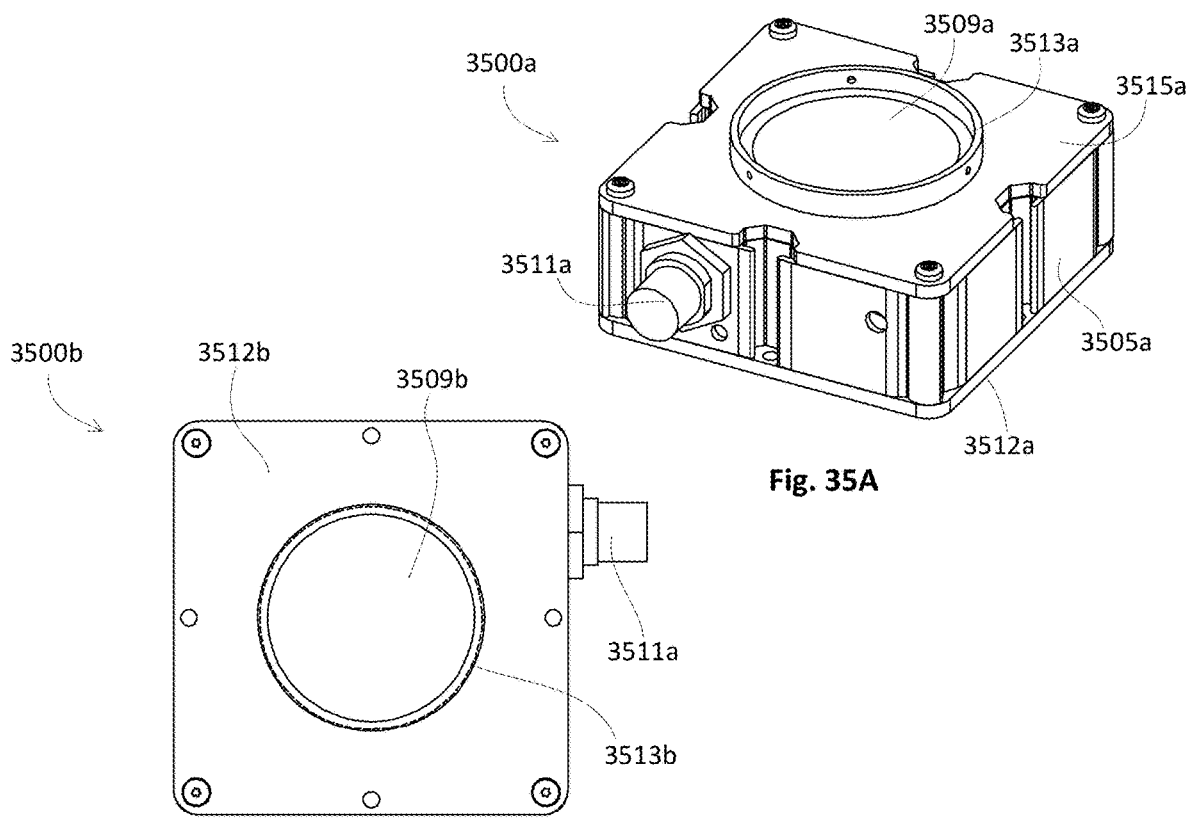
Fig. 35A
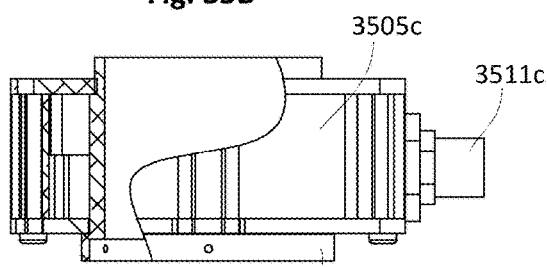
Fig. 35B
Fig. 35C
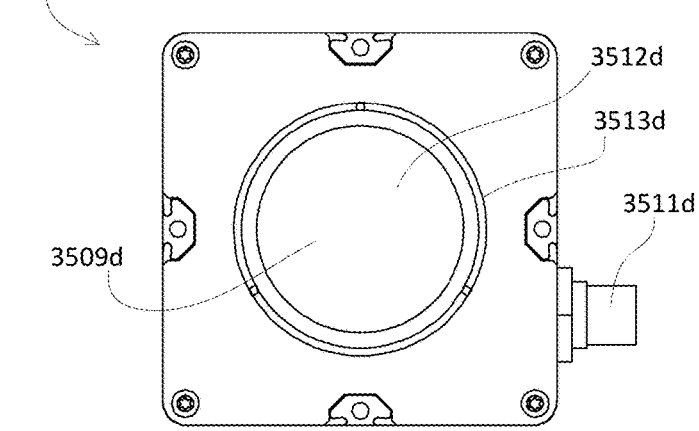
Fig. 35D

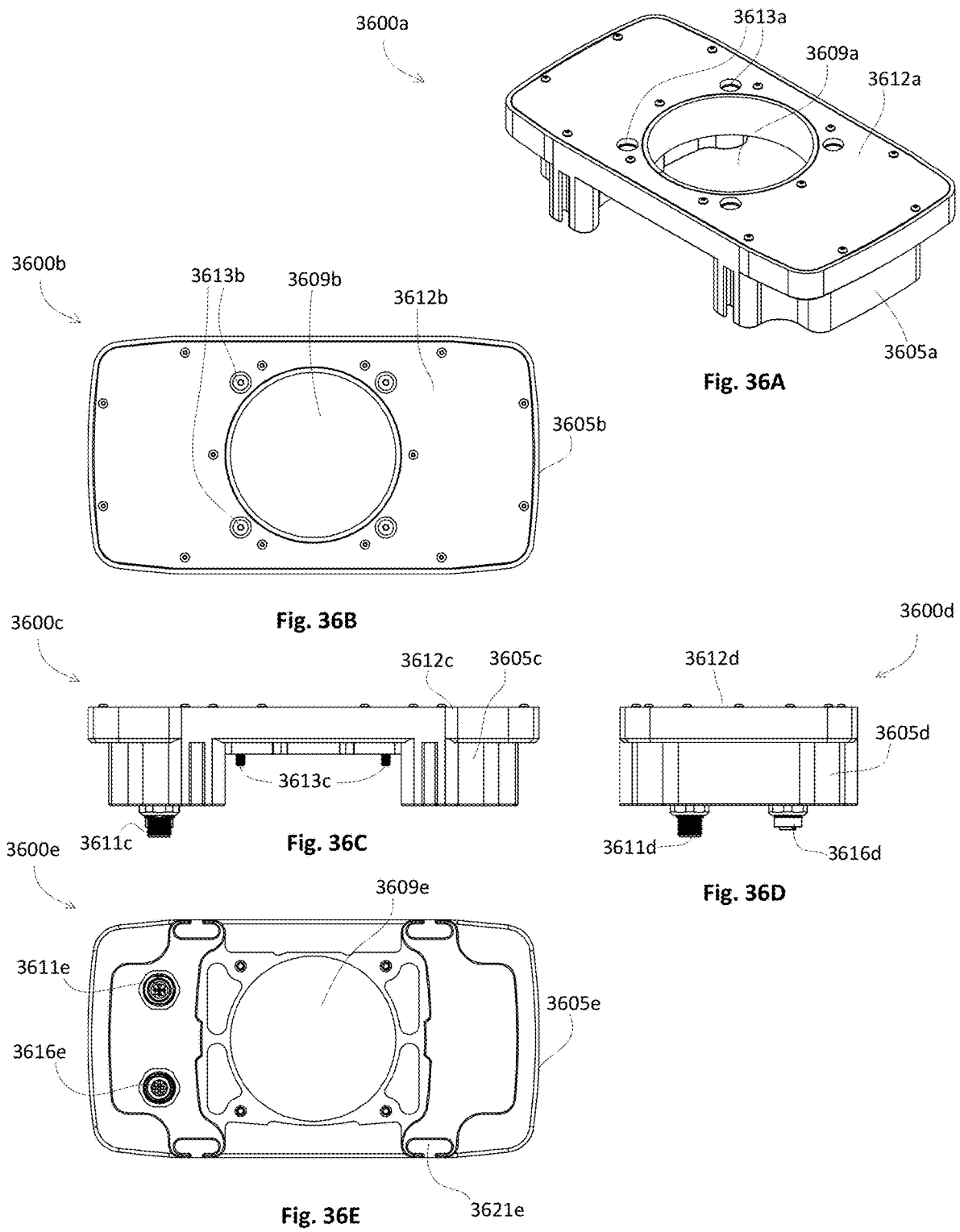

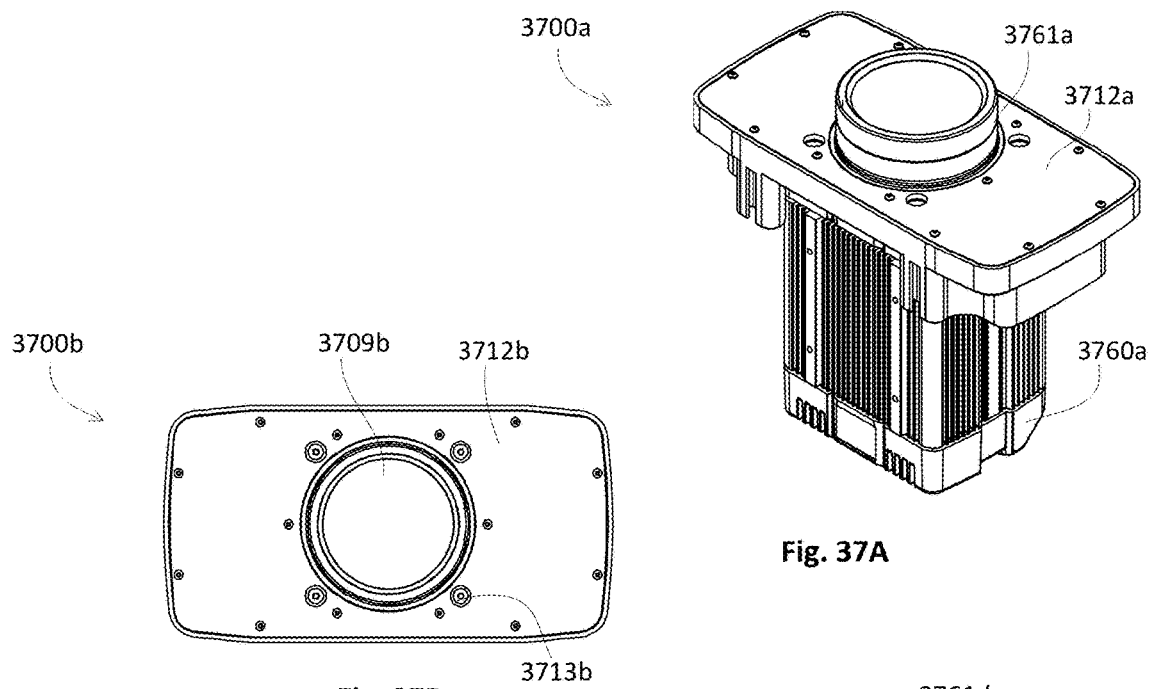
Fig. 37A
Fig. 37B
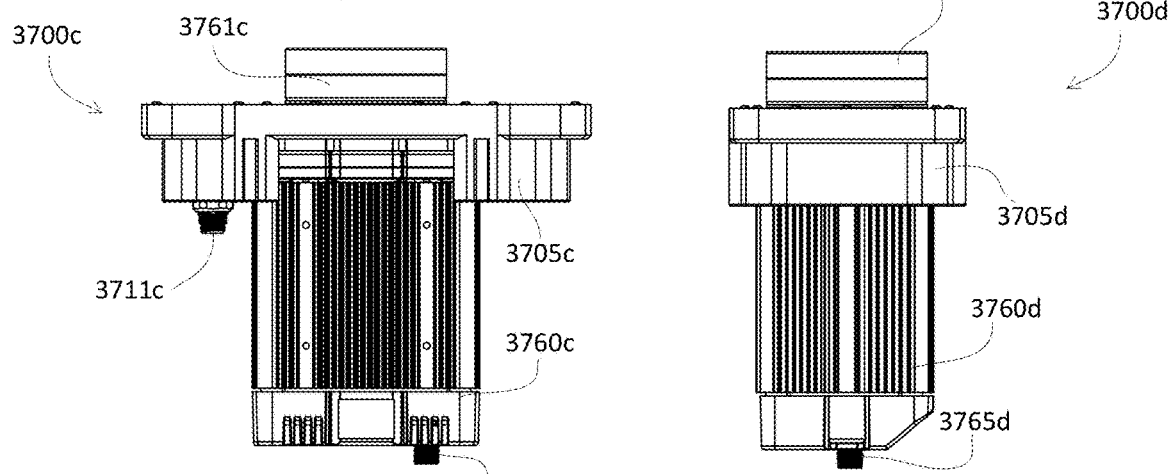
Fig. 37C
Fig. 37D
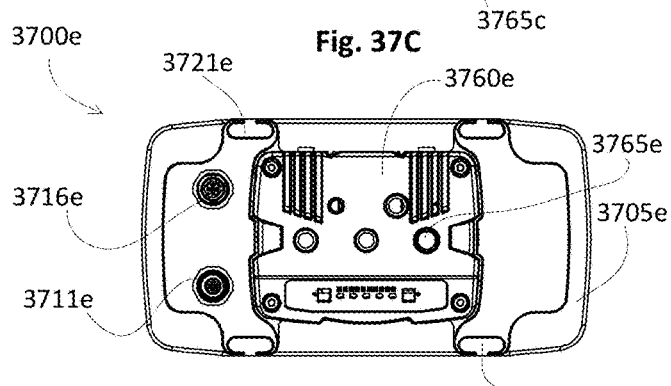
Fig. 37E

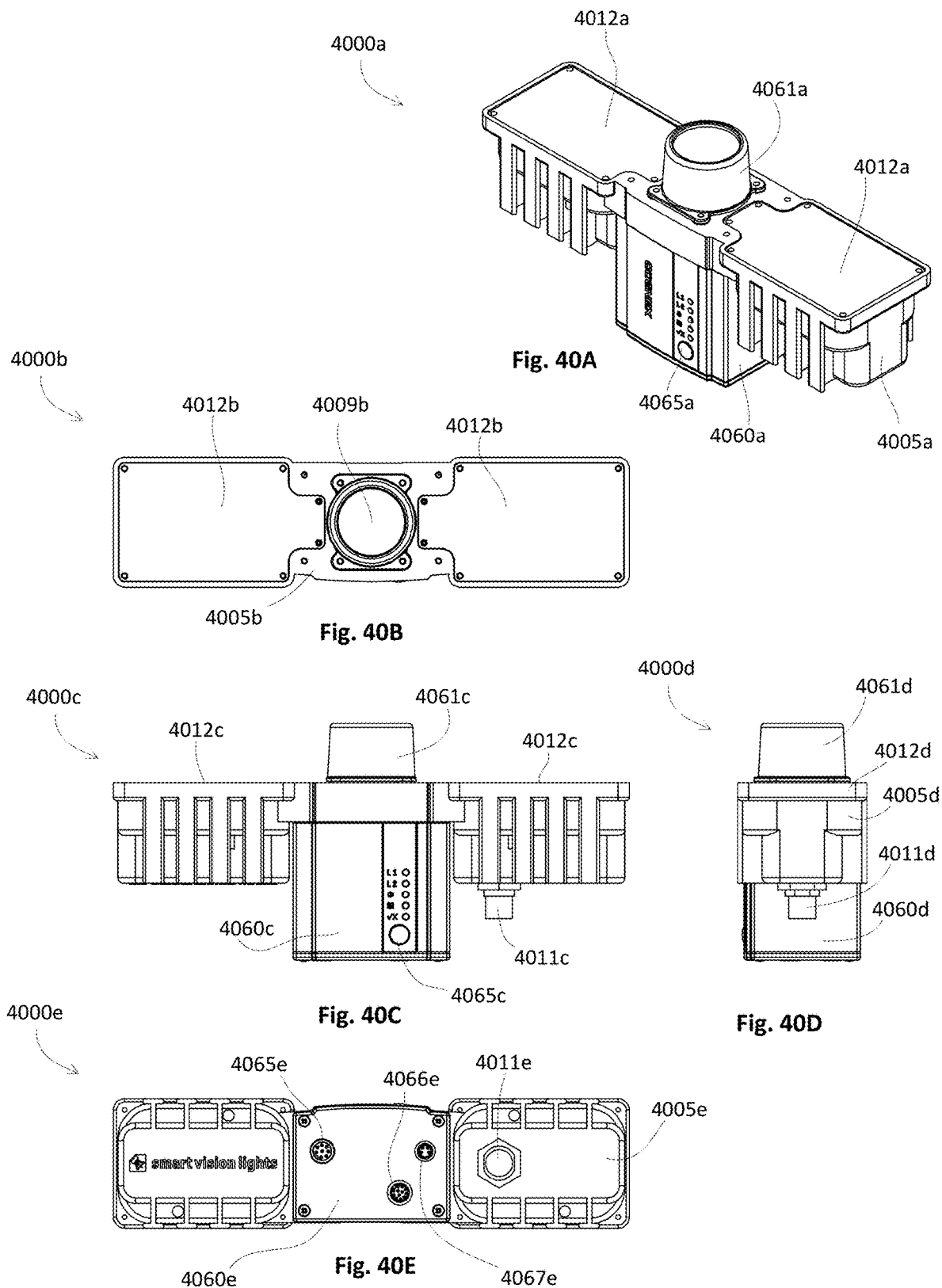

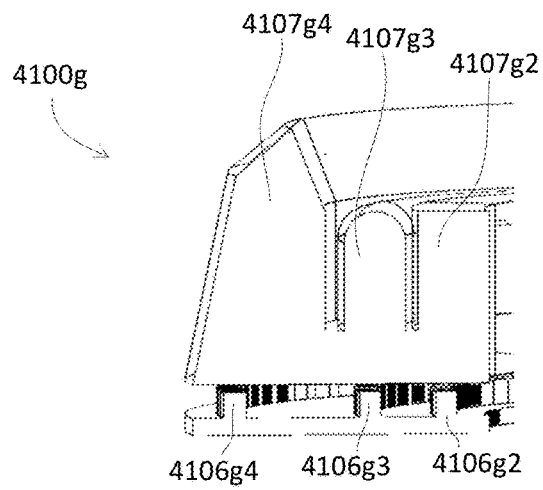
Fig. 41G
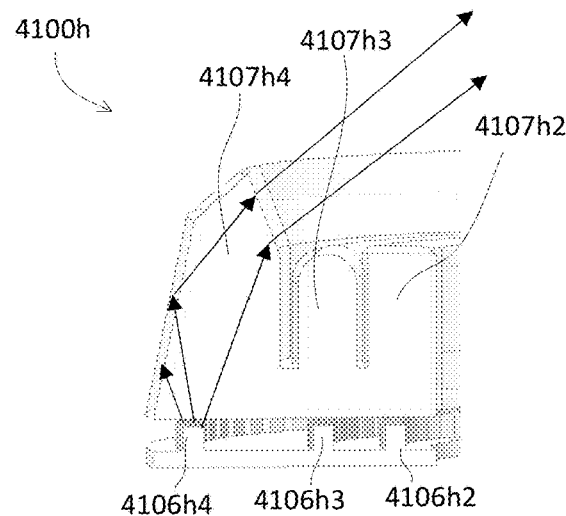
Fig. 41H
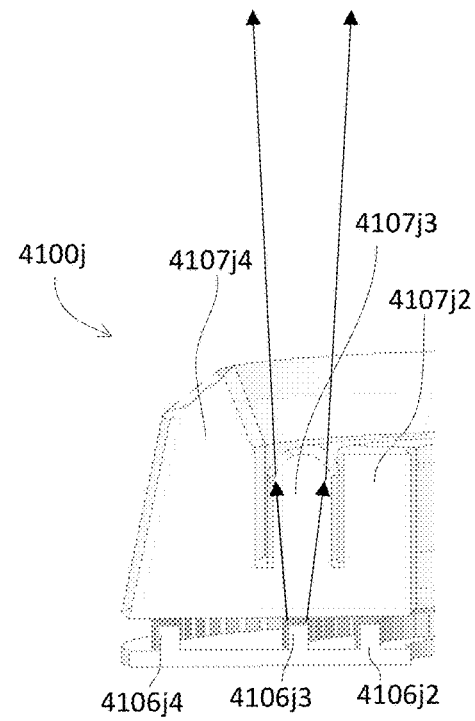
Fig. 41J
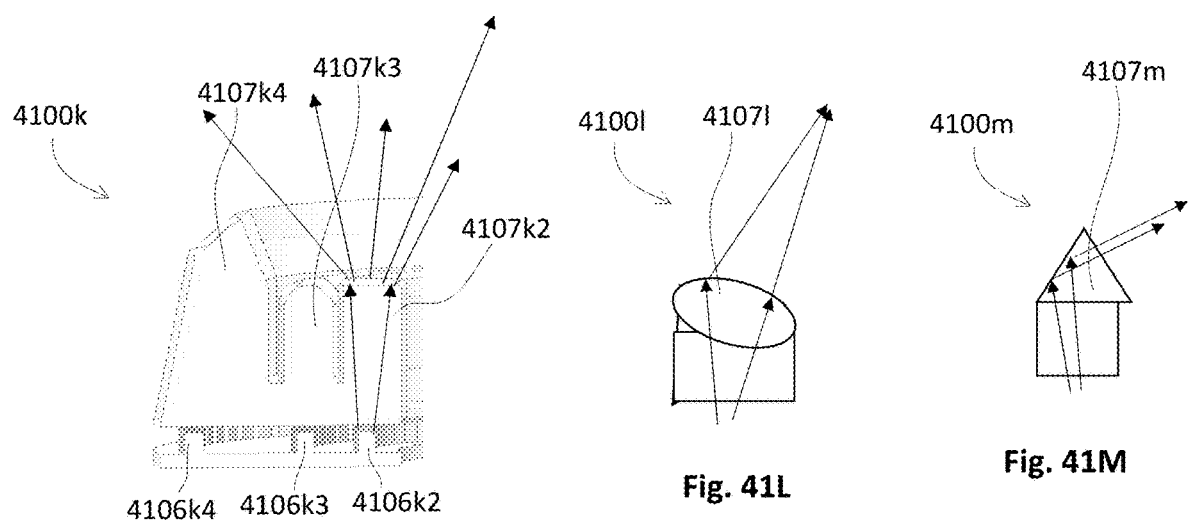
Fig. 41K
Fig. 41L
Fig. 41M

MACHINE VISION SYSTEMS, ILLUMINATION SOURCES FOR USE IN MACHINE VISION SYSTEMS, AND COMPONENTS FOR USE IN THE ILLUMINATION SOURCES

TECHNICAL FIELD

The present disclosure generally relates to machine vision systems, illumination sources for use in machine vision systems, and components for use in the illumination sources. More specifically, the present disclosure relates to machine vision systems incorporating multi-function illumination sources, multi-function illumination sources, and components for use in multi-function illumination sources.

BACKGROUND

Machine vision systems rely on quality images for quality output. High quality images enable the system to accurately interpret the information extracted from an object under inspection, resulting in reliable, repeatable system performance. The quality of the image acquired in any vision application is highly dependent on the lighting configuration: the color, angle, and amount of lighting used to illuminate an object can mean the difference between a good image, resulting in good performance, and a poor image, yielding poor results.

Machine vision lighting should maximize feature contrast while minimizing contrast of the rest, thereby allowing the camera to clearly "see" the part or mark. High contrast features simplify integration and improve reliability; images with poor contrast and uneven illumination require more effort from the system and increase processing time. The optimal lighting configuration is dependent on the size of the part to be inspected, its surface features and part geometry, and the system needs. With a broad range of wavelength (color), field of view (size), and geometry (shape) options available, machine vision lighting can be tailored to specific application requirements.

SUMMARY

A machine vision system may include at least one patterned area light source and at least one digital camera oriented at a first angle relative to surface of an object to be inspected. The at least one patterned area light source may be oriented at a second angle relative to the surface of the object to be inspected such that a field of view of the at least one digital camera encompasses reflection of at least a portion of light emitted by the at least one patterned area light source from the surface of the object to be inspected. The machine vision system may also include a digital image data receiving module stored on a memory of a computing device that, when executed by a processor of the computing device, may cause the processor to receive digital image data from the at least one digital camera. The digital image data may be representative of the reflection of at least a portion of light emitted by the at least one patterned area light source from the surface of the object to be inspected. The machine vision system may further include a phase measuring deflectometry module stored on the memory of the computing device that, when executed by the processor of the computing device, may cause the processor to determine whether the surface of the object to be inspected includes a defect based on the digital image data.

In another embodiment, a machine vision system may include at least one patterned area light source oriented to emit light toward an object to be inspected. The machine vision system may also include at least one digital camera with a field of view oriented toward the object to be inspected. The field of view of the at least one digital camera may encompass at least a portion of light emitted by the at least one patterned area light source. The machine vision system may further include a digital image data receiving module stored on a memory of a computing device that, when executed by a processor of the computing device, may cause the processor to receive digital image data from the at least one digital camera. The digital image data may be representative of at least a portion of light emitted by the at least one patterned area light source. The machine vision system may yet further include a phase measuring deflectometry module stored on the memory of the computing device that, when executed by the processor of the computing device, may cause the processor to determine whether the object to be inspected includes a defect based on the digital image data.

In a further embodiment, a machine vision system may include at least one patterned area light source oriented to emit light toward an object to be inspected. The machine vision system may also include at least one digital camera with a field of view oriented toward the object to be inspected. The field of view of the at least one digital camera may encompass at least a portion of light emitted by the at least one patterned area light source. The machine vision system may further include a digital image data receiving module stored on a memory of a computing device that, when executed by a processor of the computing device, may cause the processor to receive digital image data from the at least one digital camera. The digital image data may be representative of at least a portion of light emitted by the at least one patterned area light source or light emitted by the at least one patterned area light source that is reflected from a surface of the object to be inspected. The machine vision system may yet further include a phase measuring deflectometry module stored on the memory of the computing device that, when executed by the processor of the computing device, may cause the processor to determine whether the object to be inspected includes a defect based on the digital image data.

A machine vision system line scan illuminator may include two or more independent lines of light emitters. A machine vision system line scan illuminator may include individual lines may have light sources with different wavelengths. A machine vision system line scan illuminator may include individual lines may be independently controlled with respect to one another. A machine vision system line scan illuminator may include individual lines may be pulsed independently with respect to one another.

In another embodiment, a multi-function machine vision system illuminator may include at least two of: a dome light, a dark-field light, a direct light, a bright-field light, and an off-axis light. A multi-function machine vision system illuminator may include a co-axial light along with at least two of: a dome light, a dark-field light, a direct light, a bright-field light, and an off-axis light. A multi-function machine vision system illuminator may include independently controlled light sources and/or groups of light sources.

In a further embodiment, a machine vision system illuminator may include a pattern light emitter with gradient illumination between the individual portions of the pattern. A machine vision system illuminator may include a pattern light emitter with gradient illumination between the individual portions of the pattern that are created using an liquid crystal display.

In yet a further embodiment, a machine vision system may be configured with a multi-line illuminator, a multi-function illuminator, and/or a gradient illuminator. A machine vision system may be configured with a multi-line illuminator, a multi-function illuminator, and/or a gradient illuminator, and to analyze images acquired from a camera that is synchronized with a given illuminator or illuminators.

In another embodiment, a machine vision system may include a light emitting diode driver circuit. The light emitting diode circuit may include an on-time of less than 10 nanoseconds.

BRIEF DESCRIPTION OF THE FIGURES

FIGS. 17A-E depict various views of an example linear "everything" light;

FIGS. 18A-F depict various views of an example bar light;

FIGS. 19A-E depict various views of an example bar light;

FIGS. 20A-C depict various views of an example direct connect linear light;

FIGS. 21A-G depict various views of an example linear light;

FIGS. 22A-E depict various views of an example linear light;

FIGS. 26A-E depict various views of an example ring light;

FIGS. 30A-D depict various views of a washdown back light;

FIGS. 33A-F depict various views of an example direct ring light;

FIGS. 34A-E depict various views of an example direct ring light;

FIGS. 35A-D depict various views of an example ring light;

FIGS. 36A-E depict various views of an example strobe light;

FIGS. 37A-E depict various views of an example machine vision system incorporating a strobe light of FIGS. 36A-E;

FIGS. 40A-E depict various views of an example machine vision system incorporating a strobe light of FIGS. 39A-E;

FIGS. 41A-H and J-M depict various views of an example machine vision system incorporating an example multi-function illumination source;

DETAIL DESCRIPTION

Machine Vision may include a computer-based characterization of a digital image from an electronic sensor (e.g., a light sensor, a camera, a sonar sensor, an ultra-sonic sensor, etc.). A digital image may be a 1-D or 2-D array of picture elements (pixels), each pixel may include an (X,Y) location and an intensity value (e.g., 0-255 gray scales, or 8-bit contrast). Contrast may represent a visible intensity difference between dark (e.g., near 0) and light (e.g., near 255) pixels. In its most derivative form, light contrast patterns from an object may be characterized by a machine vision system.

Some considerations when choosing lighting for use in machine vision systems may include: (1) is the surface flat, slightly bumpy or very bumpy?; (2) is the surface matte or shiny?; (3) is the object curved or flat?; (4) what is the color of the barcode or mark?; and (5) are moving parts or stationary objects being inspected? Choosing optimal lighting for a machine vision system is one aspect to success of the machine vision system, and should be a consideration when setting up the machine vision system. A well planned lighting solution may result in better machine vision system performance and may save time, effort, and money in the long run. Lighting options may, for example, include: (1) use of bright light to detect missing material; (2) use of appropriate wavelength of light for accurate component placement; (3) use of non-diffused light to detect cracks in glass; (4) use of diffused light to inspect transparent packaging; (5) use of color to create contrast; (6) use of strobed light for rapidly moving parts; (7) use of infrared light to eliminate reflections; and (8) use of infrared light to diminish color variation.

Figure 2:
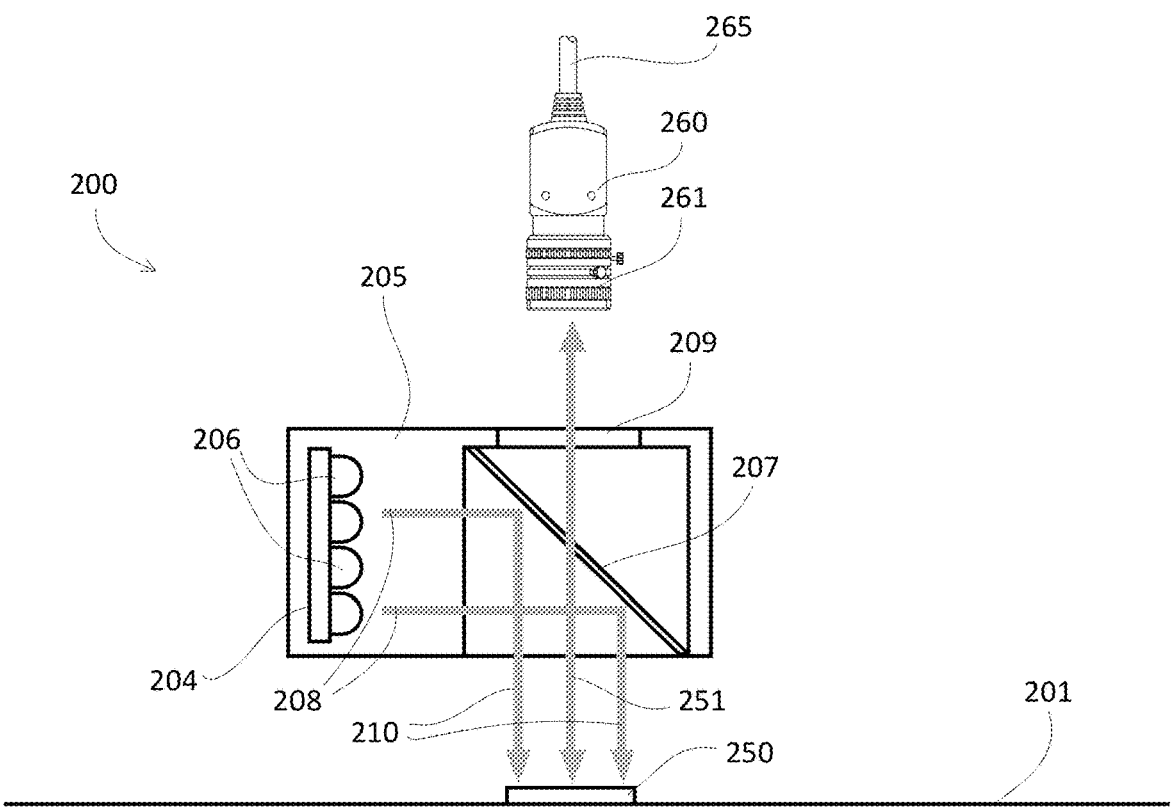
FIG. 2 depicts an example machine vision system incorporating coaxial-vertical illumination.

In one example, a bright light (e.g., co-axial light/wavelength with camera, as depicted in FIG. 2) may be used to detect missing material (e.g., identifying "Short Shots" in plastic molding). Identifying missing material from plastic molding applications may be important, for example, to ensure good sealing surfaces in associated plastic products. When material is missing, a "short shot" condition (i.e., insufficient quantity of material injected into the mold) may result. To identify short shots, a diffuse on-axis light (e.g., co-axial light/wavelength with camera, as depicted in FIG. 2) illuminator may be used to highlight missing material on, for example, a sealing surface of a product (e.g., a plastic bottle). A bright field lighting technique may rely on surface texture and flat topography. Light rays hitting a flat specular surface may reflect light strongly back to the camera, creating a bright area. Roughly textured or missing surfaces may scatter the light away from an associated camera, creating dark areas. When material is absent during the molding operation (i.e., a short shot), presenting a failure in, for example, a bottle sealing surface, a coaxial light source (e.g., co-axial light/wavelength with camera, as depicted in FIG. 2) may reflect brightly off a sealing surface of a good bottle. This may present the camera with a well-defined bright annular area. A short shot may eliminate the flat specular surface, scattering the light away from the camera and allowing identification of the defect (i.e., the short shot).

In another example, a particular wavelength of light may be used to, for example, detect accurate component placement (e.g., inspecting "Flipped Chips" on an electronic printed circuit board (PCB). Identifying proper component orientation is a common machine vision application in PCB assembly. In this example, chips may be incorrectly "flipped" in an automated assembly step. For example, instead of being placed onto a substrate (e.g., printed circuit board) with copper side down for proper electrical connection, a chip may be flipped over, silver side down, causing component and assembly failure. A machine vision system having a light source that emits a particular color may reflect brightly off of properly installed components, while improperly installed components may absorb the light and appear to a camera as dark. The sharp difference in contrast may be recognized by an associated machine vision system, enabling real-time process corrections.

A useful method for creating a high contrast image in a machine vision application is to illuminate an object with light of a particular wavelength (color). A light's wavelength can make features with color appear either bright or dark to, for example, a monochrome camera. Using a color wheel as a reference, a light of an opposing color (i.e., wavelength) may be chosen to make features dark (i.e., a light source of the same color as the object may make associated features of the object light). For example: if the feature that is desired to make darker is red, a green light may be used. A green light may be used to make a green feature appear lighter. Differences in red and blue lighting on printed aluminum may be useful.

An infrared light may be used to eliminate reflections (e.g., inspecting shiny objects such as chrome parts). Machine vision systems may rely on transitions of gray levels in a digital image. In many machine vision applications, ambient light sources (i.e., overhead room lighting) may contribute unwanted bright reflections that make it difficult or impossible for the vision system to detect the features of interest. An infrared (IR) light source can be used to eliminate this problem. Use of infrared light to diminish color variation of objects (e.g., inspecting an array of different color crayons) may be used to diminish a grayscale difference between the colored objects. For example, dark objects may absorb infrared light waves, thereby creating uniformity in objects of otherwise varying shades. This lighting solution may facilitate detection of inconsistencies where color or shade variation is expected and should not affect inspection.

In a further example, a non-diffused light emitter may be incorporated within a machine vision system to detect cracks in glass. A dark field light source (e.g., a backlight, as shown in FIGS. 25A-H,J, oriented at a 90° angle with respect to camera angle) may be used, for example, to detect cracks during sidewall inspection of glass containers. Such detection, prior to packaged-goods shipment, is one way to minimize waste, decrease returns and increase consumer confidence. The illumination source may highlight any imperfections. In this application, dark field lighting may be used to create a bright, easily detectable feature of interest within a dark background. For example, light rays may be directed at a transparent bottle from a dark field region (i.e., from outside a camera's field of view). Thereby, most of the light rays may pass through the transparent object undetected by the camera. If a material irregularity exists (e.g., a crack), some light rays may strike that irregularity. Cracks, in particular, create an internal void, where light rays refract and reflect, scattering in many directions including back to the camera. The light that is refracted/reflected to the camera may turn an otherwise difficult to detect crack into a bright feature on a dark background.

Figure 4:
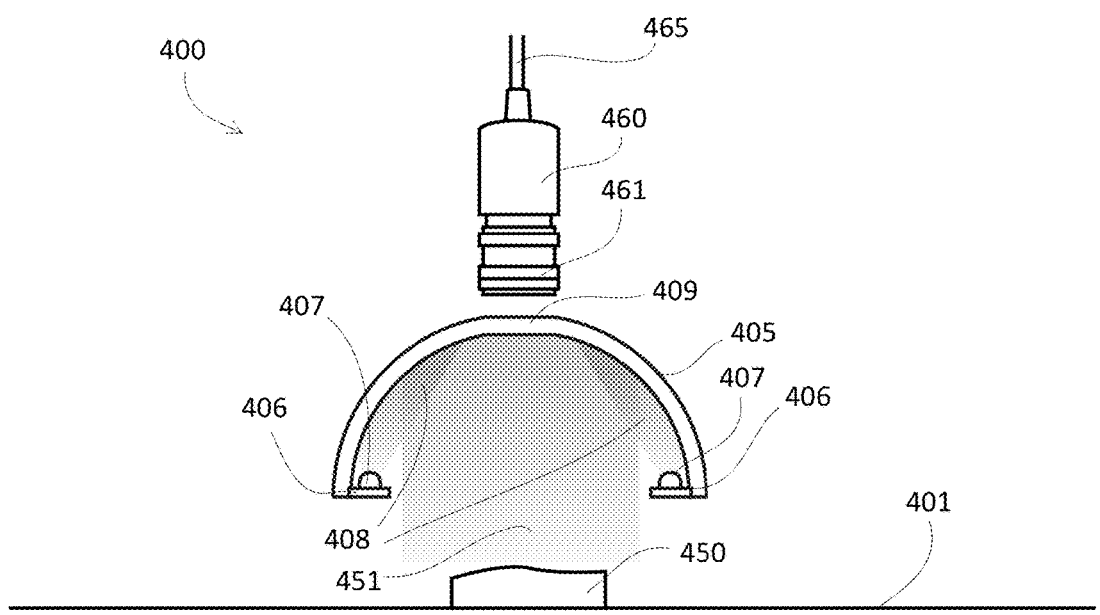
FIG. 4 depicts an example machine vision system incorporating dome-light illumination.

In yet another example, diffused light (e.g., a dome light as illustrated in FIG. 4) may be used to inspect transparent packaging. For example, missing, damaged and/or incorrect contents in cells of blister packages may be detected in an inspection step for ensuring quality of finished pharmaceutical goods. Illuminating the packages to avoid reflections from cell coverings can often be a tough challenge. To present an accurate image of the cells and their contents to a machine vision camera, a diffused light (e.g., a dome light as illustrated in FIG. 4) may be incorporated within a machine vision system with, for example, white LEDs. The diffused light (e.g., a dome light as illustrated in FIG. 4) may eliminate reflections from clear cell coverings, making the clear cell coverings virtually disappear, while at the same time providing a high contrast, neutral color view of the cell contents. Continuous diffuse lighting techniques may de-emphasizes surface textures and changes in elevation. Continuous diffuse light (e.g., a dome light as illustrated in FIG. 4) may provide a very large solid angle of illumination to guide light rays to the object from a multitude of angles, thereby eliminating the reflections and shadows typical of unidirectional or single-plane light sources. The light source may, for example, bathe the object in uniform white light from every angle within a field of view of an associated camera. This may present the camera with a glare-free image of blister pack cell contents, and the clear blister coverings may virtually disappear from view.

A light emitter may be strobed when a part to be inspected is moving quickly and an associated image captured by a camera appears blurred. For example, a formula to calculate a strobe pulse width (e.g., maximum acceptable blur image=1 pixel) may be–Strobe Pulse Width=(Field of View of camera (in)÷Pixels)/Part Speed (in/s). In the formula, a field of view (FOV) and pixels may be based on an axis of travel of associated photons. For example, assuming a typical 1 inch FOV and a 640 pixel frame, and a part speed of 500 inches per second, a strobe pulse width of 3.1 µs may be used.

In any event, a vision system lighting source may be development by, in part, taking images of a part to be inspected while trying different light sources at different positions, different orientations, and/or different wavelengths. Thereby, an imaging environment may be used to short-list best solution possibilities. Bench tests may then be used on a production floor to verify the preliminary analysis.

Object features that uniquely identify parts as "bad" or "good" (i.e., "features of interest") may be used to design lighting that creates consistent contrast between features of interest and, for example, an associated background. Various light sources may be used to test the lighting method on many "bad" & "good" objects.

Illumination for machine vision systems may be characterized as photons propagating as a transverse electromagnetic energy wave including: (1) a measured "intensity"—both radiometric and photometric; (2) a frequency that may vary inversely with wavelength (Hz—waves/sec); and a wavelength expressed in nanometers (nm) or microns (um). Energy packets of photons may exhibit properties of waves and particles including: (1) diffusion ("dispersal") through media; (2) reflection—when not viewing a light source directly, photons may interact with objects such that a camera may detect the photons; (3) refraction (apparent bending of light) through media—longer wavelengths refract less (e.g., red light refracts<violet light); and (4) diffraction ("bending") around object edges.

Machine vision light sources may include: light emitting diodes (e.g., LED Types—T1 ¾, surface mount LEDs, high current LEDs, etc.); quartz halogen—W/fiber optics; fluorescent; Xenon (strobing); etc. Photons of light rays may experience sample interaction with a target (e.g., object to be inspected) including: a total light emitted which may equal reflected photons plus absorbed photons, plus transmitted, plus emitted (fluorescence) light; incident illumination; reflected photons; emit (fluorescence) photons; absorb photons; transmitted photons. Measured irradiance/illuminance may fall off as, for example, an inverse square of a distance (I=1/r2)·2×(WD)=¼ the "intensity." Light interaction with a target may experience any one of, or all of, convergence of concepts including (Object-Light-Lens**): contrast; resolution; spatial; spectral; focal length/field of view; focus; working distance/stand-off; sensitivity.

Robotics based machine vision system applications may include a 3-D working volume: a strong inter-relationship between ambient light—any light other than the vision-specific lighting that the camera collects; controlling and negating ambient light; turning off the ambient contribution, such as, a shroud, overwhelm the ambient contribution w/ high-power lighting (e.g., continuous-on or strobe over-drive); control it with pass filters, such as, pass filters that exclude or prefer light based on wavelength, reduce sunlight and mercury vapor light 4×, or reduce fluorescent light 35×; lighting contrast, such as, maximum contrast of features of interest (i.e., signal) v ambient light (i.e., noise), minimum contrast of features of no interest (i.e., noise); minimum sensitivity to normal variations, such as, minor target differences, presence of, or change in ambient lighting, or sample handling/presentation differences.

Machine vision lighting may change contrast by at least one of; change light source emission direction with respect to a target and/or with respect to an associated camera geometry, such as, a 3-D spatial relationship—target, light & camera; change light pattern (e.g., structured lighting), such as, a light head type (e.g., spot, line, dome, sheet, etc.); illumination type (e.g., bright field, dark field, diffuse, back lighting, etc.); change spectrum (e.g., color, wavelength, projecting monochromatic, white vs object and/or camera response, projecting warm vs. cool color family light-object vs. background, etc.); or change light character (e.g., filtering), such as, affecting a wavelength or character of light collected by a camera.

Figure 3:
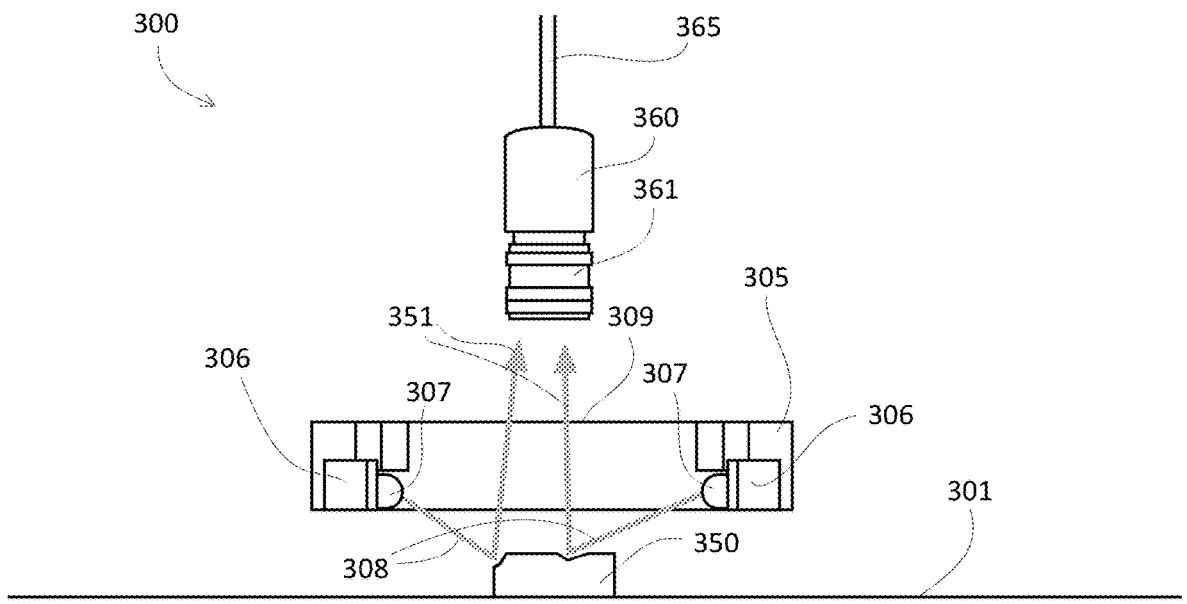
FIG. 3 depicts an example machine vision system incorporating low-angle illumination.
Figure 5:
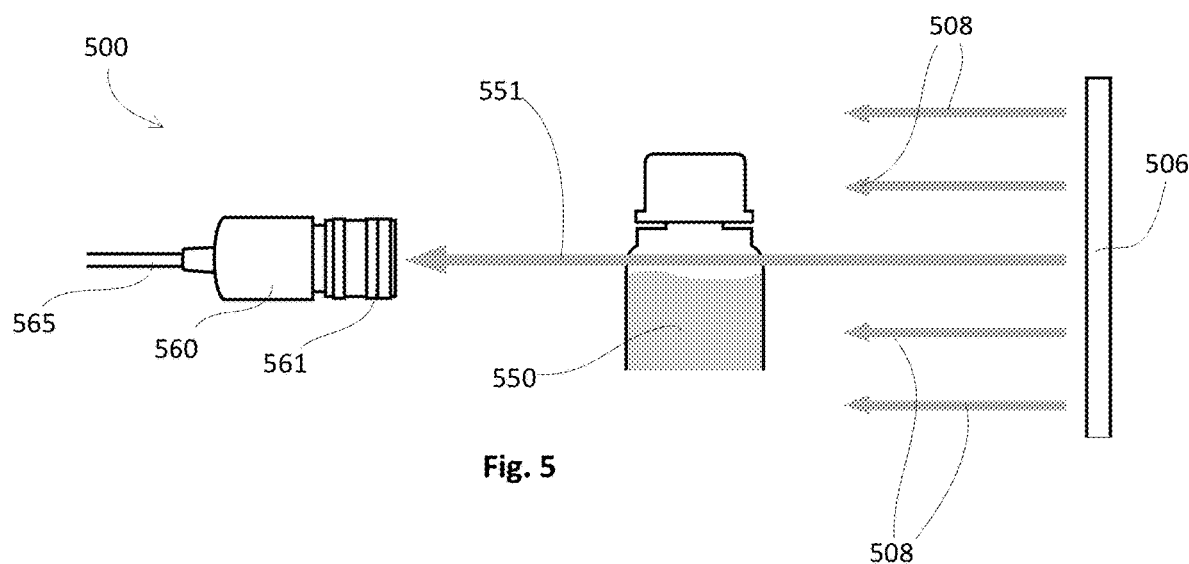
FIG. 5 depicts an example machine vision system incorporating backlight.
Figure 7A:
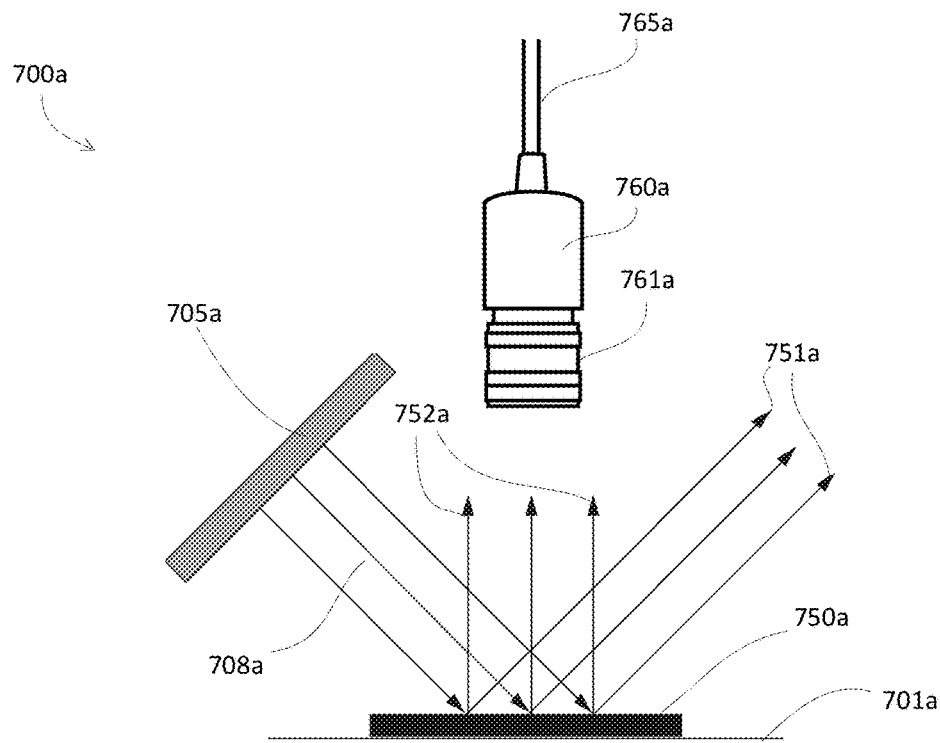
FIGS. 7A and 7B depict example machine vision systems incorporating direct reflection and diffuse reflection, respectively.
Figure 7B:
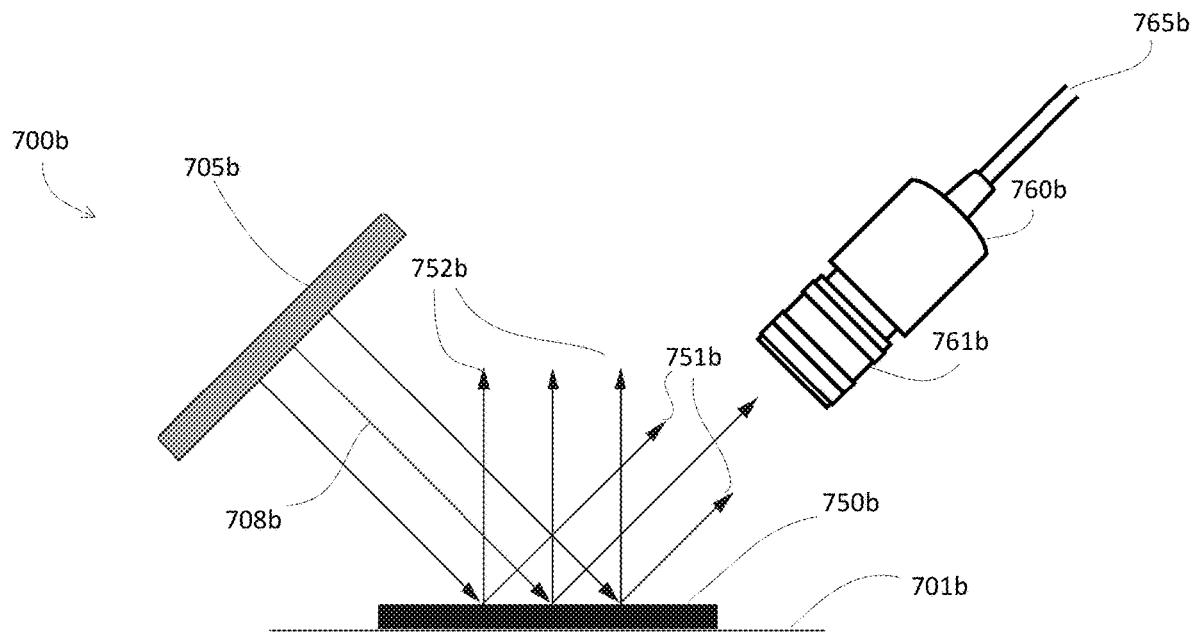
Figure 8A:
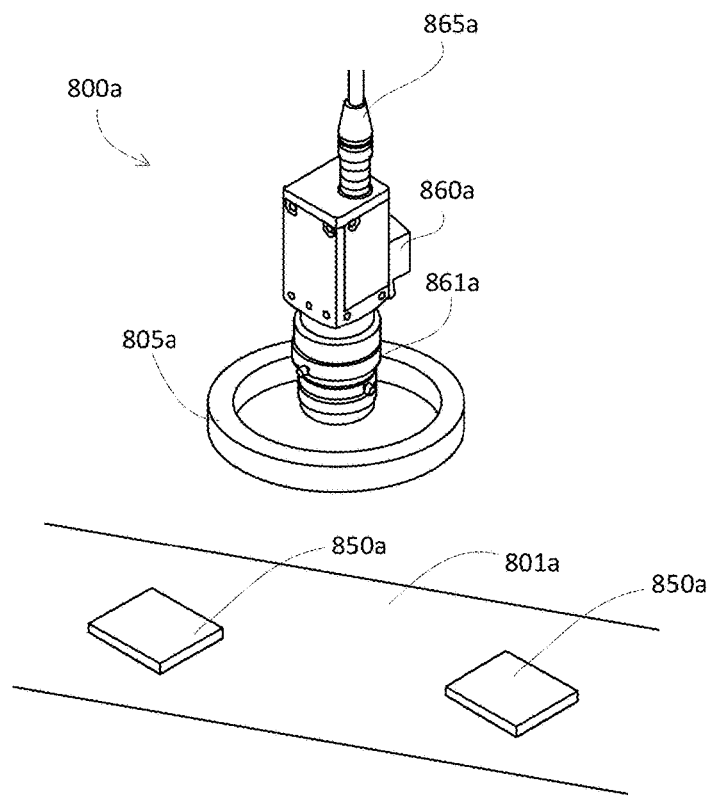
FIGS. 8A and 8B, depicts an example machine vision system incorporating strobe illumination.
Figure 8B:
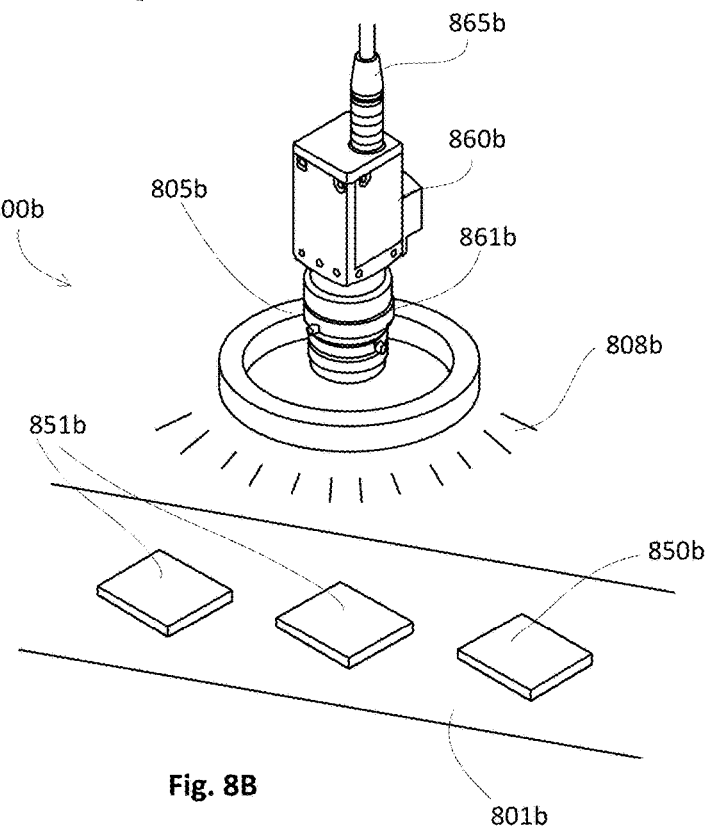

Machine vision lighting techniques may include: partial bright field illumination (e.g., illumination as shown in FIGS. 7A and 7B); dark field illumination (e.g., illumination as shown FIG. 1); back lighting (e.g., illumination as shown in FIG. 5); co-axial diffuse illumination (e.g., illumination as shown in FIG. 2); diffuse dome illumination (e.g., illumination as shown in FIG. 4); or flat diffuse illumination (e.g., illumination as shown in FIGS. 3, 8A and 8B); any sub-combination thereof, or a combination thereof.

Figure 10:
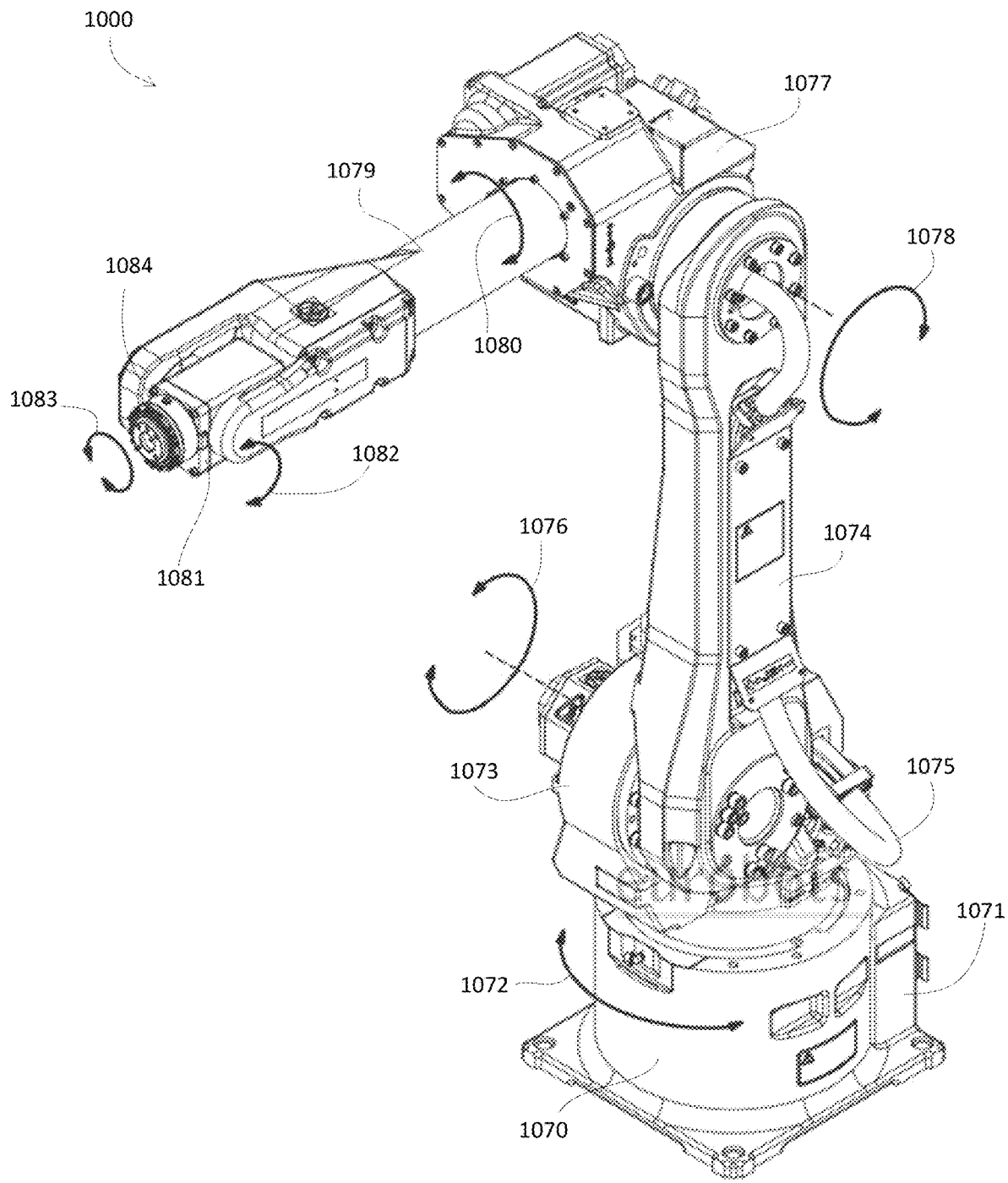
FIG. 10 depicts an example multi-axis robotic vision system.
Figure 11:
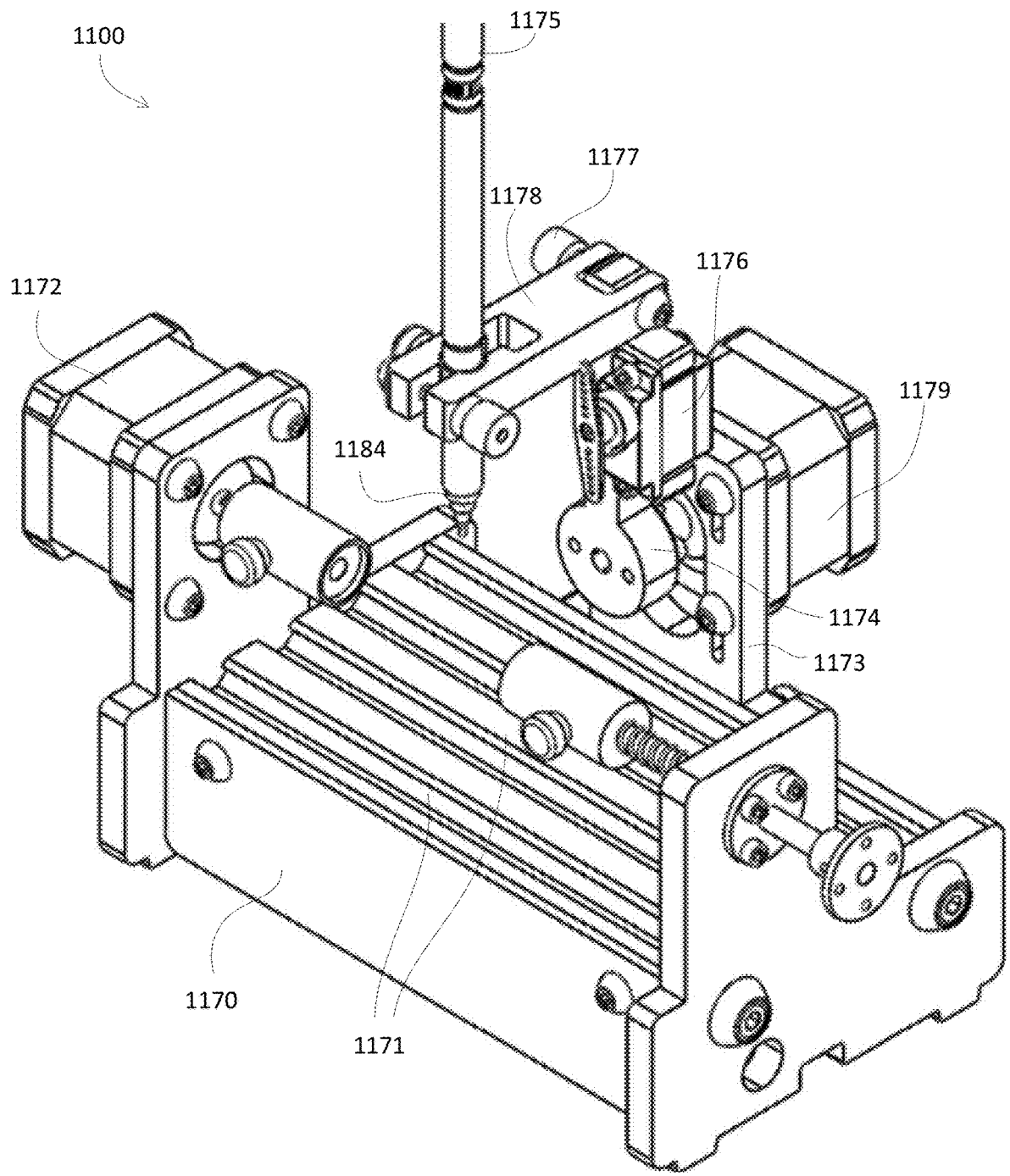
FIG. 11 depicts an example linear robotic vision system.

Advanced lighting techniques may include: structured laser/LED grids, lines, focused linears; full bright field; collimated; co-axial; back lighting; multi-axis/combo dome plus dark field, bright and dark field, addressable rows of LEDs, etc. Bright field lighting may reduce an effect of specular surfaces that reflect glare if light is high-angle. Diffuse, flat and smooth surfaces of a target may reflect photons more evenly. Dark field illumination (e.g., angled light emission—45 degrees or less) may be used on highly reflective surfaces, optical character recognition, or surface defect applications. Dark field illumination may emphasize height, edges, diffuse surfaces bright, flat polished surfaces dark, shape and contour enhanced, etc. Back light may be used for edge or hole detection, on translucent materials, liquid fill levels, detecting glass/plastic cracks, part P/A, vision-guided robotics (e.g., robots as shown in FIGS. 10 and 11), pick and place, gauging (e.g., high accuracy measurements), etc.

Light diffusion and diffraction may include multiple angle light from back light diffuser, bending light around obstacles (e.g., Θ=λ/D, where Q is the diffraction angle and D is opening width (Θ1>Θ2)), high-accuracy gauging (e.g., monochromatic light, shorter wavelengths of light, collimation—parallel rays longer λ light may penetrate some objects better), small bottle fill level determination. Illumination source characteristics may be selected based upon, for example, colors and materials properties of targets (e.g., shorter wavelength illumination for penetration through a target). Diffuse dome light may be similar to the light on an overcast day (e.g., may create minimal glare, target surface texture and detail may be de-emphasized, contrast may be de-emphasized, may be useful for curved shiny parts, may have opposite effect of dark field illumination). Co-axial diffuse illumination (e.g., light directed at beam splitter as in FIG. 2) may be used on non-curved, reflective objects such that surface texture may be emphasized and/or angled elevation changes may be darkened. Flat diffuse illumination may include a diffuse sheet directed downward, long WD and larger FOV, or hybrid diffuse (e.g., dome and co-axial). Table 1 illustrates a summary of various types of illumination along with various uses:

TABLE 1 illumination type v uses/requirements

| | Partial Bright Field | Dark Field | Diffuse Axial Full Bright Field | Diffuse Dome Full Bright Field |
|---|---|---|---|---|
| Lighting Type: | Ring, Spot, Bar | Angled Ring, Bar | Diffuse Box | Dome Flat Diffuse |
| When To Use | Non specular Area lighting May be used as a dark field light | Non Specular Surface/Topo Edges Look thru transparent parts | Non Specular Flat/Textured Angled surfaces | Non Specular Curved surfaces if ambient light issues |
| Requirements | No WD limit (limited only to intensity need on part) | Light must be very close to part Large footprint Limited spot size Ambient light may interfere | Light close to part Large footprint Ambient light minor Beam splitter lowers light to camera | Light close to part Large footprint Camera close to light Spot size is ½ light inner diameter |

Illumination devices for machine vision lighting may include an over drive circuit having, for example, an integrated strobe driver for complete LED light control as described, for example, in commonly assigned U.S. Pat. No. 10,067,069, the entire disclosure of which is incorporated herein by reference. The integrated strobe driver may be configured such that there is no need for an external driver to control the light. For example, an integrated intelligent driver may monitor strobe operation maximizing the lights output during part inspections via the vision system. The over drive function may include a safe strobe technology that may apply safe working parameters to ensure that associated LEDs are not damaged by driving them beyond their limits. This may be especially beneficial for overdriving high current LEDs. An over drive circuit may provide repeatable intensity control and pulsing by using a microprocessor to monitor and control electric power to the LEDs for safe operation. An integrated over drive controller may include both NPN and PNP strobe input for easy integration with, for example, smart cameras. Lights may have high speed reaction times that offer extremely fast repeatable pulse times. Over drive technology may automatically set limits for different LEDs and/or associated color or wavelength of LEDs may be maximized to produce, for example, highest output LED lights. For example, UV, IR, white, red, blue, green and cyan LEDs may have different maximum current limits and an over drive technology may control associated colors of light independently. An over drive circuit may include: 2000 strobes per second (SPS); intensity control using analog 0-10 VDC or potentiometer; highest power LED light drivers; safe strobe technology that may protected operation of LEDs; five times brighter than standard high current LED lights; precise current that provides stable light intensity; high speed >>fast response; and/or NPN and PNP strobe control.

A multi drive controller as described, for example, in commonly assigned U.S. Pat. No. 10,067,069, the entire disclosure of which is incorporated herein by reference, may combine two drives into one with constant ON operation and over drive high-pulse operation. The multi drive controller may allow a user to selectively operate an illumination source in constant ON operation or pulse/strobe the light at, for example, a maximum allowed intensity by setting associated parameters. Over drive operation may provide five times or more the power of constant operation. A built-in multi-driver may also protect associated LEDs from premature degradation and failure caused by, for example, excessive heat, by regulating a current delivered to the LEDs and limiting a duty cycle of the light. A multi-drive circuit may enable, for example, faster imaging and capture/freeze motion on high-speed production lines when compared to constant ON drivers.

Figure 1:
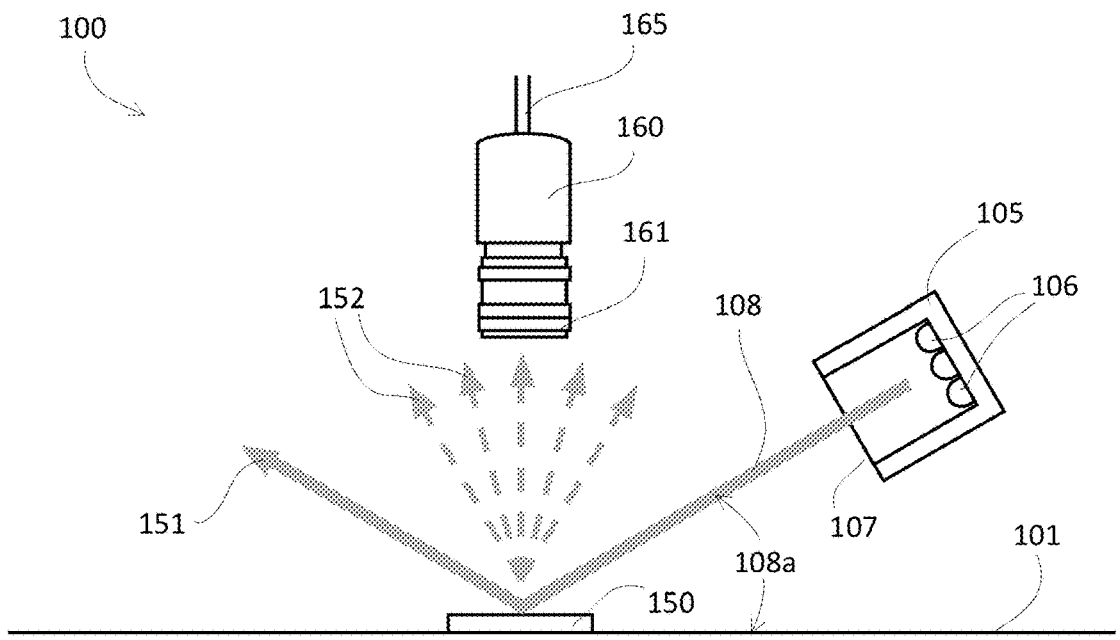
FIG. 1 depicts an example machine vision system incorporating indirect illumination.

Turning to FIG. 1, a machine vision system 100 may incorporate an indirect illumination source 105 that may be configured to at least partially illuminate a target 150 via photons 108 emitted by light source(s) 106 at an angle 108a with respect to the target 150, for example, traveling on a target transport 101 (e.g., a conveyer belt, a robot, etc.). The illumination source 105 may include an illumination source optical element 107 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 1, the illumination source optical element 107 may be manually and/or automatically variable. While similarly not shown in FIG. 1, an illumination source 105 may include either, or both, a hardwired electrical power/control connection or a hardwired electrical power connection and a wireless control (e.g., WIFI, Bluetooth, radio frequency, a wide area wireless network, etc.).

The machine vision system 100 may incorporate at least one camera 160 having an electrical power/control connection 165 and/or a camera optical element 161 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 1, the camera optical element 161 may be manually and/or automatically variable via, for example, control signals received via the electrical power/control connection 165. As an alternative, or addition, the camera 160 may include a wireless control (e.g., WIFI, Bluetooth, radio frequency, a wide area wireless network, etc.).

In any event, the photons 108 may impact the target 150 and may result in regular reflections 151 and/or diffuse reflections 152. The regular reflections 151 and/or the diffuse reflections 152 may be dependent upon, for example, any target defects. The camera 160 may detect, for example, the diffuse reflections 152. The machine vision system 100 may detect target defects by, for example, distinguishing diffuse reflections 152 associated with a target defect from diffuse reflections 152 associated with a target that does not include a defect.

The machine vision system 100 may be used to, for example, detect printing beneath a cellophane wrapped package, detect defective plating of electrical terminals, detect imperfect plating on tips of electrical terminals, etc. Indirect lighting, as when the angle 108a is less than, for example 45°, may eliminate glare and may apply illumination evenly. Color image processing may enable, for example, differentiation between bare silver metal and gold plating. The illumination source 105 may be configured within a lighting technique using a bar-light that may, for example, emit uniform light on long targets. Applying the light from an angle 108a may create diffuse reflection, and may enable differentiation between an acceptable target (e.g., a target free of defects, a target with minimal defects, etc.) and a rejected target (e.g., a target having defects). When a surface of the target is glossy, a polarizing filter 107, 161 may be incorporated within the machine vision system 100. With direct reflection (e.g., an angle 108a greater than 45°), since a sticker may reflect the illumination 108, edges of the sticker may not be clear (e.g., only the edges are extracted from an associated image). With bar illumination, on the other hand, the position detection of stickers may be precisely carried out. In another example with direct reflection, there may not be any contrast between an edge of an electrical terminal and an associated molded area of a target. With bar illumination, on the other hand, since only the edges of the terminals appear bright, the edge position can be detected.

One of the more difficult concepts in machine vision lighting is recognizing when it is advantageous to use dark field lighting (e.g., an angle 108a less than 45°) over a bright field counterpart (e.g., an angle 108a greater than 45°). Both techniques have advantages and disadvantages; whereas bright field lighting has a wider application envelope for most samples, dark field lighting has a more limited set of conditions necessary for its successful application. A comparison (a contrast) between bright field (BF) and dark field (DF) lighting using common vision applications may result by varying (either automatically or manually) angle 108a. As used in vision inspection, bright field lighting may be defined as lighting that is primarily incident on a field of view (e.g., a target) from a source oriented at greater than 45 degrees relative to the sample surface. Bright field may be further divided into 2 sub-techniques, and solid angle—a measure of the amount of relative area from which the light is sourced—is an effective differentiator. Bar, spot and ring lights, or any light at a significant working distance (WD), have a relatively low solid angle, and are therefore termed partial or directional BF point sources. Conversely, high solid angle hemispherical or planar lights, such as diffuse domes and cylinders, or axial diffuse and "flat" arrays, respectively, are termed full bright field sources. Consider also, for a full bright field light to be effective, hence subtending a large solid angle, it must be placed relatively close to the sample. Thus, it may follow that as a light's WD may increase, its solid angle may decrease, rendering the effect of a full BF light more typical of a partial BF light. This dichotomy may be a consideration because each combination of light presentation, geometry, WD and solid angle may have its own advantages depending on target characteristics, inspection features of interest, and sample access considerations, to name just a few.

When a bright field is characterized as a result of high angle incident light producing a "bright" field of view, dark field lighting can be said to generate a primarily "dark" field of view, at low angles of incidence. Dark field lighting may be used in microscopy and may be defined by circular light incident on a target surface at less than 45 degree angle 108a. A low angle 108a DF, with incident light as low as 10-15 degrees from the target 150 surface, as well as from a single direction, not just from circular sources, may be incorporated within a machine vision system 100. BF and DF light may respond differently on a mirrored surface. A dark field set up and resulting image of a scratch on a target may include the angle 108a of reflection that is equal to an angle of incidence. Further, as a corollary, the actual detail of the surface features may determine how and where light 108 reflects. The angle of incidence 108a, and similarly project what the angle of reflection of the light function diagrams, dark field is produced. For example, with the BF ring light, if we project the amount of light reflected from the mirror that actually returns back into the lens, it may be quite large; in fact, most of the light may be reflected into the camera. This effect may produce an image, typically referred to as a specular hot spot. Comparing a projected amount of light from a low angle DF ring light, most of the light may reflect away from an associated camera 160, and thus may not be collected, hence a "dark field" may result. Consider the above-mentioned corollary: It is the individual surface details that may reflect differently from an overall mirrored surface, and some of the light may reflected off surface imperfections and may reach the camera. In this fashion, a surface of a mirror may be inspected for scratches.

In another example of the robustness of dark field vs. bright field lighting for some common inspections, an image may be captured with a standard coaxial BF ring light (e.g., as shown in FIG. 2), compared to an image generated by a linear bar oriented from the side in classic dark field geometry. Either image may be suitable as-is, but consider if the next sample had considerable dark staining: The DF image may not change, whereas the stain might be plainly visible in the bright field image, and thus more likely to affect the inspection results. It may, or may not, follow that all dark field lights are applied at very low angles of incidence, to produce a completely dark field, except for surface abnormalities. In the following example, by using a light off axis near 45 degrees, an associated machine vision system may take advantage of dark field effects, thus erasing a specular glare problem. A series of images may illustrate the effect of applying both ring and bar lights at an angle that allows a majority of light to reflect away from the camera, thus eliminating specular glare, yet still allowing enough captured field lighting to view, for example, a surface label and details. An image may illustrate specular reflection of a co-axial bright field light. Compare this image with an image where the same light was moved off-axis to produce an acceptable result for inspection. Similarly, a high intensity array light may be used mounted transversely to a bottle length from a greater WD to produce the same acceptable inspection result if target access is limited.

Directional or partial BF lights may be versatile, from a positioning stand point, so long as the light does not produce specular glare; i.e., image a surface of a ball-bearing with a ring light. Full BF lights, particularly a diffuse dome and cylinder varieties as, for example, shown in FIG. 4, may be generally used in close proximity to a target, and also may be selected with specific lenses in mind to avoid vignetting issues. Furthermore, there is a possibility that these lights may block part access, particularly in a vision guided robotics implementation (e.g., vision guided robotics as in FIGS. 10 and 11). Dark field lights, particularly circular varieties, also may be placed very close to a target, and may suffer similar problems as full BF lights. Assuming circular DF is not necessary, bar lights, of sufficient power, may be placed in a dark field orientation from a longer WD, and may alleviate some target access issues. Almost any light, except for diffuse area lights and back lights, may be used in a dark field orientation, namely 45 degrees or less with respect to a target surface.

With reference to FIG. 2, a machine vision system 200 may incorporate a coaxial-vertical illumination source 205 that may be configured to at least partially illuminate a target 250 via photons 208 emitted by light source(s) 206 toward the target 250, for example, traveling on a target transport 201 (e.g., a conveyer belt, a robot, etc.). The illumination source 205 may include an illumination source optical element 207 (e.g., a half-mirror, a beam splitter, a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 2, the illumination source optical element 207 may be manually and/or automatically variable. While similarly not shown in FIG. 2, an illumination source 205 may include either, or both, a hardwired electrical power/control connection or a hardwired electrical power connection and a wireless control (e.g., WIFI, Bluetooth, radio frequency, a wide area wireless network, etc.).

The machine vision system 200 may incorporate at least one camera 260 having an electrical power/control connection 265 and/or a camera optical element 261 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 2, the camera optical element 261 may be manually and/or automatically variable via, for example, control signals received via the electrical power/control connection 265. As an alternative, or addition, the camera 260 may include a wireless control (e.g., WIFI, Bluetooth, radio frequency, a wide area wireless network, etc.). The illumination source 205 may include an electrical printed circuit 204 that may control the light source((s) 206, the illumination source optical element 207, the camera, and/or the camera optical element 261.

In any event, the photons 208 may be redirected by the illumination source optical element 207 such that photons 210 may impact the target 250 and may result in regular reflections 251 passing through an illumination source aperture 209. The regular reflections 251 may be dependent upon, for example, any target defects. The camera 260 may detect, for example, the regular reflections 251. The machine vision system 200 may detect target defects by, for example, distinguishing regular reflections 251 associated with a target defect from regular reflections 251 associated with a target that does not include a defect.

A coaxial vertical illuminator 205 may, for example, apply light on axis with the camera optical element 261. Contrast between dark and bright parts of a target 250 may be captured and differentiated by allowing the reflected light 251 from, for example, a glossy surface of the target 250 into the camera 260 while, for example, blocking diffuse light at any edges of a defect. Thereby, the illumination source 205 may enhance, for example, an edge of an imprinting against a reflective surface (i.e., the machine vision system 200 may detect imprints on press-molded parts).

In a specific example, product numbers and/or specification imprints may be recognized by associated patterns. Incorrect stamping and mixing of different products may also be detected. With direct reflection (e.g., direct reflections 751*b* as illustrated in FIG. 7B), an engraved mark may not be stably detected due to irregular reflection. With coaxial vertical-illumination 205, on the other hand, an engraved mark, for example, on a target may appear dark so that a stable detection can be conducted. Coaxial vertical-illumination 205 may be used in conjunction with inspection of a glass target. With direct reflection 751*b*, since a sticker may reflect the illumination, edges of a defective sticker may not be clear (i.e., only the edges may be extracted). With coaxial vertical-illumination 205, on the other hand, position detection of stickers may be precisely carried out.

Turning to FIG. 3, a machine vision system 300 may incorporate a low-angle illumination 305 that may be configured to at least partially illuminate a target 350 via photons 308 emitted by light source(s) 306 at an angle (e.g., 108*a* of FIG. 1) with respect to the target 350, for example, traveling on a target transport 301 (e.g., a conveyer belt, a robot, etc.). The illumination source 305 may include an illumination source optical element 307 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 3, the illumination source optical element 307 may be manually and/or automatically variable. While similarly not shown in FIG. 3, an illumination source 205 may include either, or both, a hardwired electrical power/control connection or a hardwired electrical power connection and a wireless control (e.g., WIFI, Bluetooth, radio frequency, a wide area wireless network, etc.).

The machine vision system 300 may incorporate at least one camera 360 having an electrical power/control connection 365 and/or a camera optical element 361 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 3, the camera optical element 361 may be manually and/or automatically variable via, for example, control signals received via the electrical power/control connection 365. As an alternative, or addition, the camera 360 may include a wireless control (e.g., WIFI, Bluetooth, radio frequency, a wide area wireless network, etc.).

In any event, the photons 308 may impact the target 350 and may result in regular reflections 351 passing through an illumination source aperture 309. The regular reflections 351 may be dependent upon, for example, any target defects. The camera 360 may detect, for example, the regular reflections 351. The machine vision system 300 may detect target defects by, for example, distinguishing regular reflections 351 associated with a target defect from regular reflections 351 associated with a target that does not include a defect.

The illumination source 305 may be particularly useful with respect to a target 350 that is, for example, a recessed metal part with a reflective, textured, flat or curved surface. The illumination source 305 may sharpen contrast of edges and uneven surfaces of a target 350. In a particular example, the machine vision system 300 may be employed to detect chips on rubber packaging. Alternatively, the machine vision system 300 may be used to detect minute defects such as chips on a perimeter edge, surface flaws or deviations in thickness of a target.

A low-angle illuminator 305 may allow differentiation by applying light 308 at an angle 108*a* onto an edge of a surface of a target 350. With direct reflection 751*b*, a chip on a contour of a target 350, for example, may not be clear. With low-angle illumination 305, on the other hand, the chip on the contour may appear bright and may be clearly recognized. Similarly, with direct reflection 751*b*, a film over a target 350, for example, may reflect light 351 such that characters printed on the target 350 may not be clear. With low-angle illumination 305, on the other hand, characters printed on a target 350 may be clearly highlighted.

With reference to FIG. 4, a machine vision system 400 may incorporate dome-light illumination 405 that may be configured to at least partially illuminate a target 450 via photons 408 emitted by light source(s) 406. The target 450 may be, for example, traveling on a target transport 401 (e.g., a conveyer belt, a robot, etc.). The illumination source 405 may include an illumination source optical element 407 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 4, the illumination source optical element 407 may be manually and/or automatically variable. While similarly not shown in FIG. 4, an illumination source 405 may include either, or both, a hardwired electrical power/control connection or a hardwired electrical power connection and a wireless control (e.g., WIFI, Bluetooth, radio frequency, a wide area wireless network, etc.).

The machine vision system 400 may incorporate at least one camera 460 having an electrical power/control connection 465 and/or a camera optical element 461 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 4, the camera optical element 461 may be manually and/or automatically variable via, for example, control signals received via the electrical power/control connection 465. As an alternative, or addition, the camera 460 may include a wireless control (e.g., WIFI, Bluetooth, radio frequency, a wide area wireless network, etc.).

In any event, the photons 408 may impact the target 450 and may result in regular reflections 451 passing through an illumination source aperture 409. The regular reflections 451 may be dependent upon, for example, any target defects. The camera 460 may detect, for example, the regular reflections 451. The machine vision system 400 may detect target defects by, for example, distinguishing regular reflections 451 associated with a target defect from regular reflections 451 associated with a target that does not include a defect.

Indirect light 408 emitted by a dome illumination source 405 may allow the camera 460 of the machine vision system 400 to acquire clear images free of, for example, hot spots. For example, the machine vision system 400 may be employed to detect printing on aluminum packaging material. Detection of printing on aluminum is normally difficult or impossible due to hot spots generated from surface irregularities or glare caused by an associated film sheet. The dome-light illuminator 405 may emit indirect light 408 from various directions. Since soft diffuse light may be applied uniformly over a target 450 with, for example, an irregular shape, surface conditions of the target 450 may be uniform, making contrast of inspection points clear. With direct reflection 751*b*, as a contrast, print may not be detected because of glare on the package. With dome illumination 405, glare may be effectively eliminated by evenly illuminating the surface of the target 450, allowing the print to appear with high contrast.

As a particular example, a dome illumination source 450 may be used for detecting print on a bottom of an aluminum can. With direct reflection 751*b*, the print may not be detected because of irregular reflection from the curved can bottom. With dome illumination 405, on the other hand, the curved surface may be evenly illuminated and the print can be detected by the camera 460.

Turning to FIG. 5, a machine vision system 500 may incorporate a backlight 506. The backlight 506 may be similar to, for example, any one of the illumination sources 2500*a-h,j* of FIGS. 25A-H,J. The illumination source 506 may include an illumination source optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 5, the illumination source optical element may be manually and/or automatically variable. While similarly not shown in FIG. 5, an illumination source 506 may include either, or both, a hardwired electrical power/control connection or a hardwired electrical power connection and a wireless control (e.g., WIFI, Bluetooth, radio frequency, a wide area wireless network, etc.).

The machine vision system 500 may incorporate at least one camera 560 having an electrical power/control connection 565 and/or a camera optical element 561 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 5, the camera optical element 561 may be manually and/or automatically variable via, for example, control signals received via the electrical power/control connection 565. As an alternative, or addition, the camera 560 may include a wireless control (e.g., WIFI, Bluetooth, radio frequency, a wide area wireless network, etc.). In any event, the backlight 506 may emit photons 508 toward a target 550. Light 551 may be transmitted through the target 550 toward a camera 560.

Illuminating a target 550 with a backlight 506 may produce a silhouette of the target 550 with respect to the camera 560. The machine vision system 500 may utilize the silhouette to enable, for example, high-accuracy transparent target detection. The machine vision system 500 may enable detecting a level of, for example, transparent liquid within a transparent or semi-transparent container. The backlight illuminator 506 may silhouette a shape of the target 550 using the light 551 passing through the target 550.

As a particular example, the machine vision system 500 may be used to measure a size of an electrical lead terminal. With direct reflection 751*b*, for example, some edges of the lead terminal may not clear. With backlight illumination 506, on the other hand, complicated contour of the lead terminal may become a sharp silhouette so that shape and size measurements can be conducted by the machine vision system 500.

As another example, the machine vision system 500 may be used to detect foreign objects in unwoven fabric. With direct reflection 751*b*, for example, there may be no clear contrast between a flaw and a background. With backlight illumination 506, on the other hand, a silhouette of the foreign object may enable a stable measurement by the machine vision system 500.

Figure 6:
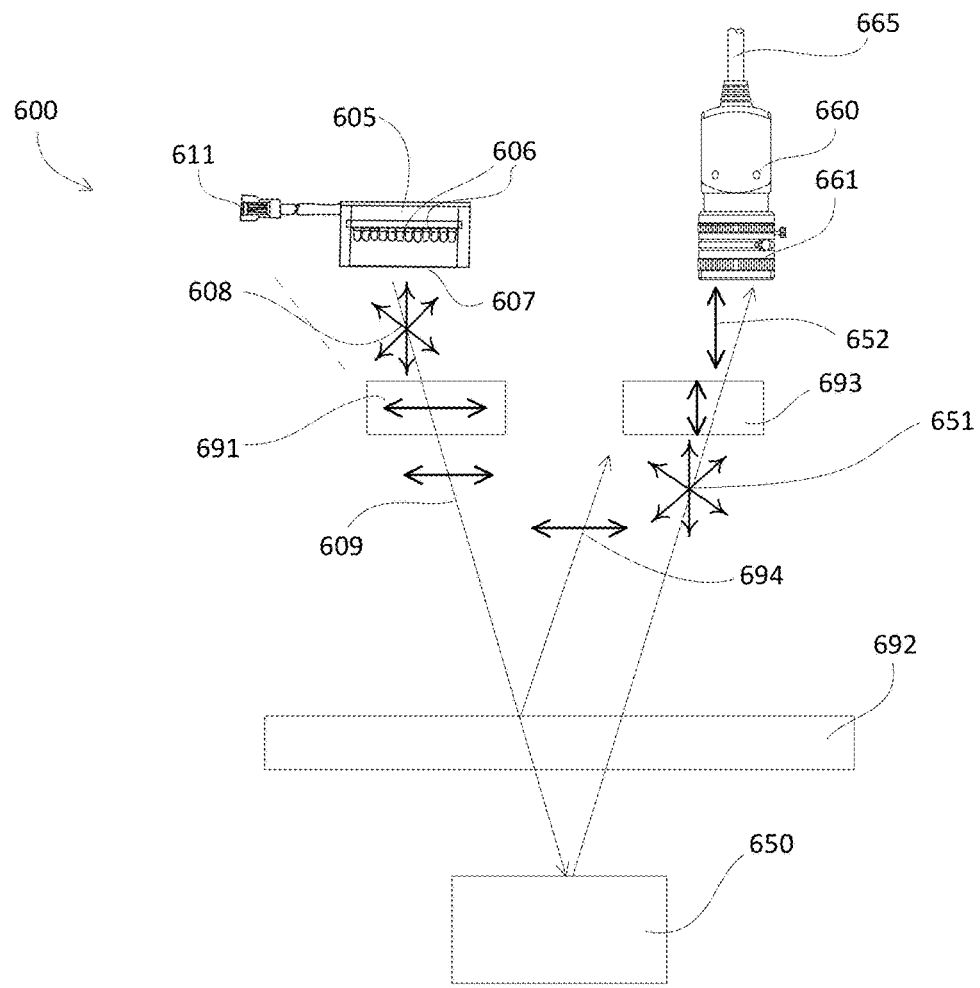
FIG. 6 depicts an example machine vision system incorporating polarization.

With reference to FIG. 6, a machine vision system 600 may incorporate polarization (e.g., illumination source polarization filter 691 and/or camera polarization filter 693). As a particular example, the machine vision system 600 may include an illumination source 605 having an electrical power and/or control connection 611, light emitters 606, and an illumination source optical element 607 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 6, the illumination source optical element 607 may be manually and/or automatically variable. An illumination source 606 may include either, or both, a hardwired electrical power/control connection 611 or a hardwired electrical power connection 611 and a wireless control (e.g., WIFI, Bluetooth, radio frequency, a wide area wireless network, etc.).

The machine vision system 600 may incorporate at least one camera 660 having an electrical power/control connection 665 and/or a camera optical element 661 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 6, the camera optical element 661 may be manually and/or automatically variable via, for example, control signals received via the electrical power/control connection 665. As an alternative, or addition, the camera 660 may include a wireless control (e.g., WIFI, Bluetooth, radio frequency, a wide area wireless network, etc.).

In any event, the illumination source 605 may emit photons 608 (e.g., unpolarized light) toward the illumination source polarization filter 691 (e.g., a linear polarization filter, a right circular polarization filter, a left circular polarization filter, a wire-grid polarization filter, an interferential polarization filter, an elliptical polarization filter, a birefringence polarization filter, a dichroism polarization filter, etc.). Unpolarized light 608 may be transmitted through the illumination source polarization filter 691 such that, for example, polarized light 609 may be directed through a transparent film 692 (e.g., glass) toward a target 650. The light 608 may be polarized with the polarization filter 691, and may become polarized light 609. For example, a glass surface 692 may specularly reflect light 609. The specular reflection 694 may be intercepted by the camera polarization filter 693 while the target surface 650 may diffusely reflect light 651. The diffuse reflection 651 may be polarized by the polarization filter 693 and only the polarized light 652 may enter into the camera 660. Without polarization filter 693, the camera optical element 661 may reflect the illumination 651. With the camera polarization filter 693, on the other hand, the camera polarization filter 693 may reduce, or eliminate, any reflection. The machine vision system 600 may, thereby, eliminate glare of, for example, a glossy target 650 together with an associated lens polarizing filter 661. The polarization filters 691, 693 may be compatible with, for example, a direct-ring light 805*a,b* of FIGS. 8A and 8B, respectively, and/or a bar light 2100*a-g* of FIGS. 21A-G.

The machine vision system 600 may be useful in avoiding surface glare of a target 650. While the machine vision system 600 may include a particular geometry, the geometry (e.g., a 3D spatial arrangement of the light and/or camera) may be reoriented based on, for example, a particular target 650 and/or process for manufacturing the target. The illumination source 605 may be, for example, strobed to overwhelm glare from ambient sources of light.

A polarization filter 691, 693 may transmit only a light wave in a specified direction. Regular reflections, from a glossy surface for example, can be eliminated when polarization filters 691, 693 are mounted on the optical elements 607, 661.

Turning to FIGS. 7A and 7B, a machine vision system 700*a,b* may incorporate direct reflection 751*a,b* and diffuse reflection 752*a,b*. The machine vision system 700*a,b* may include an illumination source 705*a,b* that is configured to emit photons 708*a,b* toward a target 750*a,b* at an angle 108*a*. The target 750*a,b* may be, for example, traveling on a target transport 701*a,b* (e.g., a conveyer belt, a robot, etc.).

The machine vision system 700*a,b* may incorporate at least one camera 760*a,b* having an electrical power/control connection 765*a,b* and/or a camera optical element 761*a,b* (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 7, the camera optical element 761*a,b* may be manually and/or automatically variable via, for example, control signals received via the electrical power/control connection 765*a,b*. As an alternative, or addition, the camera 760*a,b* may include a wireless control (e.g., WIFI, Bluetooth, radio frequency, a wide area wireless network, etc.).

In any event, the photons 708*a,b* may impact the target 750*a,b* and result in direct reflections 751*a,b* and diffuse reflections 752*a,b*. As illustrated in FIG. 7A, the camera 700*a* may be geometrically oriented with respect to the illumination source 705*a* and the target 750*a* such that the camera 700*a* detects the diffuse reflections 752*a*. On the other hand, as illustrated in FIG. 7B, the camera 700*b* may be geometrically oriented with respect to the illumination source 705*b* and the target 750*b* such that the camera 700*b* detects the direct reflections 752*b*.

Detecting the direct reflections as illustrated in FIG. 7B may be particularly useful, for example, in regard to detecting print on a glossy background of a label (i.e., the background may appear bright and the print may appear dark as it diffusely reflects the light). In other words, with diffuse reflection as illustrated in FIG. 7A, the glossy background of the label may appear dark and the print may appear bright. Target surfaces may have a variety of colors and reflections, and surface gloss may be considered to determine lighting angle 108*a*. A glossy surface may specularly reflect the light and a matte surface may diffuse the light. A glossy surface can appear bright or dark by changing position of the illuminator 705*a,b* and the camera 760*a,b*.

With reference to FIGS. 8A and 8B, a machine vision system 800*a*, 800*b* may incorporate a ring illumination source 805-*a,b*. The ring illumination source 805*a,b* may produce strobe illumination 808*b* dependent upon, for example, a presents of a target 851*b*. The targets 850*a,b*, 851*b* may be traveling on, for example, a target transport 801*a,b* (e.g., a conveyer belt, a robot, etc.).

The machine vision system 800*a,b* may incorporate at least one camera 860*a,b* having an electrical power/control connection 865*a,b* and/or a camera optical element 861*a,b* (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 8, the camera optical element 861*a,b* may be manually and/or automatically variable via, for example, control signals received via the electrical power/control connection 865*a,b*. As an alternative, or addition, the camera 860*a,b* may include a wireless control (e.g., WIFI, Bluetooth, radio frequency, a wide area wireless network, etc.).

In an example application of the machine vision system 800*a,b*, the ring light 805*a* may automatically turn off without target 850*a,b* detected, and the ring light 805*b* may automatically turn on with target 851*b* detected. Effects of intermittent lighting and wiring may include longer machine vision system 800*a,b* life when a ratio of off time to on time increases. High-speed strobing of ring illumination source 805*a,b* may not burden associated light emitting diode (LED) elements. For example, when off time is four times longer than on time, a service life of the illumination source 805*a,b* may be five times longer than that of a continuously on light source.

Figure 9:
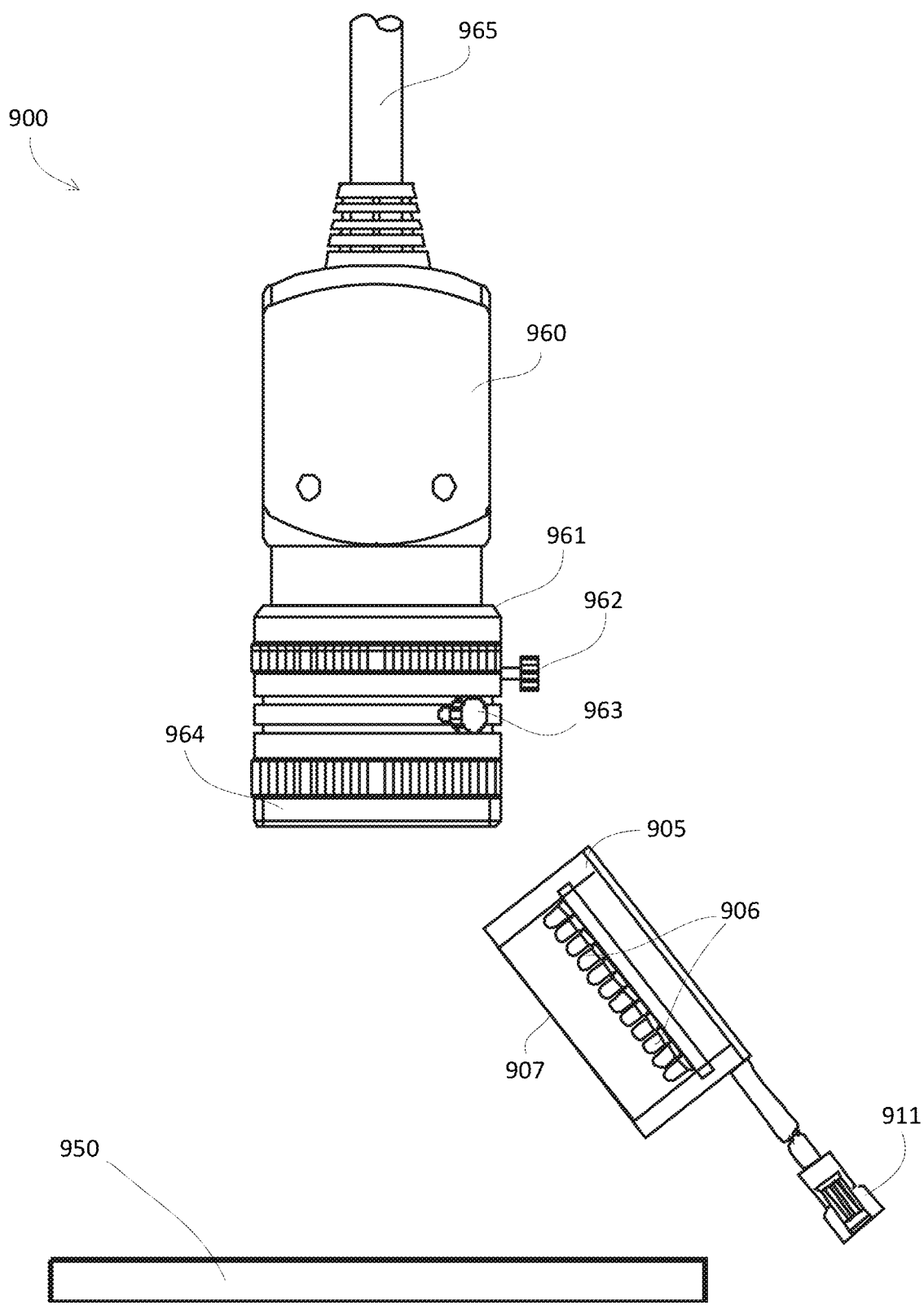
FIG. 9 depicts an example machine vision system incorporating indirect illumination.

Turning to FIG. 9, a machine vision system 900 may incorporate an indirect illumination source 905 that may be configured to at least partially illuminate a target 950. The machine vision system 900 may be similar to, for example, the machine vision system 100 of FIG. 1. The illumination source 905 may include an electrical power/control connection 911, light source(s) 906, and an illumination source optical element 907 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 9, the illumination source optical element 907 may be manually and/or automatically variable. While similarly not shown in FIG. 9, the illumination source 905 may include a wireless control (e.g., WIFI, Bluetooth, radio frequency, a wide area wireless network, etc.) in addition to, or in lieu of, the hardwired electrical control connection 911.

The machine vision system 900 may incorporate at least one camera 960 having an electrical power/control connection 965, a first camera optical element 961 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). and/ or a second camera optical element 964 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). The first camera optical element 961 may be manually controlled via a first manual control 962 and/or, while not shown in FIG. 9, automatically variable via, for example, control signals received via the electrical power/control connection 965. The second camera optical element 964 may be manually controlled via a second manual control 963 and/or, while not shown in FIG. 9, automatically variable via, for example, control signals received via the electrical power/ control connection 965. As an alternative, or addition, the camera 960 may include a wireless control (e.g., WIFI, Bluetooth, radio frequency, a wide area wireless network, etc.).

To obtain a clear contrast with LED illumination 906, a scattering rate can be used, within the illumination source 905, along with color relation (e.g., complementary/similar colors). For example, blue light may have a short wavelength and a high scattering rate. In contrast, red light may have a long wavelength, low scattering rate and a high transmission. Light with a high scattering rate may be effective to detect surface conditions on a target 950. When using a blue light with a high scattering rate, there may be a larger amount of diffuse reflection on a stain, for example, which may allow stains on a target 950 to be detected more easily than with, for example, red light.

With reference to FIG. 10, a multi-axis robotic vision system 1000 may include a pivotal base 1073 configured to, for example, rotate with respect to a mount 1070 about a first axis of rotation 1072 (e.g., up to 360° rotation). The multi-axis robotic vision system 1000 may include a controller 1071 (e.g., controller 4405*a* of FIG. 44A) configured to, for example, control the multi-axis robotic vision system 1000, associated illumination source(s) (e.g., illumination source 105, 205, 305, 405, 505, 605, 705*a*, 705*b*, 805*a*, 805*b*, 905, etc.), associated illumination source optical element (e.g., illumination source optical element 107, 207, 307, 407, 607, 907, etc.), associated camera(s) (e.g., camera 160, 260, 360, 460, 560, 660, 760*a*, 760*b*, 860*a*, 860*b*, 960, etc.), and/or associated camera optical element (e.g., camera optical element 161, 261, 361, 461, 561, 661, 761*a*, 761*b*, 861*a*, 861*b*, 961, 964, etc.). The multi-axis robotic vision system 1000 may include a first arm 1074 configured to, for example, rotate with respect to the base 1073 about a second axis of rotation 1076 (e.g., up to 360° rotation). The multi-axis robotic vision system 1000 may include a manipulated portion 1077 configured to, for example, rotate with respect to the first arm 1074 about a third axis or rotation 1078 (e.g., up to 360° rotation). The multi-axis robotic vision system 1000 may include a second arm 1079 configured to, for example, rotate with respect to the manipulated portion 1077 about a fourth axis of rotation 1080 (e.g., up to 360° rotation). The multi-axis robotic vision system 1000 may include an articulating portion 1081 configured to, for example, rotate with respect to the second arm 1079 about a fifth axis of rotation 1082 (e.g., up to 360° rotation). The multi-axis robotic vision system 1000 may include an illumination source/camera fixture 1084 configured to, for example, rotate with respect to the articulating portion 1081 about a sixth axis of rotation 1083 (e.g., up to 360° rotation).

In any event, the controller 1071 may be configured to, for example, cause the multi-axis robotic vision system 1000 to grasp a predetermined illumination source (e.g., illumination source 105, 205, 305, 405, 505, 605, 705*a*, 705*b*, 805*a*, 805*b*, 905, etc.) and/or camera (e.g., camera 160, 260, 360, 460, 560, 660, 760*a*, 760*b*, 860*a*, 860*b*, 960, etc.) from, for example, a storage rack (not shown in FIG. 10) and provide electrical power/control and/or pneumatic signals to the illumination source and/or camera via electrical power/ control and/or pneumatic interconnections 1075. The controller 1071 may be configured to, for example, acquire a series of images of a target or targets (not shown in FIG. 10) using a corresponding series of varied illumination patterns from a particular illumination source/camera, and/or a corresponding series of images of a target or targets using a corresponding series of varied illumination sources and/or varied cameras (i.e., the controller 1071 may be configured to cause the multi-axis machine vision system 1000 to sequentially grasp/release a series of different illumination sources/cameras and acquire a respective series of images of a target or targets). Further details of the corresponding image acquisition/analysis process are described elsewhere herein (e.g., with regard to FIGS. 44A-D).

Turning to FIG. 11, a linear robotic vision system 1100 may include a controller 1079 (e.g., controller 4405*a* of FIG. 44A) configured to, for example, control the linear robotic vision system 1100, associated illumination source(s) (e.g., illumination source 105, 205, 305, 405, 505, 605, 705*a*, 705*b*, 805*a*, 805*b*, 905, etc.), associated illumination source optical element (e.g., illumination source optical element 107, 207, 307, 407, 607, 907, etc.), associated camera(s)

(e.g., camera 160, 260, 360, 460, 560, 660, 760*a*, 760*b*, 860*a*, 860*b*, 960, etc.), and/or associated camera optical element (e.g., camera optical element 161, 261, 361, 461, 561, 661, 761*a*, 761*b*, 861*a*, 861*b*, 961, 964, etc.). The linear robotic vision system 1100 may include a target support 1171 attached to a base 1070. The linear robotic vision system 1100 may include a target (not shown in FIG. 11) manipulator 1172 proximate the target support 1171. The linear robotic vision system 1100 may include a carriage 1173 linearly movable, for example, with respect to the target support 1171. The linear robotic vision system 1100 may include a first arm 1176 pivotally attached to the carriage 1173 via, for example, a first pivot 1174. The linear robotic vision system 1100 may include a second arm 1178 pivotally attached to the first arm 1176 via, for example, a second pivot 1177. The linear robotic vision system 1100 may include an illumination source/camera attachment 1184 attached to, for example, the second arm 1178.

In any event, the controller 1179 may be configured to, for example, cause the linear robotic vision system 1100 to grasp a predetermined illumination source (e.g., illumination source 105, 205, 305, 405, 505, 605, 705*a*, 705*b*, 805*a*, 805*b*, 905, etc.) and/or camera (e.g., camera 160, 260, 360, 460, 560, 660, 760*a*, 760*b*, 860*a*, 860*b*, 960, etc.) from, for example, a storage rack (not shown in FIG. 11) and provide electrical power/control and/or pneumatic signals to the illumination source and/or camera via electrical power/ control and/or pneumatic interconnections 1175. The controller 1179 may be configured to, for example, acquire a series of images of a target or targets (not shown in FIG. 11) using a corresponding series of varied illumination patterns from a particular illumination source/camera, and/or a corresponding series of images of a target or targets using a corresponding series of varied illumination sources and/or varied cameras (i.e., the controller 1179 may be configured to cause the linear machine vision system 1100 to sequentially grasp/release a series of different illumination sources/ cameras and acquire a respective series of images of a target or targets). Further details of the corresponding image acquisition/analysis process are described elsewhere herein (e.g., with regard to FIGS. 44A-D).

Figure 12:
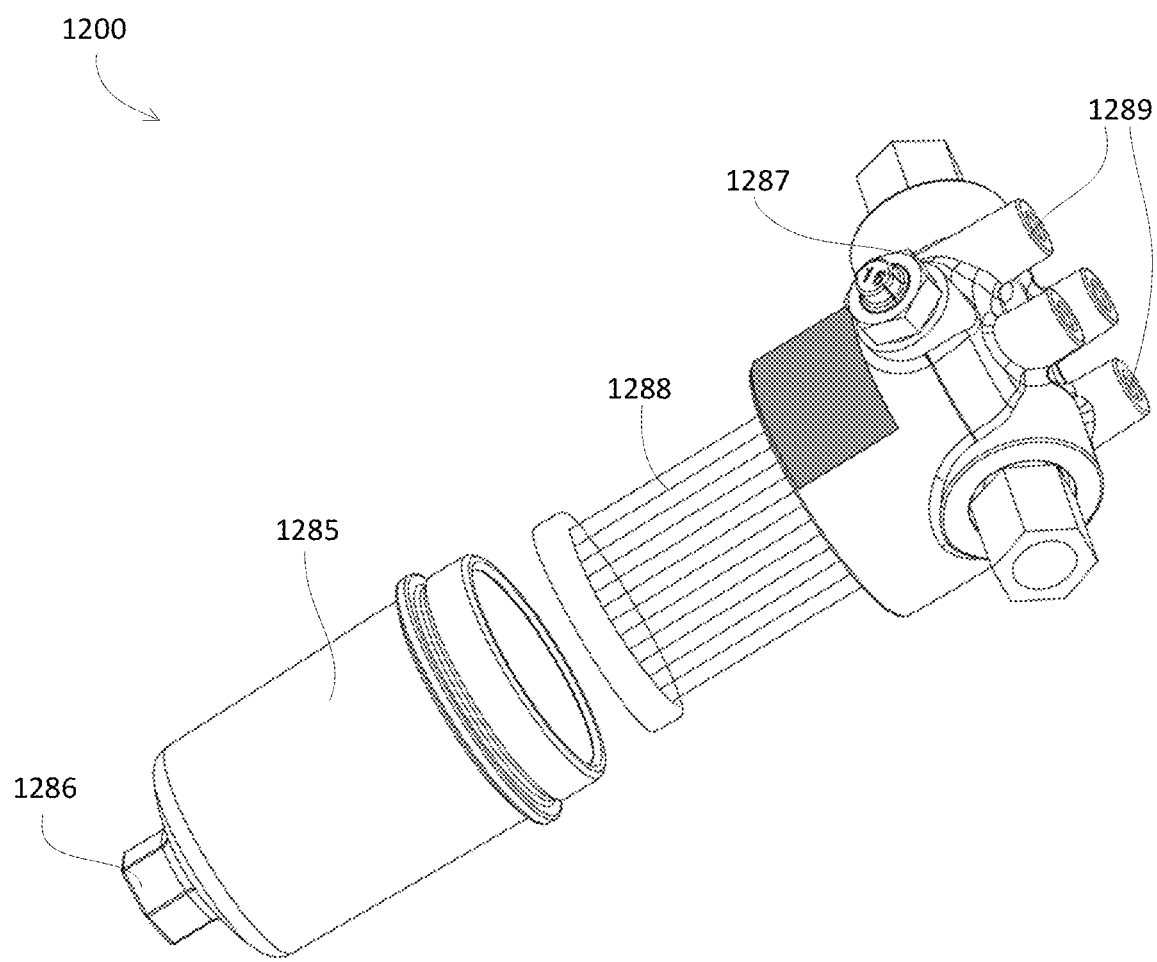
FIG. 12 depicts an example machine vision system adaptor for use with, for example, the visions systems of FIGS. 1-11.

With reference to FIG. 12, a machine vision system adaptor 1200 may include a main body portion 1285 having a robot fixture 1286 and illumination source/camera fixtures 1289. The machine vision system adaptor 1200 may be configured for use with, for example, the multi-axis robot machine vision system 1000 of FIG. 10 and/or the linear robot machine vision system 1100 of FIG. 1100. In any event, the machine vision system adaptor 1200 may include electrical power/control connections 1288 and/or pneumatic power/control connections 1287.

Figure 13A:
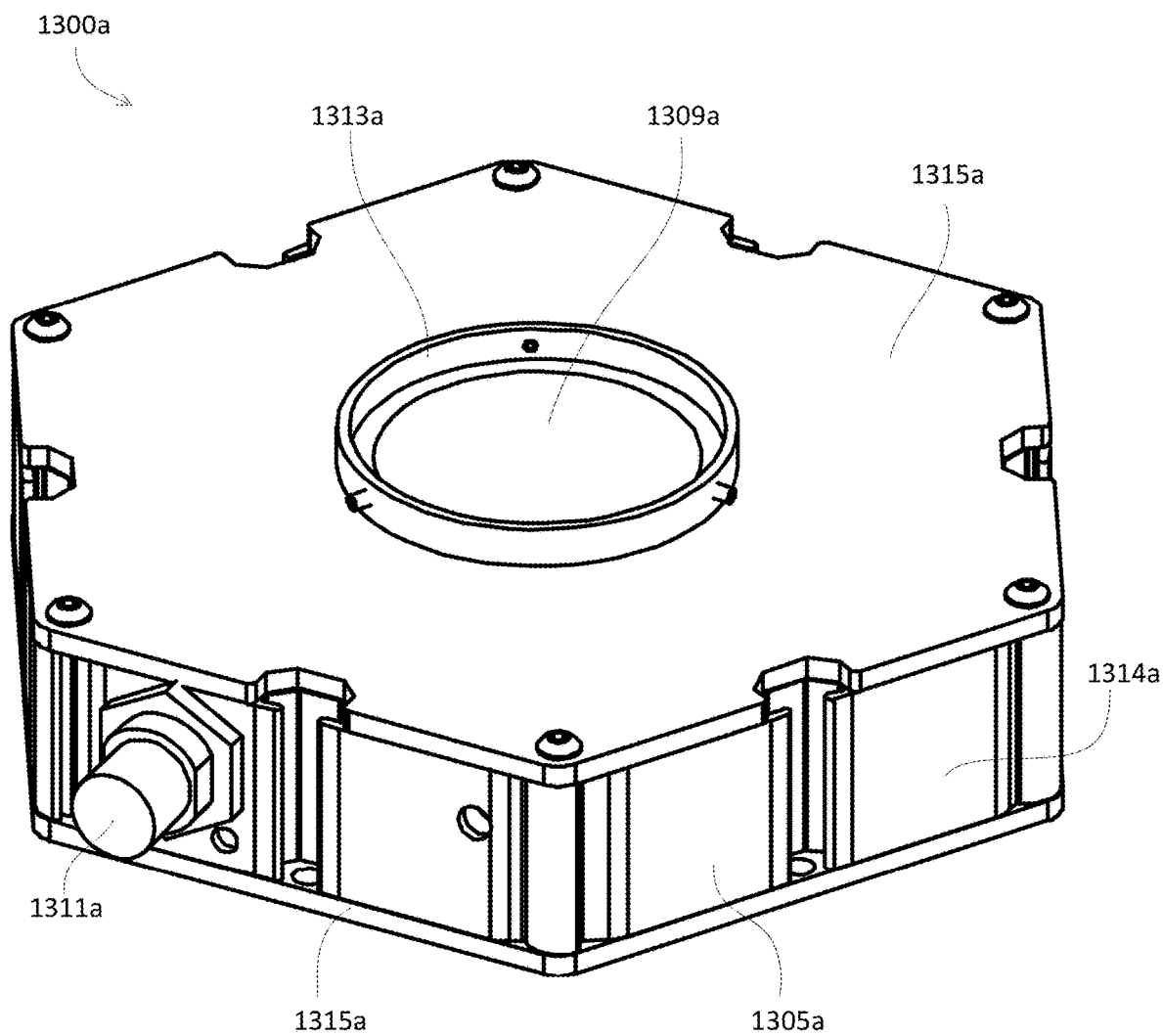
FIGS. 13A-C depict various views of an example ring light.
Figure 13B:
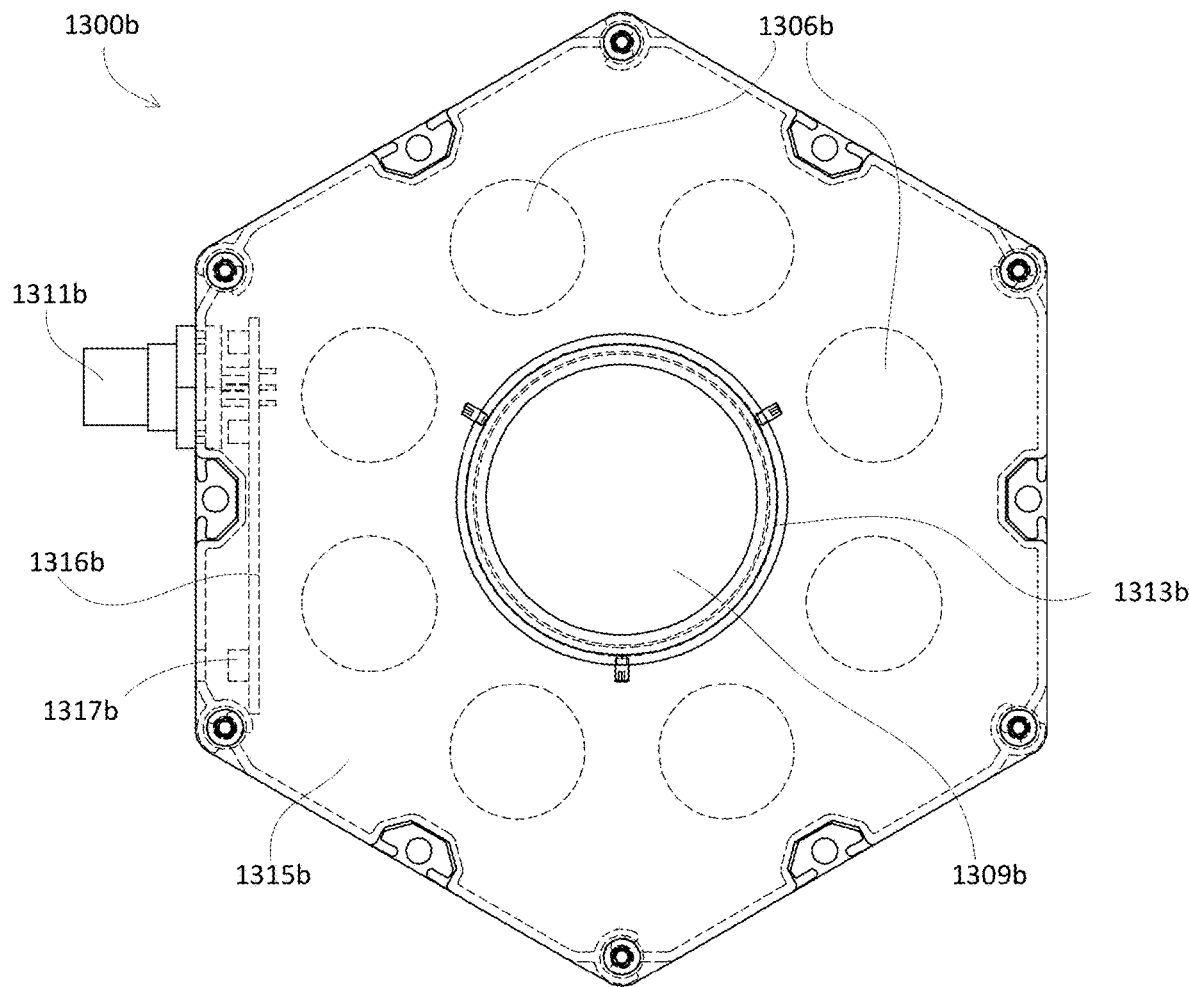
Figure 13C:
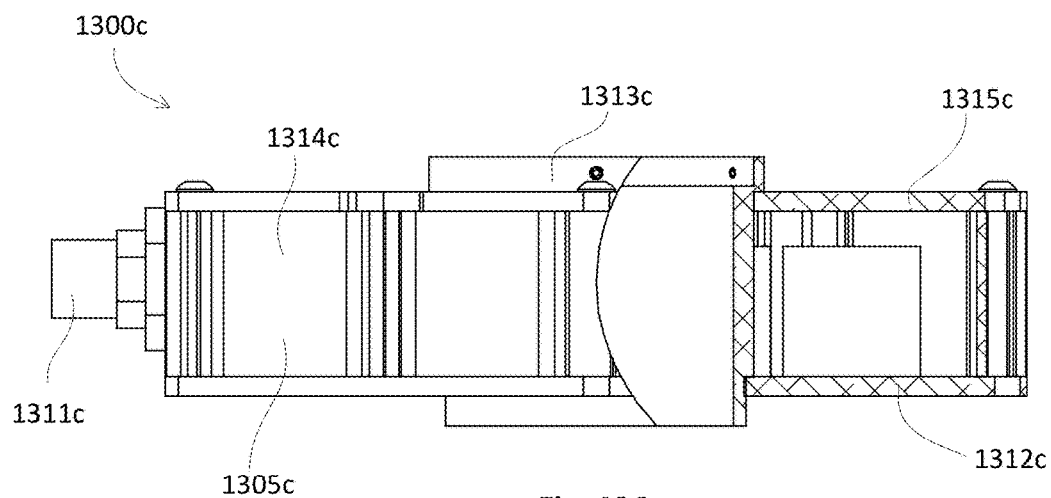
Figure 14A:
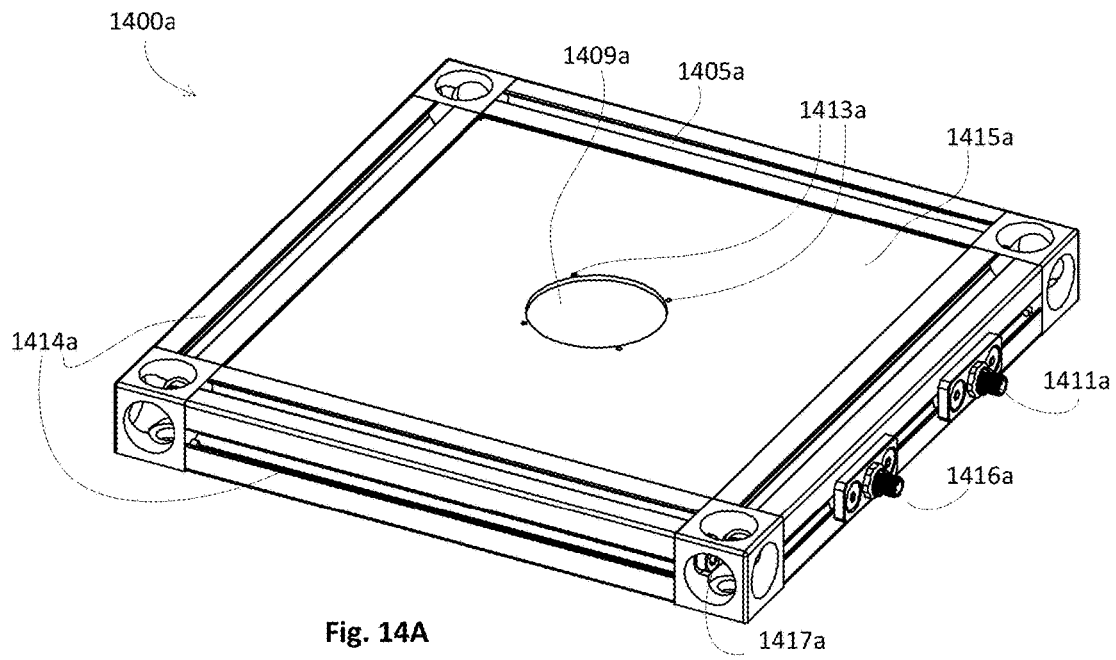
FIGS. 14A-E depict various views of an example ring light.
Figure 14B:
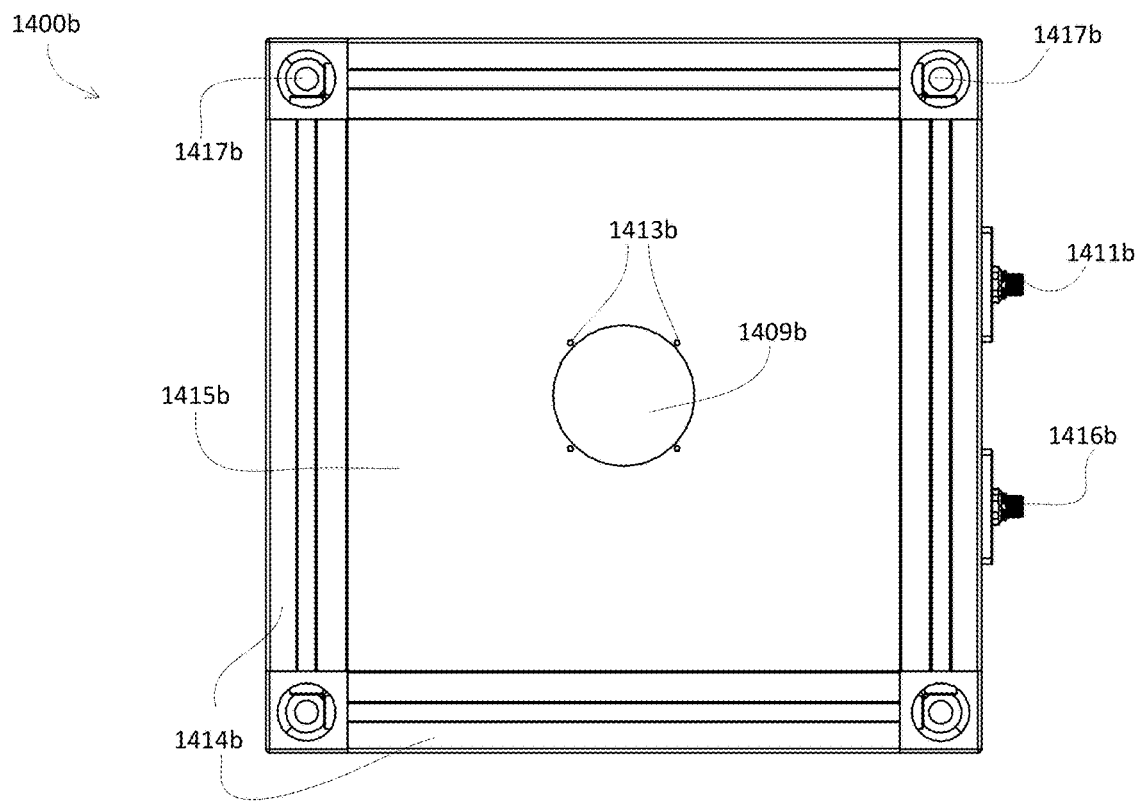
Figure 14C:
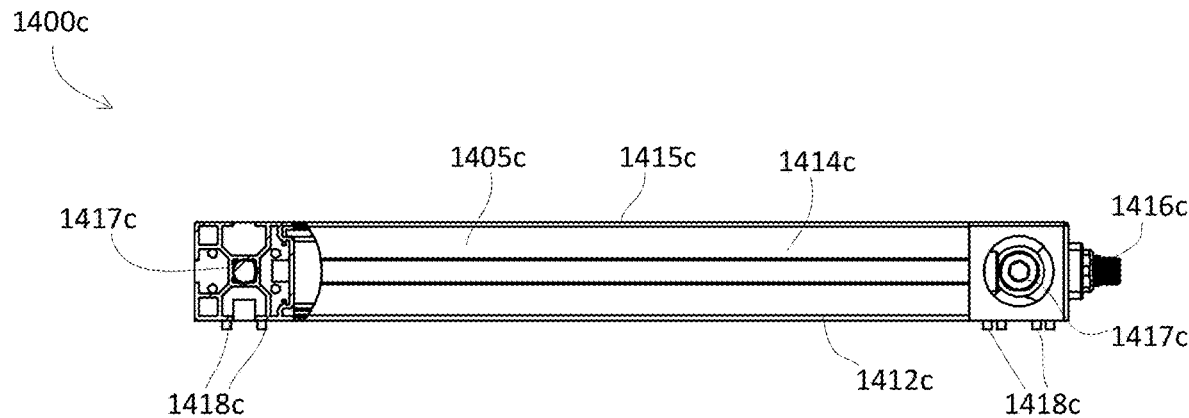
Figure 14D:
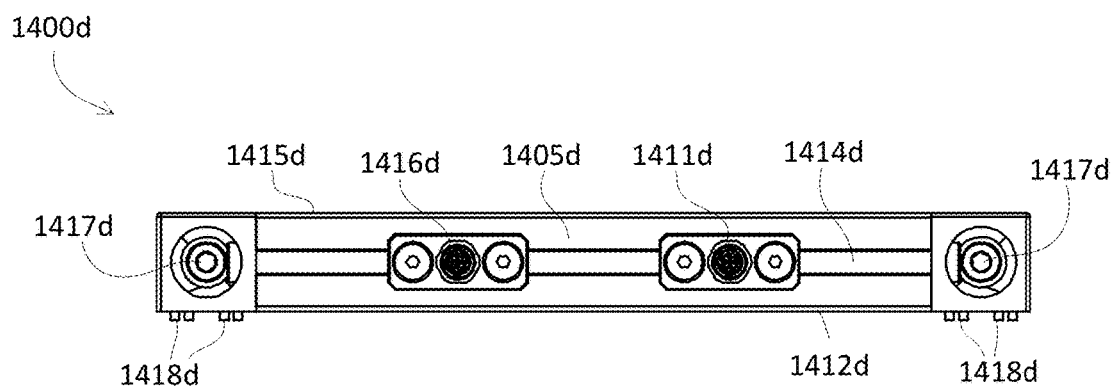
Figure 14E:
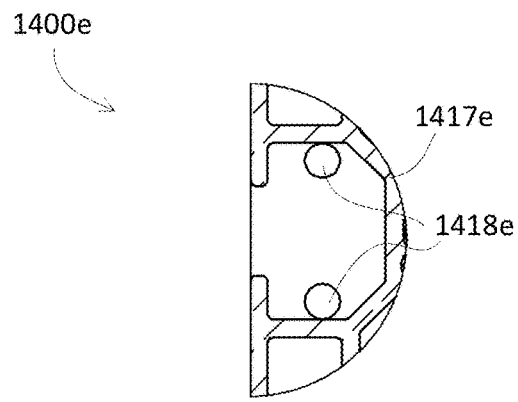
Figure 15A:
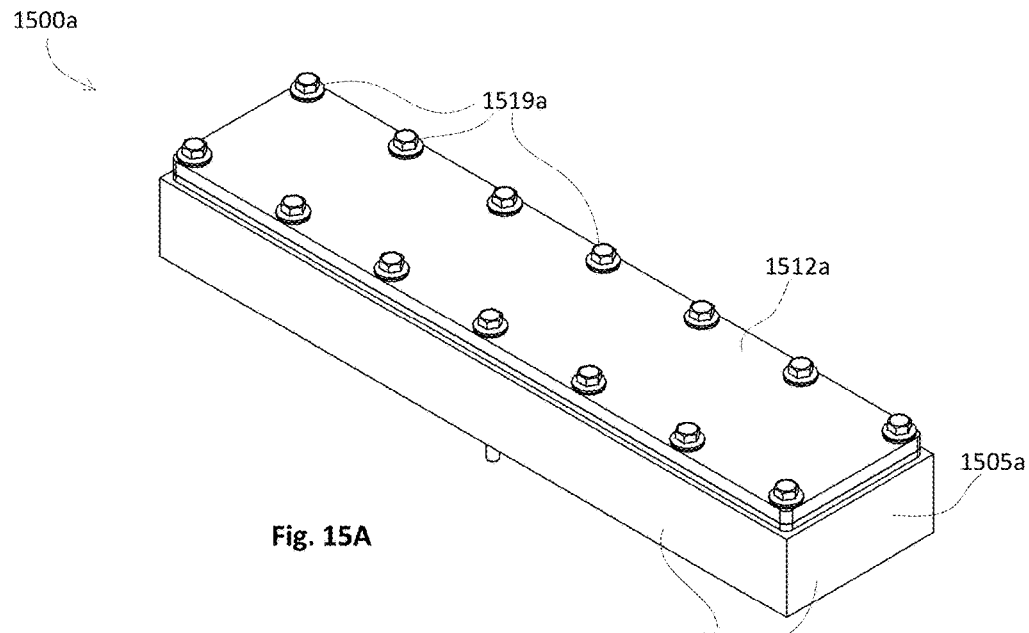
FIGS. 15A-D depict various views of an example linear bar-light.
Figures 15B, 15C:
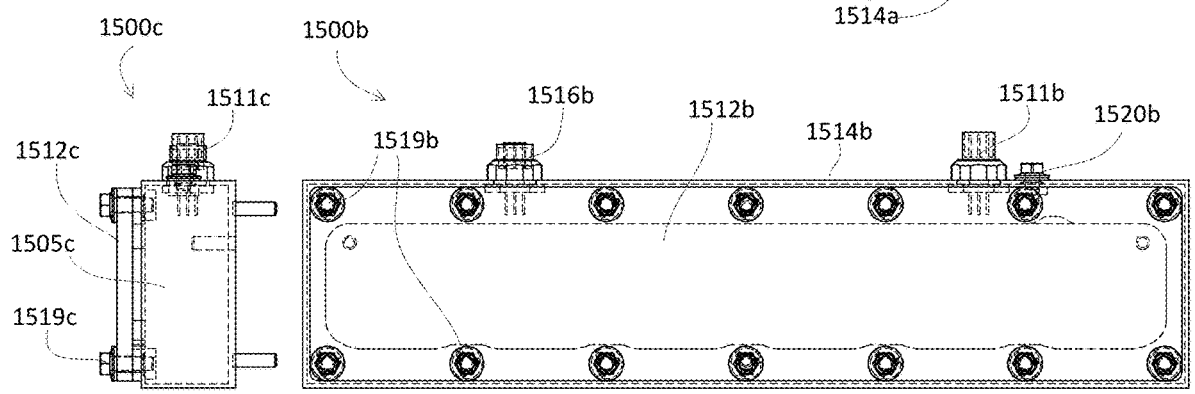
Figure 15D:
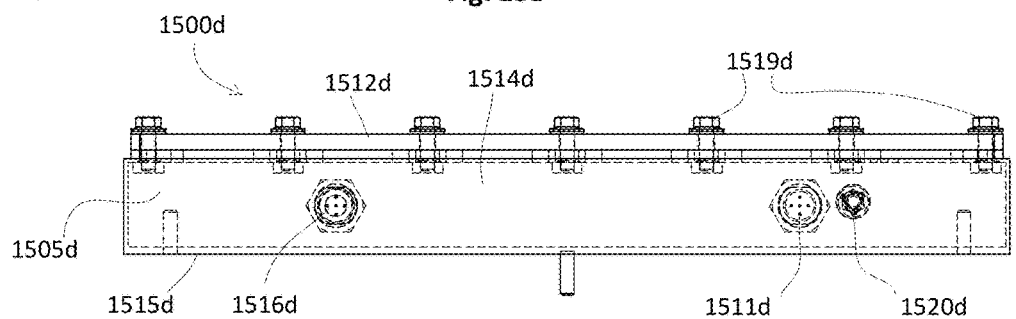

Turning to FIGS. 13A-C, a machine vision system 1300*a-c* may include ring light 1305*a-c* similar to, for example, ring light 805*a,b* of FIGS. 8A and 8B. The ring light 1305*a-c* may include a plurality of housing side portions 1314*a,c*, a top housing portion 1315*a-c* and a bottom housing portion 1312*a-c* defining, for example, a hexagon shape housing. While the ring light 1305*a-c* is shown in FIGS. 13A and B as defining a hexagon shape, the housing side portions 1314*a,c*, the a top housing portion 1315*a-c* and the bottom housing portion 1312*a-c*, may define any shape (e.g., a circular shape, a square shape, a rectangular shape, a pentagon shape, a heptagon, an octagon, or any suitable polygon shape). The bottom housing portion 1312*a-c* may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The ring light 1305*a-c* may include a camera attachment 1313*a-c* defining a camera aperture 1309*a,b* in at least the top housing portion 1315*a-c*. In addition to being adapted to attach to a camera (not shown in FIGS. 13A-C), the camera attachment 1313*a-c* may be configured to be attached to a robot (e.g., attachment 1084, 1184, or 1289 of FIGS. 10, 11, and 12, respectively). The aperture 1309*a,b* may extend through the bottom housing portion 1312*a,c*. Alternatively, the bottom housing portion 1312*a,c* may close off an end of the aperture 1309*a,b*. The ring light 1305*a-c* may include an electrical power/control connection 1311*a-c*, an electrical printed circuit board 1316*b*, a controller 1317*b*, and a plurality of light sources 1306*b*. The controller 1317*b* may be configured to receive electrical power/control signals via the electrical power/control connection 1311*a-c* and control, for example, an intensity of each of the plurality of light sources 1306*b*, the optical element 1312*a-c*, and/or a camera (not shown in FIGS. 13A-C). The controller 1317*b* may be similar to, for example, the controller 4405*a* of FIG. 44A. The controller 1317*b* may implement any portion or, or all of the functionality as described, for example, with regard to FIGS. 44A-D.

The ring light 1305*a-c* may be configured as, for example, an easy mount light emitting diode (LED) ring light to mount directly to a camera lens. For example, an easy mount LED ring light can be quickly and easily adapted to any machine vision system with either of, for example, four standard mounting options. First, there may be a standard M46 thread protruding from a back of an easy mount LED ring light. Using readily available step-up or step-down rings the ring light 1305*a-c* can be mounted directly to threads found on the front end of most camera lenses.

Second, a ring light 1305*a-c* may mount a lens at a front end. Once again, an off-the-shelf step up or step down adapter ring can be used to adapt lenses with M43 or smaller filter mounting threads. A flange 1313*a-c* at a front end of an easy mount may hold a step ring with, for example, three set screws, and a camera lens may be inserted through the center 1309*a,b* of the ring light 1305*a-c*, and threaded onto the step ring. In those few cases where a lens's locking thumbscrews may prevent the lens from fitting through the center 1309*a,b*, extra low-profile replacement set screws may be included, allowing protruding thumbscrews to be removed.

Figure 16A:
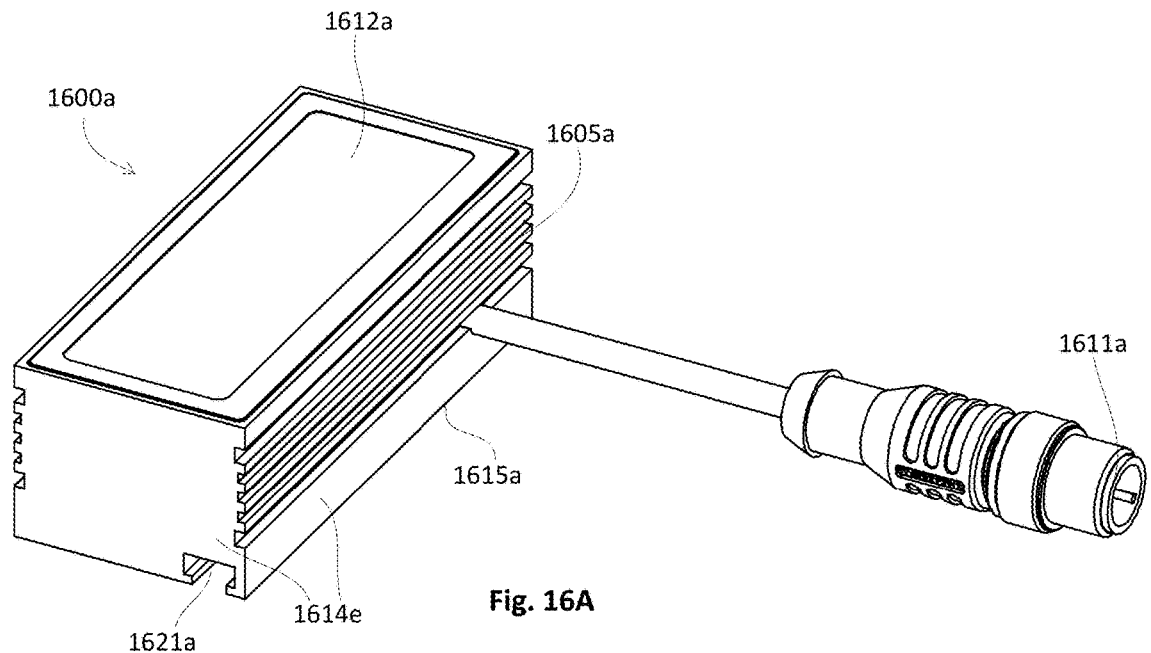
FIGS. 16A-E depict various views of an example linear light.
Figure 16B:
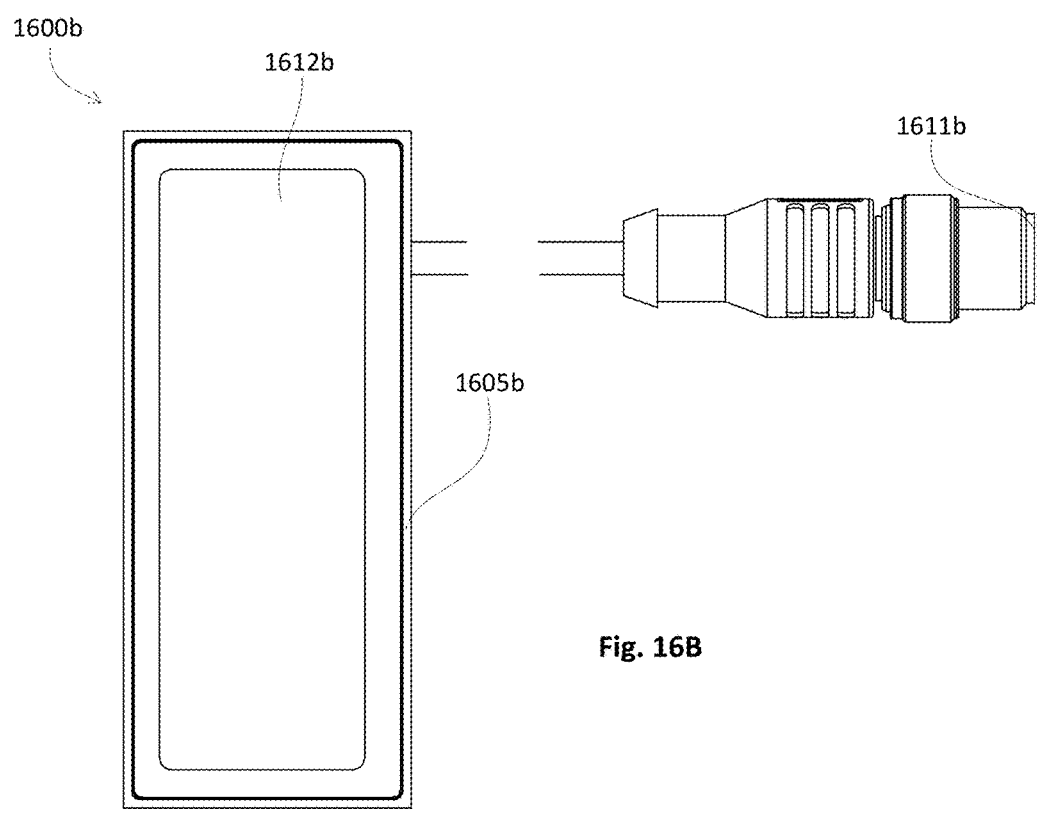
Figure 16C:
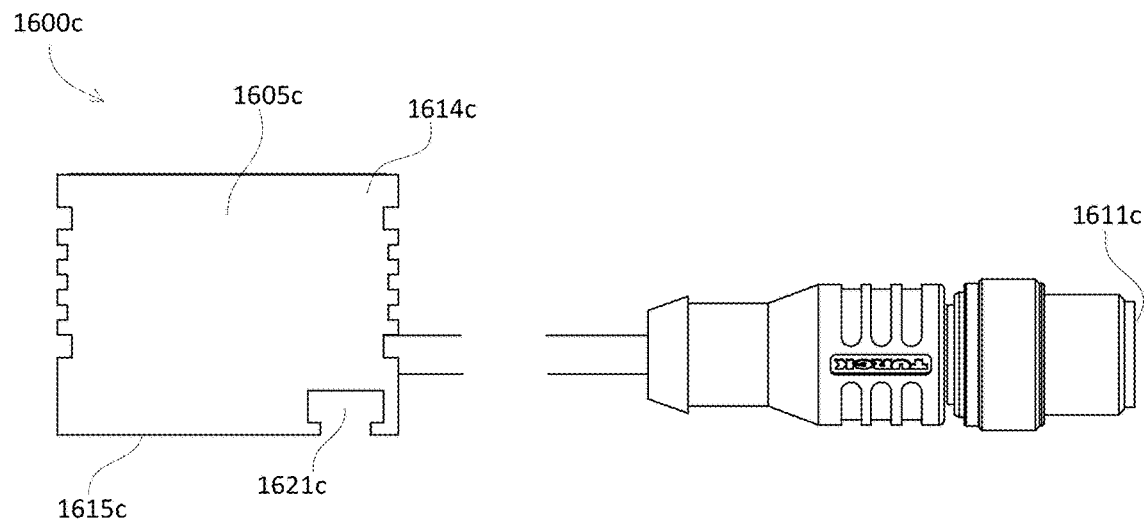
Figure 16D:
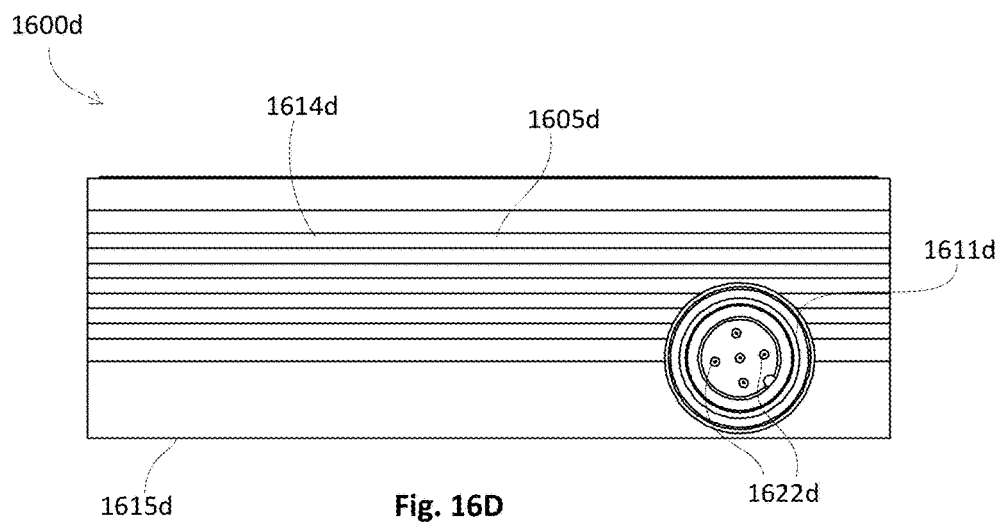
Figure 16E:
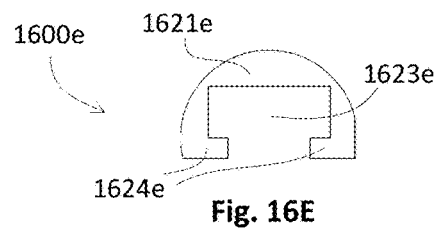

Third, a ring light 1305*a-c* may include, for example, a T-slot (e.g., T-slot 1621*e* of FIG. 16E) mount on the sides 1314*a-c*. Correspondingly, standard industrial T-nuts can be dropped into the slot 1621*e* for mounting.

A fourth way to mount a ring light 1305*a-c* may include using threaded M4 holes on a back plate (e.g., top housing portion 1315*a-c*) of light housing. An easy mount ring light may be a high output LED light in an aluminum housing. An aluminum housing may include industry standard T-Slots for ease of mounting. Ring light 1305*a-c* may be available in light output of white, red, amber, blue, green, cyan, IR, UV, a sub-combination thereof, or a combination thereof. A ring light 1505*a-c* may include an integrated constant current driver with a built in strobe input with, for example, an option for PNP or NPN trigger control. The internal controller 1317*b* may obviate or operate in conjunction with an external driver to control the individual light sources 1306*b*. An integrated driver may also be included with a variable light intensity control. Additionally, or alternatively, light output may be controlled by a manual potentiometer or a 0-10 VDC analog signal.

An all metal construction of a ring light 1305a-c may provide a small particle resistant and all around durable light. A ring light 1305a-c may include a plug and play 5 Pin M12 connector 1311a-c that may allow for ease of use while allowing for full control. A 0-10 $V_{DC}$ intensity control may be incorporated and may assist in gaining full control of light output. A standard 42 mm inner hole diameter 1309a,b may allow for use with nearly all camera systems with available step-up and step-down conversion kit adapters.

A ring light 1305a-c may operate with either an NPN or a PNP signal 1311a-c, and may operate on an industry standard 24 $V_{DC}$. A ring light 1305a-c may include an overdrive driver with, for example, NPN or PNP signal options. A ring light 1305a-c may include: sixteen, 1 mm$^2$ die high current LEDs 1306b; T-Slot for mounting; conversion adapters for different cameras (not shown in FIGS. 13A-C); PNP and NPN strobe input; continuous operation; a strobe mode; dimmable light control via a built in potentiometer; eight, 1 mm$^2$ die high current LEDs 1306b; four, 1 mm$^2$ die high current LEDs 1306b; a backlight diffuser 1312a-c; an analog intensity 0-10 $V_{DC}$ signal 1311a-c: Maximum strobe time 125 mS; up to 5000 strobes per second; 4-5 times brighter than standard high current LEDs; lenses on each LED 1306b for creating a collimated light pattern; optics 1312a-c that include a focused uniform lens for wide vision; a narrow uniform/homogenous light pattern; optics 1312a-c that include a tightly focused uniform lens for narrow version; camera lenses that can be mounted to front or back of ring light 1305a-c; a Cognex camera adapter; a Dalsa camera adapter; a Dalsa BOA series camera adapter; a Datalogic camera adapter for A series cameras; a Matrox camera adapter for Iris GT & Gator cameras; polarizes and diffusers for camera; and/or four, 1 mm$^2$ die high current LEDs.

Camera lens options for a ring light 1305a-c may include wide angle or narrow angle lenses. Wavelength options for the light sources 1306b may include: white, 365/395 nm, 470 nm, 505 nm, 530 nm, 625 nm, 850/940 nm, any sub-combination thereof, or a combination thereof. An all metal construction of ring light 1305a-c may provide a small particle resistant, and an all around durable light.

With reference to FIGS. 14A-E, a machine vision system 1400a-e may include a ring light 1405a-c similar to, for example, ring light 805a,b of FIGS. 8A and 8B, or ring light 1305a-c of FIGS. 13A-C. The ring light 1405a-e may include a plurality of housing side portions 1414a-d, a top housing portion 1415a-d and a bottom housing portion 1412c,d defining, for example, a square shape housing. The plurality of housing side portions 1414a-d may be interconnected via fastening features 1417a-e, 1418c-e.

While the ring light 1405a-e is shown in FIGS. 14A-E as defining a square shape, the housing side portions 1414a-d, the top housing portion 1415a-d and the bottom housing portion 1412c,d, may define any shape (e.g., a circular shape, a hexagon shape, a rectangular shape, a pentagon shape, a heptagon, an octagon, or any suitable polygon shape). The bottom housing portion 1412c,d may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The ring light 1405a-e may include a camera attachment 1413a,b defining a camera aperture 1409a,b in at least the top housing portion 1415a-d. In addition to being adapted to attach to a camera (not shown in FIGS. 14A-E), the camera attachment 1413a,b may be configured to be attached to a robot (e.g., attachment 1084, 1184, or 1289 of FIGS. 10, 11, and 12, respectively). The aperture 1409a,b may extend through the bottom housing portion 1412c,d. Alternatively, the bottom housing portion 1412c,d may close off an end of the aperture 1409a,b. The ring light 1405a-e may include a first electrical power/control connection 1411a-d, a second electrical power/control connection 1416a-d, an electrical printed circuit board (not shown in FIGS. 14A-E), a controller (not shown in FIGS. 14A-E), and a plurality of light sources (not shown in FIGS. 14A-E). The controller may be configured to receive electrical power/control signals via the first electrical power/control connection 1411a-d and may control, for example, an intensity of each of the plurality of light sources, the optical element 1412c,d, and/or a camera (not shown in FIGS. 14A-E). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the second electrical power/control connection 1416a-d, to, for example, a camera or a second light (another illuminator), and/or receive electrical power/control signals from, for example, a camera.

A ring light 1405a-e may include, for example: 40 high output LEDs; different lenses; a built in driver; no external wiring to an internal driver; continuous operation; a strobe mode; an analog intensity via 0-10 $V_{DC}$ signal; 128 high output LEDs; a 45 mm industrial frame with T-Slots; a large area/long distance configuration; 40 high output LEDs; a diffuse panel 1412a,b; a light tent or dome type of illumination; backlit LEDs for a more intense and highly diffuse lighting option; a narrow depth of approximately 30 mm; front lights with, for example, a 53 mm camera hole 1309a,b in the center; a 190 mm×190 mm housing; a 78 mm hole 1409a,b; a 300 mm×300 mm housing; a 30 mm industrial extrusion; a waterproof wash down housing; food and drug administration (FDA) compliancy; 2000 strobes per second (SPS); intensity control using analog 0-10 $V_{DC}$; a potentiometer for intensity control; may be 5 times brighter than standard high current LED lights; precise current that may provide stable light intensity; and/or a PNP and NPN strobe input.

A ring light 1405a-d may include an integrated strobe driver for LED light control where, for example, there is no need for an external driver to control the light. The integrated intelligent driver may monitor a strobe operation and/or an over drive operation, thereby, maximizing an output of ring light 1405a-d during inspections when used within an associated machine vision system. The ring light 1405a-d may include working parameters to ensure the LEDs are not damaged by driving the LEDs beyond associated LED design limits. This is especially beneficial for overdriving high current LEDs. A ring light 1405a-d may provide repeatable intensity control and pulsing by using, for example, a microprocessor to monitor and control electrical power to the LEDs for safe operation. An integrated controller may offer both a NPN and/or a PNP strobe input for easy integration with, for example, a smart camera. A ring light 1405a-d may have high speed reaction times that offer extremely fast repeatable pulse times. A ring light 1405a-d may automatically set LED drive limits for different LEDs. Each color or wavelength of LEDs may be maximized producing a high output LED ring light 1405a-d. A ring light 1405a-d may include UV, IR, white, red, blue, green, cyan, a sub-combination, or combination thereof, all may have different maximum current limit.

A ring light 1405*a-d* may be configured as an 80/20 extrusion adaptive LED light illuminator with an intense and uniform light pattern that may provide considerable energy savings over fluorescent lighting options. A ring light 1405*a-d* may include, for example, T-slot mounting (e.g., T-slot mounting 1623*e* of FIG. 16E) that may slide into an associated extrusion with no need for extra mounting accessories. A plurality of ring light 1405*a-d* may include direct-connect up to, for example, six modules lengths of 300 mm to 1800 mm with, for example, 300 mm increments.

A ring light 1405*a-d* may be, for example, uses in machine vision applications to illuminate robotic work cells by embedding the ring light 1405*a-d* in, for example, associated gating. A ring light 1405*a-d* may be ideal for use in limited-distance or tight areas such as control panels and under-conveyor installations. A ring light 1405*a-d* may be used in welding areas where, for example, a light is simple to change. A ring light 1405*a-d* may be substituted for legacy hanging fixtures. A ring light 1405*a-d* may be configured for mounting into, for example, most popular 0.32", 8 mm, and 10 mm T-slot extrusions. A ring light 1405*a-d* may include, for example, a M12 pigtail for connecting around extrusion corners. A ring light 1405*a-d* may be, for example, 12" or 300 mm in lengths. A ring light 1405*a-d* may be, for example, IP-50 rated. A ring light 1405*a-d* may be, for example, configured in compliance with CE, IEC62471 photobiological eye safety, RoHS. A ring light 1405*a-d* may include a 2-Pin jumper cable for use in, for example, T-slot mounting.

A ring light 1405*a-e* may include a light module (e.g., modular lighting assembly 30 of U.S. Pat. No. 9,004,715) positioned within, for example, any one of the housing side portions 1414*a-d*. Additionally, or alternatively, any given machine vision system 1400*a-d* may include a modular structural frame (e.g., modular structural frame 10 of U.S. Pat. No. 9,004,715) that includes a plurality of modular lighting assemblies 30. A modular structural frame 10 may define, for example, at least a portion of a machine vision system enclosure or a support structure for any portion of a machine vision system (e.g., any one of the machine vision systems as described herein).

Turning to FIGS. 15A-D, a machine vision system 1500*a-d* may include a linear bar-light linear light 1505*a-d* (i.e., a bar light) similar to, for example, bar light 105 of FIG. 1, or bar light 905 of FIG. 9. The bar light 1505*a-d* may include a plurality of housing side portions 1514*a-d*, a top housing portion 1512*a-d* and a bottom housing portion 1515*c,d* defining, for example, a rectangular shape housing. The plurality of housing side portions 1514*a-d* may be interconnected via, for example, a common casting, welding. fasteners, etc. While the bar light 1505*a-d* is shown in FIGS. 15A-D as defining a rectangular shape, the housing side portions 1514*a-d*, the a top housing portion 1512*a-d* and the bottom housing portion 1515*c,d*, may define any shape (e.g., a circular shape, a hexagon shape, a square shape, a pentagon shape, a heptagon, an octagon, or any suitable polygon shape). The top housing portion 1512*a-d* may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The bar light 1505*a-d* may include a first electrical power/control connection 1511*b-d*, a second electrical power/control connection 1516*b,c*, an electrical printed circuit board (not shown in FIGS. 15A-D), a controller (not shown in FIGS. 15A-D), and a plurality of light sources (not shown in FIGS. 15A-D). The controller may be configured to receive electrical power/control signals via the first electrical power/control connection 1511*b-d* and may control, for example, an intensity of each of the plurality of light sources, the optical element 1512*c,d*, and/or a camera (not shown in FIGS. 15A-D). The controller may be similar to, for example, the controller 1317*b* of FIG. 13B and/or 4405*a* of FIG. 44A. The controller may implement any portion or, or all of the functionality as described, for example, with regard to FIGS. 44A-D. The controller may provide electrical power/control signals, via the second electrical power/control connection 1516*b,c* to, for example, a camera or a second light (another illuminator), and/or receive electrical power/control signals from, for example, a camera.

A bar light 1505*a-d* may be configured, for example, to produce up to 100,000 lux. A bar light 1505*a-d* may include a multi-drive driver, allowing users to operate the bar light 1505*a-d* in, for example, a continuous operation mode and/or an over drive strobe (high-pulse operation) mode. A plurality of bar lights 1505*a-d* may be connected in, for example, a string of six to create ultra-long linear lights at a fraction of a cost of traditional monolithic solutions without any loss in uniformity. A plurality of bar lights 1505*a-d* may be connected by, for example, daisy-chaining the bar lights 1505*a-d* together using, for example, locking jumper cables extending between respective electrical power/control connection 1511*b-d*, 1516*b,d*. An electrical power/control connection 1511*b-d* may be rated for IP65. A bar light 1505*a-d* may include, for example, a 5 Pin M12 connector 1511*b-d*, 1516*b,d*. A bar light 1505*a-d* may include a 1-10 V analog control line to provide, for example, control over intensity in a continuous mode. A bar light 1505*a-d* may include product parameters that may be, for example, user selectable to a maximum allowed intensity. A bar light 1505*a-d* may be configured such that removing a signal will put the bar light 1505*a-d* into, for example, an over drive operation mode.

A bar light 1505*a-d* may be used in, for example, a bright field application, a direct lighting application, a dark field application, etc. A bar light 1505*a-d* may include a PNP and/or a NPN strobe input. A bar light 1505*a-d* may include a 5-pin M12 quick connect. A bar light 1505*a-d* may include a wavelength color of, for example: white, 470 nm, 505 nm, 530 nm, 625 nm, 850 nm, 940 nm, a sub-combination thereof, or a combination thereof. A bar light 1505*a-d* may include, for example, four (4) screw holes (not shown in FIGS. 15A-D) located on a bottom of the bar light 1505*a-d* for easy mounting. A bar light 1505*a-d* may include, for example, a 3-Axis pan and tilt mount. A plurality of bar lights 1505*a-d* may be directly connected together (i.e., with no space between the lights). A bar light 1505*a-d* may include a waterproof stainless steel enclosure specially designed for food industry and wash down environments where, for example, water and corrosive materials are present. A bar light 1505*a-d* may include circuitry enclosed in, for example, an epoxy potted compound further protecting the bar light 1505*a-d* from dust, debris, and other contaminants. A bar light 1505*a-d* may include 12 high intensity LEDs. A bar light 1505*a-d* may include $24V_{DC}$, and may operate in continuous or strobe mode. A bar light 1505*a-d* may include NPN or PNP strobe triggers that may be, for example, used to control a pulse of the bar light 1505*a-d*. A bar light 1505*a-d* may be configured such that, for example, an intensity of the bar light 1505*a-d* can be controlled via 0-10V remote analog signal and/or a manual potentiometer. A bar light 1505*a-d* may include, for example, twelve, 1 mm$^2$ die high current LEDs. A bar light 1505*a-d* may include a backlight lens 1512a-d that is, for example, a viable option for silhouetting objects.

With reference to FIGS. 16A-E, a machine vision system 1600a-e may include a bar light 1605a-d similar to, for example, bar light 105 of FIG. 1, bar light 905 of FIG. 9, or bar light 1505a-d of FIGS. 15A-D. The bar light 1605a-d may include a plurality of housing side portions 1614a,c,d, a top housing portion 1612a,b and a bottom housing portion 1615a,c,d defining, for example, a rectangular shape housing. The plurality of housing side portions 1614a,c,d may be interconnected via, for example, a common casting, a common mold, welding. fasteners, etc. While the bar light 1605a-d is shown in FIGS. 16A-E as defining a rectangular shape, the housing side portions 1614a,c,d, the a top housing portion 1612a,b and the bottom housing portion 1615a,c,d, may define any shape (e.g., a circular shape, a hexagon shape, a square shape, a pentagon shape, a heptagon, an octagon, or any suitable polygon shape). The top housing portion 1612a,b may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The bar light 1605a-d may include an electrical power/control connection 1611b-d, an electrical printed circuit board (not shown in FIGS. 16A-E), a controller (not shown in FIGS. 16A-E), and a plurality of light sources (not shown in FIGS. 16A-E). The controller may be configured to receive electrical power/control signals via the electrical power/control connection 1611a-d and may control, for example, an intensity of each of the plurality of light sources, the optical element 1612a,b, and/or a camera (not shown in FIGS. 16A-E). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 1611a-d to, for example, a camera or a second light (another illuminator), and/or receive electrical power/control signals from, for example, a camera.

A bar light 1600a-d may include a narrow 40° lens 1612a,b, a narrow 16° (N16) lens 1612a,b, a narrow 25° (N25) lens 1612a,b, a wide 80° (W) lens 1612a,b, a line (L) lens 1612a,b, etc. A bar light 1605a-d may be configured, for example, to produce up to 100,000 lux. A bar light 1605a-d may include a multi-drive driver, allowing users to operate the bar light 1605a-d in, for example, a continuous operation mode and/or an over drive strobe (high-pulse operation) mode. An electrical power/control connection 1611a-d may be rated for IP65. A bar light 1605a-d may include, for example, a 5 Pin M12 connector 1622d. A bar light 1605a-d may include a 1-10V analog control line to provide, for example, control over intensity in a continuous mode. A bar light 1605a-d may include product parameters that may be, for example, user selectable to a maximum allowed intensity. A bar light 1605a-d may be configured such that removing a signal will put the bar light 1605a-d into, for example, an over drive operation mode.

A bar light 1605a-d may be used in, for example, a bright field application, a direct lighting application, a dark field application, etc. A bar light 1605a-d may include a PNP and/or an NPN strobe input. A bar light 1605a-d may include a 5-pin M12 quick connect 1622d. A bar light 1605a-d may include a wavelength color of, for example: white, 470 nm, 505 nm, 530 nm, 625 nm, 850 nm, 940 nm, a sub-combination thereof, or a combination thereof. A bar light 1605a-d may include, for example, a T-slot mount 1621a,e having a slot 1623e defined by tabs 1624e. A bar light 1605a-d may include, for example, a 3-Axis pan and tilt mount. A bar light 1605a-d may include a waterproof stainless steel enclosure specially designed for food industry and wash down environments where, for example, water and corrosive materials are present. A bar light 1605a-d may include circuitry enclosed in, for example, an epoxy potted compound further protecting the bar light 1605a-d from dust, debris, and other contaminants. A bar light 1605a-d may include 12 high intensity LEDs. A bar light 1605a-d may include $24V_{DC}$, and may operate in continuous or strobe mode. A bar light 1605a-d may include NPN or PNP strobe triggers that may be, for example, used to control a pulse of the bar light 1605a-d. A bar light 1605a-d may be configured such that, for example, an intensity of the bar light 1605a-d can be controlled via 0-10V remote analog signal and/or a manual potentiometer. A bar light 1605a-d may include, for example, twelve, 1 $mm^2$ die high current LEDs. A bar light 1605a-d may include a backlight lens 1612a,b that is, for example, a viable option for silhouetting objects.

Turning to FIGS. 17A-E, a machine vision system 1700a-e may include a linear light 1705a-d similar to, for example, bar light 105 of FIG. 1, bar light 905 of FIG. 9, bar light 1505a-d of FIGS. 15A-D, or bar light 1605a-d of FIGS. 16A-E. The linear light 1705a-d may include a plurality of housing side portions 1714a-d, a top housing portion 1712a,b,d and a bottom housing portion 1715a,b defining, for example, a rectangular shape housing. The plurality of housing side portions 1714a-d may be interconnected via, for example, a common casting, a common mold, welding. fasteners, etc. While the linear light 1705a-e is shown in FIGS. 17A-E as defining a rectangular shape, the housing side portions 1714a-d, the a top housing portion 1712a,b,d and the bottom housing portion 1715a,b, may define any shape (e.g., a circular shape, a hexagon shape, a square shape, a pentagon shape, a heptagon, an octagon, or any suitable polygon shape). The top housing portion 1712a,b,d may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The linear light 1705a-e may include an electrical power/control connection 1711a-d, an electrical printed circuit board (not shown in FIGS. 17A-E), a controller (not shown in FIGS. 17A-E), and a plurality of light sources (not shown in FIGS. 17A-E). The controller may be configured to receive electrical power/control signals via the electrical power/control connection 1711a-d and may control, for example, an intensity of each of the plurality of light sources, the optical element 1712a,b,d, and/or a camera (not shown in FIGS. 17A-E). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 1711a-d to, for example, a camera or a second light (another illuminator), and/or receive electrical power/control signals from, for example, a camera.

A linear light 1705a-d may include a narrow 40° lens 1712a,b,d, a narrow 16° (N16) lens 1712a,b,d, a narrow 25° (N25) lens 1712a,b,d, a wide 80° (W) lens 1712a,b,d, a line (L) lens 1712a,b,d, etc. A linear light 1705a-d may be configured, for example, to produce up to 100,000 lux. A linear light 1705a-d may include a multi-drive driver, allowing users to operate the linear light 1705a-d in, for example, a continuous operation mode and/or an over drive strobe (high-pulse operation) mode. An electrical power/control connection 1711a-d may be rated for IP65. A linear light 1705a-d may include, for example, a 5 Pin M12 connector 1722a-d. A linear light 1705a-d may include a 1-10V analog control line to provide, for example, control over intensity in a continuous mode. A linear light 1705a-d may include product parameters that may be, for example, user selectable to a maximum allowed intensity. A linear light 1705a-d may be configured such that removing a signal will put the linear light 1705a-d into, for example, an over drive operation mode.

A linear light 1705a-d may be used in, for example, a bright field application, a direct lighting application, a dark field application, a line scan application, etc. A linear light 1705a-d may include a PNP and/or a NPN strobe input. A linear light 1705a-d may include a 5-pin M12 quick connect 1722a-d. A linear light 1705a-d may emit a wavelength color of, for example: white, 470 nm, 505 nm, 530 nm, 625 nm, 850 nm, 940 nm, a sub-combination thereof, or a combination thereof. A linear light 1705a-d may include, for example, a T-slot mount 1721c,e having a slot 1723e defined by tabs 1724e. A linear light 1705a-d may include, for example, a 3-Axis pan and tilt mount. A linear light 1705a-d may include a waterproof stainless steel enclosure specially designed for food industry and wash down environments where, for example, water and corrosive materials are present. A linear light 1705a-d may include circuitry enclosed in, for example, an epoxy potted compound further protecting the linear light 1705a-d from dust, debris, and other contaminants. A linear light 1705a-d may include 12 high intensity LEDs. A linear light 1705a-d may include $24V_{DC}$, and may operate in continuous or strobe mode. A linear light 1705a-d may include NPN or PNP strobe triggers that may be, for example, used to control a pulse of the linear light 1705a-d. A linear light 1705a-d may be configured such that, for example, an intensity of the linear light 1705a-d may be controlled via 0-10V remote analog signal and/or a manual potentiometer. A linear light 1705a-d may include, for example, twelve, 1 mm² die high current LEDs. A linear light 1705a-d may include a backlight lens 1712a,b,d that is, for example, a viable option for silhouetting objects.

A linear light 1705a-d may include a rugged IP65-rated housing, strobe and constant operation capability, and the convenience of aluminum extrusion T-slot mounting. A linear light 1705a-d may be drip proof and/or splash proof. A linear light 1705a-d may emit wavelength color(s) of, for example: white, 470 nm, 505, nm, 530 nm, 625 nm, 850 nm, 940 nm, a sub-combination thereof, or a combination thereof.

With reference to FIGS. 18A-F, a machine vision system 1800a-f may include a linear light 1805a-d,f similar to, for example, bar light 105 of FIG. 1, bar light 905 of FIG. 9, bar light 1505a-d of FIGS. 15A-D, or bar light 1605a-d of FIGS. 16A-E, or linear light 1705a-d of FIGS. 17A-E. The linear light 1805a-d,f may include a plurality of housing side portions 1814a-d, a top housing portion 1812a-d and a bottom housing portion 1815d defining, for example, a rectangular shape housing. The plurality of housing side portions 1814a-d may be interconnected via, for example, a common casting, a common mold, welding. fasteners, etc. While the linear light 1805a-d,f is shown in FIGS. 18A-F as defining a rectangular shape, the housing side portions 1814a-d, the a top housing portion 1812a-d and the bottom housing portion 1815d, may define any shape (e.g., a circular shape, a hexagon shape, a square shape, a pentagon shape, a heptagon, an octagon, or any suitable polygon shape). The top housing portion 1812a-d may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The linear light 1805a-d,f may include a first electrical power/control connection 1811a,c,d, an electrical printed circuit board 1804f, a controller (not shown in FIGS. 18A-F), and a plurality of light sources 1806f. The controller may be configured to receive electrical power/control signals via the first electrical power/control connection 1811a,c,d and may control, for example, an intensity of each of the plurality of light sources 1806f, the optical element 1812a-d, and/or a camera (not shown in FIGS. 18A-F). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the second electrical power/control connection 1816a-d to, for example, a camera or a second light (another illuminator), and/or receive electrical power/control signals from, for example, a camera.

A linear light 1805a-d,f may include a narrow 40° lens 1812a-d, a narrow 16° (N16) lens 1812a-d, a narrow 25° (N25) lens 1812a-d, a wide 80° (W) lens 1812a-d, a line (L) lens 1812a-d, 1807f, etc. A linear light 1805a-d,f may be configured, for example, to produce up to 100,000 lux. A linear light 1805a-d,f may include a multi-drive driver, allowing users to operate the linear light 1705a-d,f in, for example, a continuous operation mode and/or an over drive strobe (high-pulse operation) mode. A first electrical power/control connection 1811a-d and/or a second electrical power/control connection 1816a-d may be rated for IP65. A linear light 1805a-d,f may include, for example, a 5 Pin M12 connector. A linear light 1805a-d,f may include a 1-10V analog control line to provide, for example, control over intensity in a continuous mode. A linear light 1805a-d,f may include product parameters that may be, for example, user selectable to a maximum allowed intensity. A linear light 1805a-d,f may be configured such that removing a signal will put the linear light 1805a-d,f into, for example, an over drive operation mode.

A linear light 1805a-d,f may be used in, for example, a bright field application, a direct lighting application, a dark field application, a line scan application, etc. A linear light 1805a-d,f may include a PNP and/or a NPN strobe input. A linear light 1805a-d,f may include a 5-pin M12 quick connect. A linear light 1805a-d,f may include a wavelength color of, for example: white, 470 nm, 505 nm, 530 nm, 625 nm, 850 nm, 940 nm, a sub-combination thereof, or a combination thereof. A linear light 1805a-d,f may include, for example, a T-slot mount 1821b,c,e having a slot 1823e defined by tabs 1824e. A linear light 1805a-d,f may include, for example, a 3-Axis pan and tilt mount. A linear light 1805a-d, may include a waterproof stainless steel enclosure specially designed for food industry and wash down environments where, for example, water and corrosive materials are present. A linear light 1805a-d,e may include circuitry 1804f, 1806f enclosed in, for example, an epoxy potted compound further protecting the linear light 1805a-d,f from dust, debris, and other contaminants. A linear light 1805a-d,f may include 12 high intensity LEDs. A linear light 1805a-d,f may include $24V_{DC}$, and may operate in continuous or strobe mode. A linear light 1805a-d,f may include NPN or PNP strobe triggers that may be, for example, used to control a pulse of the linear light 1805a-d,f. A linear light 1805a-d,f may be configured such that, for example, an intensity of the linear light 1805a-d,f may be controlled via 0-10V remote analog signal and/or a manual potentiometer. A linear light 1805a-d,f may include, for example, twelve, 1 mm² die high current LEDs. A linear light 1805a-d,f may include a backlight lens 1812a-d that is, for example, a viable option for silhouetting objects.

A linear light 1805a-d,f may include a rugged IP65-rated housing, strobe and constant operation capability, and the convenience of aluminum extrusion T-slot mounting 1821b, c,e. A linear light 1805a-d,f may be drip proof and/or splash proof. A linear light 1805a-d,f may emit wavelength color(s) of, for example: white, 470 nm, 505, nm, 530 nm, 625 nm, 850 nm, 940 nm, a sub-combination thereof, or a combination thereof.

A linear light 1805a-d,f may be designed as a direct LED replacement for standard fluorescent lighting and may provide a homogeneous output. A linear light 1805a-d,f may include a plug-and-play design. A linear light 1805a-d,f may include 30 high intensity LEDs 1806f and may include a diffuse lens 1812a-d, 1807f to, for example, disperse the light in an equivalent fashion as a fluorescent light of equivalent length, and may provide an even distribution. A linear light 1805a-d,f may include an integrated constant current driver built into the light.

With further reference to FIG. 18F, a linear light 1805f may be configured as a multi-line 1853f line scan light. A linear light 1805f may provide high intensity lighting for applications in machine vision where, for example, materials are processed on a conveyor or continuous feed web system. A machine vision system 1800f may include a specialized camera (not shown in FIG. 18F) with sensor arrays that match the shape of the line-shaped beam 1853f projected 1810f by the lens 1807f of the linear light 1805f. For example, camera systems with large area sensor arrays, that allow the machine vision system 1800f to continually capture images or a large illuminated area, may be included. A linear light 1805f may project two or more independent lines 1853f. Each line 1853f may have arbitrary LED 1806f wavelengths. Each line 1853f may be independently controlled. Each line 1853f may be independently pulsed. Line arrays may be constructed from a large range of wavelengths, UV, Visible, NIR, SWIR, a sub-combination thereof, or a combination thereof. A linear light 1805f may include a design of a line-high-power (LHP) that may, for example, allow projection 1810f of intense and fully focusable line. The LHP may utilizes, for example, 192 high-power LEDs 1806f for every 300 mm in length, while remaining thermally stable via, for example, heat-dissipating qualities of an aluminum housing and/or built-in air or liquid cooling controlled via an external chilling system. A linear light 1805f may include an interlocking key switch selectable between high and low intensity, the LHP Series is fully controllable and user protected. A linear light 1805a-d, f may include a high and low-intensity selector, an interlock system for user protection, a wire-grid polarizer 1812a-d, greater than 5 Million lux output, and/or 72 high-power LEDs Turning to FIGS. 19A-E, a machine vision system 1900a-e may include a bar light 1905a-d similar to, for example, bar light 105 of FIG. 1, bar light 905 of FIG. 9, bar light 1505a-d of FIGS. 15A-D, or a bar light 1605a-d of FIGS. 16A-D. The bar light 1905a-d may include a plurality of housing side portions 1914a-d, a top housing portion 1912a-d and a bottom housing portion 1915a-d defining, for example, a rectangular shape housing. The plurality of housing side portions 1914a-d may be interconnected via, for example, a common casting, a common mold, welding, fasteners, etc. While the bar light 1905a-d is shown in FIGS. 19A-E as defining a rectangular shape, the housing side portions 1914a-d, the a top housing portion 1912a-d and the bottom housing portion 1915a-d, may define any shape (e.g., a circular shape, a hexagon shape, a square shape, a pentagon shape, a heptagon, an octagon, or any suitable polygon shape). The top housing portion 1912a-d may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The bar light 1905a-d may include an electrical power/control connection 1911b-d, an electrical printed circuit board (not shown in FIGS. 19A-E), a controller (not shown in FIGS. 19A-E), and a plurality of light sources (not shown in FIGS. 19A-E). The controller may be configured to receive electrical power/control signals via the electrical power/control connection 1911a-d and may control, for example, an intensity of each of the plurality of light sources, the optical element 1912a-d, and/or a camera (not shown in FIGS. 19A-E). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 1911a-d to, for example, a camera or a second light (another illuminator), and/or receive electrical power/control signals from, for example, a camera.

A bar light 1900a-d may include a narrow 40° lens 1912a-d, a narrow 16° (N16) lens 1912a-d, a narrow 25° (N25) lens 1912a-d, a wide 80° (W) lens 1912a-d, a line (L) lens 1912a-d, etc. A bar light 1905a-d may be configured, for example, to produce up to 100,000 lux. A bar light 1905a-d may include a multi-drive driver, allowing users to operate the bar light 1605a-d in, for example, a continuous operation mode and/or an over drive strobe (high-pulse operation) mode. An electrical power/control connection 1911a-d may be rated for IP65. A bar light 1905a-d may include, for example, a 5 Pin M12 connector. A bar light 1905a-d may include a 1-10V analog control line to provide, for example, control over intensity in a continuous mode. A bar light 1905a-d may include product parameters that may be, for example, user selectable to a maximum allowed intensity. A bar light 1905a-d may be configured such that removing a signal will put the bar light 1905a-d into, for example, an over drive operation mode.

A bar light 1905a-d may be used in, for example, a bright field application, a direct lighting application, a dark field application, etc. A bar light 1905a-e may include a PNP and/or a NPN strobe input. A bar light 1905a-d may include a 5-pin M12 quick connect. A bar light 1905a-e may include a wavelength color of, for example: white, 470 nm, 505 nm, 530 nm, 625 nm, 850 nm, 940 nm, a sub-combination thereof, or a combination thereof. A bar light 1905a-e may include, for example, a T-slot mount 1921d,e having a slot 1923e defined by tabs 1924e. A bar light 1905a-d may include, for example, a 3-Axis pan and tilt mount. A bar light 1905a-d may include a waterproof stainless steel enclosure specially designed for food industry and wash down environments where, for example, water and corrosive materials are present. A bar light 1905a-d may include circuitry enclosed in, for example, an epoxy potted compound further protecting the bar light 1905a-d from dust, debris, and other contaminants. A bar light 1905a-d may include 12 high intensity LEDs. A bar light 1905a-d may include 24V$_{DC}$, and may operate in continuous or strobe mode. A bar light 1905a-d may include NPN or PNP strobe triggers that may be, for example, used to control a pulse of the bar light 1905a-d. A bar light 1905a-d may be configured such that, for example, an intensity of the bar light 1905a-d can be controlled via 0-10V remote analog signal and/or a manual potentiometer. A bar light 1905a-d may include, for example, twelve, 1 mm$^2$ die high current LEDs. A bar light 1905a-d may include a backlight lens 1912a-d that is, for example, a viable option for silhouetting objects.

A bar light 1905a-d may be configured to be drip-proof and/or splash-proof. A bar light 1905a-d may include an aluminum design that may, for example, provide heat dissipation and/or ventilation to allow for pressure equalization. A bar light 1905a-d may include a multi-drive driver, which may allow the light to operate in constant output mode or in an over drive strobe operation. A bar light 1905a-d may be sealed to IP65 standards, may include a driver built in, no external wiring to a driver, NPN and/or PNP signal options, continuous operation, strobe mode built in, and/or an industry standard 5-Pin M12 connector.

With reference to FIGS. 20A-C, a machine vision system 2000a-c may include a linear light 2005a-c similar to, for example, linear light 1705a-d of FIGS. 17A-E, or linear light 1805a-d of FIGS. 18A-E. The linear light 2005a-c may include a plurality of housing side portions 2014a-c, a top housing portion 2012a-c and a bottom housing portion 2015a-c defining, for example, a rectangular shape housing. The plurality of housing side portions 2014a-c may be interconnected via, for example, a common casting, a common mold, welding. fasteners, etc. While the linear light 2005a-c is shown in FIGS. 20A-C as defining a rectangular shape, the housing side portions 2014a-c, the a top housing portion 2012a-c and the bottom housing portion 2015a-c, may define any shape (e.g., a circular shape, a hexagon shape, a square shape, a pentagon shape, a heptagon, an octagon, or any suitable polygon shape). The top housing portion 2012a-c may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The linear light 2005a-c may include an electrical power/control connection 2011a-c, an electrical printed circuit board (not shown in FIGS. 20A-C), a controller (not shown in FIGS. 20A-C), and a plurality of light sources (not shown in FIGS. 20A-C). The controller may be configured to receive electrical power/control signals via the electrical power/control connection 2011a-c and may control, for example, an intensity of each of the plurality of light sources, the optical element 2012a-c, and/or a camera (not shown in FIGS. 20A-C). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 2011a-c to, for example, a camera or a second light (another illuminator), and/or receive electrical power/control signals from, for example, a camera.

A linear light 2005a-c may include a narrow 40° lens 2012a-c, a narrow 16° (N16) lens 2012a-c, a narrow 25° (N25) lens 2012a-c, a wide 80° (W) lens 2012a-c, a line (L) lens 2012a-c, etc. A linear light 2005a-c may be configured, for example, to produce up to 100,000 lux. A linear light 2005a-c may include a multi-drive driver, allowing users to operate the bar light linear light 2005a-c in, for example, a continuous operation mode and/or an over drive strobe (high-pulse operation) mode. An electrical power/control connection 2011a-c may be rated for IP65. A linear light 2005a-c may include, for example, a 5 Pin M12 connector. A linear light 2005a-c may include a 1-10V analog control line to provide, for example, control over intensity in a continuous mode. A linear light 2005a-c may include product parameters that may be, for example, user selectable to a maximum allowed intensity. A linear light 2005a-c may be configured such that removing a signal will put the linear light 2005a-c into, for example, an over drive operation mode.

A linear light 2005a-c may be used in, for example, a bright field application, a direct lighting application, a dark field application, etc. A linear light 2005a-c may include a PNP and/or a NPN strobe input. A linear light 2005a-c may include a 5-pin M12 quick connect. A linear light 2005a-c may include a wavelength color of, for example: white, 470 nm, 505 nm, 530 nm, 625 nm, 850 nm, 940 nm, a sub-combination thereof, or a combination thereof. A linear light 2005a-c may include, for example, a T-slot mount 2021a-c having a slot defined by tabs. A linear light 2005a-c may include, for example, a 3-Axis pan and tilt mount. A linear light 2005a-c may include a waterproof stainless steel enclosure specially designed for food industry and wash down environments where, for example, water and corrosive materials are present. A linear light 2005a-c may include circuitry enclosed in, for example, an epoxy potted compound further protecting the linear light 2005a-c from dust, debris, and other contaminants. A linear light 2005a-c may include 12 high intensity LEDs. A linear light 2005a-c may include 24V$_{DC}$, and may operate in continuous or strobe mode. A linear light 2005a-c may include NPN or PNP strobe triggers that may be, for example, used to control a pulse of the linear light 2005a-c. A linear light 2005a-c may be configured such that, for example, an intensity of the linear light 2005a-c can be controlled via 0-10V remote analog signal and/or a manual potentiometer. A linear light 2005a-c may include, for example, twelve, 1 mm$^2$ die high current LEDs. A linear light 2005a-c may include a backlight lens 2012a-c that is, for example, a viable option for silhouetting objects. A linear light 2005a-c may include 6 or 12 high output LED's, driver built in, no external wiring to a driver, PNP and/or NPN strobe input, continuous operation, strobe mode, dimmable via built in potentiometer, analog intensity 0-10 VDC signal, and/or T-Slot for mounting and connecting together. A linear light 2005a-c can be used as backlight and/or diffuse front light and may include 6 or 12 high output LEDs, a built in driver, no external wiring to a driver, a PNP and/or NPN strobe input, dimmable via potentiometer or 0-10V$_{DC}$ analog signal, T-Slot for mounting and connecting lights together, lengths of 6" increments, maximum 5000 strobes per second, dimmable via built in potentiometer, and/or analog intensity 0-10V$_{DC}$ signal. A plurality of linear lights 2005a-c may be directly connect with no external wiring.

Turning to FIGS. 21A-G, a machine vision system 2100a-g may include a linear light 2005a-c similar to, for example, linear light 1705a-d of FIGS. 17A-E, linear light 1805a-d of FIGS. 18A-E, or linear light 2005a-d. The linear light 2105a-d,f,g may include a plurality of housing side portions 2114a-d,f,g, a top housing portion 2112a-d,f,g and a bottom housing portion 2115a-d,f,g defining, for example, a rectangular shape housing. The plurality of housing side portions 2114a-d,f,g may be interconnected via, for example, a common casting, a common mold, welding. fasteners, etc. While the linear light 2105a-d,f,g is shown in FIGS. 21A-G as defining a rectangular shape, the housing side portions 2114a-d,f,g, the a top housing portion 2112a-d,f,g and the bottom housing portion 2115a-d,f,g, may define any shape (e.g., a circular shape, a hexagon shape, a square shape, a pentagon shape, a heptagon, an octagon, or any suitable polygon shape). The top housing portion 2112a-d,f,g may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The linear light 2105a-d,f,g may include an electrical power/control connection 2111a-d,f,g, an electrical printed circuit board 2104f,g, a controller (not shown in FIGS. 21A-G), and a plurality of light sources 2106f,g. The controller may be configured to receive electrical power/control signals via the electrical power/control connection 2111a-d,f,g and may control, for example, an intensity of each of the plurality of light sources 2106f,g, the optical element 2112a-d,f,g, and/or a camera (not shown in FIGS. 21A-G). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 2111a-d,f,g to, for example, a camera or a second light (another illuminator), and/or receive electrical power/control signals from, for example, a camera.

A linear light 2105a-d,f,g may include a narrow 40° lens 2112a-d,f,g, a narrow 16° (N16) lens 2112a-d,f,g, a narrow 25° (N25) lens 2112a-d,f,g, a wide 80° (W) lens 2112a-d,f,g, a line (L) lens 2112a-d,f,g, etc. A linear light 2105a-d,f,g may be configured, for example, to produce up to 100,000 lux. A linear light 2105a-d,f,g may include a multi-drive driver, allowing users to operate the bar light linear light 2105a-d,f,g in, for example, a continuous operation mode and/or an over drive strobe (high-pulse operation) mode. An electrical power/control connection 2111a-d,f,g may be rated for IP65. A linear light 2105a-d,f,g may include, for example, a 5 Pin M12 connector. A linear light 2105a-d,f,g may include a 1-10V analog control line to provide, for example, control over intensity in a continuous mode. A linear light 2105a-d,f,g may include product parameters that may be, for example, user selectable to a maximum allowed intensity. A linear light 2105a-d,f,g may be configured such that removing a signal will put the linear light 2105a-d,f,g into, for example, an over drive operation mode.

A linear light 2105a-d,f,g may be used in, for example, a bright field application, a direct lighting application, a dark field application, etc. A linear light 2105a-d,f,g may include a PNP and/or a NPN strobe input. A linear light 2105a-d,f,g may include a 5-pin M12 quick connect. A linear light 2105a-d,f,g may include a wavelength color of, for example: white, 470 nm, 505 nm, 530 nm, 625 nm, 850 nm, 940 nm, a sub-combination thereof, or a combination thereof. A linear light 2005a-c may include, for example, a T-slot mount 2121a-d,f,g having a slot 2123e defined by tabs 2124e. A linear light 2105a-d,f,g may include, for example, a 3-Axis pan and tilt mount. A linear light 2105a-d,f,g may include a waterproof stainless steel enclosure specially designed for food industry and wash down environments where, for example, water and corrosive materials are present. A linear light 2105a-d,f,g may include circuitry enclosed in, for example, an epoxy potted compound further protecting the linear light 2105a-d,f,g from dust, debris, and other contaminants. A linear light 2005a-c may include 12 high intensity LEDs 2106f,g. A linear light 2105a-d,f,g may include $24V_{DC}$, and may operate in continuous or strobe mode. A linear light 2105a-d,f,g may include NPN or PNP strobe triggers that may be, for example, used to control a pulse of the linear light 2105a-d,f,g. A linear light 2105a-d,f,g may be configured such that, for example, an intensity of the linear light 2105a-d,f,g can be controlled via 0-10V remote analog signal and/or a manual potentiometer. A linear light 2105a-d,f,g may include, for example, twelve, 1 $mm^2$ die high current LEDs 2106f,g. A linear light 2105a-d,f,g may include a backlight lens 2105a-d,f,g that is, for example, a viable option for silhouetting objects. A linear light 2105a-d,f,g may include 6 or 12 high output LED's 2106f,g, driver built in, no external wiring to a driver, PNP and/or NPN strobe input, continuous operation, strobe mode, dimmable via built in potentiometer, analog intensity 0-10 VDC signal, and/or T-Slot for mounting and connecting together. A linear light 2105a-d,f,g can be used as backlight and/or diffuse front light and may include 6 or 12 high output LEDs 2106f,g, a built in driver, no external wiring to a driver, a PNP and/or NPN strobe input, dimmable via potentiometer or $0-10V_{DC}$ analog signal, T-Slot for mounting and connecting lights together, lengths of 6" increments, maximum 5000 strobes per second, dimmable via built in potentiometer, and/or analog intensity $0-10V_{DC}$ signal. A plurality of linear lights 2105a-d,f,g may be directly connect with no external wiring.

With reference to FIGS. 22A-E, a machine vision system 2200a-e may include a linear bar-light linear light 2205a-e (i.e., a bar light) similar to, for example, bar light 105 of FIG. 1, or bar light 905 of FIG. 9, or bar light 1505a-d of FIGS. 15A-D. The bar light 2205a-e may include a plurality of housing side portions 2214a-e, a top housing portion 2212a-e and a bottom housing portion 2215a-e defining, for example, a rectangular shape housing. The plurality of housing side portions 2214a-e may be interconnected via, for example, a common casting, welding. fasteners, etc. While the bar light 2205a-e is shown in FIGS. 22A-E as defining a rectangular shape, the housing side portions 2214a-e, the a top housing portion 2212a-e and the bottom housing portion 2215c,e, may define any shape (e.g., a circular shape, a hexagon shape, a square shape, a pentagon shape, a heptagon, an octagon, or any suitable polygon shape). The top housing portion 2212a-e may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The bar light 2205a-e may include a first electrical power/control connection 2211a,c,e second electrical power/control connection 2216c-e, an electrical printed circuit board (not shown in FIGS. 22A-E), a controller (not shown in FIGS. 22A-E), and a plurality of light sources (not shown in FIGS. 22A-E). The controller may be configured to receive electrical power/control signals via the first electrical power/control connection 2211a,c,e and may control, for example, an intensity of each of the plurality of light sources, the optical element 2212a-e, and/or a camera (not shown in FIGS. 22A-E). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the second electrical power/control connection 2216c-e to, for example, a camera or a second light (another illuminator), and/or receive electrical power/control signals from, for example, a camera.

A bar light 2205a-e may be configured, for example, to produce up to 100,000 lux. A bar light 2205a-e may include a multi-drive driver, allowing users to operate the bar light 2205a-e in, for example, a continuous operation mode and/or an over drive strobe (high-pulse operation) mode. A plurality of bar lights 2205a-e may be connected in, for example, a string of six to create ultra-long linear lights at a fraction of a cost of traditional monolithic solutions without any loss in uniformity. A plurality of bar lights 2205a-e may be connected by, for example, daisy-chaining the bar lights 2205a-e together using, for example, locking jumper cables extending between respective electrical power/control connection 2211a,c,e, 2216c-d. An electrical power/control connection 2211a,c,e may be rated for IP65. A bar light 2205a-e may include, for example, a 5 Pin M12 connector 2211a,c,e, 2216c-e. A bar light 2205a-e may include a 1-10V analog control line to provide, for example, control over intensity in a continuous mode. A bar light 2205a-e may include product parameters that may be, for example, user selectable to a maximum allowed intensity. A bar light 2205a-e may be configured such that removing a signal will put the bar light 2205a-e into, for example, an over drive operation mode.

A bar light 2205a-e may be used in, for example, a bright field application, a direct lighting application, a dark field application, etc. A bar light 2205a-e may include a PNP and/or a NPN strobe input. A bar light 2205a-e may include a 5-pin M12 quick connect. A bar light 2205a-e may include a wavelength color of, for example: white, 470 nm, 505 nm, 530 nm, 625 nm, 850 nm, 940 nm, a sub-combination thereof, or a combination thereof. A bar light 2205a-e may include, for example, four (4) screw holes 2221a,c located on a bottom of the bar light 2205a-e for easy mounting. A bar light 2205a-e may include, for example, a 3-Axis pan and tilt mount. A plurality of bar lights 2205a-e may be directly connected together (i.e., with no space between the lights). A bar light 2205a-e may include a waterproof stainless steel enclosure specially designed for food industry and wash down environments where, for example, water and corrosive materials are present. A bar light 2205a-e may include circuitry enclosed in, for example, an epoxy potted compound further protecting the bar light 2205a-e from dust, debris, and other contaminants. A bar light 2205a-e may include 12 high intensity LEDs. A bar light 2205a-e may include $24V_{DC}$, and may operate in continuous or strobe mode. A bar light 2205a-e may include NPN or PNP strobe triggers that may be, for example, used to control a pulse of the bar light 2205a-e. A bar light 2205a-e may be configured such that, for example, an intensity of the bar light 2205a-e can be controlled via 0-10V remote analog signal and/or a manual potentiometer. A bar light 2205a-e may include, for example, twelve, 1 mm² die high current LEDs. A bar light 2205a-e may include a backlight lens 2212a-e that is, for example, a viable option for silhouetting objects. A bar light 2205a-e may include 12 high intensity LEDs. A bar light 2205a-e may include an integrated constant current driver built into the light. A bar light 2205a-e may eliminate the need for any external components in an associated machine vision lighting system. A bar light 2205a-e may include $24V_{DC}$, and may operate in continuous or strobe mode. A bar light 2205a-e may include NPN or PNP strobe triggers that may be, for example, used to control a pulse of the light. A bar light 2205a-e may control an intensity of the light via, for example, a 0-10V remote analog signal or an integrated manual potentiometer. A bar light 2205a-e may include 12 HB high current LED's, a built in SMART driver, no external driver needed, PNP and/or NPN strobe, constant on operation, strobed operation, manual intensity control via integrated potentiometer dimming, remote intensity control—Analog $0-10V_{DC}$, mount on aluminum extrusion, and/or a maximum strobe rate of 5000 strobes per second.

Figure 23:
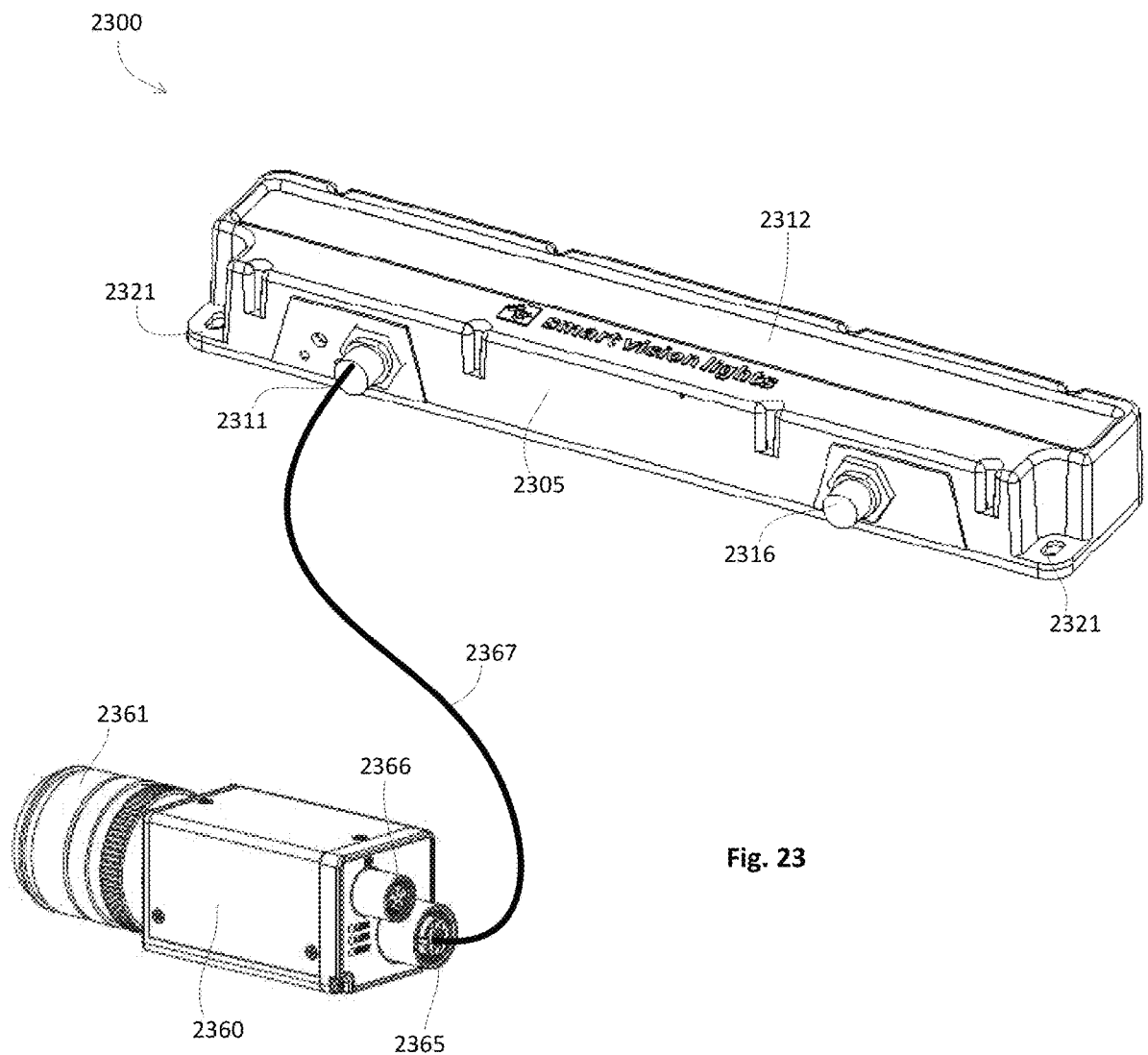
FIG. 23 depicts an example machine vision system incorporating a linear light.
Figure 24A:
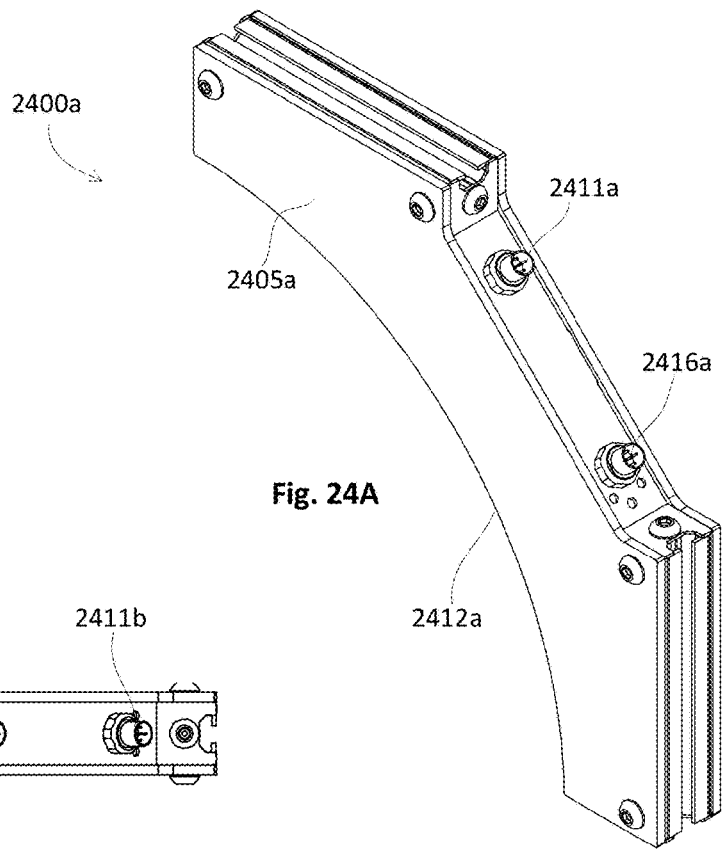
FIGS. 24A-D depict various views of an example curved linear light.
Figure 24B:
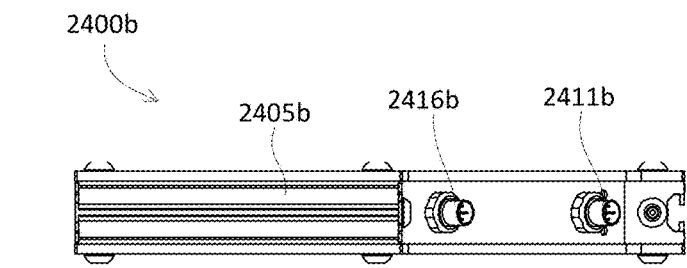
Figure 24C:
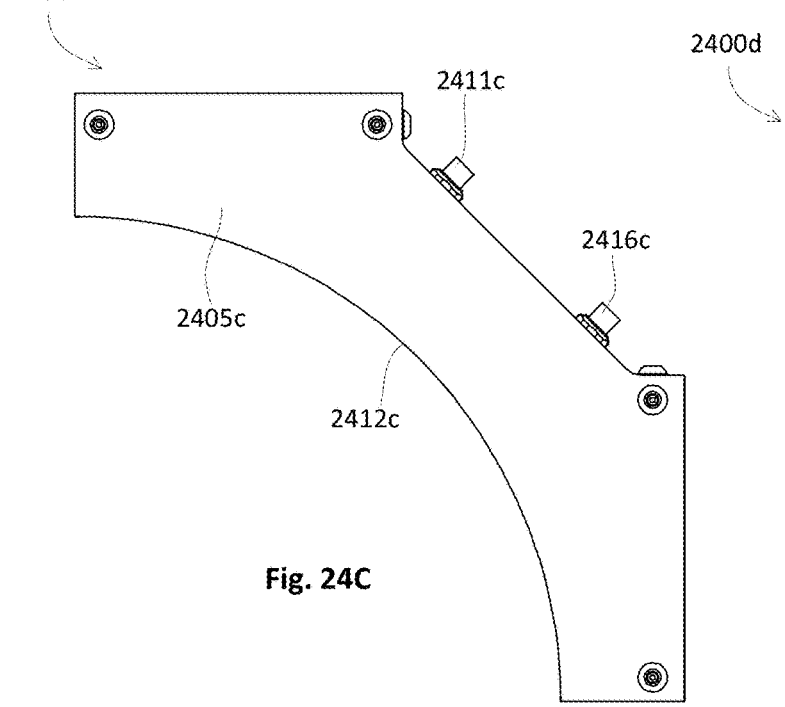
Figure 24D:
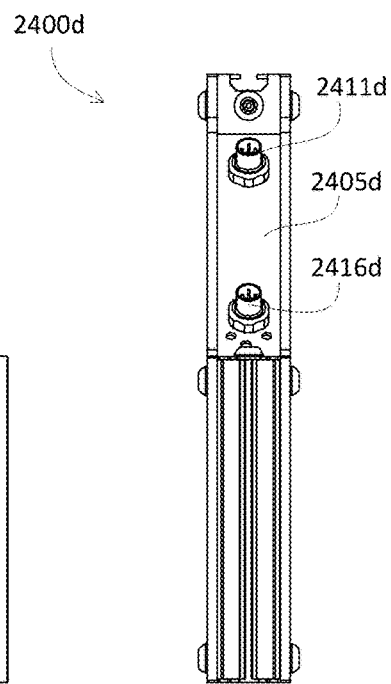
Figure 25A:
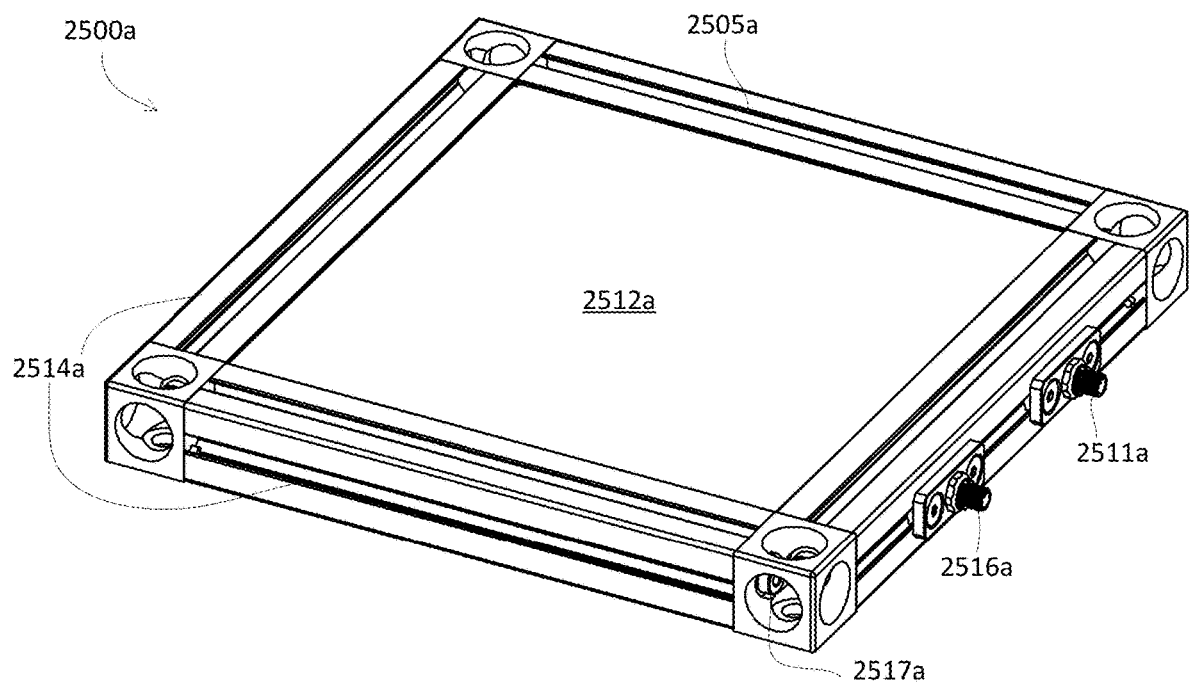
FIGS. 25A-H and J depict various views of an example patterned area light.
Figure 25B:
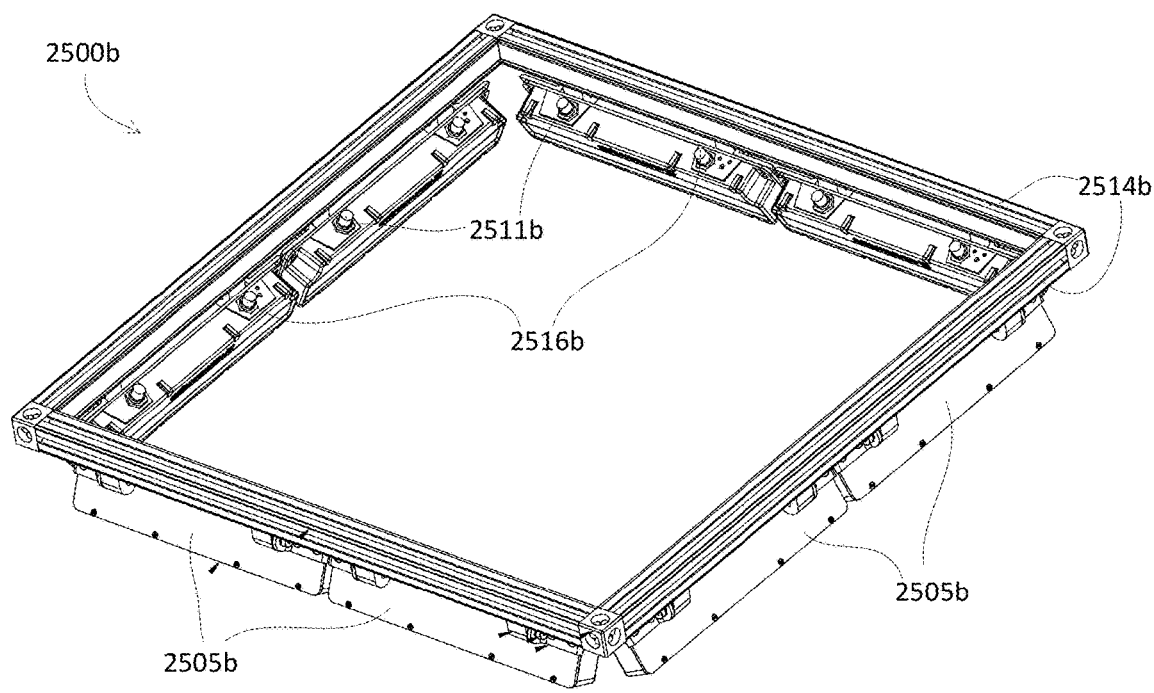
Figure 25C:
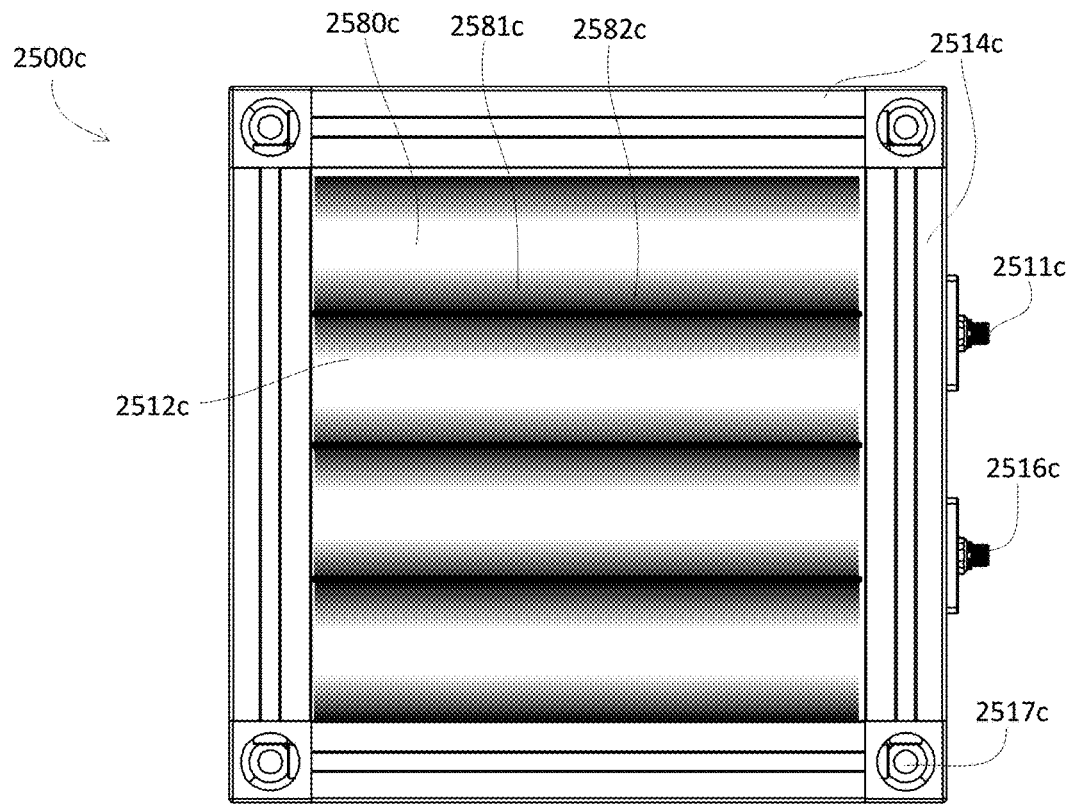
Figure 25D:
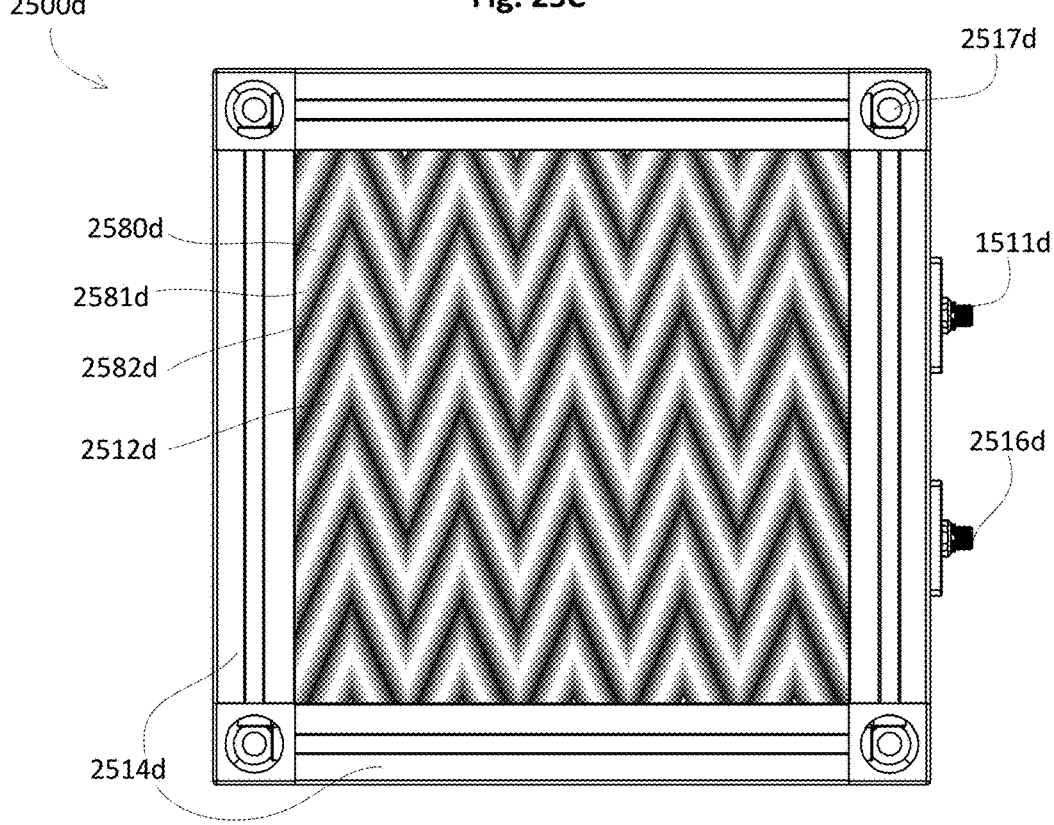
Figure 25E:
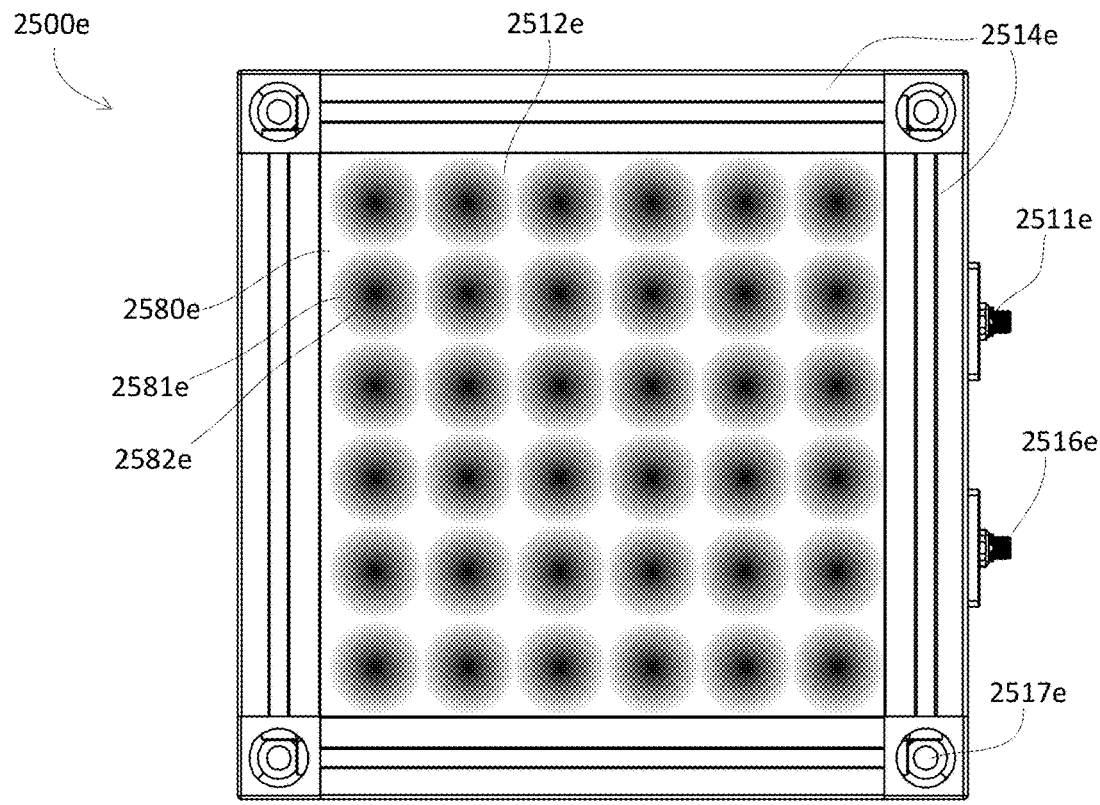
Figure 25F:
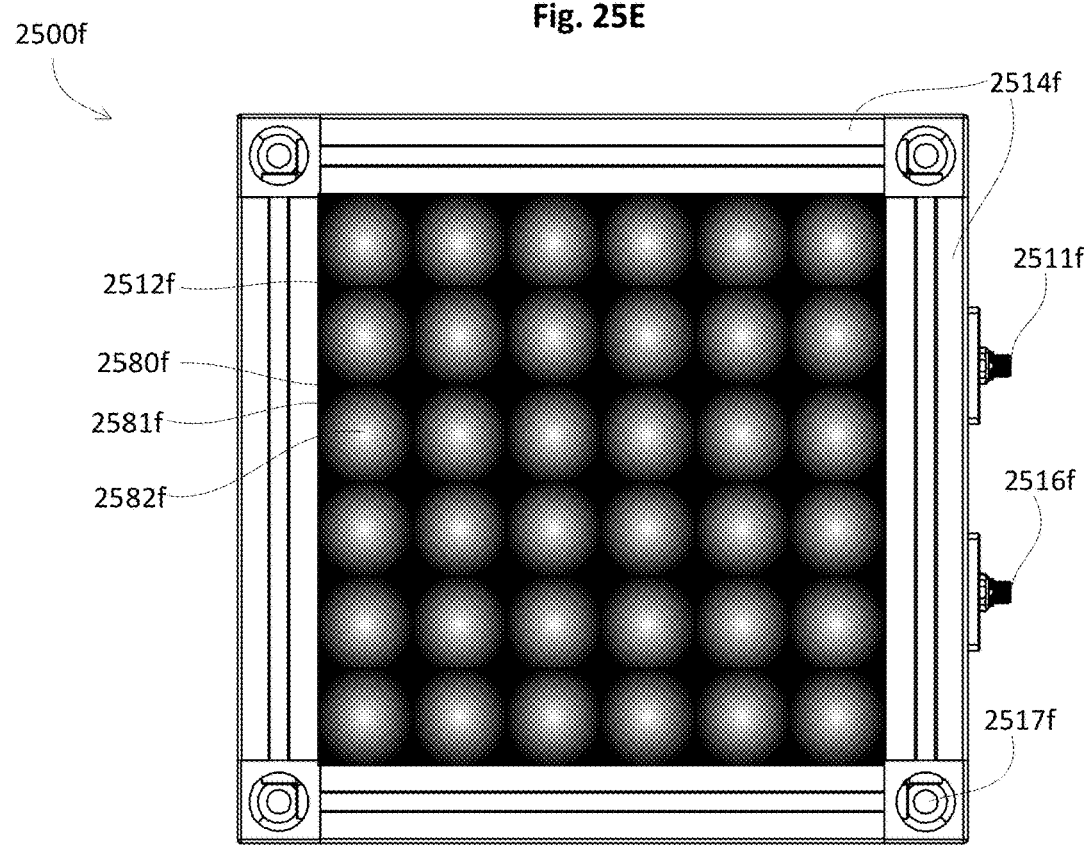
Figures 25G, 25H, 25J:
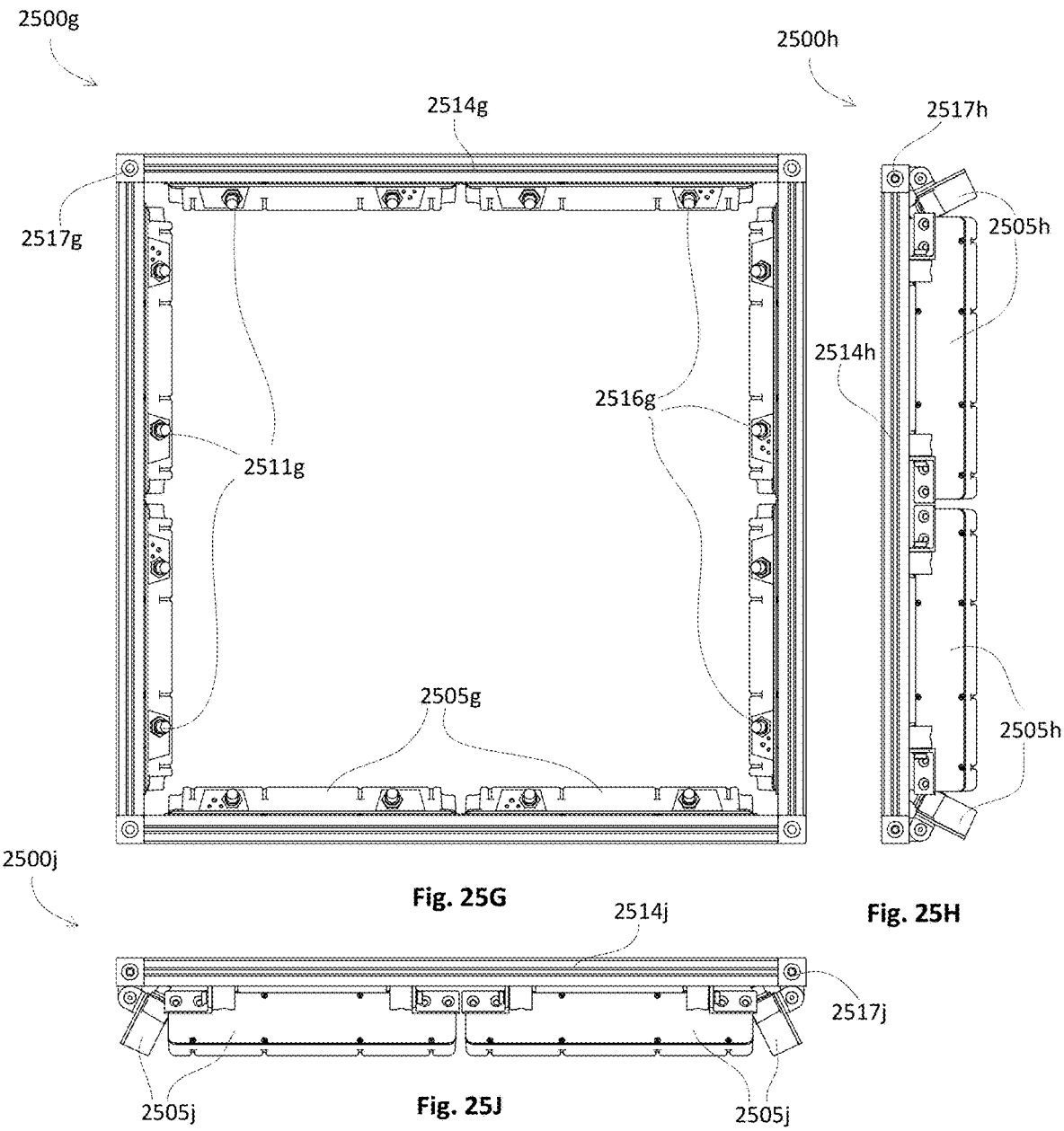
Figure 27A:
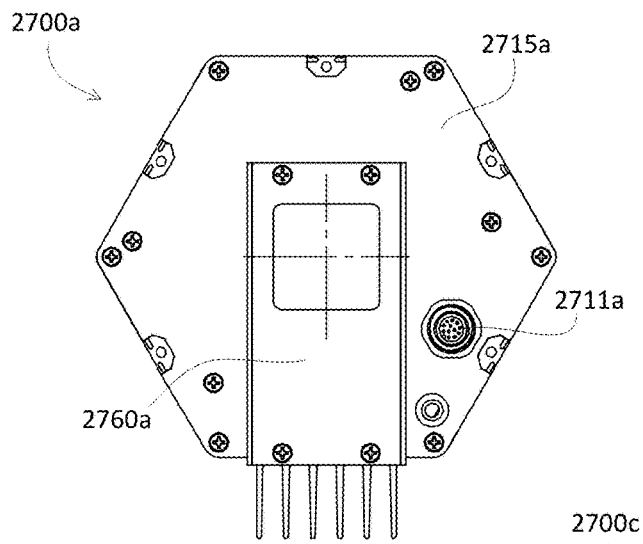
FIGS. 27A-D depict various views of an example dual-axis light.
Figure 27B:
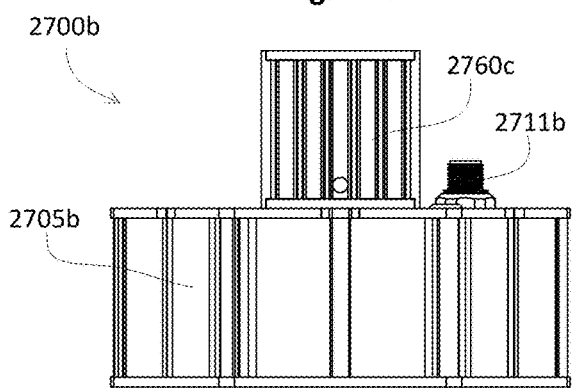
Figure 27C:
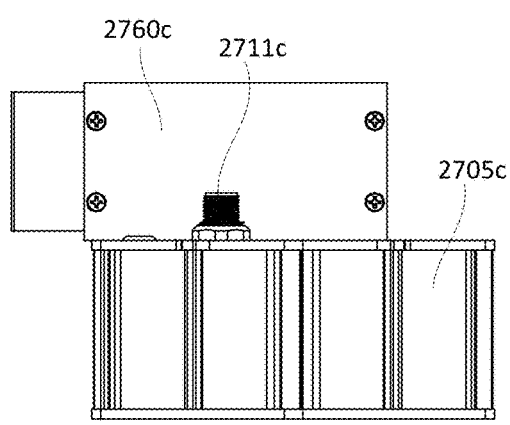
Figure 27D:
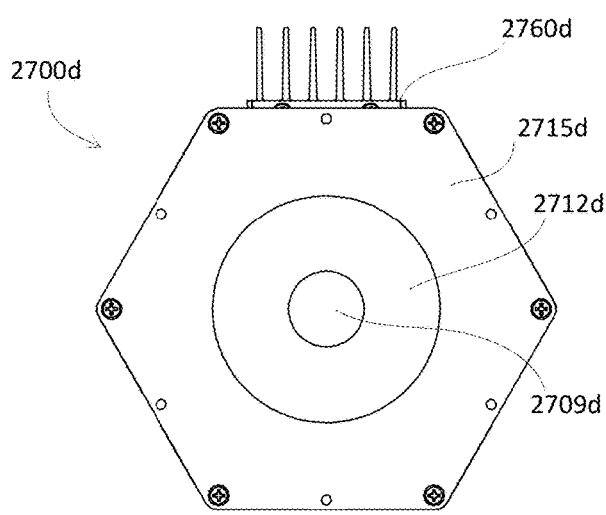
Figure 28C:
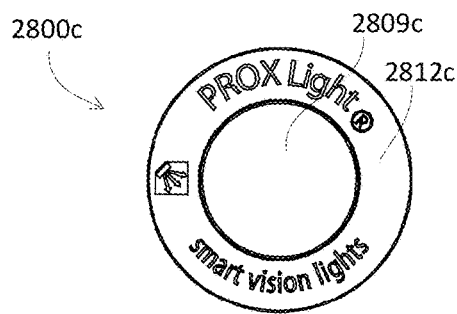
FIGS. 28A-E depict various views of an example structured light.
Figure 28A:
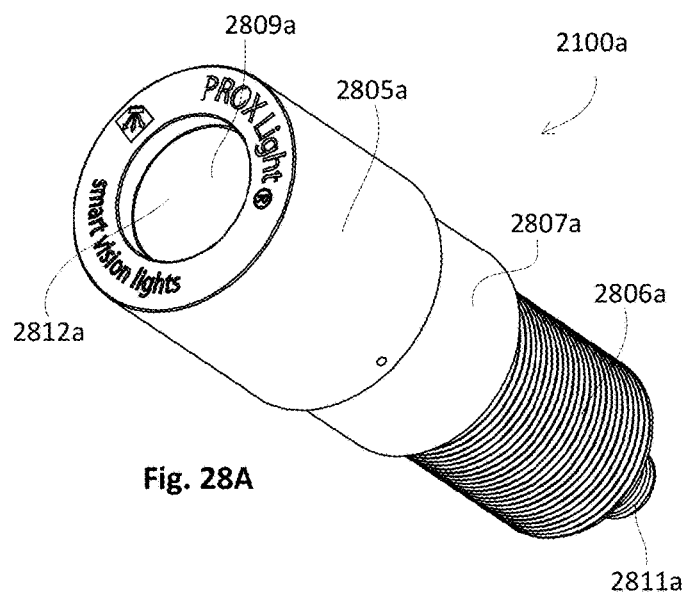
Figure 28B:
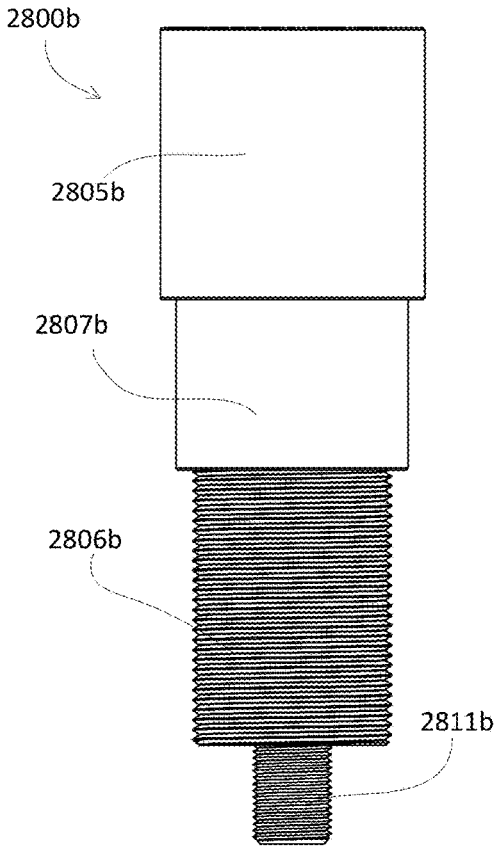
Figure 28E:
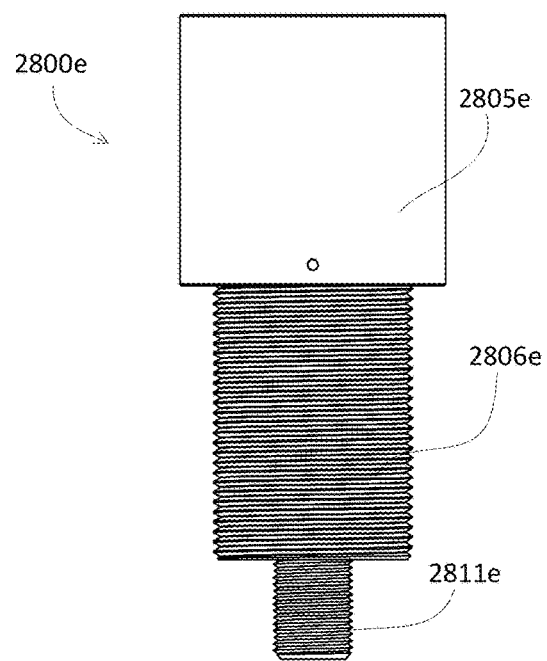
Figure 28D:
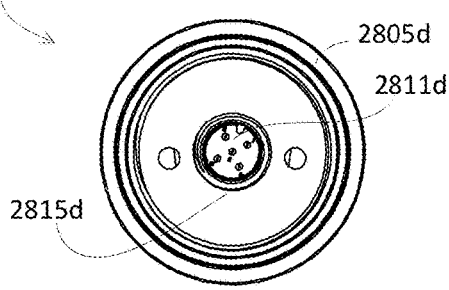

Turning to FIG. 23, a machine vision system 2300 may incorporate a linear bar-light linear light 2305 (i.e., a bar light) similar to, for example, bar light 105 of FIG. 1, or bar light 905 of FIG. 9, bar light 1505a-d of FIGS. 15A-D, bar light 2205a-e of FIGS. 22A-E. The bar light 2305 may include a plurality of housing side portions 231, a top housing portion 2312 and a bottom housing portion 2315 defining, for example, a rectangular shape housing. The plurality of housing side portions 2314 may be interconnected via, for example, a common casting, welding. fasteners, etc. While the bar light 2305 is shown in FIG. 23 as defining a rectangular shape, the housing side portions 2314, the a top housing portion 2312 and the bottom housing portion 2315, may define any shape (e.g., a circular shape, a hexagon shape, a square shape, a pentagon shape, a heptagon, an octagon, or any suitable polygon shape). The top housing portion 2312 may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The bar light 2305 may include a first electrical power/control connection 2311 second electrical power/control connection 2316, an electrical printed circuit board (not shown in FIG. 23), a controller (not shown in FIG. 23), and a plurality of light sources (not shown in FIG. 23). The controller may be configured to receive electrical power/control signals via the first electrical power/control connection 2311 and may control, for example, an intensity of each of the plurality of light sources, the optical element 2312, a camera 2360, and/or a camera lens 2361. The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the second electrical power/control connection 2316 to, for example, a camera 2360 via camera connection 2365 or a second light (another illuminator), and/or receive electrical power/control signals from, for example, a camera connector 2366.

A bar light 2305 may be configured, for example, to produce up to 100,000 lux. A bar light 2305 may include a multi-drive driver, allowing users to operate the bar light 2305 in, for example, a continuous operation mode and/or an over drive strobe (high-pulse operation) mode. A plurality of bar lights 2305 may be connected in, for example, a string of six to create ultra-long linear lights at a fraction of a cost of traditional monolithic solutions without any loss in uniformity. A plurality of bar lights 2305 may be connected by, for example, daisy-chaining the bar lights 2305 together using, for example, locking jumper cables extending between respective electrical power/control connection 2311, 2316. An electrical power/control connection 2311, 2316 may be rated for IP65. A bar light 2305 may include, for example, a 5 Pin M12 connector 2311, 2316. A bar light 2305 may include a 1-10V analog control line to provide, for example, control over intensity in a continuous mode. A bar light 2305 may include product parameters that may be, for example, user selectable to a maximum allowed intensity. A bar light 2305 may be configured such that removing a signal will put the bar light 2305 into, for example, an over drive operation mode.

A bar light 2305 may be used in, for example, a bright field application, a direct lighting application, a dark field application, etc. A bar light 2305 may include a PNP and/or a NPN strobe input. A bar light 2305 may include a 5-pin M12 quick connect. A bar light 2305 may include a wavelength color of, for example: white, 470 nm, 505 nm, 530 nm, 625 nm, 850 nm, 940 nm, a sub-combination thereof, or a combination thereof. A bar light 2305 may include, for example, four (4) screw holes 2321 located on a bottom of the bar light 2305 for easy mounting. A bar light 2305 may include, for example, a 3-Axis pan and tilt mount. A plurality of bar lights 2305 may be directly connected together (i.e., with no space between the lights). A bar light 2305 may include a waterproof stainless steel enclosure specially designed for food industry and wash down environments where, for example, water and corrosive materials are present. A bar light 2305 may include circuitry enclosed in, for example, an epoxy potted compound further protecting the bar light 2305 from dust, debris, and other contaminants. A bar light 2305 may include 12 high intensity LEDs. A bar light 2305 may include $24V_{DC}$, and may operate in continuous or strobe mode. A bar light 2305 may include NPN or PNP strobe triggers that may be, for example, used to control a pulse of the bar light 2305. A bar light 2305 may be configured such that, for example, an intensity of the bar light 2305 can be controlled via 0-10V remote analog signal and/or a manual potentiometer. A bar light 2305 may include, for example, twelve, 1 mm² die high current LEDs. A bar light 2305 may include a backlight lens 2312 that is, for example, a viable option for silhouetting objects. A bar light 2305 may include 12 high intensity LEDs. A bar light 2305 may include an integrated constant current driver built into the light. A bar light 2305 may eliminate the need for any external components in an associated machine vision lighting system. A bar light 2305 may include $24V_{DC}$, and may operate in continuous or strobe mode. A bar light 2305 may include NPN or PNP strobe triggers that may be, for example, used to control a pulse of the light. A bar light 2305 may control an intensity of the light via, for example, a 0-10V remote analog signal or an integrated manual potentiometer. A bar light 2305 may include 12 HB high current LED's, a built in SMART driver, no external driver needed, PNP and/or NPN strobe, constant on operation, strobed operation, manual intensity control via integrated potentiometer dimming, remote intensity control—analog $0-10V_{DC}$, mount on aluminum extrusion, and/or a maximum strobe rate of 5000 strobes per second.

With reference to FIGS. 24A-D, a machine vision system 2400a-d may include a curved linear light 2405a-d similar to, for example, a curved version of linear light 1705a-d of FIGS. 17A-E, linear light 1805a-d of FIGS. 18A-E, linear light 2005a-d, or linear light 2105a-g of FIGS. 21A-G. The curved linear light 2405a-d may include a plurality of housing side portions 2414a-d, an inner curved housing portion 2412a-d, a top housing portion 2415a-d and a bottom housing portion 2415a-d defining, for example, a curved shape housing. The plurality of housing side portions 2414a-d may be interconnected via, for example, a common casting, a common mold, welding. fasteners, etc. While the curved linear light 2405a-d is shown in FIGS. 24A-E as defining a curved shape, the housing side portions 2414a-d, the inner curved housing portion 2412a-d, the top housing portion 2415a-d, and the bottom housing portion 2415a-d, may define any shape (e.g., a circular shape, a rectangular shape, a hexagon shape, a square shape, a pentagon shape, a heptagon, an octagon, or any suitable polygon shape). The inner curved housing portion 2412a-d may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The curved linear light 2405a-d may include a first electrical power/control connection 2411a-d, a second electrical power/control connection 2416a-d, an electrical printed circuit board (not shown in FIGS. 24A-D), a controller (not shown in FIGS. 24A-D), and a plurality of light sources (not shown in FIGS. 24A-D). The controller may be configured to receive electrical power/control signals via the electrical power/control connection 2411a-d and may control, for example, an intensity of each of the plurality of light sources, the optical element 2412a-d, and/or a camera (not shown in FIGS. 24A-D). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 2416a-d to, for example, a camera or a second light (another illuminator), and/or receive electrical power/control signals from, for example, a camera.

A curved linear light 2405a-d may include a narrow 40° lens 2412a-d, a narrow 16° (N16) lens 2412a-d, a narrow 25° (N25) lens 2412a-d, a wide 80° (W) lens 2412a-d, a line (L) lens 2412a-d, etc. A curved linear light 2405a-d may be configured, for example, to produce up to 100,000 lux. A curved linear light 2405a-d may include a multi-drive driver, allowing users to operate the curved linear light 2405a-d in, for example, a continuous operation mode and/or an over drive strobe (high-pulse operation) mode. An electrical power/control connection 2411a-d, 2416a-d may be rated for IP65. A curved linear light 2405a-d may include, for example, a 5 Pin M12 connector. A curved linear light 2405a-d may include a 1-10V analog control line to provide, for example, control over intensity in a continuous mode. A curved linear light 2405a-d may include product parameters that may be, for example, user selectable to a maximum allowed intensity. A curved linear light 2405a-d may be configured such that removing a signal will put the curved linear light 2405a-d into, for example, an over drive operation mode.

A curved linear light 2405a-d may be used in, for example, a bright field application, a direct lighting application, a dark field application, etc. A curved linear light 2405a-d may include a PNP and/or a NPN strobe input. A curved linear light 2405a-d may include a 5-pin M12 quick connect. A curved linear light 2405a-d may include a wavelength color of, for example: white, 470 nm, 505 nm, 530 nm, 625 nm, 850 nm, 940 nm, a sub-combination thereof, or a combination thereof. A curved linear light 2405a-d may include, for example, a T-slot mount 2421c,d having a slot defined by tabs. A curved linear light 2405a-d may include, for example, a 3-Axis pan and tilt mount. A curved linear light 2405a-d may include a waterproof stainless steel enclosure specially designed for food industry and wash down environments where, for example, water and corrosive materials are present. A curved linear light 2405a-d may include circuitry enclosed in, for example, an epoxy potted compound further protecting the curved linear light 2405a-d from dust, debris, and other contaminants. A curved linear light 2405a-d may include 12 high intensity LEDs. A curved linear light 2405a-d may include 24$V_{DC}$, and may operate in continuous or strobe mode. A curved linear light 2405a-d may include NPN or PNP strobe triggers that may be, for example, used to control a pulse of the curved linear light 2405a-d. A curved linear light 2405a-d may be configured such that, for example, an intensity of the curved linear light 2405a-d can be controlled via 0-10V remote analog signal and/or a manual potentiometer. A curved linear light 2405a-d may include, for example, twelve, 1 mm$^2$ die high current LEDs. A curved linear light 2405a-d may include a backlight lens 2412a-d that is, for example, a viable option for silhouetting objects. A curved linear light 2405a-d may include 6 or 12 high output LED's, driver built in, no external wiring to a driver, PNP and/or NPN strobe input, continuous operation, strobe mode, dimmable via built in potentiometer, analog intensity 0-10 VDC signal, and/or T-Slot for mounting and connecting together. A curved linear light 2405a-d can be used as backlight and/or diffuse front light and may include 6 or 12 high output LEDs, a built in driver, no external wiring to a driver, a PNP and/or NPN strobe input, dimmable via potentiometer or 0-10$V_{DC}$ analog signal, T-Slot for mounting and connecting lights together, lengths of 6" increments, maximum 5000 strobes per second, dimmable via built in potentiometer, and/or analog intensity 0-10$V_{DC}$ signal. A plurality of curved linear lights 2405a-d may be directly connect with no external wiring. Four curved linear lights 2405a-d may be connected together end-to-end to form a circular linear light. A curved linear light 2405a-d utilizes 16 high intensity LEDs providing quarter-round 90° light illumination. A curved linear light 2405a-d, or a plurality of curved linear lights 2405a-d, may be configured to wrap light around curved surfaces of a target. A curved linear light 2405a-d may include lenses 2412a-d to create, for example, a thin focused uniform line of light.

A curved linear light 2405a-d may be employed within an associated machine vision system to, for example, detect defects in a carpet surface (e.g., inspection of the part to ensure the carpet is fully formed and free of defects), detect surface defects in a plastic bottle (e.g., inspection of plastic quart sized motor oil bottles for streak defects), detect defects in an automotive panel tab and clip inspection (e.g., inspection of part to ensure black tabs, for example, are bent over, or brass clips are present), detect a presence/absence of automobile headliner (e.g., the goal of the application may be to identify the presence or absence of various features on an automobile head liner and attempt to verify the complete assembly and ensure that all parts are present), detect presence/absence of candy cane inspection (e.g., the inspection of completed candy cane boxes to ensure that the box is full and that the proper sticker/label is on the front of the box), detect palletizing/packaging—pick and place (e.g., properly illuminate packaged cases of canned and bottled products so that a robot may properly pick up the item and place it correctly on a pallet), etc. A curved linear light 2405a-d may be configured as an adjustable dark field ring light.

Turning to FIGS. 25A-H and J, a machine vision system 2500a-h,j may include a patterned area light source 2505a-h,j. The patterned area light source 2505a-h,j may be similar to, for example, ring light 1405a-e of FIGS. 14A-E without an aperture 1400a-e. A patterned area light source 2505a-h,j may include a plurality of housing side portions 2514a-h,j, a bottom housing portion (not shown in FIGS. 25A-H,J), and a top housing portion 2512a,c-f defining, for example, a square shape housing. The plurality of housing side portions 2514a-h,j may be interconnected via fastening features 2517a-h,j.

While the patterned area light source 2505a-h,j is shown in FIGS. 25A-H,J as defining a square shape, the housing side portions 2514a-h,j, the a bottom housing portion and the top housing portion 2512a,c-f, may define any shape (e.g., a circular shape, a hexagon shape, a rectangular shape, a pentagon shape, a heptagon, an octagon, or any suitable polygon shape). The top housing portion 2512a,c-f may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The patterned area light source 2505a-h,j may include a first electrical power/control connection 2511a-h,j, a second electrical power/control connection 2516a-h,j, an electrical printed circuit board (not shown in FIGS. 25A-H,J), a controller (not shown in FIGS. 25A-H,J), and a plurality of light sources 2505g,h,j (e.g., bar lights 2205a-e of FIGS. 22A-E). The controller may be configured to receive electrical power/control signals via the first electrical power/control connection 2511a-h,j and may control, for example, an intensity of each of the plurality of light sources 2505g,h,j, the optical element 2512a,c-f, and/or a camera (not shown in FIGS. 25A-H,J). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the second electrical power/control connection 2516a-h,j to, for example, a camera or a second light (another illuminator), and/or receive electrical power/control signals from, for example, a camera.

A patterned area light source 2505a-h,j may include, for example: 40 high output LEDs; different lenses; a built in driver; no external wiring to an internal driver; continuous operation; a strobe mode; an analog intensity via 0-10$V_{DC}$ signal; 128 high output LEDs; a 45 mm industrial frame with T-Slots; a large area/long distance configuration; 40 high output LEDs; a diffuse panel 2512a,c-f; a light tent or dome type of illumination; backlit LEDs for a more intense and highly diffuse lighting option; a narrow depth of approximately 30 mm; front lights with, for example, a 300 mm×300 mm housing; a 30 mm industrial extrusion; a waterproof wash down housing; food and drug administration (FDA) compliancy; 2000 strobes per second (SPS); intensity control using analog 0-10 $V_{DC}$; a potentiometer for intensity control; may be 5 times brighter than standard high current LED lights; precise current that may provide stable light intensity; and/or a PNP and NPN strobe input.

A patterned area light source 2505a-h,j may include an integrated strobe driver for LED light control where, for example, there is no need for an external driver to control the light. The integrated intelligent driver may monitor a strobe operation and/or an over drive operation, thereby, maximizing an output of ring light 1405a-d during inspections when used within an associated machine vision system. The patterned area light source 2505a-h,j may include working parameters to ensure the LEDs are not damaged by driving the LEDs beyond associated LED design limits. This is especially beneficial for overdriving high current LEDs. A patterned area light source 2505a-h,j may provide repeatable intensity control and pulsing by using, for example, a microprocessor to monitor and control electrical power to the LEDs for safe operation. An integrated controller may offer both a NPN and/or a PNP strobe input for easy integration with, for example, a smart camera. A patterned area light source 2505a-h,j may have high speed reaction times that offer extremely fast repeatable pulse times. A patterned area light source 2505a-h,j may automatically set LED drive limits for different LEDs. Each color or wavelength of LEDs may be maximized producing a high output LED patterned area light source 2505a-h,j. A patterned area light source 2505a-h,j may include UV, IR, white, red, blue, green, cyan, a sub-combination, or combination thereof, all may have different maximum current limit.

A patterned area light source 2505a-h,j may be configured as an 80/20 extrusion adaptive LED light illuminator with an intense and uniform light pattern that may provide considerable energy savings over fluorescent lighting options. A patterned area light source 2505a-h,j may include, for example, T-slot mounting (e.g., T-slot mounting 1623e of FIG. 16E) that may slide into an associated extrusion with no need for extra mounting accessories. A plurality of patterned area light sources 2505a-h,j may include direct-connect up to, for example, six modules lengths of 300 mm to 1800 mm with, for example, 300 mm increments.

A patterned area light source 2505a-h,j may be, for example, uses in machine vision applications to illuminate robotic work cells by embedding the patterned area light source 2505a-h,j in, for example, associated gating. A patterned area light source 2505a-h,j may be ideal for use in limited-distance or tight areas such as control panels and under-conveyor installations. A patterned area light source 2505a-h,j may be used in welding areas where, for example, a light is simple to change. A patterned area light source 2505a-h,j may be substituted for legacy hanging fixtures. A patterned area light source 2505a-h,j may be configured for mounting into, for example, most popular 0.32", 8 mm, and 10 mm T-slot extrusions. A patterned area light source 2505a-h,j may include, for example, a M12 pigtail for connecting around extrusion corners. A patterned area light source 2505a-h,j may be, for example, 12" or 300 mm in lengths. A patterned area light source 2505a-h,j may be, for example, IP-50 rated. A ring light 1405a-d may be, for example, configured in compliance with CE, IEC62471 photobiological eye safety, RoHS. A patterned area light source 2505a-h,j may include a 2-Pin jumper cable for use in, for example, T-slot mounting.

A patterned area light source 2505a-h,j may provide, for example, high output diffuse light. A patterned area light source 2505a-h,j may be incorporated into a machine vision system 2500a-h,j for high speed packaging and bottling lines. A patterned area light source 2505a-h,j may be configured to emit, for example, an even light flow throughout the lighted surface area. A patterned area light source 2505a-h,j may include hundreds and/or thousands of LED lights (depending on the size).

With further reference to FIGS. 25C-F, a patterned area light source 2505c-f may be configured as a direct light (as opposed to a back light) within, for example, a gradient reflection defect detection machine vision system. For example, synchronized line scan cameras (not shown in FIGS. 25C-F), with striped lighting and/or pattern lighting capture capability, may capture multiple images (e.g., Lumitrax™) with shape images as a target passes within a field of view of the camera and/or as the patterned area light source 2505a-h,j and/or camera is/are moved relative to the target. A patterned area light source 2505a-h,j may be configured to, for example, automatically detect: minute or nearly-invisible flaws; defects on metal or glossy surfaces; shallow dents, pinholes, and bumps in a target; etc. A patterned area light source 2505c-f may, for example, emit an image of a backlight with a gradient printed on the surface 2512c-f. A patterned area light source 2505c-f may be configured within a machine vision system 2500c-f such that a defect on a target may transition from light 2580c-f to dark 2582c-f and pass through a light gradient 2581c-f. A patterned area light source 2505c-f may be incorporated within, for example, machine vision systems 2500c-f for detecting defects of a target having reflective surfaces; defects in paints and coatings (e.g., pits, scratch, pin hole, foreign materials, etc.); defects in metals (e.g., dents, cracks, scratches, etc.); defects in glass (e.g., dirt, scratch, bubble, etc.); targets having curved surfaces; etc. As opposed to gradient transitions between pattern elements (i.e., lines, dots, etc.), a patterned area light source 2505c-f may include sharp transitions between associated pattern elements. Additionally, or alternatively, individual portions of any given pattern may be any color or combination of colors.

Inspection of specularly reflective surfaces for shape and defects poses a well-known difficult challenge for machine vision systems. For example, identifying defects on specular surfaces (e.g., "orange-peel" effect on a painted surface or a small chip on a screen of a cell phone) may entail complex specialized setups and equipment. Known systems often present barriers for associated system integrators. Phase measuring deflectometry (PMD) using patterned area lighting (PAL), on the other hand, may provide a simple and effective solution for these types of applications.

One difference between use of a PAL source and use of other lighting systems is that systems that employ a PAL source can reveal both shapes and more subtle variations, such as scratches and pits, with a single image acquisition. Depending on the application, patterns such as lines, circles, squares, checkerboards, and even zigzag lines can be selected to optimize flaw detection. For example, patterns may be printed directly on a surface of a backlight diffuser. For transparent materials, a PAL source may be used as a backlight, where an object is placed between the PAL source and an associated camera. For reflective surfaces, a PAL source may be used as an area light, where emitted light may be oriented at an angle relative to a surface of an object to be inspected such that an associated camera can capture a reflection of a PAL pattern form the object's surface. The surface of the object being inspected can be either flat or curved.

Use of a PAL source is not limited to scuffs, dents, and light scratches. Deep scratches, stamped letters or slight bends may be found in the same manner as the aforementioned defects. Stamped letters and surface bends distort the reflected pattern, while a deep scratch shows up in both the dark and light lines. This effect is due to a spatial distortion of the light path as it is deflected from features that make up the defect and can be easily discerned from the regular pattern background. Similarly, a PAL source may be used to look for defects on paints and coatings, including pits, scratches, pinholes, digs, orange peel, and foreign materials. It can also be used during inspection of large or very small metal parts for dents. bends, cracks, and scratches.

A phase measuring deflectometry may include a single camera (monoscopic) and a patterned area light source. The patterned area light source and camera may be oriented at similar but opposite angles relative to an object to be inspected. Accordingly, the camera. may capture a reflected image of illumination emitted by the patterned area light source, and as reflected from, for example, a specular surface of the object. The specular surface of the object may be flat or curved.

Portions of the resulting image, captured from the reflection, may be distorted by surface shape variations or defects of the object. Distortions may be due to, for example, a phase shift in a reflection angle of the pattern image. Based on mathematical relations of light reflection and surface shape, a processor may implement software algorithms to determine object shape characteristics, and the processor may locate even small defects associated with the surface of the object. For example, an amount of phase shift may be determined by a divergence of the object surface. The processor may detect gradual variations in a surface shape (i.e., a reflected pattern may have a similar gradual variation. For sharp variations associated with a surface of an object, such as pits or scratches, large variations in phase may occur resulting in an abrupt change in background contrast. For absolute quantitative results, camera and patterned area light source positional calibration may be performed. A monoscopic phase measuring deflectometry system may be expanded with an additional camera to define a stereoscopic phase measuring deflectometry system.

On a flat surface, light emitted by a patterned area light source may be reflected at an angle equal (but opposite) to an angle of light that is incident on a surface of an object to be inspected. When a defect is present, light may reflect off of the defect at an angle that is phase shifted relative to the light that is reflected from the original flat surface reflection angle. A processor may quantify variations and defects based on size, direction, and shape as a function of phase shift in the reflected image.

In addition to inspection of specularly reflective surfaces, a phase measuring deflectometry system may be used to inspect transparent objects. The principles are similar to specular surface inspection. When light emitted by a patterned area light source passes through a defect (e.g., a fold in glass or a small pit in plastic) light may be deflected or refracted at an angle out of phase with an incident light ray angle. Defects in transparent objects may be difficult to locate and quantify under non-patterned lighting conditions, however, the defects may be clearly detectable in an image when a patterned area. light source is used. A single camera (monoscopic) arrangement may be used to inspect transparent objects when using a phase measuring deflectometry system. When used as a transmission light source, a PAL source may be used as a backlight, but with the addition of high-contrast patterns that reveal subtle variations and defects in transparent objects, such as clear glass bottles. Transparent objects may refract transmitted light, whereby defects distort the pattern in contrast to the regular pattern background. Defects from the transmitted pattern may appear in high contrast to an associated background pattern, as was the case with the reflected patterned.

A monoscopic (single camera) phase measuring deflectometry (PMD) may include a single patterned area light (PAL) source and a single camera. Based on the light source pattern type and orientation of the PAL source, a processor may produce two-dimensional and/or three-dimensional quantitative/qualitative results. For example, two-dimensional imaging may be achieved when a single direction pattern is used. In this case, the patterned area light source may emit lines of light that may be, for example, either vertical, horizontal, or diagonal with respect to an object and an associated camera. Three-dimensional results can be achieved with a bi-directional pattern (e.g., lines of light emitted in a grid pattern) this setup may be used in a single frame image acquisition application.

Alternatively, a stereoscopic PMD may be used to produce two-dimensional and/or three-dimensional quantitative/qualitative results. For example, depending on desired precision and accuracy, a quantitative stereoscopic PMD system may be used to reduce computational error and optimize surface accuracy associated with various phase reflectometry models. Qualitative outcomes may be achieved based on a difference between a plurality of images acquired by an associated camera.

A multi-angle PMD system may include two or more PAL sources and two or more cameras. Each PAL source and a respective camera may be arranged in a monoscopic PDM system a stereoscopic PDM system, or any combination thereof. Whereby, two-dimensional and three-dimensional qualitative image captures may be performed. A processor may, for example, use multiple images to detect various defects and/or to recreate a three-dimensional model of the inspected object. Alternatively, a multi-angle PMD system may include an x-axis and y-axis camera/light combo, with a processor that analyzes a combination of x-axes and y-axes images, to generate three-dimensional information without having to shift an associated pattern orientation.

A patterned area light source 2505$c$-$f$ having a gradient pattern 2580$c$-$f$, 2582$c$-$f$, 2581$c$-$f$ may include, for example, a UV printed pattern on any backlight or diffuse panel front 2512$c$-$f$ including wash down versions. A patterned area light source 2505$c$-$f$ may include a dynamic element 2512$c$-$f$ configured to change a pattern type 2580$c$-$f$, 2582$c$-$f$, 2581$c$-$f$ and/or phase using, for example, a LCD, a DLP, e-paper, etc.

With reference to FIGS. 26A-E, a machine vision system 2600$a$-$e$ may include a ring light 2605$a$-$d$ similar to, for example, ring light 805$a,b$ of FIGS. 8A and 8B, ring light 1305$a$-$c$ of FIGS. 13A-C, or ring light 1405$a$-$d$ of FIGS. 14A-D. The ring light 2605$a$-$d$ may include a housing side portion 2614$a$-$d$, a top housing portion 2615$a$-$d$ and a bottom housing portion 2612$c,d$ defining, for example, a round shape housing. While the ring light 2605$a$-$d$ is shown in FIGS. 26A-E as defining a round shape, the housing side portion 2614$a$-$d$, the top housing portion 2615$a$-$d$ and the bottom housing portion 2612$c,d$, may define any shape (e.g., a square shape, a hexagon shape, a rectangular shape, a pentagon shape, a heptagon, an octagon, or any suitable polygon shape). The bottom housing portion 2612$c,d$ may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The ring light 2605$a$-$d$ may include a camera attachment (not shown in FIGS. 26A-E) defining an aperture 2609$a,c,d$ in at least the top housing portion 2615$a$-$d$. In addition to being adapted to attach to a camera (not shown in FIGS. 26A-E), the camera attachment may be configured to be attached to a robot (e.g., attachment 1084, 1184, or 1289 of FIGS. 10, 11, and 12, respectively) and/or a coaxial light (e.g., coaxial light 205 of FIG. 2). The aperture 2609$a,c,d$ may extend through the bottom housing portion 2612$a$-$d$. Alternatively, the bottom housing portion 2612$a$-$d$ may close off an end of the aperture 2609$a,c,d$. The ring light 2605$a$-$d$ may include an electrical power/control connection 2611$a$-$d$, an electrical printed circuit board (not shown in FIGS. 26A-E), a controller (not shown in FIGS. 26A-E), and a plurality of light sources (not shown in FIGS. 26A-E). The controller may be configured to receive electrical power/control signals via the electrical power/control connection 2611$a$-$d$ and may control, for example, an intensity of each of the plurality of light sources, the optical element 2612$a$-$d$, and/or a camera (not shown in FIGS. 26A-E). The controller may be similar to, for example, the controller 1317*b* of FIG. 13B and/or 4405*a* of FIG. 44A. The controller may implement any portion or, or all of the functionality as described, for example, with regard to FIGS. 44A-D. Alternatively, or additionally, the controller may provide electrical power/control signals, via the electrical power/control connection 2611*a-d* to, for example, a camera or a second light (another illuminator), and/or receive electrical power/control signals from, for example, a camera.

A ring light 2605*a-d* may include, for example: 40 high output LEDs; different lenses; a built in driver; no external wiring to an internal driver; continuous operation; a strobe mode; an analog intensity via 0-10V$_{DC}$ signal; 128 high output LEDs; a 45 mm industrial frame with T-slots 2623*e* having a channel 2621*e* defined by tabs 2624*e*; a large area/long distance configuration; 40 high output LEDs; a diffuse panel 2612*a-d*; a light tent or dome type of illumination; backlit LEDs for a more intense and highly diffuse lighting option; a narrow depth of approximately 30 mm; front lights with, for example, a 53 mm camera hole 2309*a,c,d* in the center; a 190 mm diameter housing; a 78 mm hole 2609*a,c,d*; a 300 mm diameter housing; a 30 mm industrial extrusion; a waterproof wash down housing; food and drug administration (FDA) compliancy; 2000 strobes per second (SPS); intensity control using analog 0-10 V$_{DC}$; a potentiometer for intensity control; may be 5 times brighter than standard high current LED lights; precise current that may provide stable light intensity; and/or a PNP and NPN strobe input.

A ring light 2605*a-d* may include an integrated strobe driver for LED light control where, for example, there is no need for an external driver to control the light. The integrated intelligent driver may monitor a strobe operation and/or an over drive operation, thereby, maximizing an output of ring light 2605*a-d* during inspections when used within an associated machine vision system. The ring light 2605*a-d* may include working parameters to ensure the LEDs are not damaged by driving the LEDs beyond associated LED design limits. This is especially beneficial for overdriving high current LEDs. A ring light 2605*a-d* may provide repeatable intensity control and pulsing by using, for example, a microprocessor to monitor and control electrical power to the LEDs for safe operation. An integrated controller may offer both a NPN and/or a PNP strobe input for easy integration with, for example, a smart camera. A ring light 2605*a-d* may have high speed reaction times that offer extremely fast repeatable pulse times. A ring light 2605*a-d* may automatically set LED drive limits for different LEDs. Each color or wavelength of LEDs may be maximized producing a high output LED ring light 2605*a-d*. A ring light 2605*a-d* may include UV, IR, white, red, blue, green, cyan, a sub-combination, or combination thereof, all may have different maximum current limit.

A ring light 2605*a-d* may be configured as an 80/20 extrusion adaptive LED light illuminator with an intense and uniform light pattern that may provide considerable energy savings over fluorescent lighting options. A ring light 2605*a-d* may include, for example, T-slot mounting 2623*e* that may, for example, slide into an associated extrusion with no need for extra mounting accessories.

A ring light 2605*a-d* may be, for example, uses in machine vision applications to illuminate robotic work cells by embedding the ring light 2605*a-d* in, for example, associated gating. A ring light 2605*a-d* may be ideal for use in limited-distance or tight areas such as control panels and under-conveyor installations. A ring light 2605*a-d* may be used in welding areas where, for example, a light is simple to change. A ring light 2605*a-d* may be substituted for legacy hanging fixtures. A ring light 2605*a-d* may be configured for mounting into, for example, most popular 0.32", 8 mm, and 10 mm T-slot extrusions. A ring light 2605*a-d* may include, for example, a M12 pigtail for connecting around extrusion corners. A ring light 2605*a-d* may be, for example, 12" or 300 mm in lengths. A ring light 2605*a-d* may be, for example, IP-50 rated. A ring light 2605*a-d* may be, for example, configured in compliance with CE, IEC62471 photobiological eye safety, RoHS. A ring light 2605*a-d* may include a 2-Pin jumper cable for use in, for example, T-slot mounting.

A ring light 2605*a-d* may be configured to provide radial and/or bright field lighting. A ring light 2605*a-d* may include a silicone lens 2612*a-d* that may, for example, provide an extra-tight seal and IP65 rating. A ring light 2605*a-d* may include a lens 2612*a-d* that, for example, does not yellow, craze, react to UV light, lack of chemical reactivity, robustness in harsh environmental conditions, and/or high transmission from 365 nm (UV) to 2000 nm (IR). A ring light 2605*a-d* may be configured as a low-angle ring light for dark field ring applications. A ring light 2605*a-d* may be used for radial illumination. A ring light 2605*a-d* may include storage of electrical energy (e.g., a battery, a capacitor, a combination thereof, etc.) to pulse associated LED's. A ring light 2605*a-d* may include pulsed LED energy of 2000 watts when LED's are active. A ring light 2605*a-d* may pulse LED's with up to 180 amps of DC current. A ring light 2605*a-d* may include a temperature monitor that may, for example, shut down when LED's die rises above a safe temperature. After shut down the LED die may begin a rest time till a safe temperature is reached.

Turning to FIGS. 27A-D, a machine vision system 2700*a-d* may include a dual-axis light 2705*a-d* similar to, for example, a combination of ring light 805*a,b* of FIGS. 8A and 8B, ring light 1305*a-c* of FIGS. 13A-C, ring light 1405*a-d* of FIGS. 14A-D, or ring light 2605*a-d* of FIGS. 26A-E, and coaxial light 205 of FIG. 2. The dual-axis light 2705*a-d* may include a housing side portion 2714*a-d*, a top housing portion 2715*a-d* and a bottom housing portion 2712*c,d* defining, for example, a round shape housing. While the dual-axis light 2705*a-d* is shown in FIGS. 27A-D as defining a round shape, the housing side portion 2714*a-d*, the top housing portion 2715*a-d* and the bottom housing portion 2712*c,d*, may define any shape (e.g., a square shape, a hexagon shape, a rectangular shape, a pentagon shape, a heptagon, an octagon, or any suitable polygon shape). The bottom housing portion 2712*c,d* may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The dual-axis light 2705*a-d* may include a camera 2760*a-d* attachment defining an aperture 2709*a,c,d* in at least the top housing portion 2715*a-d*. In addition to being adapted to attach to a camera 2760*a-d*, the camera attachment may be configured to be attached to a robot (e.g., attachment 1084, 1184, or 1289 of FIGS. 10, 11, and 12, respectively) and/or a coaxial light (e.g., coaxial light 205 of FIG. 2). The aperture 2709*a,c,d* may extend through the bottom housing portion 2712*a-d*. Alternatively, the bottom housing portion 2712*a-d* may close off an end of the aperture 2709*a,c,d*. The dual-axis light 2705*a-d* may include an electrical power/control connection 2711*a-c*, an electrical printed circuit board (not shown in FIGS. 27A-D), a controller (not shown in FIGS. 27A-D), and a plurality of light sources (not shown in FIGS. 27A-D). The controller may be configured to receive electrical power/control signals via the electrical power/control connection 2711a-c and may control, for example, an intensity of each of the plurality of light sources, the optical element 2712a-d, and/or a camera 2760a-d. The controller may be similar to, for example, the controller 1317b of FIG. 13B and/or 4405a of FIG. 44A. The controller may implement any portion or, or all of the functionality as described, for example, with regard to FIGS. 44A-D. Alternatively, or additionally, the controller may provide electrical power/control signals, via the electrical power/control connection 2711a-c to, for example, a camera or a second light (another illuminator), and/or receive electrical power/control signals from, for example, a camera 2760a-d.

A dual-axis light 2705a-d may include, for example: 40 high output LEDs; different lenses; a built in driver; no external wiring to an internal driver; continuous operation; a strobe mode; an analog intensity via 0-10$V_{DC}$ signal; 128 high output LEDs; a 45 mm industrial frame with T-slots having a channel defined by tabs; a large area/long distance configuration; 40 high output LEDs; a diffuse panel 2712a-d; a light tent or dome type of illumination; backlit LEDs for a more intense and highly diffuse lighting option; a narrow depth of approximately 30 mm; front lights with, for example, a 53 mm camera hole 2709c in the center; a 190 mm diameter housing; a 78 mm hole 2709c; a 300 mm diameter housing; a 30 mm industrial extrusion; a waterproof wash down housing; food and drug administration (FDA) compliancy; 2000 strobes per second (SPS); intensity control using analog 0-10 $V_{DC}$; a potentiometer for intensity control; may be 5 times brighter than standard high current LED lights; precise current that may provide stable light intensity; and/or a PNP and NPN strobe input.

A dual-axis light 2705a-d may include an integrated strobe driver for LED light control where, for example, there is no need for an external driver to control the light. The integrated intelligent driver may monitor a strobe operation and/or an over drive operation, thereby, maximizing an output of dual-axis light 2705a-d during inspections when used within an associated machine vision system. The dual-axis light 2705a-d may include working parameters to ensure the LEDs are not damaged by driving the LEDs beyond associated LED design limits. This is especially beneficial for overdriving high current LEDs. A dual-axis light 2705a-d may provide repeatable intensity control and pulsing by using, for example, a microprocessor to monitor and control electrical power to the LEDs for safe operation. An integrated controller may offer both a NPN and/or a PNP strobe input for easy integration with, for example, a smart camera. A dual-axis light 2705a-d may have high speed reaction times that offer extremely fast repeatable pulse times. A dual-axis light 2705a-d may automatically set LED drive limits for different LEDs. Each color or wavelength of LEDs may be maximized producing a high output LED dual-axis light 2705a-d. A dual-axis light 2705a-d may include UV, IR, white, red, blue, green, cyan, a sub-combination, or combination thereof, all may have different maximum current limit.

A dual-axis light 2705a-d may be configured as an 80/20 extrusion adaptive LED light illuminator with an intense and uniform light pattern that may provide considerable energy savings over fluorescent lighting options. A dual-axis light 2705a-d may include, for example, T-slot mounting that may, for example, slide into an associated extrusion with no need for extra mounting accessories.

A dual-axis light 2705a-d may be, for example, uses in machine vision applications to illuminate robotic work cells by embedding the dual-axis light 2705a-d in, for example, associated gating. A dual-axis light 2705a-d may be ideal for use in limited-distance or tight areas such as control panels and under-conveyor installations. A dual-axis light 2705a-d may be used in welding areas where, for example, a light is simple to change. A dual-axis light 2705a-d may be substituted for legacy hanging fixtures. A dual-axis light 2705a-d may be configured for mounting into, for example, most popular 0.32", 8 mm, and 10 mm T-slot extrusions. A dual-axis light 2705a-d may include, for example, a M12 pigtail for connecting around extrusion corners. A dual-axis light 2705a-d may be, for example, 12" or 300 mm in lengths. A dual-axis light 2705a-d may be, for example, IP-50 rated. A dual-axis light 2705a-d may be, for example, configured in compliance with CE, IEC62471 photobiological eye safety, RoHS. A dual-axis light 2705a-d may include a 2-Pin jumper cable for use in, for example, T-slot mounting.

A dual-axis light 2705a-d may be configured to provide radial and/or bright field lighting. A dual-axis light 2705a-d may include a silicone lens 2712a-d that may, for example, provide an extra-tight seal and IP65 rating. A dual-axis light 2705a-d may include a lens 2712a-d that, for example, does not yellow, craze, react to UV light, lack of chemical reactivity, robustness in harsh environmental conditions, and/or high transmission from 365 nm (UV) to 2000 nm (IR). A dual-axis light 2705a-d may be configured as a low-angle ring light for dark field ring applications. A dual-axis light 2705a-d may be used for radial illumination. A dual-axis light 2705a-d may include storage of electrical energy (e.g., a battery, a capacitor, a combination thereof, etc.) to pulse associated LED's. A dual-axis light 2705a-d may include pulsed LED energy of 2000 watts when LED's are active. A dual-axis light 2705a-d may pulse LED's with up to 180 amps of DC current. A dual-axis light 2705a-d may include a temperature monitor that may, for example, shut down when LED's die rises above a safe temperature. After shut down the LED die may begin a rest time till a safe temperature is reached.

A dual-axis light 2705a-d may include a multicolor inspection light with a built in individual On-Axis and Off-Axis intensity control. A dual-axis light 2705a-d may include uniformity and an intense light output with variable intensities with multiple color options. A dual-axis light 2705a-d may include variable Intensity control on, for example, each of a red, green, and/or blue LED control channel. A dual-axis light 2705a-d may include RGB Color Select Ability—3 Analog Channels Per Axis. A dual-axis light 2705a-d may include both ON and OFF-Axis illumination options. A dual-axis light 2705a-d may include diffuse On and Off axis light output. A dual-axis light 2705a-d may be configured for incorporation within, for example, pharmaceutical blister pack inspection, solder joint inspection, or any inspection of products with, for example, a highly reflective finish.

With reference to FIGS. 28A-E, a machine vision system 2800a-e may include a structured light 2805a-e. The structured light 2805a-e a main body portion 2807a,b threadingly engaged with an adjustable housing portion 2806a,b,e, electrical power/control connection 2811a,b,d,e, and an optical element 2812a,c,d (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.) positioned within a light output aperture 2809a,c.

A structured light 2805a-e may be configured as, for example, a LED structured light pattern projector. A structured light 2805a-e may include a LED projector that may use patterns and optics to provide a focused structured light. A structured light 2805a-e may include pattern projectors that integrate precisely etched masks 2812a,c,d. Any kind of pattern shape can be easily supplied, integrated and projected. The size of the projection area can be easily modified by interchanging the projection optics. Projectors integrate standard C-mount ⅔" lenses. A structured light 2805a-e may include telecentric lenses 2812a,c,d for telecentric pattern projection. A structured light 2805a-e may project a focused spot of light. A structured light 2805a-e may include a 9 mm$^2$ LED die size that emits nine times an intensity as a standard high output LED. A structured light 2805a-e may include a housing that is constructed of finned 6061-T6 aluminum and designed to dissipate heat, thereby, allowing associated LEDs to be run at a much higher current than a standard 1 mm$^2$ die LED's. A structured light 2805a-e may include multiple interchangeable pattern styles. A structured light 2805a-e may project a thinner and more define pattern of light compared to laser projectors. A structured light 2805a-e may include a 5 Pin M12 quick disconnect 2811a,b,d,e. A structured light 2805a-e may include at least one of: multiple interchangeable patterns; a driver built in (i.e., no external wiring to a driver); a PNP and/or a NPN strobe input; continuous operation mode; a strobe operation mode; analog intensity 0-10V$_{DC}$ signal; one, 9 mm$^2$ die high current LED; an Overdrive driver with NPN or PNP signal options; an LED strobed at 15 A during an active ON period; a 2 A LED continuous on drive; up to 2000 strobes per second; designed to operate in food applications; corrosion resistant; one 5 watt high output, high current LED in a small 30 mm housing; a housing that is an industry standard M30 barrel style used for proximity and photoelectric sensors; explosion proof; and an APG C2 enclosure providing an explosive environment.

Figure 29B:
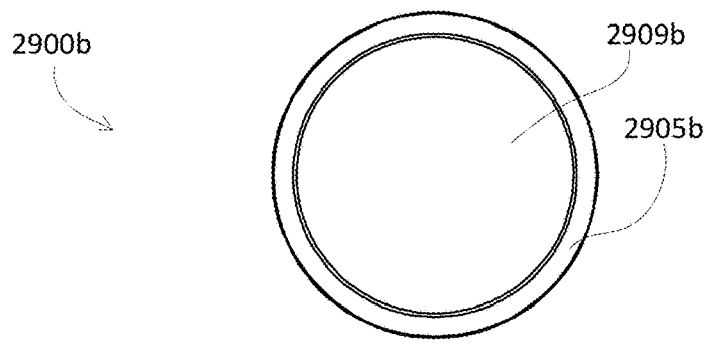
FIGS. 29A-C depict various views of an example structured light.
Figure 29A:
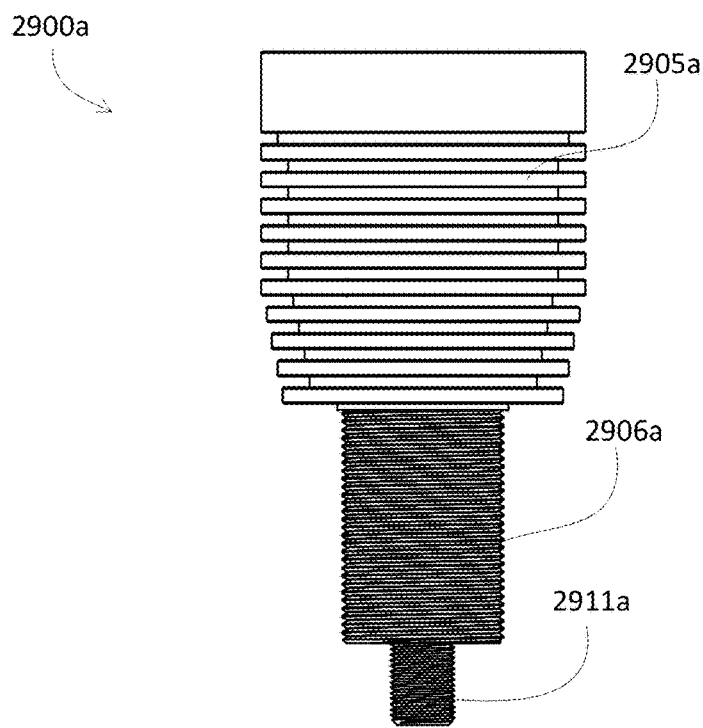
Figure 29C:
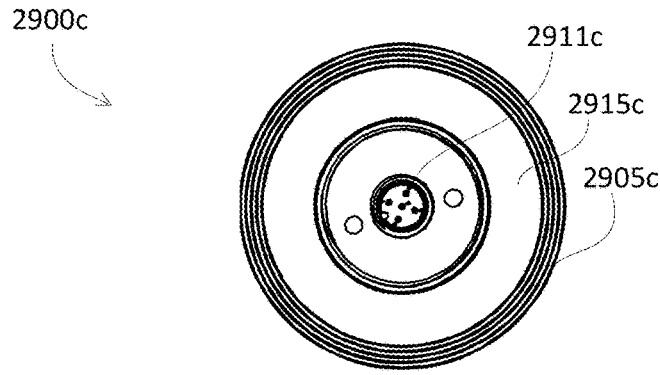

Turning to FIGS. 29A-C, a machine vision system 2900a-c may include a structured light 2905a-c. The structured light 2905a-c a main body portion threadingly engaged with an adjustable housing portion 2906a, electrical power/control connection 2911a,c, and an optical element 2912b,c (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.) positioned within a light output aperture 2809b. A structured light 2905a-c may be configured as, for example, a LED structured light pattern projector.

A structured light 2905a-c may include a single 5 W LED housed in, for example, a 30 mm barrel sensor housings. A structured light 2905a-c may include a housing with a threaded barrel M30×1.5 style similar to a housing used for standard proximity and photoelectric sensors. A structured light 2905a-c may emit white, red, amber, blue, green cyan, IR and/or UV light output. A structured light 2905a-c may include an integrated constant current driver with built-in strobe input with option for PNP and/or NPN trigger control. The integrated driver may eliminate wiring between the light and an external driver, and may limit current to the LED while providing constant stable power. A structured light 2905a-c may include a PNP and/or NPN strobe trigger to control light pulse timing.

A structured light 2905a-c may include at least one of: a 30 mm barrel style housing; a M12 quick disconnect; a PNP and/or NPN strobe input; driver built in; no external wiring to a driver; a continuous operation mode; a strobe operation mode; an analog intensity 0-10V$_{DC}$ signal input; standard optics that may provide tight focused light; a single high current LED enclosed in a 30 mm barrel style housing; an NPN and PNP strobe signal with a 0-10V$_{DC}$ analog intensity control signal; a mounting option allowing for installation with two locking bolts; an over drive driver; three high intensity LEDs; built in safe strobe technology for use without damage to the LED; a telescoping lens; compact 30 mm diameter design; a homogeneous light pattern output; one, 1 mm$^2$ die high current LED; an adjustable length lens that produces a spot size without having to adjust a position of whole light; maximum strobe pulse 125 mS; up to 2000 strobes per second; diffuse and even lighting output; a narrow, 4 degree lens with long, tightly focused beam of light; a 5-pin M12 quick connect 2911b,c; a washdown IP68 rating; optics 2912b for focus into a fiber-optic conductor; and an APG C2 enclosure providing an explosive environment light.

With reference to FIGS. 30A-D, a machine vision system 3000a-d may include a washdown back light 3005a-d similar to, for example, light 105 of FIG. 1, light 506 of FIG. 6, light 905 of FIG. 9, or light 1505a-d of FIGS. 15A-D. The washdown back light 3005a-d may include a plurality of housing side portions 3014a-d, a top housing portion 3012a-d and a bottom housing portion 3015c,d defining, for example, a square shape housing. The plurality of housing side portions 3014a-d may be interconnected via, for example, a common casting, welding. fasteners, etc. While the washdown back light 3005a-d is shown in FIGS. 30A-D as defining a square shape, the housing side portions 3014a-d, the top housing portion 3012a-d and the bottom housing portion 3015c,d, may define any shape (e.g., a circular shape, a hexagon shape, a rectangular shape, a pentagon shape, a heptagon, an octagon, or any suitable polygon shape). The top housing portion 3012a-d may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The washdown back light 3005a-d may include a electrical power/control connection 3011a-d, an electrical printed circuit board (not shown in FIGS. 30A-D), a controller (not shown in FIGS. 30A-D), and a plurality of light sources (not shown in FIGS. 30A-D). The controller may be configured to receive electrical power/control signals via the electrical power/control connection 3011a-d and may control, for example, an intensity of each of the plurality of light sources, the optical element 3012a-d, and/or a camera (not shown in FIGS. 30A-D). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 3011a-d to, for example, a camera or a second light (another illuminator), and/or receive electrical power/control signals from, for example, a camera.

A washdown back light 3005a-d may be configured, for example, to produce up to 100,000 lux. A washdown back light 3005a-d may include a multi-drive driver, allowing users to operate the washdown back light 3005a-d in, for example, a continuous operation mode and/or an over drive strobe (high-pulse operation) mode. A plurality of washdown back light 3005a-d may be connected in, for example, a string of six to create ultra-long linear lights at a fraction of a cost of traditional monolithic solutions without any loss in uniformity. A plurality of washdown back light 3005a-d may be connected by, for example, daisy-chaining the washdown back light 3005a-d together using, for example, locking jumper cables extending between respective electrical power/control connection 3011a-d. An electrical power/control connection 3011a-d may be rated for IP65. A washdown back light 3005a-d may include, for example, a 5 Pin M12 connector 3011a-d. A washdown back light 3005a-d may include a 1-10V analog control line to provide, for example, control over intensity in a continuous mode. A washdown back light 3005a-d may include product parameters that may be, for example, user selectable to a maximum allowed intensity. A washdown back light 3005a-d may be configured such that removing a signal will put the washdown back light 3005a-d into, for example, an over drive operation mode.

In addition to a back light application, a washdown back light 3005a-d may be used in, for example, a bright field application, a direct lighting application, a dark field application, etc. A washdown back light 3005a-d may include a PNP and/or a NPN strobe input. A washdown back light 3005a-d may include a 5-pin M12 quick connect. A washdown back light 3005a-d may include a wavelength color of, for example: white, 470 nm, 505 nm, 530 nm, 625 nm, 850 nm, 940 nm, a sub-combination thereof, or a combination thereof. A washdown back light 3005a-d may include, for example, four (4) screw holes (not shown in FIGS. 30A-D) located on a bottom of the washdown back light 3005a-d for easy mounting. A washdown back light 3005a-d may include, for example, a 3-Axis pan and tilt mount. A plurality of washdown back lights 3005a-d may be directly connected together (i.e., with no space between the lights). A washdown back light 3005a-d may include a waterproof stainless steel enclosure specially designed for food industry and wash down environments where, for example, water and corrosive materials are present. A washdown back light 3005a-d may include circuitry enclosed in, for example, an epoxy potted compound further protecting the washdown back light 3005a-d from dust, debris, and other contaminants. A washdown back light 3005a-d may include 12 high intensity LEDs. A washdown back light 3005a-d may include $24V_{DC}$, and may operate in continuous or strobe mode. A washdown back light 3005a-d may include NPN or PNP strobe triggers that may be, for example, used to control a pulse of the washdown back light 3005a-d. A washdown back light 3005a-d may be configured such that, for example, an intensity of the washdown back light 3005a-d can be controlled via 0-10V remote analog signal and/or a manual potentiometer. A washdown back light 3005a-d may include, for example, twelve, 1 mm² die high current LEDs. A washdown back light 3005a-d may include a backlight lens 3012a-d that is, for example, a viable option for silhouetting objects. A washdown back light 3005a-d may include at least one of: a stainless steel IP68 rated enclosure with sealed bolts and waterproof connector 3011a-d for applications in washdown and corrosive environments; a series of backlights that may offer backlit LED's for an intense and highly diffuse lighting option; a built in driver; no external wiring to an external driver; a narrow depth of just 30 mm allows for mounting in tight locations; and an optically clear internal light dispersion grid and matte white-finished backing plate to reflect light up and out through an diffusion acrylic 3012a-d.

Figures 31A, 31B, 31C:
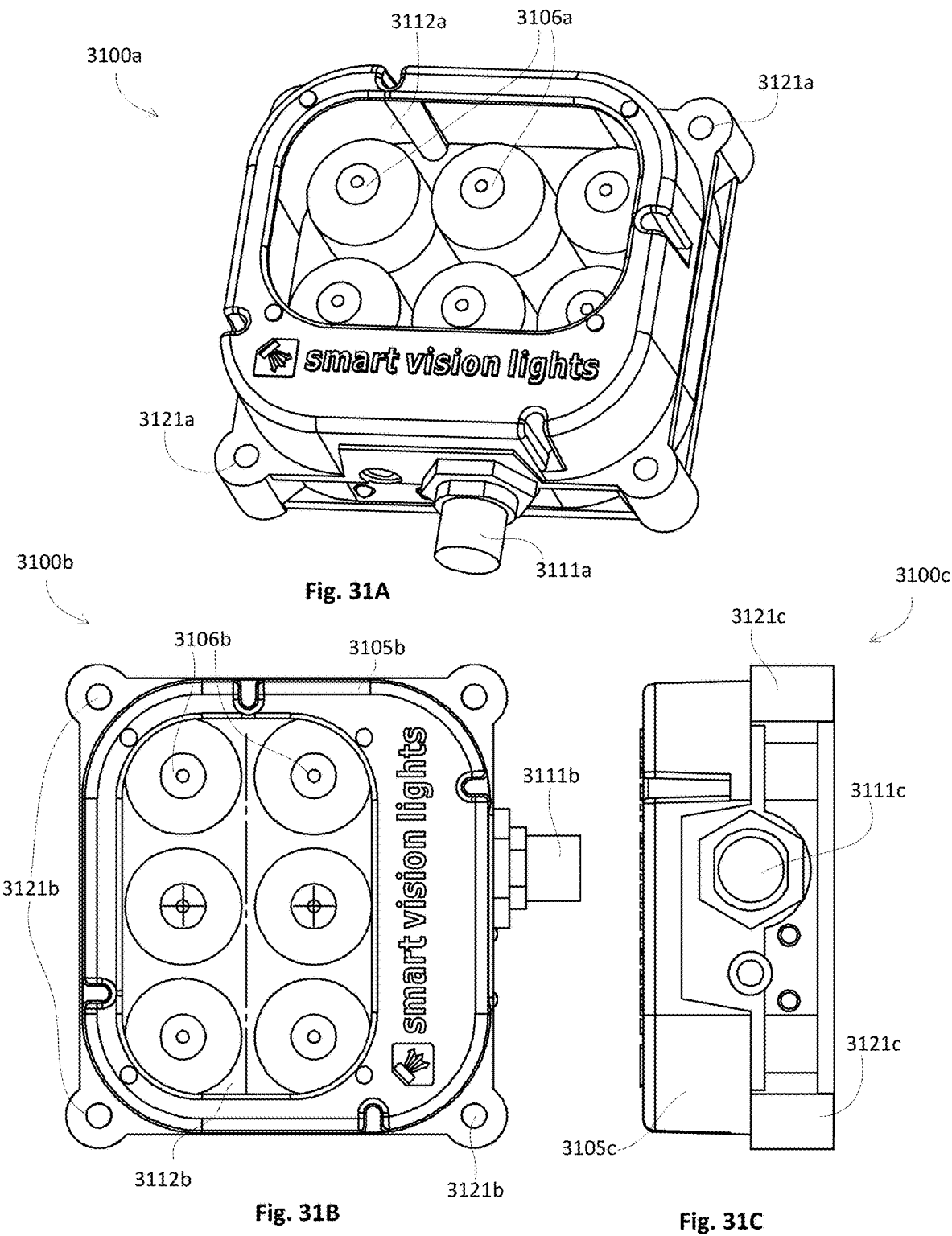
FIGS. 31A-C depict various views of an example brick light.
Figure 32A:
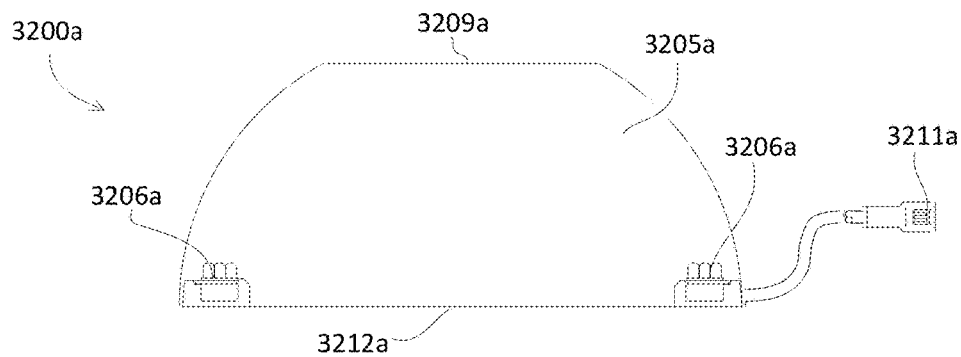
FIGS. 32A-F depict various views of an example dome light.
Figure 32B:
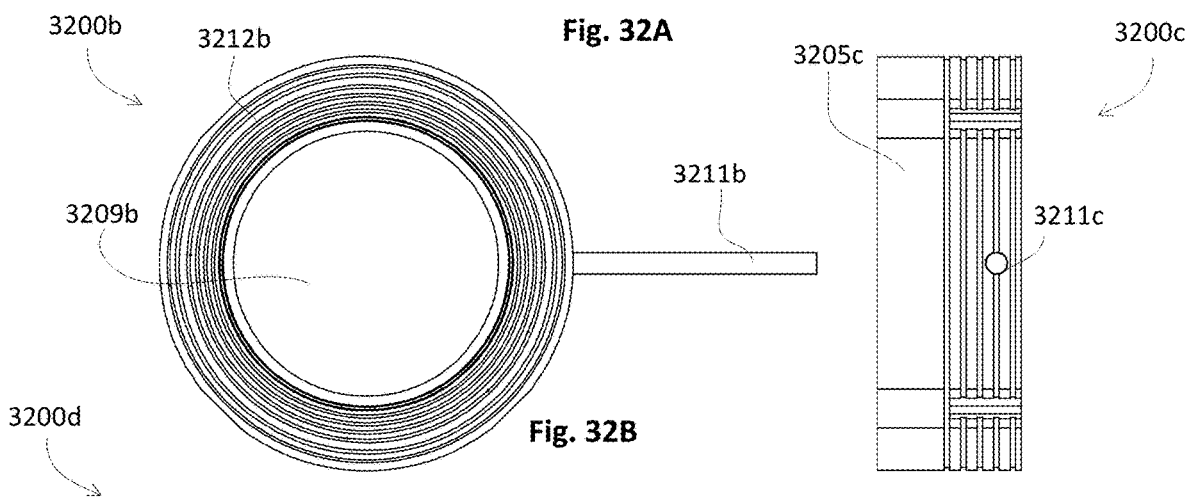
Figure 32C:
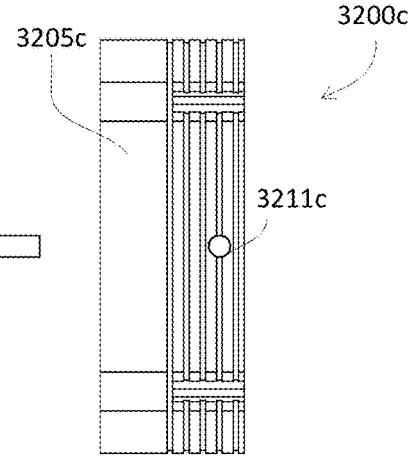
Figure 32D:
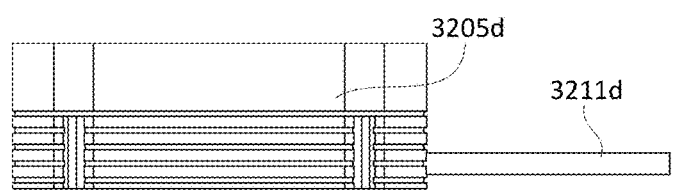
Figure 32E:
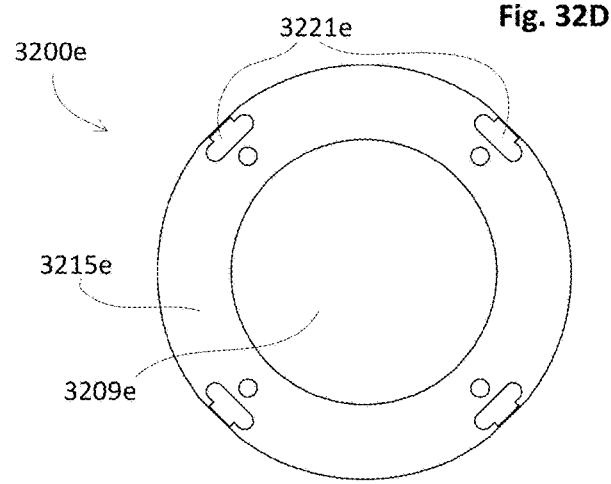
Figure 32F:
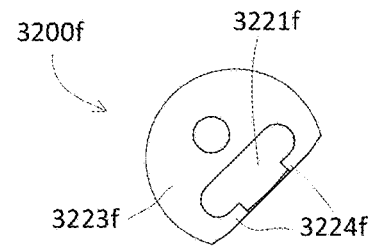

Turning to FIGS. 31A-C, a machine vision system 3100a-c may include a brick light 3105a-c similar to, for example, light 105 of FIG. 1, light 506 of FIG. 6, light 905 of FIG. 9, or light 1505a-d of FIGS. 15A-D. The brick light 3105a-c may include a plurality of housing side portions 3114a-c, a top housing portion 3112a-c and a bottom housing portion 3115c defining, for example, a square shape housing. The plurality of housing side portions 3114a-c may be interconnected via, for example, a common casting, welding. fasteners, etc. While the brick light 3105a-c is shown in FIGS. 31A-C as defining a square shape, the housing side portions 3114a-c, the a top housing portion 3112a-c and the bottom housing portion 3115c, may define any shape (e.g., a circular shape, a hexagon shape, a rectangular shape, a pentagon shape, a heptagon, an octagon, or any suitable polygon shape). The top housing portion 3112a-c may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The brick light 3105a-c may include a electrical power/control connection 3111a-c, an electrical printed circuit board 3104a,b, a controller (not shown in FIGS. 31A-C), and a plurality of light sources 3106a,b. The controller may be configured to receive electrical power/control signals via the electrical power/control connection 3111a-c and may control, for example, an intensity of each of the plurality of light sources 3106a,b, the optical element 3112a-c, and/or a camera (not shown in FIGS. 31A-C). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 3111a-c to, for example, a camera or a second light (another illuminator), and/or receive electrical power/control signals from, for example, a camera.

A brick light 3105a-c may be configured, for example, to produce up to 100,000 lux. A brick light 3105a-c may include a multi-drive driver, allowing users to operate the brick light 3105a-c in, for example, a continuous operation mode and/or an over drive strobe (high-pulse operation) mode. A plurality of brick lights 3105a-c may be connected in, for example, a string of six to create ultra-long linear lights at a fraction of a cost of traditional monolithic solutions without any loss in uniformity. A plurality of brick light 3105a-c may be connected by, for example, daisy-chaining the brick light 3105a-c together using, for example, locking jumper cables extending between respective electrical power/control connection 3111a-c. An electrical power/control connection 3111a-c may be rated for IP65. A brick light 3105a-c may include, for example, a 5 Pin M12 connector 3111a-c. A brick light 3105a-c may include a 1-10V analog control line to provide, for example, control over intensity in a continuous mode. A brick light 3105a-c may include product parameters that may be, for example, user selectable to a maximum allowed intensity. A brick light 3105a-c may be configured such that removing a signal will put the brick light 3105a-c into, for example, an over drive operation mode.

In addition to a back light application, a brick light 3105a-c may be used in, for example, a back light application, a bright field application, a direct lighting application, a dark field application, etc. A brick light 3105a-c may include a PNP and/or a NPN strobe input. A brick light 3105a-c may include a 5-pin M12 quick connect. A brick light 3105*a-c* may include a wavelength color of, for example: white, 470 nm, 505 nm, 530 nm, 625 nm, 850 nm, 940 nm, a sub-combination thereof, or a combination thereof. A brick light 3105*a-c* may include, for example, four (4) screw holes 3121*a-c* located on a bottom 3115*c* of the brick light 3105*a-c* for easy mounting. A brick light 3105*a-c* may include, for example, a 3-Axis pan and tilt mount. A plurality of brick lights 3105*a-c* may be directly connected together (i.e., with no space between the lights). A brick light 3105*a-c* may include a waterproof stainless steel enclosure specially designed for food industry and wash down environments where, for example, water and corrosive materials are present. A brick light 3105*a-c* may include circuitry enclosed in, for example, an epoxy potted compound further protecting the brick light 3105*a-c* from dust, debris, and other contaminants. A brick light 3105*a-c* may include 12 high intensity LEDs 3106*a,b*. A brick light 3105*a-c* may include 24$V_{DC}$, and may operate in continuous or strobe mode. A brick light 3105*a-c* may include NPN or PNP strobe triggers that may be, for example, used to control a pulse of the brick light 3105*a-c*. A brick light 3105*a-c* may be configured such that, for example, an intensity of the brick light 3105*a-c* can be controlled via 0-10V remote analog signal and/or a manual potentiometer. A brick light 3105*a-c* may include, for example, twelve, 1 mm$^2$ die high current LEDs. A brick light 3105*a-c* may include a backlight lens 3112*a-c* that is, for example, a viable option for silhouetting objects. A brick light 3105*a-c* may include at least one of: a stainless steel IP68 rated enclosure with sealed bolts and waterproof connector 3111*a-c* for applications in washdown and corrosive environments; a series of backlights that may offer backlit LED's for an intense and highly diffuse lighting option; a built in driver; no external wiring to an external driver; a narrow depth of just 30 mm allows for mounting in tight locations; and an optically clear internal light dispersion grid and matte white-finished backing plate to reflect light up and out through an diffusion acrylic 3112*a-c*. A brick light 3105*a-c* may include standard tight, wide angle expanded, or line generating optics 3112*a-c*. A brick light 3105*a-c* may include six high output, high current LEDs 3106*a,b*. A brick light 3105*a-c* may include an aluminum back plate which may allow the brick light 3105*a-c* to be run at a higher current and hence greater intensity.

With reference to FIGS. 32A-F, a machine vision system 3200*a-f* may include a dome light 3205*a-d* similar to, for example, dome light 405 of FIG. 4. The dome light 3205*a-d* may include a plurality of housing side portions 3214*a,c,d*, a bottom housing portion 3212*a,b* and a domed top housing portion 3215*a,c,d* defining, for example, a circular dome shape housing. The plurality of housing side portions 3214*a,c,d* and the domed top housing portion 3215*a,c,d* may be interconnected via, for example, a common casting, a common mold, welding. fasteners, etc. While the dome light 3205*a-d* is shown in FIGS. 32A-F as defining a circular dome shape, the housing side portions 3214*a,c,d*, the a bottom housing portion 3212*a,b* and the top housing portion 3215*a,c,d*, may define any shape (e.g., a circular shape, a hexagon shape, a square shape, a pentagon shape, a heptagon, an octagon, or any suitable polygon shape). The bottom housing portion 3212*a,b* may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The dome light 3205*a-d* may include a camera attachment 3213*a-c* defining a camera aperture 3209*a,b* in at least the top dome shape housing portion 3215*a-c*. In addition to being adapted to attach to a camera (not shown in FIGS. 32A-F), the camera attachment 3213*a-c* may be configured to be attached to a robot (e.g., attachment 1084, 1184, or 1289 of FIGS. 10, 11, and 12, respectively) and/or an on-axis light 205 of FIG. 2. The aperture 3209*a,b* may extend through the bottom housing portion 3212*a,c*. Alternatively, the bottom housing portion 3212*a,c* may close off an end of the aperture 3209*a,b*.

The dome light 3205*a-d* may include an electrical power/control connection 3211*b-d*, an electrical printed circuit board (not shown in FIGS. 32A-F), a controller (not shown in FIGS. 32A-F), and a plurality of light sources 3206*a*. The controller may be configured to receive electrical power/control signals via the electrical power/control connection 3211*a-d* and may control, for example, an intensity of each of the plurality of light sources 3206*a*, the optical element 3212*a,b*, and/or a camera (not shown in FIGS. 32A-E). The controller may be similar to, for example, the controller 1317*b* of FIG. 13B and/or 4405*a* of FIG. 44A. The controller may implement any portion or, or all of the functionality as described, for example, with regard to FIGS. 44A-D. The controller may provide electrical power/control signals, via the electrical power/control connection 3211*a-d* to, for example, a camera or a second light (another illuminator), and/or receive electrical power/control signals from, for example, a camera.

A dome light 3205*a-d* may be incorporated within a machine vision system 3200*a-e* to read, for example, code and imperfections on rounded or highly reflective products and/or product inspection with an even, uniform, and repeatable light intensity. A dome light 3205*a-d* may include a multi-drive controller and/or a built-in driver. The multi-drive controller may combine constant ON operation and overdrive strobe (high pulse) operation. A dome light 3205*a-d* may be selectively operated in either constant ON operation or pulse/strobe operation at the maximum allowed intensity by an LED 3206*a* manufacturer by simply setting product parameters with, for example, an associated controller. The multi-drive controller may protect the LEDs 3206*a* from premature degradation and failure caused by excessive heat by, for example, regulating the current delivered to the LEDs 3206*a* and limiting an associated duty cycle of the light output.

A dome light 3205*a-d* may include, for example: a closed in cover 3212*a,b*; T-slots 3221*e*, 3223*f* on flat sides 3214*c,d*; a driver built in; no external wiring to an internal driver; a diffuse 4" dome light; 20 LED 3206*a* design with constant current regulation; a built in driver along with a semi-reflective white dome; a NPN and/or PNP strobe operation with a built in 0-10$V_{DC}$ analog intensity control; a 5-pin M12 connector; a 100 mm dome 3215*a* diameter; a 25 mm camera viewing hole 3209*a,b,e*. A dome light 3205*a-d* may include, for example: a 40 LED 3206*a* design and a constant current regulation; constant ON operation; over drive strobe operation; a NPN and/or PNP strobe operation with a built in 0-10$V_{DC}$ analog intensity control; a 5-pin M12 connector; a 150 mm dome diameter; and a 30 mm camera viewing hole 3209*a,b,e*. A dome light 3205*a-d* may include, for example: continuous operation; over drive operation; 9 T-slots; a diffuse 10" dome; 60 LED 3206*a* design with constant current regulation built in; a semi-reflective white dome; A dome light 3205*a-d* may emit wavelength colors of: white, 470 nm, 530 nm, 625 nm, a sub-combination thereof, or a combination thereof.

Turning to FIGS. 33A-F, a machine vision system 3300a-f may include a ring light 3305a,c,e,d similar to, for example, ring light 305 of FIG. 3, ring light 805a,b of FIGS. 8A and 8B, or ring light 1305a-d of FIGS. 13A-D, or ring light 1405a-d of FIGS. 14A-D. The ring light 3305a,c,e,d may include a plurality of housing side portions 3314a,c,d, a bottom housing portion 3312a,b and a top housing portion 3315a,c,d defining, for example, a circular shape housing. The plurality of housing side portions 3314a,c,d and the top housing portion 3315a,c,d may be interconnected via, for example, a common casting, a common mold, welding. fasteners, etc. While the ring light 3305a,c,e,d is shown in FIGS. 33A-F as defining a circular shape, the housing side portions 3314a,c,d, the a bottom housing portion 3312a,b and the top housing portion 3315a,c,d, may define any shape (e.g., a rectangular shape, a hexagon shape, a square shape, a pentagon shape, a heptagon, an octagon, or any suitable polygon shape). The bottom housing portion 3312a,b may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The ring light 3305a,c,e,d may include a camera attachment 3313a-c defining a camera aperture 3309a,b in at least the top housing portion 3315a-c. In addition to being adapted to attach to a camera (not shown in FIGS. 33A-F), the camera attachment 3313a-c may be configured to be attached to a robot (e.g., attachment 1084, 1184, or 1289 of FIGS. 10, 11, and 12, respectively) and/or an on-axis light 205 of FIG. 2. The aperture 3309a,b may extend through the bottom housing portion 3312a,c. Alternatively, the bottom housing portion 3312a,c may close off an end of the aperture 3309a,b.

The ring light 3305a,c,e,d may include an electrical power/control connection 3311b-d, an electrical printed circuit board (not shown in FIGS. 33A-F), a controller (not shown in FIGS. 33A-F), and a plurality of light sources 3306a. The controller may be configured to receive electrical power/control signals via the electrical power/control connection 3311a-d and may control, for example, an intensity of each of the plurality of light sources 3306a, the optical element 3312a,b, and/or a camera (not shown in FIGS. 33A-E). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 3311a-d to, for example, a camera or a second light (another illuminator), and/or receive electrical power/control signals from, for example, a camera.

With reference to FIGS. 34A-E, a machine vision system 3400a-e may include a direct ring light 3405a-d similar to, for example, ring light 305 of FIG. 3, ring light 805a,b of FIGS. 8A and 8B, or ring light 1305a-d of FIGS. 13A-D, or ring light 1405a-d of FIGS. 14A-D. The direct ring light 3405a-d may include a plurality of housing side portions 3414a,c,d, a bottom housing portion 3412a,b and a top housing portion 3415a,c,d defining, for example, a circular shape housing. The plurality of housing side portions 3414a, c,d and the top housing portion 3415a,c,d may be interconnected via, for example, a common casting, a common mold, welding. fasteners, etc. While the direct ring light 3405a-d is shown in FIGS. 34A-E as defining a circular shape, the housing side portions 3414a,c,d, the a bottom housing portion 3412a,b and the top housing portion 3415a,c,d, may define any shape (e.g., a rectangular shape, a hexagon shape, a square shape, a pentagon shape, a heptagon, an octagon, or any suitable polygon shape). The bottom housing portion 3412a,b may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The direct ring light 3405a-d may include a camera attachment 4313a-c defining a camera aperture 3409a,b in at least the top housing portion 3415a-c. In addition to being adapted to attach to a camera (not shown in FIGS. 34A-E), the camera attachment 3413a-c may be configured to be attached to a robot (e.g., attachment 1084, 1184, or 1289 of FIGS. 10, 11, and 12, respectively) and/or an on-axis light 205 of FIG. 2. The aperture 3409a,b may extend through the bottom housing portion 3412a,c. Alternatively, the bottom housing portion 3412a,c may close off an end of the aperture 3409a,b.

The direct ring light 3405a-d may include an electrical power/control connection 3411b-d, an electrical printed circuit board 3404a, a controller (not shown in FIGS. 34A-E), and a plurality of light sources 3406a. The controller may be configured to receive electrical power/control signals via the electrical power/control connection 3411a-d and may control, for example, an intensity of each of the plurality of light sources 3406a, the optical element 3412a,b, and/or a camera (not shown in FIGS. 34A-E). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 3411a-d to, for example, a camera or a second light (another illuminator), and/or receive electrical power/control signals from, for example, a camera.

Turning to FIGS. 35A-D, a machine vision system 3500a-d may include a ring light 3505a-d similar to, for example, ring light 805a,b of FIGS. 8A and 8B, or ring light 1305a-d of FIGS. 13A-D. The ring light 3505a-d may include a plurality of housing side portions 3514a,c, a top housing portion 3515a-c and a bottom housing portion 3512a-c defining, for example, a hexagon shape housing. While the ring light 3505a-d is shown in FIGS. 35A-D as defining a square shape, the housing side portions 3514a,c, the a top housing portion 3515a-c and the bottom housing portion 3512a-c, may define any shape (e.g., a circular shape, a hexagon shape, a rectangular shape, a pentagon shape, a heptagon, an octagon, or any suitable polygon shape). The bottom housing portion 3512a-c may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The ring light hexagon may include a camera attachment 3513a-c defining a camera aperture 3509a,b in at least the top housing portion 3515a-c. In addition to being adapted to attach to a camera (not shown in FIGS. 35A-D), the camera attachment 3513a-c may be configured to be attached to a robot (e.g., attachment 1084, 1184, or 1289 of FIGS. 10, 11, and 12, respectively) and/or a coaxial light 205 of FIG. 2. The aperture 3509a,b may extend through the bottom housing portion 3512a,c. Alternatively, the bottom housing portion 3512a,c may close off an end of the aperture 3509a,b. The ring light 3505a-d may include an electrical power/control connection 3511a-c, an electrical printed circuit board (not shown in FIGS. 35A-D), a controller (not shown in FIGS. 35A-D), and a plurality of light sources (not shown in FIGS. 35A-D). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 3511a-d to, for example, a camera or a second light (another illuminator), and/or receive electrical power/control signals from, for example, a camera.

With reference to FIGS. 36A-E, a machine vision system 3600a-e may include a strobe light 3605a-e similar to, for example, ring light 805a,b of FIGS. 8A and 8B, ring light 1305a-c of FIGS. 13A-C, or ring light 1405a-e of FIGS. 14A-E. The strobe light 3605a-e may include a plurality of housing side portions 3614a-e, a bottom housing portion 3615a-d and a top housing portion 3612c,d defining, for example, a rectangular shape housing. The plurality of housing side portions 3614a-d may be interconnected via, for example, a common casting, a common mold, welding. fasteners, etc.

While the strobe light 3605a-e is shown in FIGS. 36A-E as defining a rectangular shape, the housing side portions 3614a-d, the bottom housing portion 3615a-d and the top housing portion 3612c,d, may define any shape (e.g., a circular shape, a hexagon shape, a square shape, a pentagon shape, a heptagon, an octagon, or any suitable polygon shape). The top housing portion 3612c,d may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The strobe light 3605a-e may include a camera attachment 3613a-c defining a camera aperture 3609a,b,e in at least the bottom housing portion 3615a,c,e. In addition to being adapted to attach to a camera (not shown in FIGS. 36A-E), the camera attachment 3613a-c may be configured to be attached to a robot (e.g., attachment 1084, 1184, or 1289 of FIGS. 10, 11, and 12, respectively) and/or a coaxial light 205 of FIG. 2. The aperture 3609a,b,e may extend through the top housing portion 3612a-d. Alternatively, the top housing portion 3612a-d may close off an end of the aperture 3609a,b,e. The strobe light 3605a-e may include a first electrical power/control connection 3611c,d,e, a second electrical power/control connection 3616d,e, an electrical printed circuit board (not shown in FIGS. 36A-E), a controller (not shown in FIGS. 36A-E), and a plurality of light sources (not shown in FIGS. 36A-E). The controller may be configured to receive electrical power/control signals via the first electrical power/control connection 3611c,d,e and may control, for example, an intensity of each of the plurality of light sources, the optical element 3612a-d, and/or a camera (not shown in FIGS. 36A-E). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the second electrical power/control connection 3616d,e to, for example, a camera or a second light (another illuminator), and/or receive electrical power/control signals from, for example, a camera.

A strobe light 3605a-e may include, for example: T-slot mounting 3621e; a DataMan 503 (Cognex Part #: DM503-HPIA) camera mount 3613a-c; a built in SMART driver; safe strobe technology that may ensure protected operations of LEDs; a M12 quick disconnect; and/or high speed up to 1000 Strobes Per Second.

Turning to FIGS. 37A-E, a machine vision system 3700a-e may incorporate a strobe light 3705a-e similar to, for example, strobe light 3605a-e of FIGS. 36A-E. The strobe light 3705a-e may include a plurality of housing side portions 3714a-e, a bottom housing portion 3715a-d and a top housing portion 3712c,d defining, for example, a rectangular shape housing. The plurality of housing side portions 3714a-d may be interconnected via, for example, a common casting, a common mold, welding. fasteners, etc.

While the strobe light 3705a-e is shown in FIGS. 37A-E as defining a rectangular shape, the housing side portions 3714a-d, the bottom housing portion 3715a-d and the top housing portion 3712c,d, may define any shape (e.g., a circular shape, a hexagon shape, a square shape, a pentagon shape, a heptagon, an octagon, or any suitable polygon shape). The top housing portion 3712c,d may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The strobe light 3705a-e may include a camera attachment 3713a-c defining a camera aperture 3709a,b,e in at least the bottom housing portion 3715a,c,e. In addition to being adapted to attach to a camera 3760a,c-e, the camera attachment 3713a-c may be configured to be attached to a robot (e.g., attachment 1084, 1184, or 1289 of FIGS. 10, 11, and 12, respectively) and/or a coaxial light 205 of FIG. 2. The aperture 3709a,b,e may extend through the top housing portion 3712a-d. Alternatively, the top housing portion 3712a-d may close off an end of the aperture 3709a,b,e. The strobe light 3705a-e may include a first electrical power/control connection 3711c,d,e, a second electrical power/control connection 3716d,e, an electrical printed circuit board (not shown in FIGS. 37A-E), a controller (not shown in FIGS. 37A-E), and a plurality of light sources (not shown in FIGS. 37A-E). The controller may be configured to receive electrical power/control signals via the first electrical power/control connection 3711c,d,e and may control, for example, an intensity of each of the plurality of light sources, the optical element 3712a-d, a camera 3760a,c-e, and/or a camera optical element 3761a,c,d (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.) via, for example, a camera electrical power/control connector 3765c-e. The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the second electrical power/control connection 3616d,e to, for example, a camera or a second light (another illuminator), and/or receive electrical power/control signals from, for example, a camera.

A strobe light 3705a-e may include, for example: T-slot mounting 3721e; a DataMan 503 (Cognex Part #: DM503-HPIA) camera mount 3713a-c; a built in SMART driver; safe strobe technology that may ensure protected operations of LEDs; a M12 quick disconnect; and/or high speed up to 1000 Strobes Per Second.

With reference to FIGS. 38A-D, a machine vision system 3800a-e may include an illumination assembly 3805a-c for use in, for example, bar code reading systems. The illumination assembly 3805a-c may be similar to, for example, ring light 805a,b of FIGS. 8A and 8B, ring light 1305a-c of FIGS. 13A-C, ring light 1405a-e of FIGS. 14A-E, strobe light 3605a-e of FIGS. 36A-E, or strobe light 3705a-e of FIGS. 37A-E. The illumination assembly 3805a-c may include a plurality of housing side portions 3814a,c, a bottom housing portion 3815a-d and a top housing portion 3812a-c defining, for example, a rectangular shape housing. The plurality of housing side portions 3814a,c may be interconnected via, for example, a common casting, a common mold, welding. fasteners, etc.

Figure 38A:
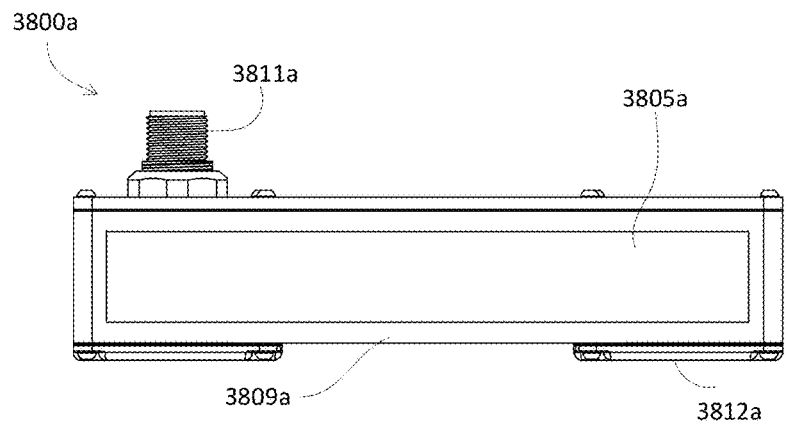
FIGS. 38A-D depict various views of an example illumination assembly for use in bar code reading systems.
Figure 38B:
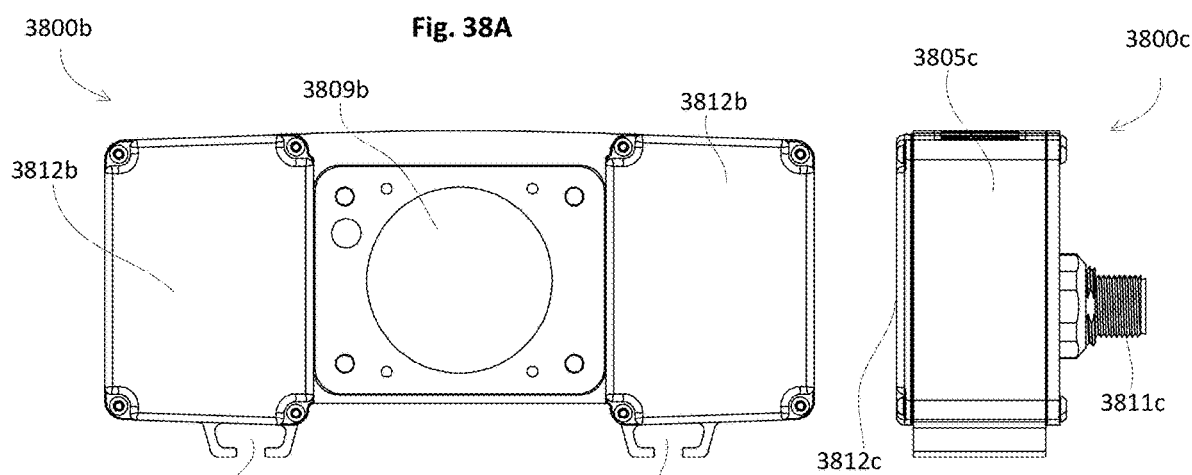
Figure 38C:
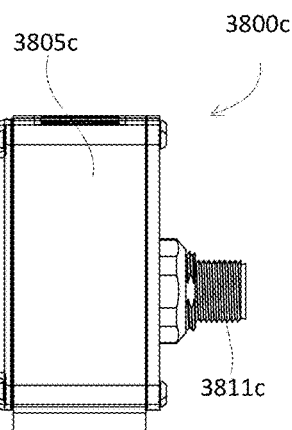
Figure 38D:
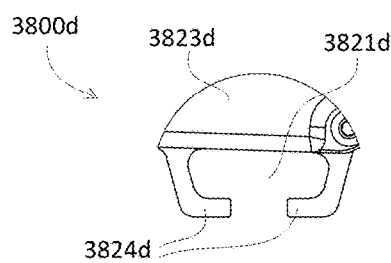
Figure 39A:
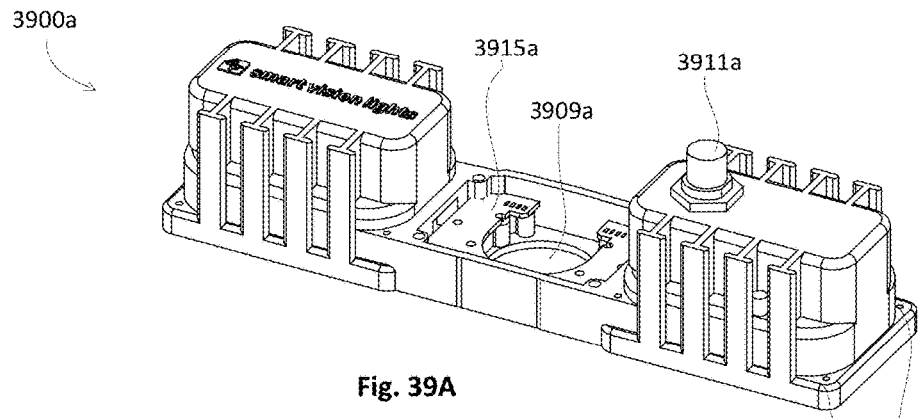
FIGS. 39A-E depict various views of an example strobe light.
Figure 39B:
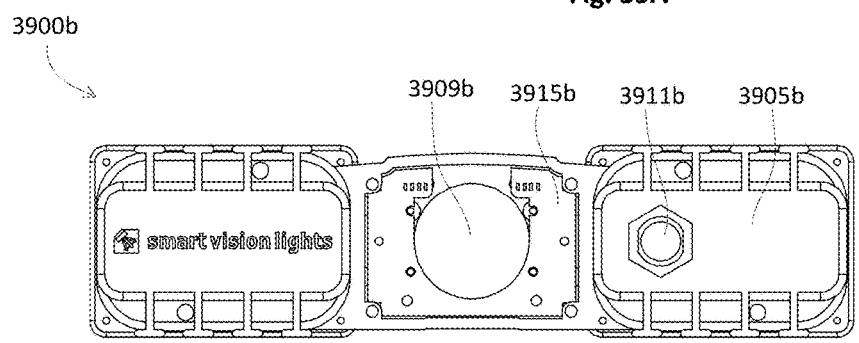
Figure 39C:
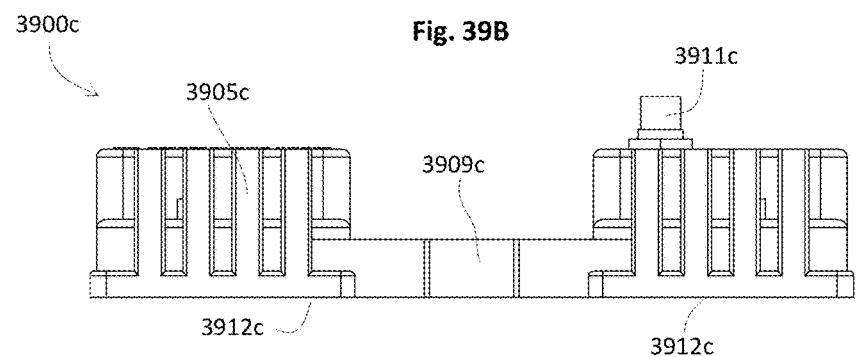
Figure 39D:
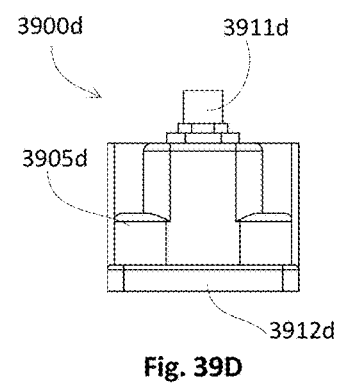
Figure 39E:
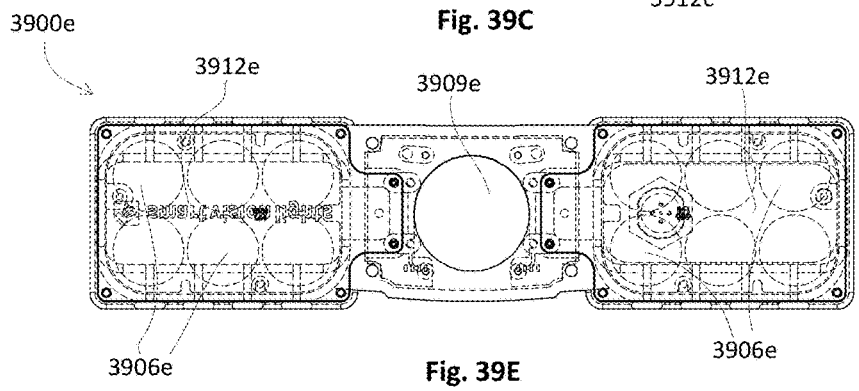

While the illumination assembly 3805a-c is shown in FIGS. 38A-C as defining a rectangular shape, the housing side portions 3814a,c, the bottom housing portion 3815a and the top housing portion 3812a-c, may define any shape (e.g., a circular shape, a hexagon shape, a square shape, a pentagon shape, a heptagon, an octagon, or any suitable polygon shape). The top housing portion 3812a-c may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The illumination assembly 3805a-c may include a camera attachment 3813b defining a camera aperture 3809a,b in at least the bottom housing portion 3615a. In addition to being adapted to attach to a camera (not shown in FIGS. 38A-D), the camera attachment 3813b may be configured to be attached to a robot (e.g., attachment 1084, 1184, or 1289 of FIGS. 10, 11, and 12, respectively) and/or a coaxial light 205 of FIG. 2. The aperture 3809a,b may extend through the top housing portion 3812a-c. Alternatively, the top housing portion 3812a-c may close off an end of the aperture 3809a,b. The illumination assembly 3805a-c may include an electrical power/control connection 3811a,c, an electrical printed circuit board (not shown in FIGS. 38A-D), a controller (not shown in FIGS. 38A-D), and a plurality of light sources (not shown in FIGS. 38A-D). The controller may be configured to receive electrical power/control signals via the first electrical power/control connection 3811a,c and may control, for example, an intensity of each of the plurality of light sources, the optical element 3812a-c, and/or a camera (not shown in FIGS. 38A-D). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 3611a,c to, for example, a camera or a second light (another illuminator), and/or receive electrical power/control signals from, for example, a camera.

An illumination assembly 3805a-c may include, for example: T-slot mounting 3821b, 3823d with T-slots 3821d defined by, for example, tabs 3824d; a DataMan 503 (Cognex Part #: DM503-HPIA) camera mount 3813b; a built in SMART driver; safe strobe technology that may ensure protected operations of LEDs; a M12 quick disconnect; and/or high speed up to 1000 Strobes Per Second. An illumination assembly 3805a-c may be incorporated into, for example, a Cognex DataMan bar coding system. An illumination assembly 3805a-c may include a laser aimer and/or laser profiler accessories for quick, intuitive alignment. An illumination assembly 3805a-c may include 12 high-intensity over drive LEDs. An illumination assembly 3805a-c may include a standard or wide projection lens 3812a-c. An illumination assembly 3805a-c may include an integrated high-pulse driver for complete control. An illumination assembly 3805a-c may be powered directly by external light controls. An illumination assembly 3805a-c may match a strobe speed of, for example, a Cognex camera to which the illumination assembly 3805a-c is mounted. An illumination assembly 3805a-c may include, for example: an optional linear polarizer kit; a 5-pin M12 connector; an operating temperature of −18° to 40° C.; an IP65 rating; CE, RoHS, and IEC 62471 compliance; red, red wide, and/or white light emitting; a built in SMART driver; and/or powered directly from a camera (e.g., a Cognex DataMan camera external light control).

With reference to FIGS. 39A-E, a machine vision system 3900a-e may include a strobe light 3905a-e similar to, for example, ring light 805a,b of FIGS. 8A and 8B, ring light 1305a-c of FIGS. 13A-C, ring light 1405a-e of FIGS. 14A-E, strobe light 3605a-e of FIGS. 36A-E, or strobe light 3705a-e of FIGS. 37A-E. The strobe light 3905a-e may include a plurality of housing side portions 3914a-e, a bottom housing portion 3615a-d and a top housing portion 3612c,d defining, for example, a rectangular shape housing. The plurality of housing side portions 3914a-d may be interconnected via, for example, a common casting, a common mold, welding. fasteners, etc.

While the strobe light 3905a-e is shown in FIGS. 39A-E as defining a rectangular shape, the housing side portions 3914a-d, the bottom housing portion 3915a-d and the top housing portion 3912c,d, may define any shape (e.g., a circular shape, a hexagon shape, a square shape, a pentagon shape, a heptagon, an octagon, or any suitable polygon shape). The top housing portion 3912c,d may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The strobe light 3905a-e may include a camera attachment 3913a-c defining a camera aperture 3909a,b,e in at least the bottom housing portion 3915a,c,e. In addition to being adapted to attach to a camera (not shown in FIGS. 39A-E), the camera attachment 3913a-c may be configured to be attached to a robot (e.g., attachment 1084, 1184, or 1289 of FIGS. 10, 11, and 12, respectively) and/or a coaxial light 205 of FIG. 2. The aperture 3909a,b,e may extend through the top housing portion 3912a-d. Alternatively, the top housing portion 3912a-d may close off an end of the aperture 3909a,b,e. The strobe light 3905a-e may include an electrical power/control connection 3911a-d, an electrical printed circuit board (not shown in FIGS. 39A-E), a controller (not shown in FIGS. 39A-E), and a plurality of light sources 3906e. The controller may be configured to receive electrical power/control signals via the electrical power/control connection 3911a-d and may control, for example, an intensity of each of the plurality of light sources 3906e, the optical element 3912a-d, and/or a camera (not shown in FIGS. 39A-E). The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 3911a-d to, for example, a camera or a second light (another illuminator), and/or receive electrical power/control signals from, for example, a camera.

A strobe light 3905a-e may include, for example: T-slot mounting 3621e; a DataMan 503 (Cognex Part #: DM503-HPIA) camera mount 3613a-c; a built in SMART driver;

safe strobe technology that may ensure protected operations of LEDs; a M12 quick disconnect; and/or high speed up to 1000 Strobes Per Second. A strobe light 3905a-e may operate at up to 500 mA of average strobing electrical current provided by a camera system with, for example, an intense and even light distribution pattern.

Turning to FIGS. 40A-E, a machine vision system 4000a-e may incorporate a strobe light 4005a-e similar to, for example, strobe light 3605a-e of FIGS. 36A-E, strobe light 3705a-e of FIGS. 37A-E, strobe light 3805a-d of FIGS. 38A-D, or strobe light 3905a-e of FIGS. 39A-E. The strobe light 4005a-e may include a plurality of housing side portions 4014a-e, a bottom housing portion 4015a-d and a top housing portion 4012c,d defining, for example, a rectangular shape housing. The plurality of housing side portions 4014a-d may be interconnected via, for example, a common casting, a common mold, welding. fasteners, etc.

While the strobe light 4005a-e is shown in FIGS. 40A-E as defining a rectangular shape, the housing side portions 4014a-d, the bottom housing portion 4015a-d and the top housing portion 4012c,d, may define any shape (e.g., a circular shape, a hexagon shape, a square shape, a pentagon shape, a heptagon, an octagon, or any suitable polygon shape). The top housing portion 4012c,d may be an optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

The strobe light 4005a-e may include a camera attachment 4013a-c defining a camera aperture 4009a,b,e in at least the bottom housing portion 4015a,c,e. In addition to being adapted to attach to a camera 4060a,c-e, the camera attachment 4013a-c may be configured to be attached to, for example, a robot (e.g., attachment 1084, 1184, or 1289 of FIGS. 10, 11, and 12, respectively) and/or a coaxial light 205 of FIG. 2. The aperture 3409a,b,e may extend through the top housing portion 4012a-d. Alternatively, the top housing portion 4012a-d may close off an end of the aperture 4009a,b,e. The strobe light 4005a-e may include an electrical power/control connection 4011c,d,e, an electrical printed circuit board (not shown in FIGS. 40A-E), a controller (not shown in FIGS. 40A-E), and a plurality of light sources (not shown in FIGS. 40A-E). The controller may be configured to receive electrical power/control signals via the electrical power/control connection 4011c,d,e and may control, for example, an intensity of each of the plurality of light sources, the optical element 4012a-d, a camera 4060a,c-e, and/or a camera optical element 4061a,c,d (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.) via, for example, a camera electrical power/control connector 4065a,c,e, 4066e, 4067e. The controller may be similar to, for example, the controller 1317b of FIG. 13B and/or 4405a of FIG. 44A. The controller may implement any portion or, or all of the functionality as described, for example, with regard to FIGS. 44A-D. The controller may provide electrical power/control signals, via the electrical power/control connection 4011c,d,e to, for example, a camera 4060a,c-e or a second light (another illuminator), and/or receive electrical power/control signals from, for example, a camera 4060a,c-e.

A strobe light 4005a-e may include, for example: T-slot mounting; a DataMan 503 (Cognex Part #: DM503-HPIA) camera mount 4013a-c; a built in SMART driver; safe strobe technology that may ensure protected operations of LEDs; a M12 quick disconnect; and/or high speed up to 1000 Strobes Per Second.

With reference to FIGS. 41A-H and J-M, a machine vision system 4100a-h,j-m may incorporate a multi-function illumination source 4105a,b. As described in detail herein, a multi-function illumination source 4105a,b may include a combination of any of the individual lights (e.g., lights of FIGS. 1-40E) as described herein. A multi-function illumination source 4105a,b may include a dual sided electrical printed circuit board 4104a, 4104c having a first set of light emitters (e.g., light emitting diodes) 4106a1, 4106b1 on a first side and oriented in a first direction, a second set of light emitters (e.g., light emitting diodes) 4106a2 on a second side and oriented in a second direction, a third set of light emitters (e.g., light emitting diodes) 4106a3 on the second side and oriented in the second direction, and a fourth set of light emitters (e.g., light emitting diodes) 4106a4 on the second side and oriented in the second direction. The first side of the PCB 4104a, 4104b1, 4104c may be opposite the second side of the PCB 4104a, 4104b1, 4104c, and the first direction may be, for example, 180° with respect to the second direction. While the multi-function illumination source 4105a,b is shown to include four sets of light emitters, any given multi-function illumination source 4105a,b may include more, or less, sets of light emitters. Alternatively, the dual sided electrical printed circuit board 4104a, 4104c may be replaced with a first single sided PCB 4104b1 and a second single sided PCB 4104b2.

The multi-function illumination source 4105a,b may include, for example, a concave reflector 4107a1, 4107b1 configured to cooperate with the first set of light emitters (e.g., light emitting diodes) 4106a1, 4106b1 to produce a dome light similar to, for example, a dome light 405 of FIG. 4. The multi-function illumination source 4105a,b may include a diffusing optical element 4107a2, 4107b2, 4107d2a, 4107d2b, 4107f2, 4107g2, 4107h2, 4107j2 configured to cooperate with the second set of light emitters (e.g., light emitting diodes) 4106a2, 4106b2, 4106c2, 4106g2, 4106h2, 4106j2, 4106k2 to produce a diffuse light similar to, for example, a diffuse light 1405a-d of FIGS. 14A-D. The multi-function illumination source 4105a,b may include a collimating optical element 4107a3, 4107b3, 4107d3a, 4107d3b, 4107f3, 4107g3, 4107h3, 4107j3 configured to cooperate with the third set of light emitters (e.g., light emitting diodes) 4106a3, 4106b3, 4106c3, 4106g3, 4106h3, 4106j3, 4106k3 to produce a direct light similar to, for example, a direct light 105 of FIG. 1. The multi-function illumination source 4105a,b may include a refracting optical element 4107a4, 4107b4, 4107d4a, 4107d4b, 4107f4, 4107g4, 4107h4, 4107j4 configured to cooperate with the fourth set of light emitters (e.g., light emitting diodes) 4106a4, 4106b4, 4106c4, 4106g4, 4106h4, 4106j4, 4106k4 to produce an indirect light similar to, for example, an indirect light 305 of FIG. 3.

Figure 41A:
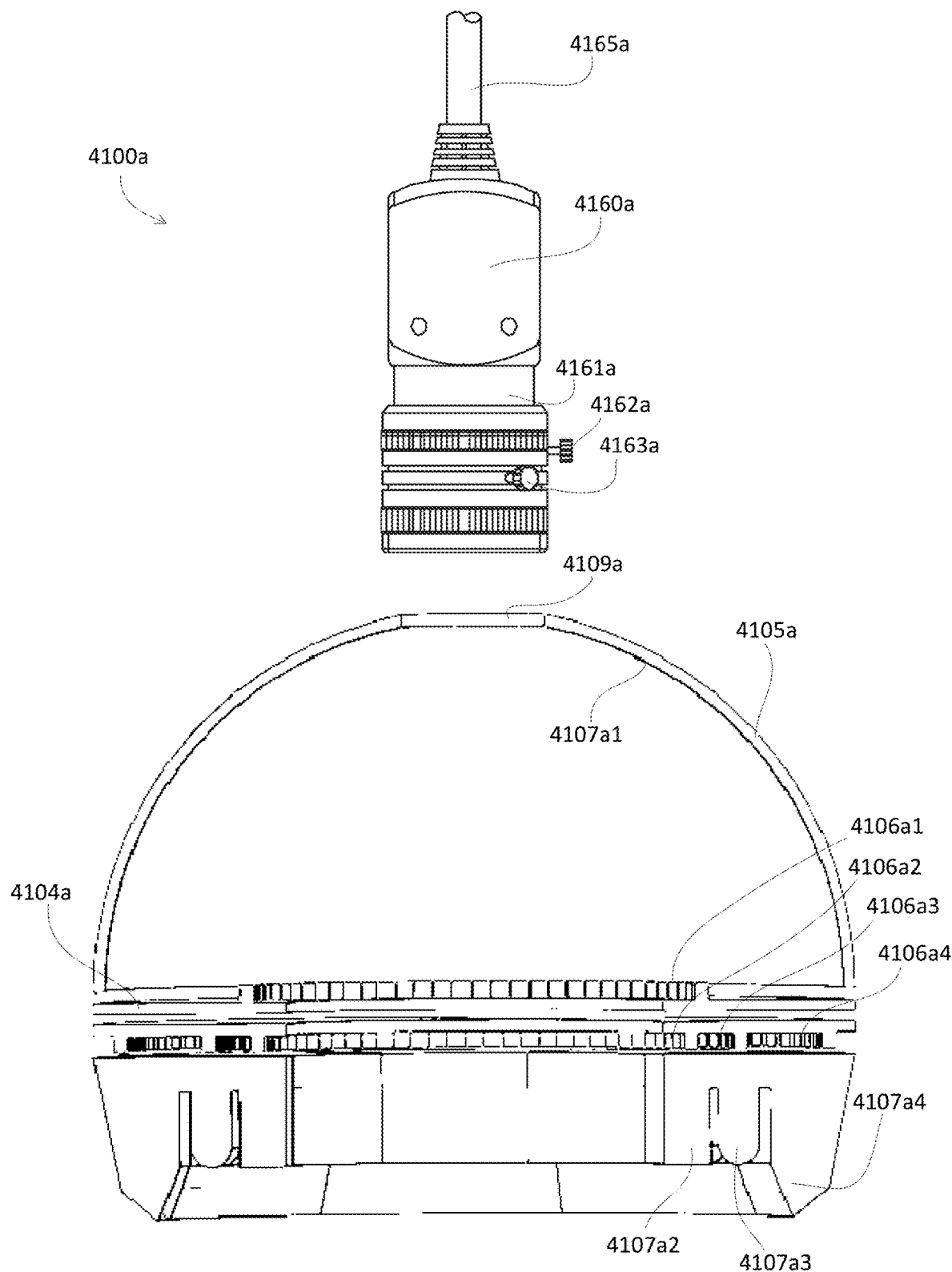
Figure 41B:
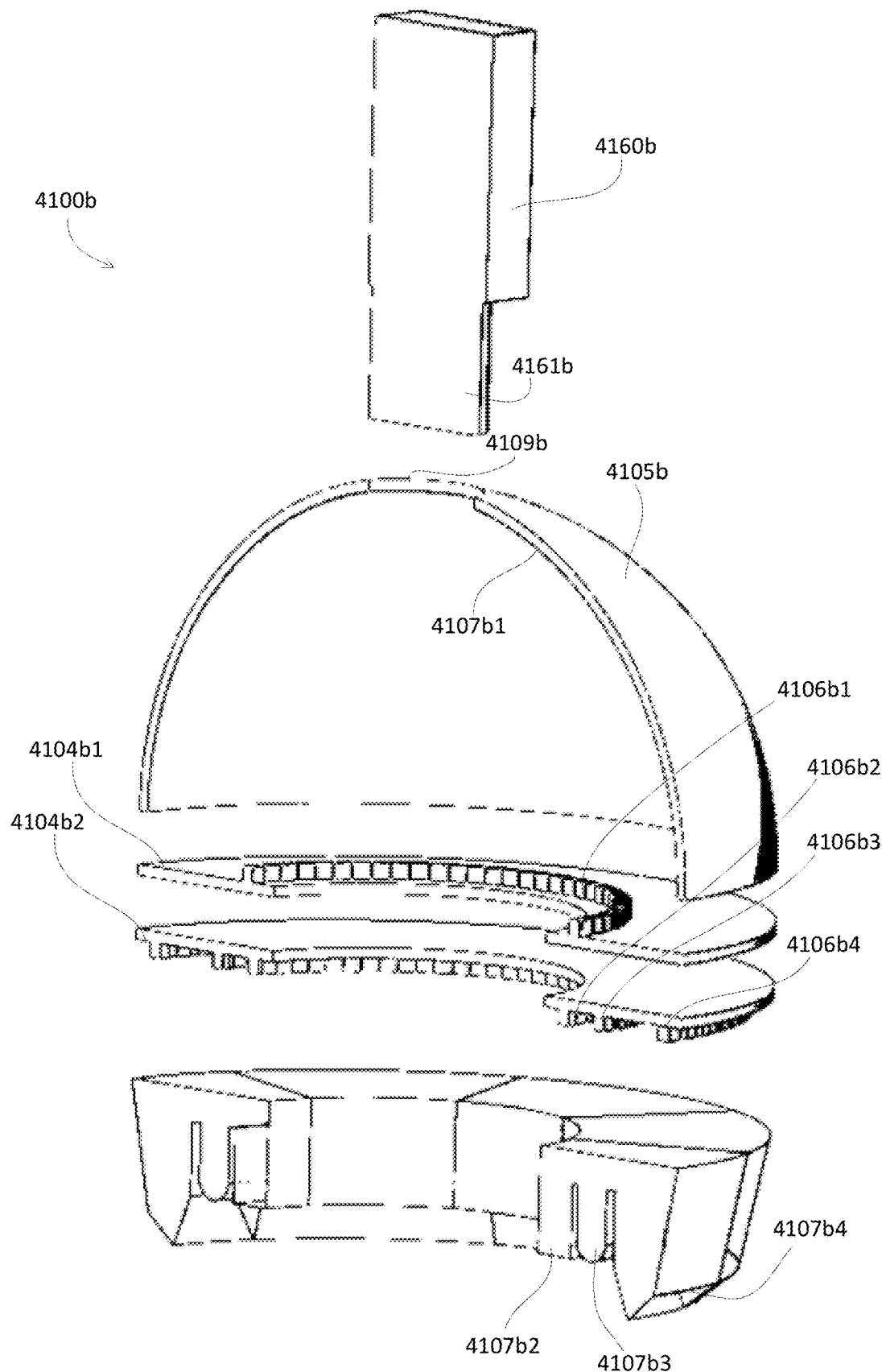
Figure 41C:
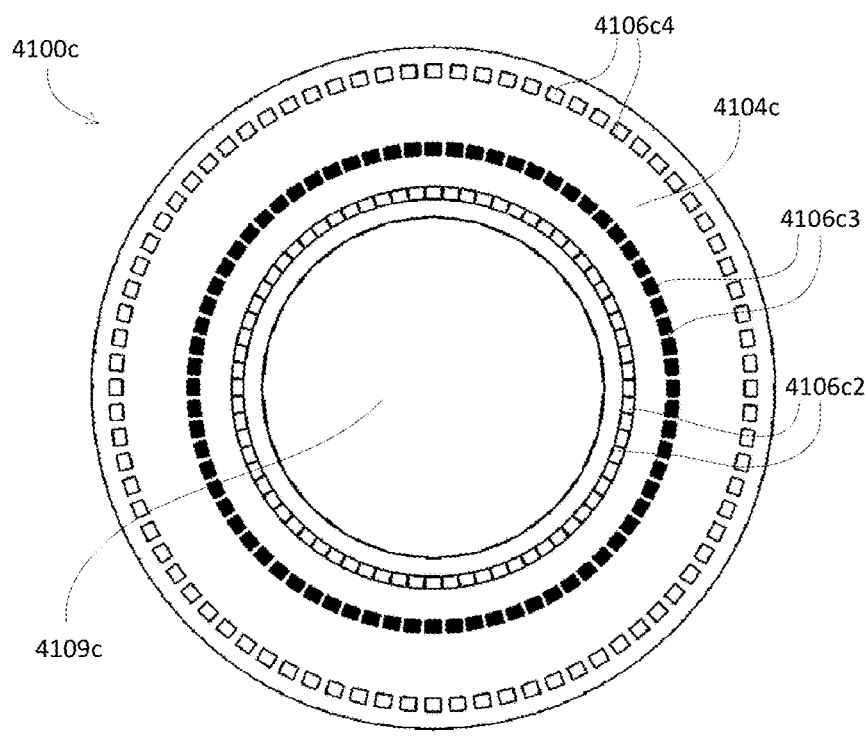
Figure 41D:
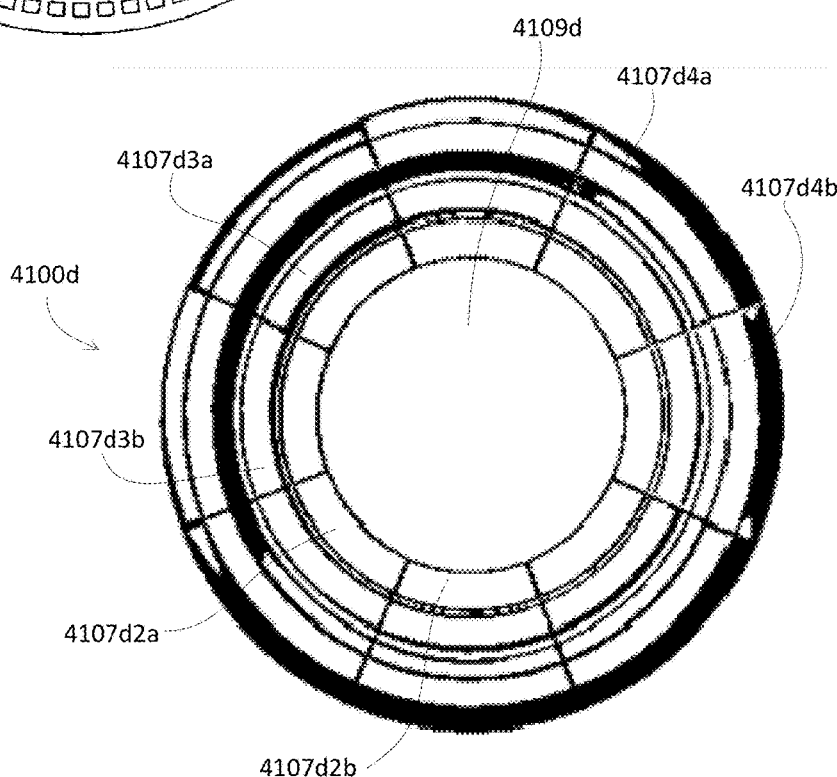
Figure 41E:
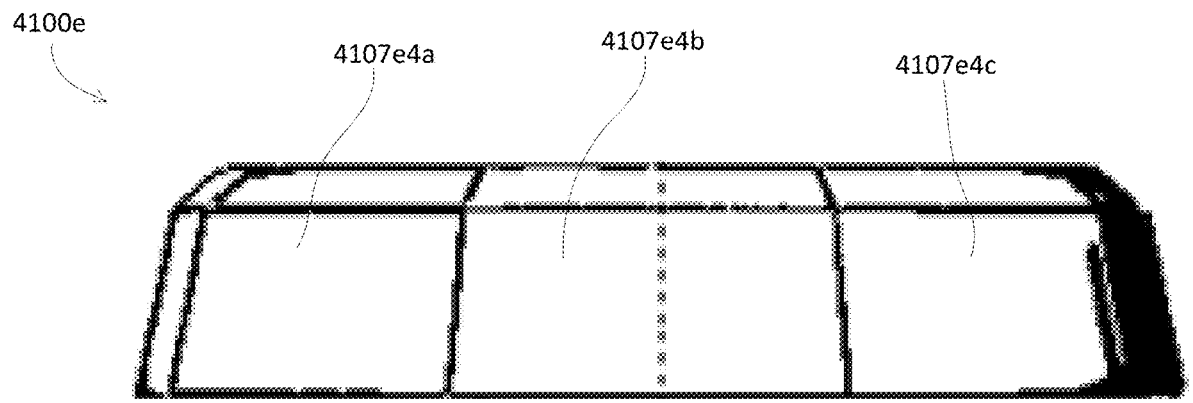

As illustrated in FIGS. 41E and 41D, any one of, or a group of, the second set of light emitters (e.g., light emitting diodes) 4106a2, 4106b2, 4106c2, 4106g2, 4106h2, 4106j2, 4106k2, any one of, or a group of, the third set of light emitters (e.g., light emitting diodes) 4106a3, 4106b3, 4106c3, 4106g3, 4106h3, 4106j3, 4106k3, or any one of, or a group of, the fourth set of light emitters (e.g., light emitting diodes) 4106a4, 4106b4, 4106c4, 4106g4, 4106h4, 4106j4, 4106k4 may be associated with a particular segment 4107d2a, 4107d2b, 4107d3a, 4107d3b, 4107d4a, 4107d4b, 4107e4a, 4107e4b, 4107e4c, respectively, of a related optical element. Thereby, a controller (e.g., controller 1317b)

may selectively energize the associated light emitter, or group of light emitters to, for example, illuminate a portion of an associated target (e.g., target 150 of FIG. 1) with light from a predetermined direction and/or predetermined angle (e.g., angle 108a) without moving the multi-function illumination source 4105a,b.

Alternatively, or additionally, any given light emitter (e.g., a single light emitting diode; a group of a red, a green, and a blue light emitting diodes; or a group of a red, a green, a blue, and a yellow light emitting diodes; etc.) may configured to emit light via a devoted optical element 4107l, 4107m. Thereby, a controller (e.g., controller 1317b) may selectively energize the associated light emitter, or group of light emitters to, for example, illuminate a portion of an associated target (e.g., target 150 of FIG. 1) with a predetermined wavelength of light from a predetermined direction and/or predetermined angle (e.g., angle 108a) multi-function illumination source 4105a,b.

While the multi-function illumination source 4105a is illustrated as including three rings of LEDs 4106a2, 4106a3, 4106a4 with corresponding optics elements 4107a2, 4107a3, 4107a4, respectively, a multi-function illumination source 4105a may include fewer, or additional, ring(s) of LEDs/optic elements. For example, a multi-function illumination source 4105a may include a first dark field illuminator 4106a4/4107a4 having an associated first angle of incidents (e.g., angle 108a of FIG. 1) and an additional, second dark field illuminator (e.g., an additional outer ring of LEDs/optic element) having an associated second angle of incidents 108a, for example, greater than the first angle of incidents. The controller 1317b may be configured to synchronize a camera 4160a to capture a sequence of images having each image within the series correlated with energizing a particular ring of LEDs.

The multi-function illumination source 4105a,b may include a camera aperture 4109a-d for incorporation of a camera 4160a, 4160b. The camera 4160a, 4160b may include an electric power/control connection 4165a and a cameral optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.) 4161a, 4161b. The controller 1317b may selectively generate camera control signals 4165a to, for example, selectively control the camera 4160a, 4160b and/or the camera optical element 4161a, 4161b. For example, the controller 1317b may selectively energize a particular light emitter, or group of light emitters, and may synchronize activation of the camera 4160a, 4160b to acquire an image of a target 150. Additionally, or alternatively, the controller 1317b may selectively control the camera optical element 4161a, 4161b in synchronization with activation of the camera 4160a, 4160b. Additionally, or alternatively, the multi-function illumination source 4105a,b may include manual controls 4162a, 4163a to, for example, enable a user to manually adjust a camera optical element 4161a, 4161b.

The controller 1317b may be configured to control a camera 4160a, 4160b (e.g., a shutter control, an auto-exposure control, a pixel integration time, a frame capture size, etc.), a camera optical element 4161a, 4161b (e.g., an aperture control, a zoom control, a focus control, etc.), and a multi-function illumination source 4105a,b (e.g., on/off control, an intensity control, a color control, a pattern control, etc.). The controller 1317b may interface with a camera 4160a, 4160b via, for example, a GenICam virtual interface layer and a physical interface (e.g., Ethernet, USB, CLHS, CoaXpress, GiGEVision, USBVision, CameraLink, CameraLinkHS, etc.). The controller 1317b may interface with a camera optical element 4161a, 4161b via, for example, an Advanced Optics Group GenICam 2019 virtual interface layer and a physical interface (e.g., Ethernet, USB, CLHS, CoaXpress, etc.). The controller 1317b may interface with a multi-function illumination source 4105a,b via, for example, a GenICam lighting 2017 virtual interface layer and a physical interface (e.g., Ethernet, USB, CLHS, CoaXpress, etc.).

In addition to being adapted to attach to a camera 4160a, 4160b, the multi-function illumination source 4105a,b may be configured to be attached to a robot (e.g., attachment 1084, 1184, or 1289 of FIGS. 10, 11, and 12, respectively) and/or a coaxial light 205 of FIG. 2. The controller 1317b may transmit a control signal to, for example, a robot controller 1071 to reorient a physical position of the multi-function illumination source 4105a,b with respect to a target 150.

While not shown in FIGS. 41a-h, j-m, the multi-function illumination source 4105a,b may include a bottom housing portion (e.g., bottom housing portion 1312a-c) (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). The aperture 4109a-d may extend through the bottom housing portion 1312a-c. Alternatively, the bottom housing portion 1312a-c may close off an end of the aperture 4109a-d. In any event, the controller may selectively control the bottom housing portion 1312a-c in synchronization with activation of the camera 4160a, 4160b.

A multi-function illumination source 4105a,b may be configured with, for example: do all foundational concepts; multi-functional light (e.g., direct light, dark field light, bright field light, diffuse light, back light, structured lighting, gradient lighting, dome lighting, stereometric lighting, polarized light, etc.); independent controls; modularity; multi-wavelength; user configurable; embedded controls; software/hardware/lights (combined functionality); modules to communicate with a controller; camera mounting/controls; and/or dynamically configurable multiplexing. A machine vision system 4100a-h, j-m may use a multi-function illumination source 4105a,b and camera(s) to inspect objects in a manufacturing and/or automated processing environment. Associated machine vision lighting applications may vary widely based on an object being illuminated. Objects can vary in shape, reflectivity, color, texture and depth. These variations can make imaging difficult. There are many different types of machine vision lighting: diffuse lighting, dark field lighting, bright-field lighting, back lighting, dome lighting, structured lighting, stereometric lighting, and many other types. Machine vision lighting system types may vary depending on an intended application. A multi-function illumination source 4105a,b may be specified and arranged specifically for an intended application. An associated machine vision lighting system may be configured for a specific type of inspection for a specific object.

Once known machine vision systems are configured, the machine vision system is usually only suitable for inspection of a specific object that the machine vision system was configured for. In many cases, if a user wants to inspect different types of objects, or the same object with slight variations in features, a lighting system often has to be reconfigured or changed. Robotic inspection systems, using specific lighting arrangements (attached to the robot), may be used to inspect many different types of objects. This presents a special case in lighting and vision where the specific object and environment becomes arbitrary. In robotic inspection, the type arbitrary object, that the vision system is able to discriminate, can be limited by the type of light being used. A multi-function illumination source 4105a,b, on the other hand, combines into one system common types of machine vision lighting types and methods to enable users to expand capabilities of an associated machine vision system, and to enable many different types of inspections with a singular lighting system.

A multi-function illumination source 4105a,b may allow a user to, for example, perform many types of inspections using only one lighting system. In many cases, a multi-function illumination source 4105a,b may be used with an associated imaging system to capture multiple images under different lighting conditions (e.g., color, spatial changes, patterns, bright-field, dark-field, UV, SWIR, etc.) to enable machine vision system discrimination of features associated with a respective target. A multi-function illumination source 4105a,b may include capabilities of a camera imaging system that may be expanded. In known lighting arrangements, on the other hand, a machine integrator would need to mount several different types of lights to achieve a similar effect.

A multi-function illumination source 4105a,b may combine several of the most common types of lighting features into a singular system (i.e., may feature a group of lights that perform a certain type of illumination). Lighting features may include, but are not limited to: all LED wavelengths and wavelength ranges available as either LED or laser light sources. A multi-function illumination source 4105a,b may be operated dynamically, where lighting angle, zone from which the light originates from, wavelength, pattern, diffusion angle, can all be controlled independently. This allows users to capture multiple images for post processing to combine the various lighting configurations into one image. A multi-function illumination source 4105a,b may be operated dynamically during the capture of a single image in order to effectively achieve the same effects one would get with image post processing. A multi-function illumination source 4105a,b may be operated in a manner where multiple lighting features can be enabled at the same time to produce customized lighting schemes. A multi-function illumination source 4105a,b may be modified/configured to add on lighting features. A multi-function illumination source 4105a,b may be configured with a variety of different lens types, whereby the features in the lenses may shape light and direct the light in a predetermined direction.

A multi-function illumination source 4105a,b may include a multifunctional lens shape, and may direct light that originates from a specific zone on an LED board. This may enable the light to produce dark-field, bright-field, diffuse, directional, and other types of light depending on the application. A multi-function illumination source 4105a,b may include optics that may be changed by, for example, removing a lens and inserting a different type of lens A multi-function illumination source 4105a,b may be controlled with an external or internal controller that uses either direct triggering or digital communications A multi-function illumination source 4105a,b may contain internal power driver circuitry and/or may be powered with external power drivers. A multi-function illumination source 4105a,b may contain an embedded microprocessor and/or field programmable gate array that can handle Input and output operations to, for example, enable communications between other devices and control power distribution to various regions within the lighting system. A multi-function illumination source 4105a,b may contain a memory that enables a user to store configurations which, may allow the user to customize and store the configuration of the multi-function illumination source 4105a,b. A multi-function illumination source 4105a,b may contain data logging abilities to store information such as temperature, light intensity, operating time, humidity, and the occurrence of past events. A multi-function illumination source 4105a,b may, for example, communicate directly with a camera system, where the camera system can directly control or configure multi-function illumination source 4105a,b. A multi-function illumination source 4105a,b may be controlled externally by a module that provides power to each of the individually controlled light zones. A multi-function illumination source 4105a,b may be controlled externally by a controller that provides proportional control level signaling. A multi-function illumination source 4105a,b may include an ability to perform power and/or control multiplexing, which may enable a user to control many different aspects of the multi-function illumination source 4105a,b without requiring a separate control line for each of the independently controlled light zones. A multi-function illumination source 4105a,b may include lighting modules, such that an end effector can be selected by a robot based on application. A multi-function illumination source 4105a,b may include controls to form a feedback loop with a camera system (e.g., referencing color target, using arbitrary camera system with our controls and lighting system to stabilize output, etc.).

With further reference to FIG. 41C, a multi-function illumination source 4105a,b may include a multizoned LED board 4104c. The multizoned LED board 4104c may include, for example: concentric LED ring zones 4106c2, 4106c3, 4106c4 to direct light to a respective optic feature; a ring split into "pie-piece" zones for (stereometric/quadrant/octant); and/or lighting zones of arbitrary LED wavelength.

Figure 41F:
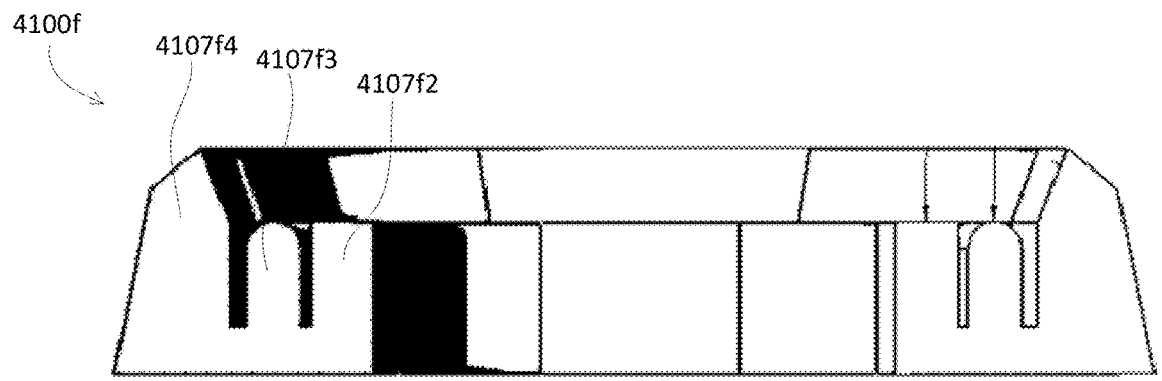
Figure 42A:
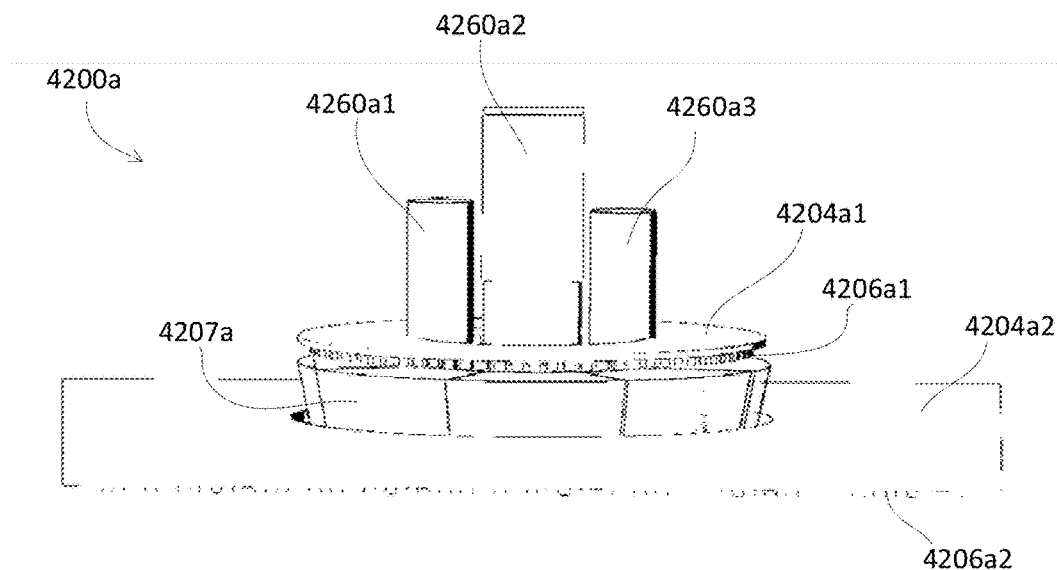
FIGS. 42A-D depict various views of an example machine vision system incorporating an example multi-function illumination source.
Figure 42B:
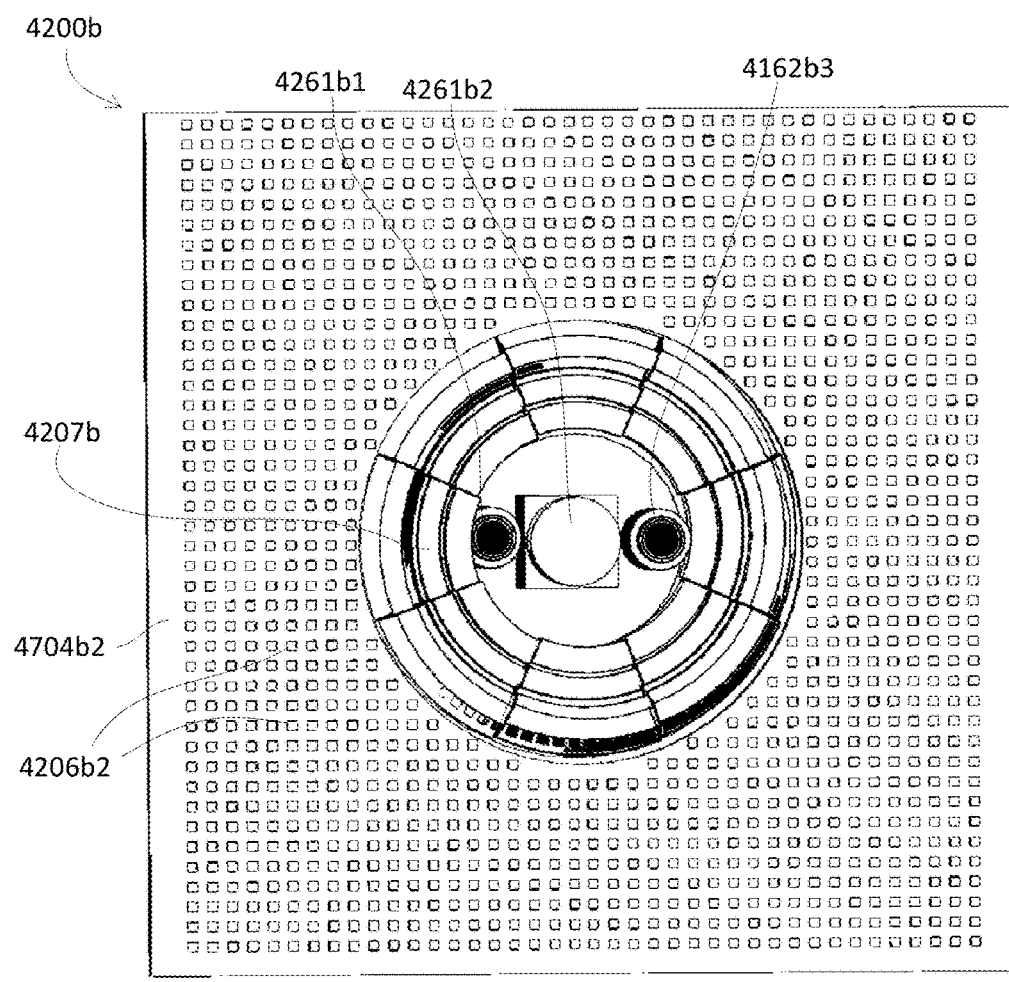
Figure 42C:
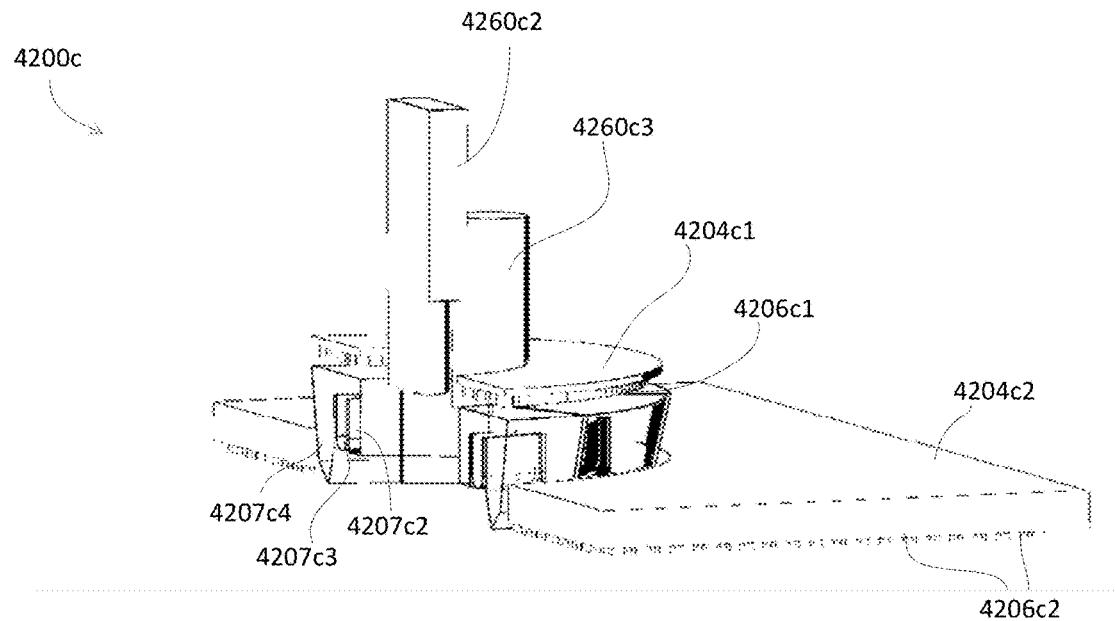
Figure 42D:
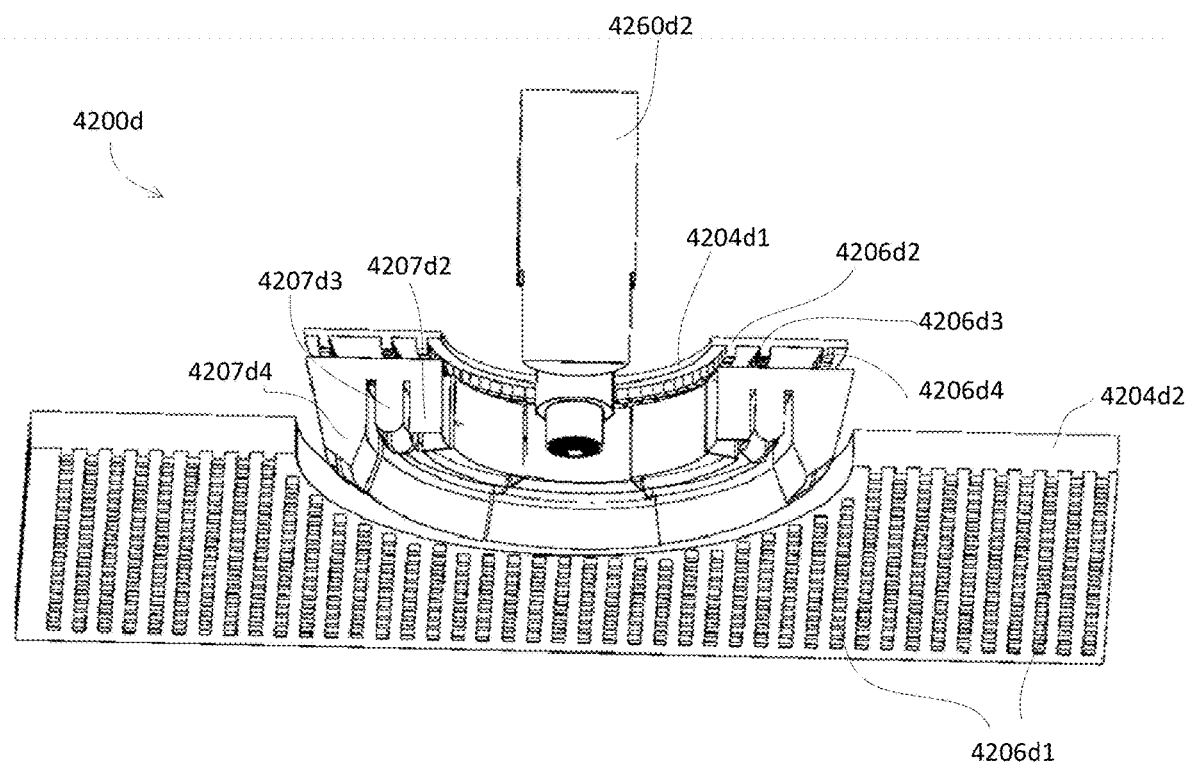

With further reference to FIGS. 41D and 41E, a multi-function illumination source 4105a,b may include a multi-functional lens structure. With further reference to FIGS. 41F-H and J-M, a multi-function illumination source 4105a,b may include a lens may include; an optic(s) is made from injection molded silicone or optically transparent material; multiple optical surfaces that may function in different ways; lens features that may be rotated about a central axis; lens features that may be individual lenses positioned arbitrarily; lens features that may be placed in an array radially or linearly; a lens/structure that may direct vertical light; a lens/structure that may focus, defocus, or collimate light; a lens/structure with a surface that may be formed with arbitrary surfaces or openings (e.g., a fresnel structure, a diffractive feature, a diffuse surface, micro-optical structures, that function as a lens holder, that function as a simple window, where a lens could be mounted to a PCB board beneath a molded lens structure, that function as a mechanical holder for a lens, a laser, a pattern generator, a detector, a camera, remote phosphor surfaces, etc.). A multi-function illumination source 4105a,b may include a dark field illumination lens feature 4107f4, 4107g4, 4107h4, 4107j4, 4107k4. A multi-function illumination source 4105a,b may include lens section with total internal reflection (TIR) to redirect a light beam at a narrow angle, typical of, for example, dark field illumination. A multi-function illumination source 4105a,b may include narrow and/or broad angle illumination lens feature 4107f3, 4107g3, 4107h3, 4107j3, 4107k3. A multi-function illumination source 4105a,b may include a lens section with refraction and TIR to, for example, direct light from an LED, or group of LEDs, and to shape the emission into either a narrow angle (FWHM<20 degrees) or a broad angle. A multi-function illumination source 4105a,b may include a diffuse surface ring light illumination 4107f2, 4107g2, 4107h2, 4107j2, 4107k2. A multi-function illumination source 4105a,b may include a lens section having a diffuse and/or arbitrary shape to direct light in all directions typical of a diffuse light source. A multi-function illumination source 4105a,b may include at least one of: LEDs that may be a multitude of independently controlled wavelengths; LEDs that may be arranged in zones that are sectioned radially or on a grid; a multifunctional lens that may be a radially symmetric geometry; a multifunctional lens that may be a rectangular type of geometry that fits into an array defined by a square or a rectangle; a lens that may be a modular section that will fit together with other lenses; a lens that may be molded and/or machined from acrylic, polycarbonate, silicone, glass, and other materials suitable for forming structures that can function as an optical element; diffractive features that may be applied to surfaces to provide wavelength dispersion; and/or Fresnel structures that may be applied to surfaces to provide separate lens features that may be added that are not part of the molded structure.

With further reference to FIGS. 41A and 41B, a multi-function illumination source 4105a,b may include a modular lighting system with camera and dome that provides dual axis lighting with beam splitter 207, where a camera is mounted to the beam splitter cube with a light shining through the cube down into the dome opening. Multi-function illumination source 4105a,b applications may include reading print from a curved shiny surface. A dome may eliminate specular hot-spots that are normally be produced from small spot light sources. With further reference to FIGS. 41E-H and J-M, a multi-function illumination source 4105a,b may include a silicone molded lens that may include at least one of: lens segments like pie slices for ring type light; segments that do different things; focused; dark field; TIR; bright field; diffuse; dome; and/or active diffuser.

Turning to FIGS. 42A-D, a machine vision system 4200a-d may incorporate a multi-function illumination source 4205a similar to, for example, the multi-function illumination source 4105a,b of FIGS. 41A and 41B, only having an additional planar illuminator 4204a2-d2/4206a2-d2 and additional camera(s) 4260a2, 4260a3. The multi-function illumination source 4205a may include a first printed circuit board 4204a1-d1 having first illuminators 4106a1, 4106c1 arranged in, for example, three rings of LEDs 4206d2, 4206d3, 4206d4. The multi-function illumination source 4205a may also include an optical element 4207a,b having, for example, three rings of optics elements 4207c2,d2, 4207c3,d3, 4207c4,d4. The multi-function illumination source 4205a may include a first camera 4260a1 having a first camera optic element 4261b1 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.), a second camera 4260a2,c2,d2 having a second camera optic element 4261b2 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.), and a third camera 4260a3,c3 having a third camera optic element 4261b3 (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.).

While not shown in FIGS. 42A-D, the multi-function illumination source 4205a,b may include a bottom housing portion (e.g., bottom housing portion 1312a-c) (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). A controller (e.g., controller 1317b of FIG. 13) may selectively control the bottom housing portion 1312a-c in synchronization with activation of any one of the cameras 4260a1, 4260a2, 4260a3.

A multi-function illumination source 4205a may include a flat panel light (e.g., an oxi dome) and structured lights 4204a2-d2/4206a2-d2. A multi-function illumination source 4205a may include multiple light modules combined. A multi-function illumination source 4205a may include structured lights (e.g., LEDs or Laser) that project a structured lighting pattern. A multi-function illumination source 4205a may include a flat panel light 4204a 2-d2/4206a2-d2 that may be zoned with, for example, independent control of any given zone. A multi-function illumination source 4205a may include a multifunctional ring light. A multi-function illumination source 4205a may include a flat panel light configured as a dome (e.g., an oxi-dome) light. A multi-function illumination source 4205a may include structured lighting of a particular wavelength (e.g., a red lighting module, a green lighting module, a blue lighting module, a yellow lighting module, etc.).

Figure 43A:
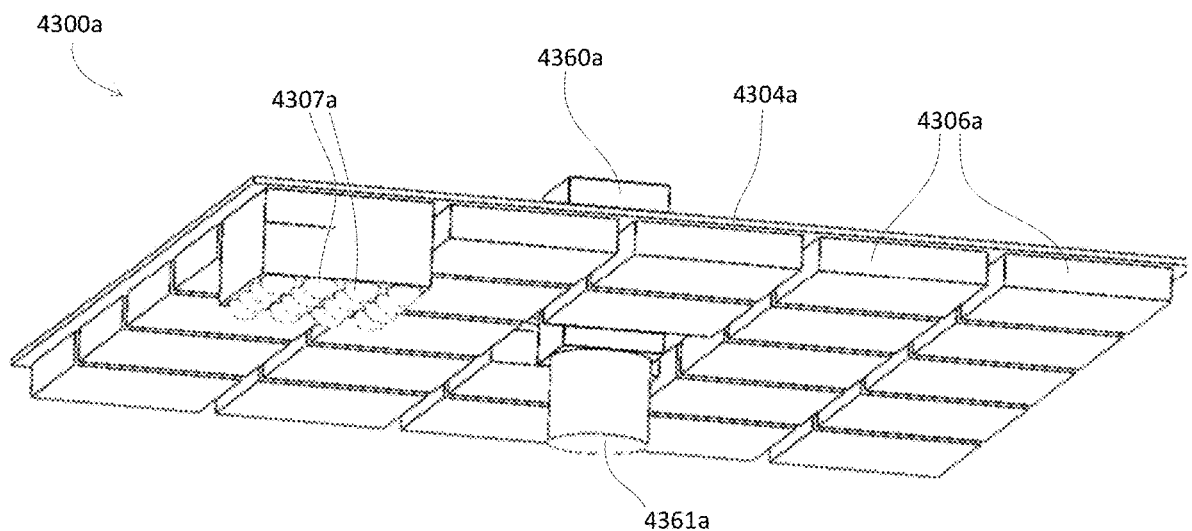
FIGS. 43A and 43B depict various views of an example machine vision system incorporating an example multi-function illumination source.
Figure 43B:
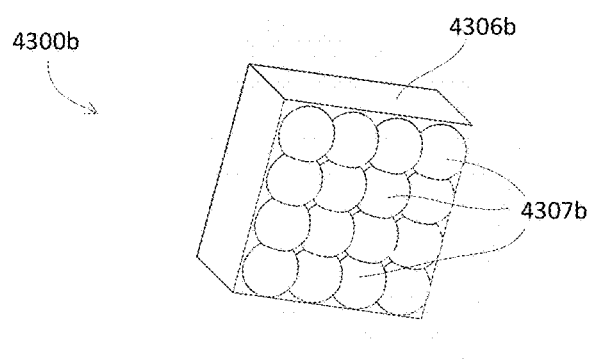

With reference to FIGS. 43A and 43B, a machine vision system 4300a,b may incorporate a multi-function illumination source 4305a and a camera 4360a having a camera optic element 4361a (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). The multi-function illumination source 4305a may be similar to, for example, the planar illuminator 4204a2-d2/4206a2-d2 of FIGS. 42A-D.

While not shown in FIG. 43A or 43B, the multi-function illumination source 4305a may include a bottom housing portion (e.g., bottom housing portion 1312a-c) (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). A controller (e.g., controller 1317b of FIG. 13) may selectively control the bottom housing portion 1312a-c in synchronization with activation of the camera 4360a.

A multi-function illumination source 4305a may include a flat panel light with multifunctional lens structures and zones. A multi-function illumination source 4305a may include a flat panel structure. A multi-function illumination source 4305a may be configured as ring light with, for example, lighting zones defined on a grid. A multi-function illumination source 4305a may include a optics 4307b may be included at each zone and/or on each LED 4306b. A multi-function illumination source 4305a may include a optical modules that mate with LED zones to get a variation of beam types (e.g., directional, dark-field, diffuse, broad angle, collimated, structured, etc.). A multi-function illumination source 4305a may include a laser diodes and/or LED's mounted with lens and/or holographic structures to produce a multitude of patterns. A multi-function illumination source 4305a may include a light modules configured in different ways. A machine vision system 4300a,b may use iterative feedback and/or machine learning systems.

Figure 44A:
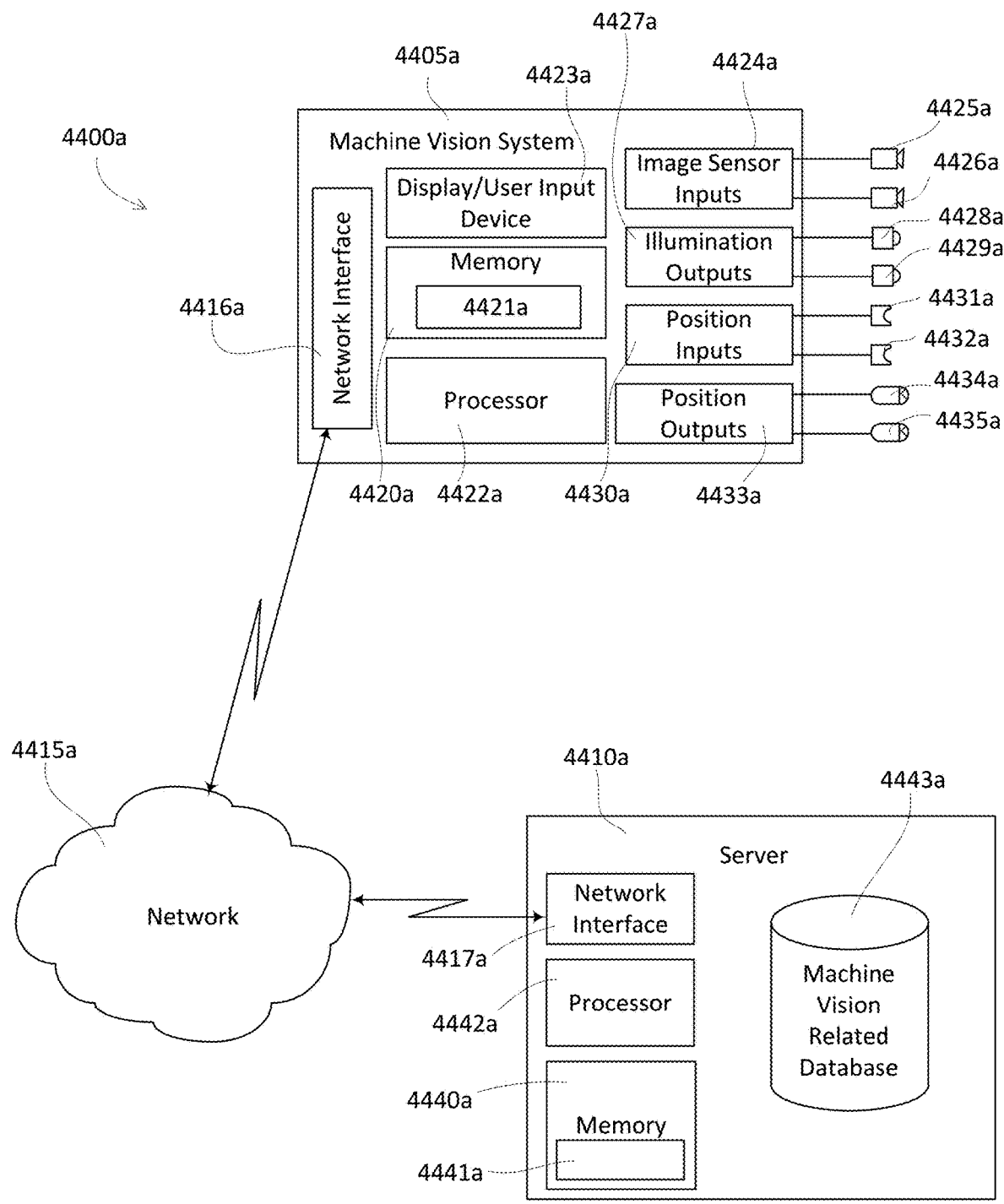
FIGS. 44A-D depict various example machine vision systems and example methods for implementation of machine vision systems.

Turning to FIGS. 44A-D, a machine vision system 4400a, 4400b, 4400c and an example method for implementation of machine vision systems 4400d are illustrated. With reference to FIG. 44A, a high-level block diagram of a machine vision system 4400a is illustrated that may implement communications between a machine vision system controller 4405a and a remote computing device 4410a (e.g., a remote server) to target inspection data to, for example, a machine vision system related database 4443a. For example, the machine vision system 4400a may acquire data from a machine vision system controller (e.g., controller 1327b of FIG. 13B) and may generate target inspection data representative of whether a particular target (or object) (e.g., target 150 of FIG. 1) includes any defect(s). The machine vision system 4400a may also acquire data from a camera (e.g., camera 100 of FIG. 1) and/or an illumination source (e.g., illumination source 105 of FIG. 1) and may determine a source of sound and volume of sound within a vehicle interior and may generate target inspection data representative of whether a particular target (or object) (e.g., target 150 of FIG. 1) includes any defect(s).

For clarity, only one machine vision system controller 4405a is depicted in FIG. 44A. While FIG. 44A depicts only one machine vision system controller 4405a, it should be understood that any number of machine vision system controllers 4405a may be supported. A machine vision system controller 4405a may include a memory 4420a and a processor 4422a for storing and executing, respectively, a module 4421a. The module 4421a may be, for example, stored in the memory 4420a as a set of computer-readable instructions, and may be related to a machine vision system inspection data generating application that, when executed by the processor 4422a, may cause target inspection data to be generated and stored in the memory 4420a. The target inspection data may be, for example, a probability that a given target includes any defect(s) and/or a severity of any defect(s). Execution of the module 4421a may also cause the processor 4422a to generate at least one illumination source 105 control signal, at least one camera 160 control signal, and/or at least one optical element 1312a control signal. Execution of the module 4421a may further cause the processor 4422a to associate the target inspection data with a particular target 150, a time and, or a date correlated with a given inspection of the target 150. Execution of the module 4421a may further cause the processor 4422a to communicate with the processor 4442a of the remote computing device 4410a via the network interface 4416a, the machine vision system controller communication network 4415a.

The machine vision system controller 4405a may further include at least one image sensor (e.g., camera and/or camera optical element) input/output 4424a communicatively connected to a first image sensor (e.g., camera and/or camera optical element) 4425a and a second image sensor (e.g., camera and/or camera optical element) 4426a. While two image sensors 4425a, 4426a are depicted in FIG. 44A, any number of image sensors may be included within a machine vision system 4400a. The processor 4422a may receive signals (e.g., image data) from the at least one image sensor (e.g., camera and/or cameral optical element) input/ output 4424a and may provide control signals to the at least one image sensor (e.g., camera and/or camera optical element) input/output 4424a to, for example, control at least one image sensor and/or at least one camera optical element (e.g., camera optical element 161 of FIG. 1).

The machine vision system controller 4405a may also include at least one illumination source input/output 4427a communicatively connected to a first illumination source 4428a and a second illumination source 4429a. While two illumination sources 4428a, 4429a are depicted in FIG. 44A, any number of illumination sources may be included within a machine vision system 4400a. The processor 4422a may receive signals (e.g., light intensity data, light color data, light polarization data, etc.) from the at least one illumination source input/output 4427a and may provide control signals to the at least one illumination source input/output 4427a to, for example, control at least one illumination source (e.g., light intensity, light color, individual light (or group of lights) within the illumination source, etc.) and/or at least one illumination source optical element (e.g., illumination source optical element 1312a of FIG. 13A).

The controller 4405a may be configured to control a camera 4425a, 4426a (e.g., a shutter control, an auto-exposure control, a pixel integration time, a frame capture size, etc.), a camera optical element 161 (e.g., an aperture control, a zoom control, a focus control, an orientation control, etc.), and a multi-function illumination source 4428a, 4429a (e.g., on/off control, an intensity control, a color control, a pattern control, a zone control, an orientation control, etc.). The controller 4405a may interface with a camera 4425a, 4426a via, for example, a GenICam virtual interface layer and a physical interface (e.g., Ethernet, USB, CLHS, CoaXpress, GiGEVision, USBVision, CameraLink, CameraLinkHS, etc.). The controller 4405a may interface with a camera optical element 161 via, for example, an Advanced Optics Group GenICam 2019 virtual interface layer and a physical interface (e.g., Ethernet, USB, CLHS, CoaXpress, etc.). The controller 4405a may interface with a multi-function illumination source 4428a, 4429a via, for example, a GenICam lighting 2017 virtual interface layer and a physical interface (e.g., Ethernet, USB, CLHS, CoaXpress, etc.).

The machine vision system controller 4405a may further include at least one position/orientation input 4430a communicatively connected to a first position/orientation sensor 4431a and a second position/orientation sensor 4432a. While two position/orientation sensors 4431a, 4432a are depicted in FIG. 44A, any number of position/orientation sensors may be included within a machine vision system 4400a. The processor 4422a may receive position/orientation input data, from the at least one position/orientation input 4430a, that may be, for example, representative of a position/orientation of at least one illumination source 105, a position/orientation of at least one camera 160, a position/orientation of at least one target 150, and/or a position/orientation of at least one robot attachment (e.g., robot attachment 1084 of FIG. 10). Alternatively, or additionally, the position/orientation input data may representative of a position/orientation of at least one illumination source 105, a position/orientation of at least one camera 160, a position/orientation of at least one target 150, and/or a position/orientation of at least one robot attachment 1084 relative at least one other a position/orientation of at least one illumination source 105, a position/orientation of at least one camera 160, a position/orientation of at least one target 150, and/or a position/orientation of at least one robot attachment 1084.

The machine vision system controller 4405a may also include at least one position/orientation output 4433a communicatively connected to a first position/orientation actuator 4434a and a second position/orientation actuator 4435a. While two position/orientation actuators 4434a, 4435a are depicted in FIG. 44A, any number of position/orientation actuators may be included within a machine vision system 4400a. The processor 4422a may generate position/orientation output data, and provide the position/orientation output data to the at least one position/orientation output 4433a, that may be, for example, representative of a desired position/orientation of at least one illumination source 105, a desired position/orientation of at least one camera 160, a desired position/orientation of at least one target 150, and/or a desired position/orientation of at least one robot attachment 1084. Alternatively, or additionally, the position/orientation output data may representative of a desired position/orientation of at least one illumination source 105, a desired position/orientation of at least one camera 160, a desired position/orientation of at least one target 150, and/or a desired position/orientation of at least one robot attachment 1084 relative at least one other a desired position/orientation of at least one illumination source 105, a desired position/orientation of at least one camera 160, a desired position/orientation of at least one target 150, and/or a desired position/orientation of at least one robot attachment 1084.

The machine vision system controller 4405a may further include a display/user input device 4423a. The processor 4422a may generate a user interface on the display/user input device 4423a that, for example, enables a user to program the machine vision system 4400a to perform a particular target inspection and/or to monitor a particular target inspection. The user interface display/user input device 4423a may be, for example, included within a Smart phone, a tablet computer, a laptop computer, a desk top personal computer system, etc. The user interface display/user input device 4423a may enable "plug and play" functionality for a camera, a camera optical element, and/or an illumination source via, for example, a GenICam, GenICcam 2019, or GenICam lighting 2017, respectively, application programming interface. For example, the user interface display/user input device 4423a may include a device discover selection icon, a device configuration selection icon, a device connection selection icon, a device disconnect selection icon, etc.

The user interface display/user input device 4423a may include device data and statistics (e.g., run-time statistics) information about a camera, a camera optical element, and/or an illumination source. The user interface display/user input device 4423a may include device data (e.g., a device model number, a device serial number, a device firmware version, etc.), reference data (e.g., a datasheet, a factory measure output, calibration data, etc.), settings/status (e.g., analog line enable/disable, analog minimum level, trigger input enable/disable, trigger level/switch points, post trigger delay, etc.), and/or run-time statistics (e.g., light ON time—normal/overdrive, number of triggers/trigger errors, intensity value—normal/overdrive, maximum duty cycle—normal/overdrive, maximum strobe time—normal/overdrive, maximum/minimum current to light, maximum temperature, etc.). Alternatively, or additionally, the user interface display/user input device 4423a may include a continuous selection icon, an overdrive selection icon, a link zones slide selector, a zone 1 slide selector and percentage slide bar indicator/selector, a zone 2 slide selector and percentage slide bar indicator/selector, a zone 3 slide selector and percentage slide bar indicator/selector, a flash selector icon, a back selector icon, a save selector icon, etc.

The network interface 4416a may be configured to facilitate communications between the machine vision system controller 4405a and the remote computing device 4410a via any hardwired, fiber optic, or wireless communication network 4415a, including for example a wireless LAN, MAN or WAN, WiFi, the Internet, a Bluetooth connection, radio frequency, light transmission (e.g., infrared, etc.), or any combination thereof. Moreover, the machine vision system controller 4405a may be communicatively connected to the remote computing device 4415a via any suitable communication system, such as via any publicly available or privately owned communication network, including those that use wired, fiber optic, wireless communication structures, such as wireless communication networks, including for example, wireless LANs and WANs, satellite and cellular telephone communication systems, etc. Communications between the machine vision system controller 4405a and the remote computing device 4415a may, for example, conform to various internet of things (Iot) standards. The machine vision system controller 4405a may cause target inspection related data to be stored in a remote computing device 4410a memory 4440a and/or a remote machine vision related database 4443a.

The remote computing device 4410a may include a memory 4440a and a processor 4442a for storing and executing, respectively, a module 4441a. The module 4441a may be stored in the memory 4440a as, for example, a set of computer-readable instructions, and may facilitate applications related to collecting machine vision related data. The module 4441a may also facilitate communications between the remote computing device 4410a and the machine vision system controller 4405a via a network interface 4417a and the network 4415a, and other functions and instructions related to performing machine vision target inspections.

The remote computing device 4410a may be communicatively coupled to a machine vision related database 4443a. While the machine vision related database 4443a is shown in FIG. 44A as being communicatively coupled to the remote computing device 4410a, it should be understood that the machine vision related database 4443a may be located within separate remote servers (or any other suitable computing devices) communicatively coupled to the remote computing device 4410a. Optionally, portions of machine vision related database 4443a may be associated with memory modules that are separate from one another, such as a memory 4422a of the machine vision system controller 4405a. The machine vision related database 4443a may include, for example, current target inspection data, previously classified target inspection data, target inspection routines, image data analysis routines, illumination source control routines, camera control routines, user interface generation routines, optical element control routines, etc.

Figure 44B:
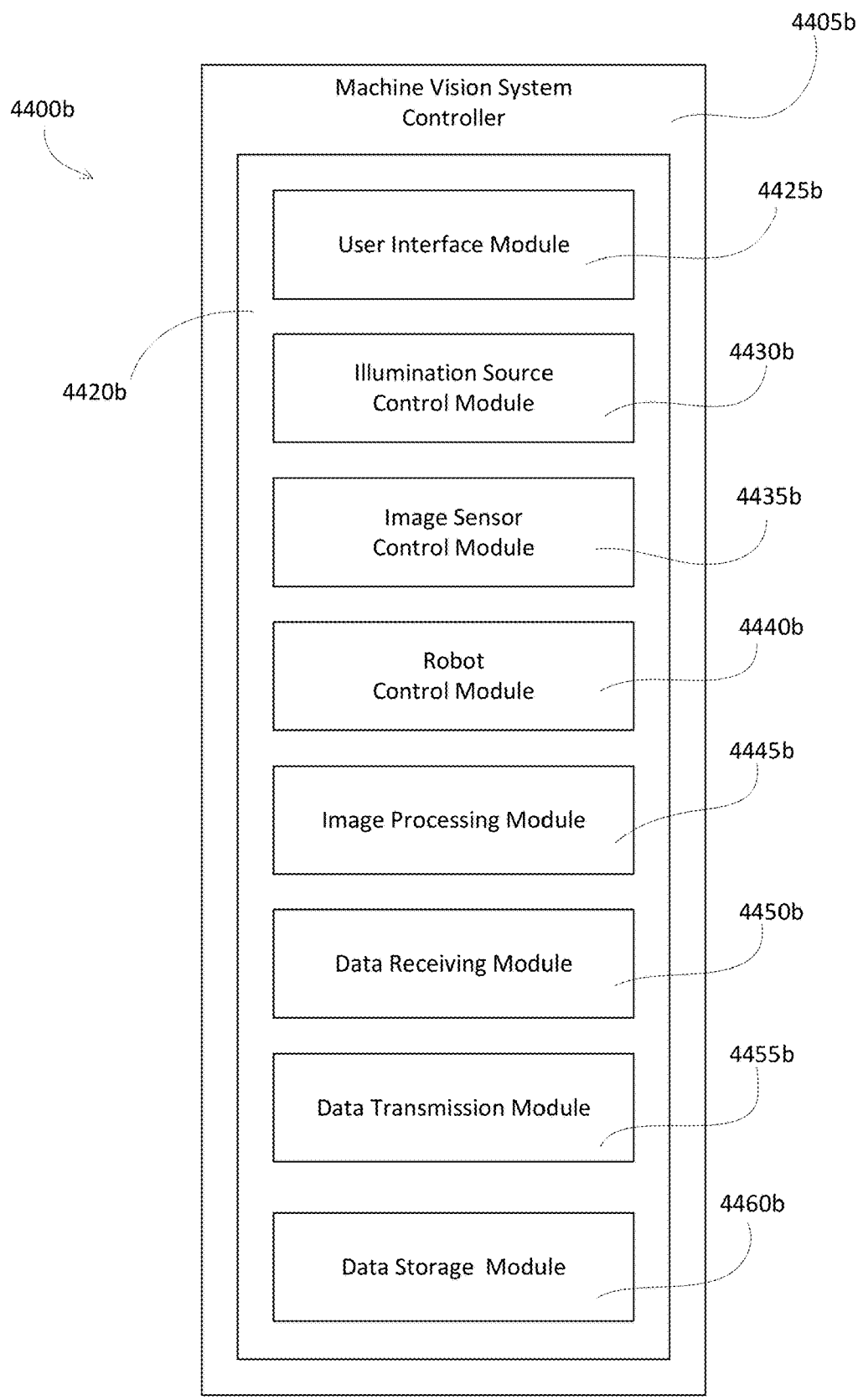
Figure 44C:
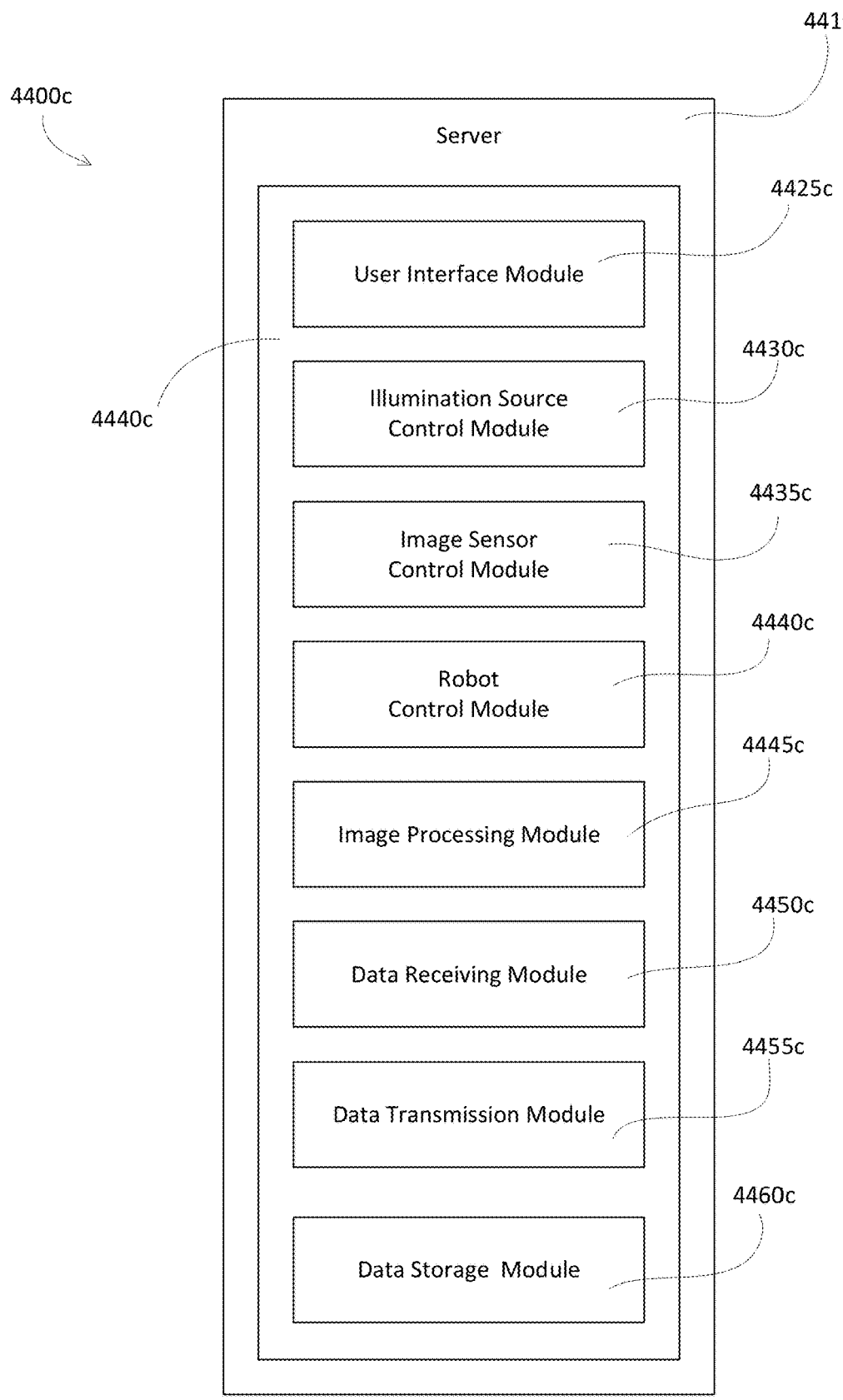
Figure 44D:
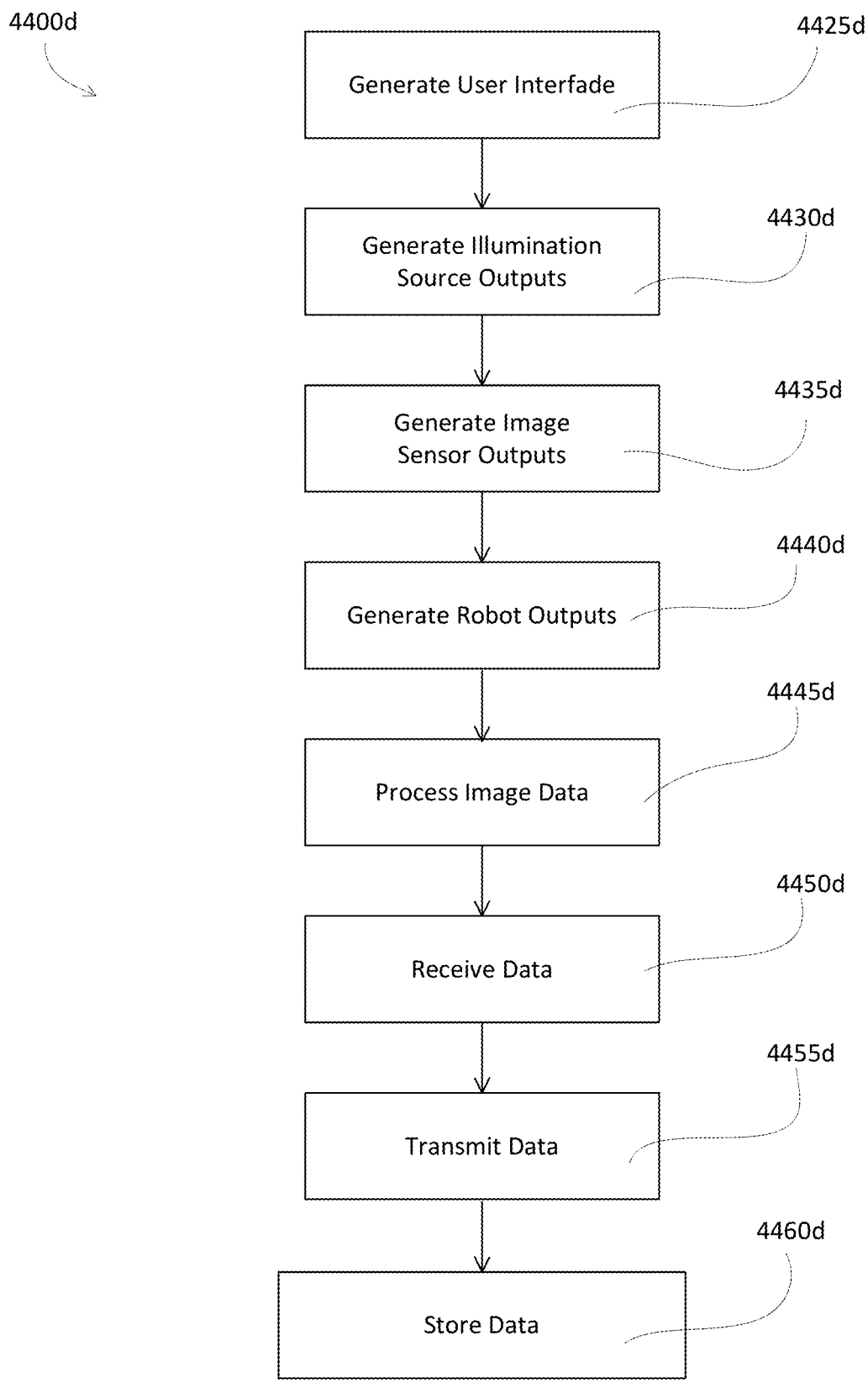

Turning to FIGS. 44B-D, a machine vision system controller 4405b of machine vision system 4400b and a remote computing device 4410c are depicted, respectively, along with a method of generating a machine vision related data file 4400d and, or transmitting machine vision related data between the machine vision system controller 4405b and the remote server 4400c. The machine vision system controller 4405b may be similar to, for example, the machine vision system controller 4405a of FIG. 44A. The remote computing device 4410c may be similar to, for example, the remote computing device 4410a of FIG. 44A. The method 4400d may be implemented by executing the modules 4425b-4460b on a processor (e.g., processor 4422a) and/or by executing the modules 4425c-4460c on a processor (e.g., processor 4442a).

In any event, the machine vision system controller 4405b may include a user interface module 4425b, an illumination source control module 4430b, an image sensor control module 4435*b*, a robot control module 4440*b*, an image processing module 4445*b*, a data receiving module 4450*b*, a data transmission module 4455*b*, and a data storage module 4460*b* stored in a memory 4420*b* as, for example, computer-readable instructions. Alternatively, the modules 4425*b*-4460*b* may be, at least in part, hardware modules (e.g., discrete electrical components/circuits, an application specific integrated circuit (ASIC), logic circuits, a field programmable gate array (FPGA), etc.). The modules 4425*b*-4460*b* may be similar to, for example, module 4421*a* of FIG. 44A.

The remote computing device 4410*c* 4405*b* may include a user interface module 4425*c*, an illumination source control module 4430*c*, an image sensor control module 4435*c*, a robot control module 4440*c*, an image processing module 4445*c*, a data receiving module 4450*c*, a data transmission module 4455*c*, and a data storage module 4460*c* stored in a memory 4440*c* as, for example, computer-readable instructions. Alternatively, the modules 4425*c*-4460*c* may be, at least in part, hardware modules (e.g., discrete electrical components/circuits, an application specific integrated circuit (ASIC), logic circuits, a field programmable gate array (FPGA), etc.). The modules 4425*c*-4460*c* may be similar to, for example, module 4441*a* of FIG. 44A.

The processor 4422*a* may execute the user interface module 4425*b* to cause the processor 4422*a* to, for example, generate a user interface display (block 4425*d*). The user interface display may, for example, enable a user to enter target data, illumination source data, camera data, robot data, etc. The user interface display may also enable a user to, for example, monitor an ongoing target inspection. The target data may include data representative of, for example: dimensions of a target; a target position/orientation; a target movement speed/position; surface characteristics of a target; expected target defects; previously classified image data for a target with no defects; previously classified image data for a target with defects; a sub-combination thereof; or a combination thereof. The illumination source data may include data representative of, for example: a type of an illumination source; a desired intensity output; a desired sequence of intensity outputs; a desired color output; a desired sequence of color outputs; a desired illumination source optical element state; a desired sequence of illumination source optical element states; a desired illumination source position/orientation; a desired sequence of illumination source positions/orientations; a desired illumination source strobe cycle; a desired sequence of strobe cycles; a sub-combination thereof; or a combination thereof. The camera data may include data representative of, for example: a type of camera; a desired position/orientation of a camera; a desired sequence of camera positions/orientations; a desired camera optical element state; a desired sequence of camera optical element states; a desired image acquisition cycle for a camera; a desired series of image acquisition cycles for a camera; a desired image area to be acquired from a camera; a sequence of desired image areas to be acquired from a camera; a sub-combination thereof; or a combination thereof. The robot data may include data representative of, for example: a type of robot; a desired position/orientation of a robot camera/illumination source attachment; a camera/illumination source to be grasped by a robot; a location/orientation of a camera/illumination source to be grasped by a robot; a sequence of desired robot camera/illumination source attachment positions/orientations; a sub-combination thereof; or a combination thereof.

The processor 4422*a* may execute the illumination source control module 4430*b* to cause the processor 4422*a* to, for example, generate at least one illumination source control signal (block 4430*d*). The illumination source control signal may be representative of, for example: a desired intensity output; a desired sequence of intensity outputs; a desired color output; a desired sequence of color outputs; a desired illumination source optical element state; a desired sequence of illumination source optical element states; a desired illumination source position/orientation; a desired sequence of illumination source positions/orientations; a desired illumination source strobe cycle; a desired sequence of strobe cycles; a sub-combination thereof; or a combination thereof.

The processor 4422*a* may execute the illumination source control module 4430*b* to cause the processor 4422*a* to, for example, generate at least one illumination source control signal (block 4430*d*) based on camera characteristics (e.g., "white balance" the light source). For example, the processor 4422*a* may control a blue LED, a green LED and a red LED such that an intensity of the blue LED and an intensity of the red LED, relative to an intensity of the green LED, are "white balanced" with characteristics of an associated camera. Thereby, an associated machine vision system signal-to-noise ratio may be improved compared to use of a non-white balanced illumination source. Additionally, or alternatively, a phosphor may be added to, for example, a blue-green light emitter and the processor 4422*a* may control an intensity of the light emitter. As another alternative, or addition, the processor 4422*a* may control a tungsten light emitter, a xenon light emitter, a fluorescent light emitter, a metal halide light emitter, a sodium vapor light emitter, a combination thereof, or a combination thereof to produce "white balance" illumination to match characteristics of an associate camera. As a further addition, or alternative, the processor 4422*a* my control a camera (e.g., vary pixel integration times, vary a pixel gain, dynamically vary pixel integration, dynamically vary pixel gain, etc.) based on illumination source characteristics to "white balance" a machine vision system.

The processor 4422*a* may execute the image sensor control module 4435*b* to cause the processor 4422*a* to, for example, generate at least one image sensor control signal (block 4435*d*). The image sensor control signal may be representative of, for example: a desired position/orientation of a camera; a desired sequence of camera positions/orientations; a desired camera optical element state; a desired sequence of camera optical element states; a desired image acquisition cycle for a camera; a desired series of image acquisition cycles for a camera; a desired image area to be acquired from a camera; a sequence of desired image areas to be acquired from a camera; a sub-combination thereof; or a combination thereof.

The processor 4422*a* may execute the robot control module 4440*b* to cause the processor 4422*a* to, for example, generate at least one robot control signal (block 4440*d*). The robot control signal may be representative of, for example: a desired position/orientation of a robot camera/illumination source attachment; a camera/illumination source to be grasped by a robot; a location/orientation of a camera/illumination source to be grasped by a robot; a sequence of desired robot camera/illumination source attachment positions/orientations; a sub-combination thereof; or a combination thereof.

The processor 4422*a* may execute the image processing module 4445*b* to cause the processor 4422*a* to, for example, process image data received by the processor 4422*a* from at least one image sensor (block 4445*d*). The processor 4422*a* may implement the method 4400*d* to, for example, execute a photometric stereo application that may use, a three-dimensional (3D) surface orientation of a given light source (or group of light sources), and the associated effect on reflected light, to produce a contrast image accentuating local 3D surface variations on a target 150.

The processor 4422a may execute the image processing module 4445b to cause the processor 4422a to, for example, analyze current image data representative of a target to determine if the target is free of defects, or if the target includes defect(s). As opposed to determined that the target does include a defect, the processor 4422a may generate a value indicative of a probability that a target includes a defect. In a particular example, the processor 4422a may determine an initial probability that a target includes a defect, and may generate an illumination source control output, a camera control output, and/or a robot control output, based upon the initial probability. Subsequent to determining the initial probability that a target includes a defect, and generating the illumination source control output, the camera control output, and/or the robot control output, the processor 4422a may generate a second probability of whether the target includes a defect. The processor 4422a may determine whether the target includes a defect based upon the initial probability and the second probability. The processor 4422a may, for example, determine whether the target includes a defect using a probability function, where the initial probability and the second probability may be weighted, via associated weighting values.

As a specific example, the processor 4422a may generate an initial illumination source control signal to cause, for example, a multi-function illumination source 4100a-h, j-m to initially energize a predetermined set of LEDs, generate an initial camera control signal to cause a camera 4160a to acquire initial image data, and process the initial image data to generate an initial probability of whether a target includes a defect. If the processor 4422a determines that the initial probability that the target includes a defect is less than, for example, 80% certain, the processor 4422a may generate a second illumination source control signal and/or a second camera control signal that cause the illumination source to energize a different set of LEDs and/or generate a robot control signal to reposition the illumination source and/or the camera. Subsequently, the processor 4422a may generate a second camera control signal to cause the camera to acquire second image data, and may determine a second probability that the target includes a defect based upon the second image data. The processor 4422a may determine whether the target includes a defect based upon the initial probability and the second probability using, for example, a probability function.

A machine vision system may include a plurality of processors 4422a, a plurality of light sources and/or a multi-function illumination source, multiple cameras, and may implement parallel processing of image data that is representative of a plurality of sequentially acquired, or simultaneously acquired, images of a target. A processor 4422a (a group of processors) may determine whether a target includes a defect based upon image data that is representative of a series of images with each image being acquired with an illumination source and/or a camera being repositioned/reoriented with respect to one another and/or being repositioned/reoriented with respect to an associated target, relative to a preceding image and/or subsequent image. The processor 4422a may generate an illumination source control signal, a camera control signal, and/or a robot control signal based upon the processor 4422a processing a previously acquired image.

An associated machine vision system may, thereby, implement any sub-combination of, or combination of: dark field illumination; bright field illumination; direct illumination; back light illumination; diffuse illumination; color of illumination; polarization of illumination; intensity of illumination; any other form of illumination as described herein to determine whether a target includes a defect. Similarly, a processor 4422a may employ any of the mathematical relations between photons (e.g., energy, polarization, frequency, angle of instance, etc.), optical properties (e.g., refraction, polarization, reflection, absorption, photoluminescence, transmittance, diffraction, dispersion, dichroism, scattering, birefringence, color, photosensitivity, etc.), and/or material characteristics (e.g., isotropic, anisotropic, refractive index, etc.), as described herein, to determine whether a given target includes defect.

The processor 4422a may determine whether a target includes a defect by comparing current image data to previously classified imaged data. Alternatively, or additionally, the current image data may be representative of features extracted from current image data and the previously classified image data may be representative of previously classified features extracted from previously acquired image data. The processor 4422a may determine whether a target includes a defect by comparing features extracted from current image data and previously classified features extract from previously acquired imaged data.

The processor 4422a may execute the data receiving module 4450b to cause the processor 4422a to, for example, to receive machine vision system data from, for example, a remote computing device 4410a (block 4450d). The machine vision system data may be representative of, for example: target data; illumination source data; camera data; robot data; current image data (e.g., image data representative of a target currently being inspected along with, for example, a day/time stamp); previously classified target image data (e.g., target image data representative of a target with defects, target image data representative of a target without defects, etc.); a sub-combination thereof; or a combination thereof. The target data may include data that is representative of, for example, a current target being inspected. The illumination source data may include data that is representative of, for example: an actual current illumination source intensity output; an actual current illumination source color output; an actual current illumination source optical element state; an actual current illumination source position/orientation; a sub-combination thereof; or a combination thereof. The camera data may include data that is representative of, for example: current image data; an actual current camera optical element state; an actual current camera position/orientation; a sub-combination thereof; or a combination thereof. The robot data may include data that is representative of, for example: an actual current robot attachment position/orientation.

The processor 4422a may execute the data transmission module 4455b to cause the processor 4422a to, for example, transmit machine vision system data to, for example, a remote computing device 4410a (block 4455d). The machine vision system data may be representative of, for example: target data; illumination source data; camera data; robot data; current image data (e.g., image data representative of a target currently being inspected along with, for example, a day/time stamp); previously classified target image data (e.g., target image data representative of a target with defects, target image data representative of a target without defects, etc.); a sub-combination thereof; or a combination thereof. The target data may include data that is representative of, for example, a current target being inspected. The illumination source data may include data that is representative of, for example: an actual current illumination source intensity output; an actual current illumination source color output; an actual current illumination source optical element state; an actual current illumination source position/orientation; a sub-combination thereof; or a combination thereof. The camera data may include data that is representative of, for example: current image data; an actual current camera optical element state; an actual current camera position/orientation; a sub-combination thereof; or a combination thereof. The robot data may include data that is representative of, for example: an actual current robot attachment position/orientation.

The processor 4422a may execute the data storage module 4460b to cause the processor 4422a to, for example, store machine vision system data in, for example, memory 4420a (block 4460d). The machine vision system data may be representative of, for example: target data; illumination source data; camera data; robot data; current image data (e.g., image data representative of a target currently being inspected along with, for example, a day/time stamp); previously classified target image data (e.g., target image data representative of a target with defects, target image data representative of a target without defects, etc.); a sub-combination thereof; or a combination thereof. The target data may include data that is representative of, for example, a current target being inspected. The illumination source data may include data that is representative of, for example: an actual current illumination source intensity output; an actual current illumination source color output; an actual current illumination source optical element state; an actual current illumination source position/orientation; a sub-combination thereof; or a combination thereof. The camera data may include data that is representative of, for example: current image data; an actual current camera optical element state; an actual current camera position/orientation; a sub-combination thereof; or a combination thereof. The robot data may include data that is representative of, for example: an actual current robot attachment position/orientation.

The processor 4442a may execute the user interface module 4425c to cause the processor 4442a to, for example, generate a user interface display (block 4425d). The user interface display may, for example, enable a user to enter target data, illumination source data, camera data, robot data, etc. The user interface display may also enable a user to, for example, monitor an ongoing target inspection. The target data may include data representative of, for example: dimensions of a target; a target position/orientation; a target movement speed/position; surface characteristics of a target; expected target defects; previously classified image data for a target with no defects; previously classified image data for a target with defects; a sub-combination thereof; or a combination thereof. The illumination source data may include data representative of, for example: a type of an illumination source; a desired intensity output; a desired sequence of intensity outputs; a desired color output; a desired sequence of color outputs; a desired illumination source optical element state; a desired sequence of illumination source optical element states; a desired illumination source position/orientation; a desired sequence of illumination source positions/orientations; a desired illumination source strobe cycle; a desired sequence of strobe cycles; a sub-combination thereof; or a combination thereof. The camera data may include data representative of, for example: a type of camera; a desired position/orientation of a camera; a desired sequence of camera positions/orientations; a desired camera optical element state; a desired sequence of camera optical element states; a desired image acquisition cycle for a camera; a desired series of image acquisition cycles for a camera; a desired image area to be acquired from a camera; a sequence of desired image areas to be acquired from a camera; a sub-combination thereof; or a combination thereof. The robot data may include data representative of, for example: a type of robot; a desired position/orientation of a robot camera/illumination source attachment; a camera/illumination source to be grasped by a robot; a location/orientation of a camera/illumination source to be grasped by a robot; a sequence of desired robot camera/illumination source attachment positions/orientations; a sub-combination thereof; or a combination thereof.

The processor 4442a may execute the illumination source control module 4430c to cause the processor 4442a to, for example, generate at least one illumination source control signal (block 4430d). The illumination source control signal may be representative of, for example: a desired intensity output; a desired sequence of intensity outputs; a desired color output; a desired sequence of color outputs; a desired illumination source optical element state; a desired sequence of illumination source optical element states; a desired illumination source position/orientation; a desired sequence of illumination source positions/orientations; a desired illumination source strobe cycle; a desired sequence of strobe cycles; a sub-combination thereof; or a combination thereof.

The processor 4442a may execute the image sensor control module 4435c to cause the processor 4442a to, for example, generate at least one image sensor control signal (block 4435d). The image sensor control signal may be representative of, for example: a desired position/orientation of a camera; a desired sequence of camera positions/orientations; a desired camera optical element state; a desired sequence of camera optical element states; a desired image acquisition cycle for a camera; a desired series of image acquisition cycles for a camera; a desired image area to be acquired from a camera; a sequence of desired image areas to be acquired from a camera; a sub-combination thereof; or a combination thereof.

The processor 4442a may execute the robot control module 4440c to cause the processor 4442a to, for example, generate at least one robot control signal (block 4440d). The robot control signal may be representative of, for example: a desired position/orientation of a robot camera/illumination source attachment; a camera/illumination source to be grasped by a robot; a location/orientation of a camera/illumination source to be grasped by a robot; a sequence of desired robot camera/illumination source attachment positions/orientations; a sub-combination thereof; or a combination thereof.

The processor 4442a may execute the image processing module 4445c to cause the processor 4442a to, for example, process image data received by the processor 4442a from at least one image sensor (block 4445d). The processor 4442a may implement the method 4400d to, for example, execute a photometric stereo application that may use, a three-dimensional (3D) surface orientation of a given light source (or group of light sources), and the associated effect on reflected light, to produce a contrast image accentuating local 3D surface variations on a target 150.

The processor 4442a may execute the image processing module 4445b to cause the processor 4442a to, for example, analyze current image data representative of a target to determine if the target is free of defects, or if the target includes defect(s). As opposed to determined that the target does include a defect, the processor 4442a may generate a value indicative of a probability that a target includes a defect. In a particular example, the processor 4442a may determine an initial probability that a target includes a defect, and may generate an illumination source control output, a camera control output, and/or a robot control output, based upon the initial probability. Subsequent to determining the initial probability that a target includes a defect, and generating the illumination source control output, the camera control output, and/or the robot control output, the processor 4442a may generate a second probability of whether the target includes a defect. The processor 4442a may determine whether the target includes a defect based upon the initial probability and the second probability. The processor 4442a may, for example, determine whether the target includes a defect using a probability function, where the initial probability and the second probability may be weighted, via associated weighting values.

As a specific example, the processor 4442a may generate an initial illumination source control signal to cause, for example, a multi-function illumination source 4100a-h, j-m to initially energize a predetermined set of LEDs, generate an initial camera control signal to cause a camera 4160a to acquire initial image data, and process the initial image data to generate an initial probability of whether a target includes a defect. If the processor 4442a determines that the initial probability that the target includes a defect is less than, for example, 80% certain, the processor 4442a may generate a second illumination source control signal and/or a second camera control signal that cause the illumination source to energize a different set of LEDs and/or generate a robot control signal to reposition the illumination source and/or the camera. Subsequently, the processor 4442a may generate a second camera control signal to cause the camera to acquire second image data, and may determine a second probability that the target includes a defect based upon the second image data. The processor 4442a may determine whether the target includes a defect based upon the initial probability and the second probability using, for example, a probability function.

A machine vision system may include a plurality of processors 4442a, a plurality of light sources and/or a multi-function illumination source, multiple cameras, and may implement parallel processing of image data that is representative of a plurality of sequentially acquired, or simultaneously acquired, images of a target. A processor 4442a (a group of processors) may determine whether a target includes a defect based upon image data that is representative of a series of images with each image being acquired with an illumination source and/or a camera being repositioned/reoriented with respect to one another and/or being repositioned/reoriented with respect to an associated target, relative to a preceding image and/or subsequent image. The processor 4442a may generate an illumination source control signal, a camera control signal, and/or a robot control signal based upon the processor 4442a processing a previously acquired image.

An associated machine vision system may, thereby, implement any sub-combination of, or combination of: dark field illumination; bright field illumination; direct illumination; back light illumination; diffuse illumination; color of illumination; polarization of illumination; intensity of illumination; any other form of illumination as described herein to determine whether a target includes a defect. Similarly, a processor 4442a may employ any of the mathematical relations between photons (e.g., energy, polarization, frequency, angle of instance, etc.), optical properties (e.g., refraction, polarization, reflection, absorption, photoluminescence, transmittance, diffraction, dispersion, dichroism, scattering, birefringence, color, photosensitivity, etc.), and/or material characteristics (e.g., isotropic, anisotropic, refractive index, etc.), as described herein, to determine whether a given target includes defect.

The processor 4442a may determine whether a target includes a defect by comparing current image data to previously classified imaged data. Alternatively, or additionally, the current image data may be representative of features extracted from current image data and the previously classified image data may be representative of previously classified features extracted from previously acquired image data. The processor 4442a may determine whether a target includes a defect by comparing features extracted from current image data and previously classified features extract from previously acquired imaged data.

The processor 4442a may execute the data receiving module 4450c to cause the processor 4442a to, for example, receive machine vision system data from, for example, a machine vision system controller 4405a (block 4450d). The machine vision system data may be representative of, for example: target data; illumination source data; camera data; robot data; current image data (e.g., image data representative of a target currently being inspected along with, for example, a day/time stamp); previously classified target image data (e.g., target image data representative of a target with defects, target image data representative of a target without defects, etc.); a sub-combination thereof; or a combination thereof. The target data may include data that is representative of, for example, a current target being inspected. The illumination source data may include data that is representative of, for example: an actual current illumination source intensity output; an actual current illumination source color output; an actual current illumination source optical element state; an actual current illumination source position/orientation; a sub-combination thereof; or a combination thereof. The camera data may include data that is representative of, for example: current image data; an actual current camera optical element state; an actual current camera position/orientation; a sub-combination thereof; or a combination thereof. The robot data may include data that is representative of, for example: an actual current robot attachment position/orientation.

The processor 4442a may execute the data transmission module 4455c to cause the processor 4442a to, for example, transmit machine vision system data to, for example, a machine vision system controller 4405a (block 4455d). The machine vision system data may be representative of, for example: target data; illumination source data; camera data; robot data; current image data (e.g., image data representative of a target currently being inspected along with, for example, a day/time stamp); previously classified target image data (e.g., target image data representative of a target with defects, target image data representative of a target without defects, etc.); a sub-combination thereof; or a combination thereof. The target data may include data that is representative of, for example, a current target being inspected. The illumination source data may include data that is representative of, for example: an actual current illumination source intensity output; an actual current illumination source color output; an actual current illumination source optical element state; an actual current illumination source position/orientation; a sub-combination thereof; or a combination thereof. The camera data may include data that is representative of, for example: current image data; an actual current camera optical element state; an actual current camera position/orientation; a sub-combination thereof; or a combination thereof. The robot data may include data that is representative of, for example: an actual current robot attachment position/orientation.

The processor 4442a may execute the data storage module 4460b to cause the processor 4442a to, for example, store machine vision system data in, for example, a memory 4440a and/or machine vision relate database 4437a (block 4460d). The machine vision system data may be representative of, for example: target data; illumination source data; camera data; robot data; current image data (e.g., image data representative of a target currently being inspected along with, for example, a day/time stamp); previously classified target image data (e.g., target image data representative of a target with defects, target image data representative of a target without defects, etc.); a sub-combination thereof; or a combination thereof. The target data may include data that is representative of, for example, a current target being inspected. The illumination source data may include data that is representative of, for example: an actual current illumination source intensity output; an actual current illumination source color output; an actual current illumination source optical element state; an actual current illumination source position/orientation; a sub-combination thereof; or a combination thereof. The camera data may include data that is representative of, for example: current image data; an actual current camera optical element state; an actual current camera position/orientation; a sub-combination thereof; or a combination thereof. The robot data may include data that is representative of, for example: an actual current robot attachment position/orientation.

With referenced to FIGS. 45A-H, a light emitting diode (LED) driver circuit 4500a-h may include an input module 4505a, a controller 4506a and a LED driver 4507a. The input module 4505a may include a NPN input, a PNP input and/or an analog input (e.g., 0-5$V_{dc}$, 0-10$V_{dc}$, etc.). The controller 4506a may be, for example, similar to controller 1317b of FIG. 13B.

Figure 45A:
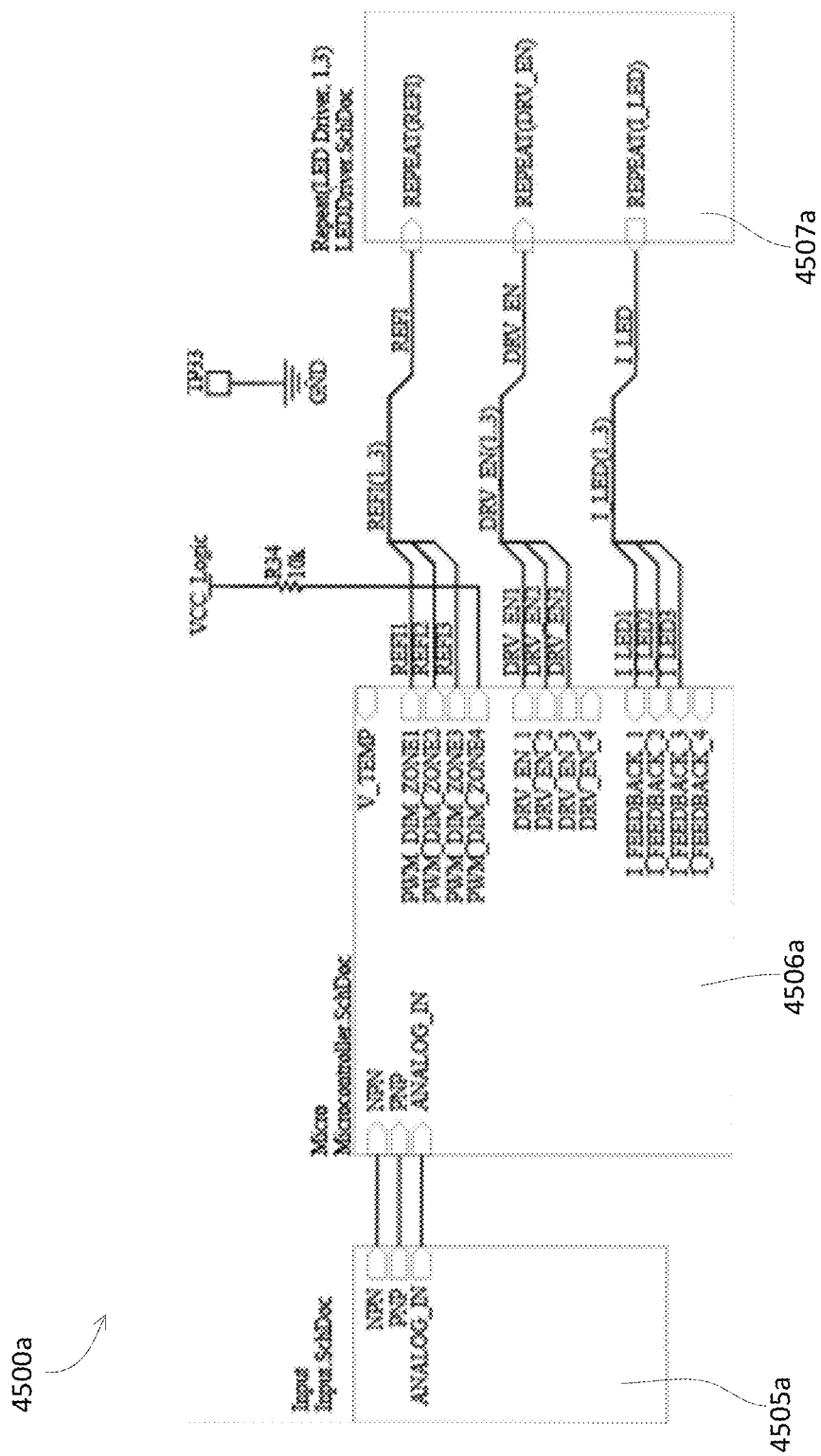
FIGS. 45A-H depict an example light emitting diode driver circuit.
Figure 45B:
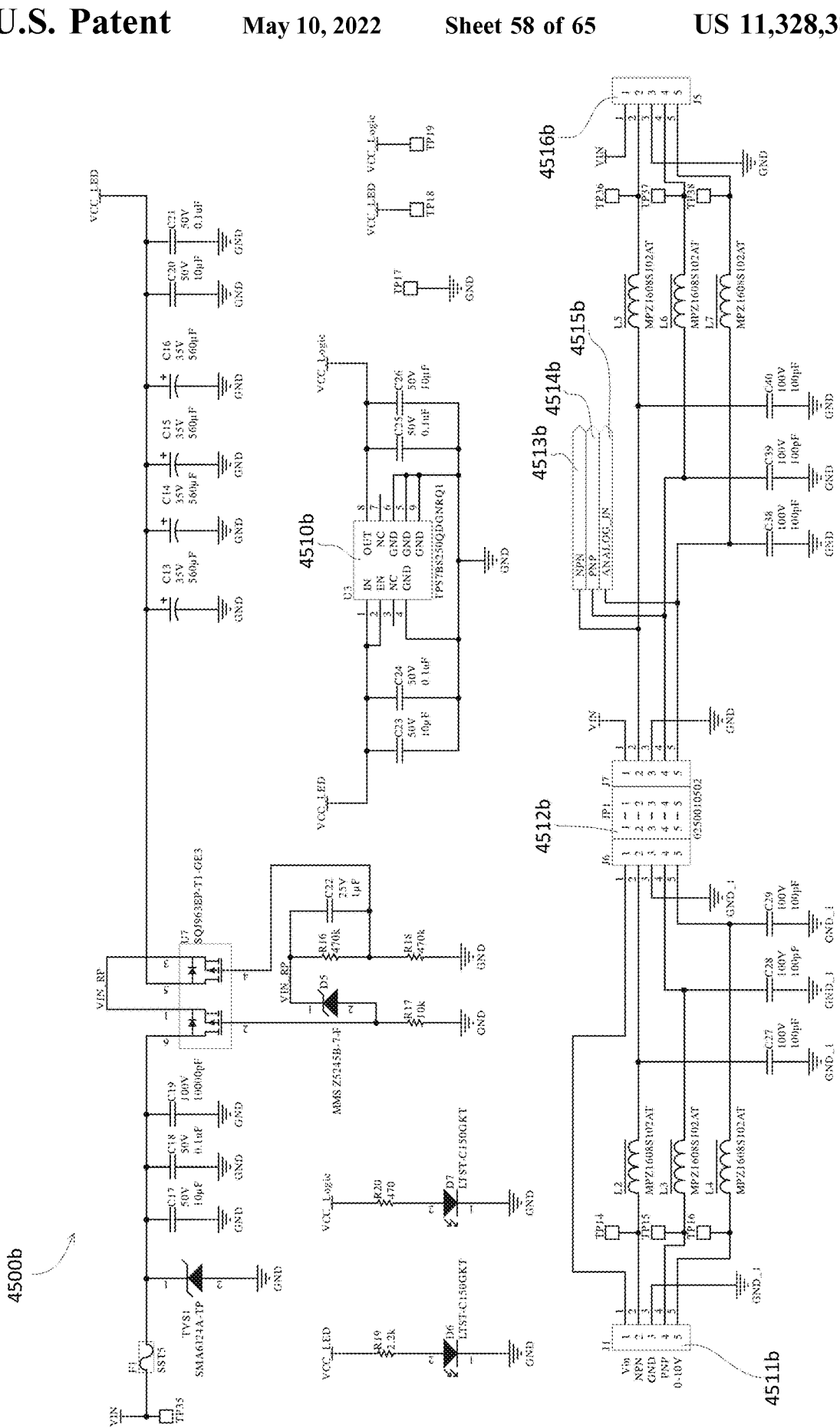
Figure 45C:
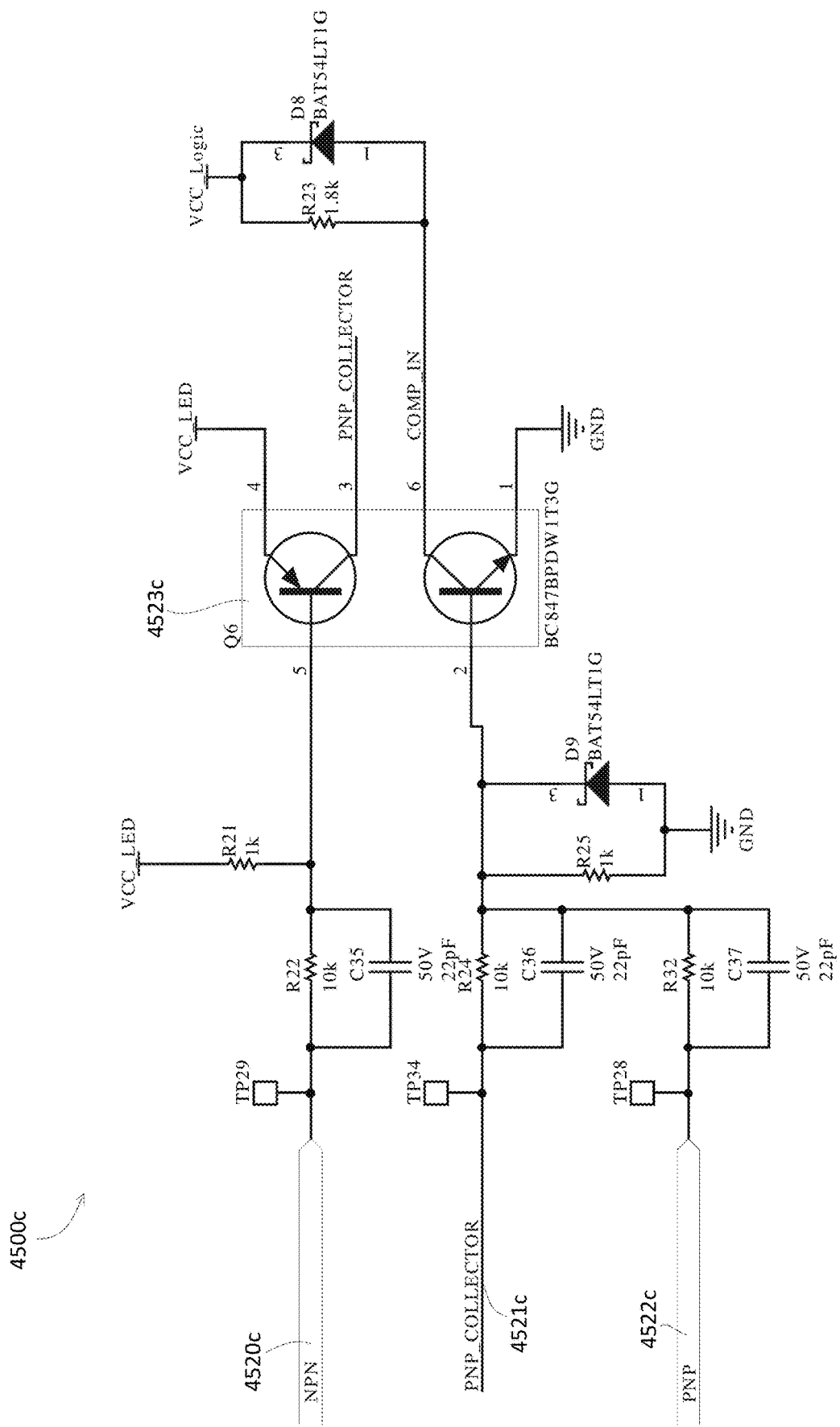
Figure 45D:
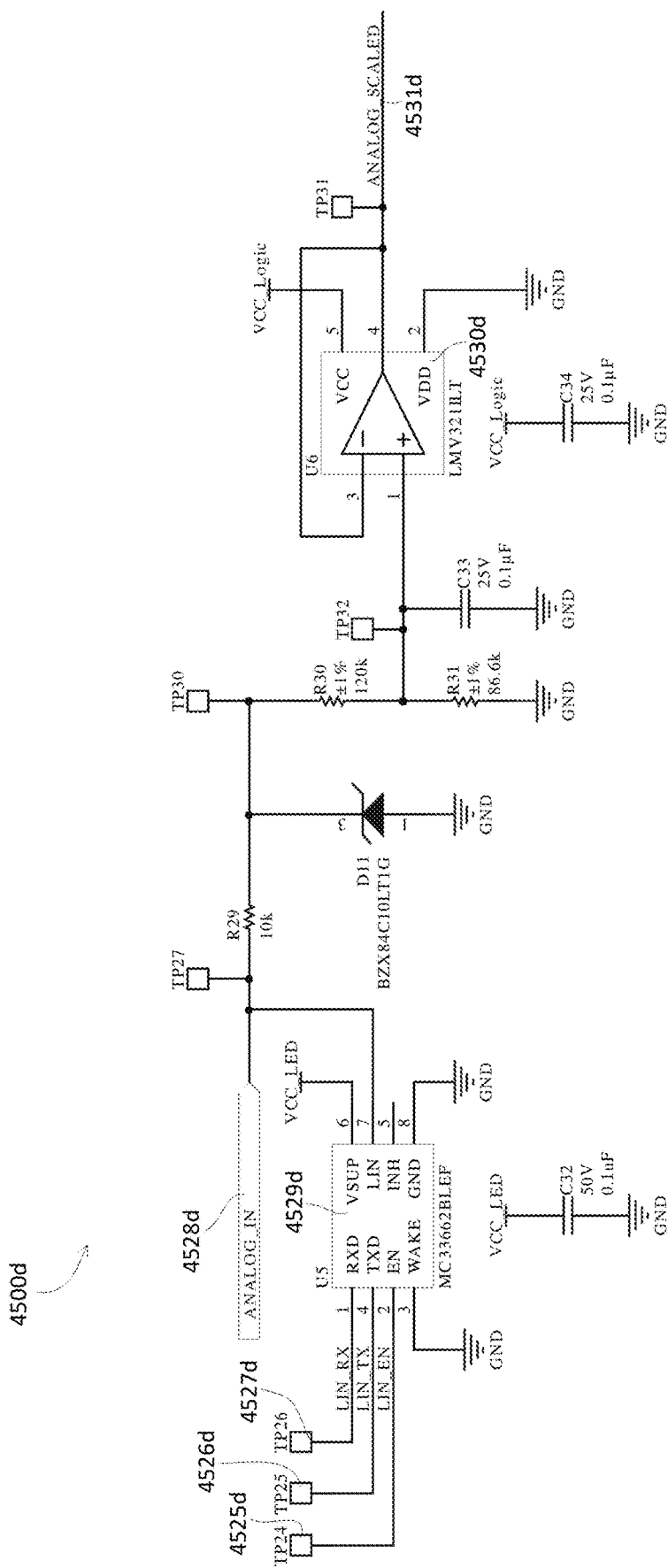
Figure 45E:
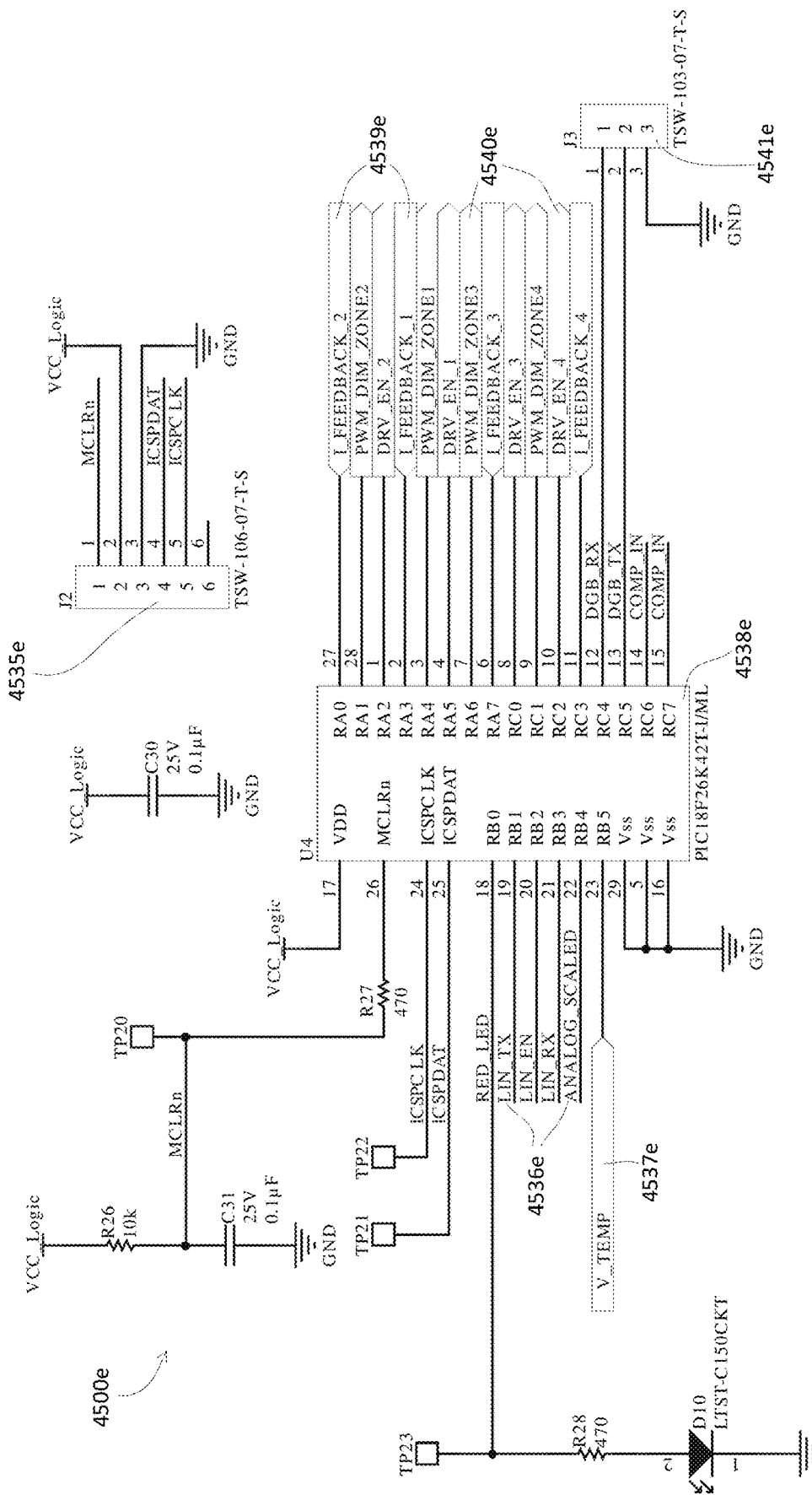
Figure 45F:
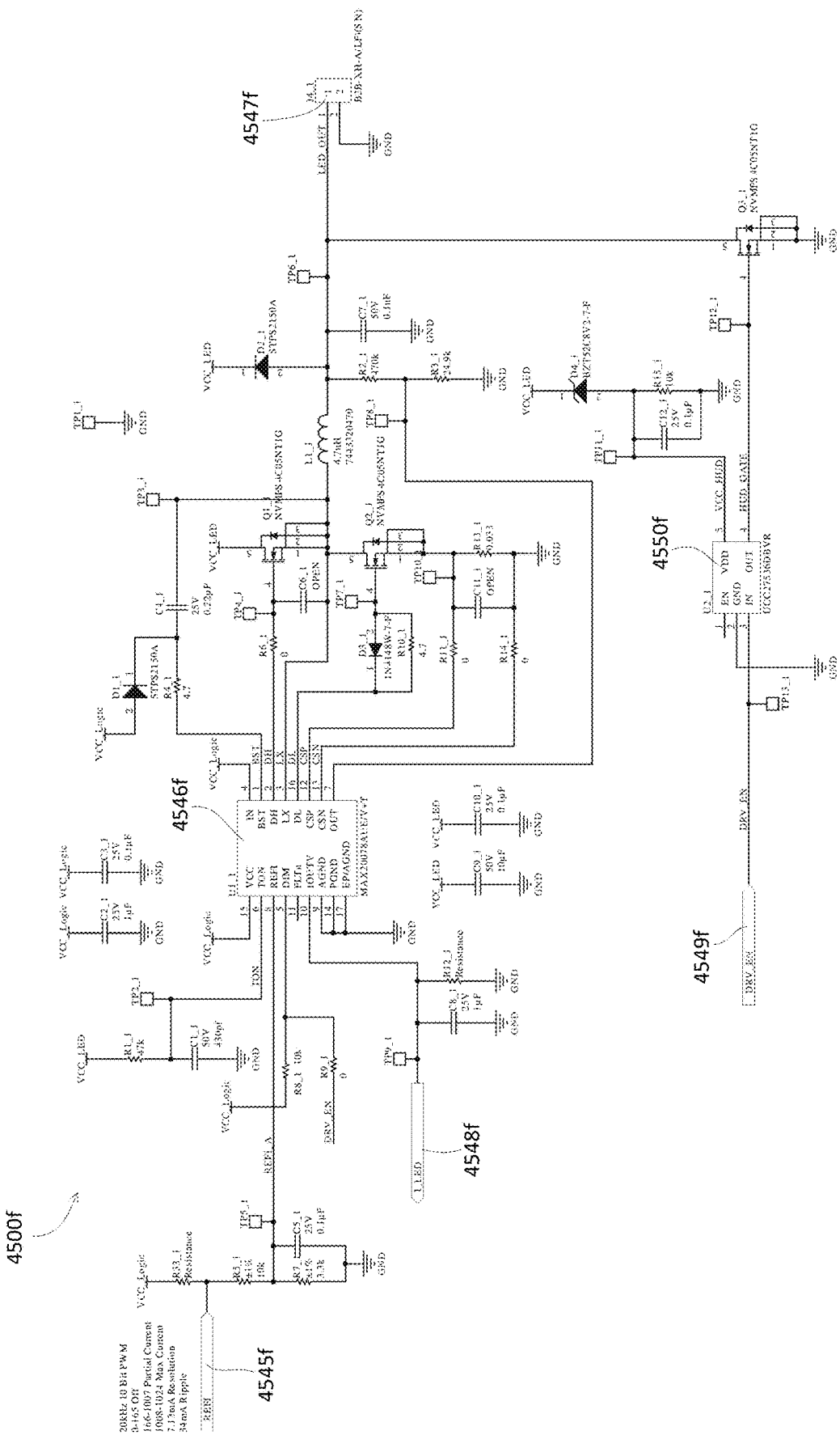
Figure 45G:
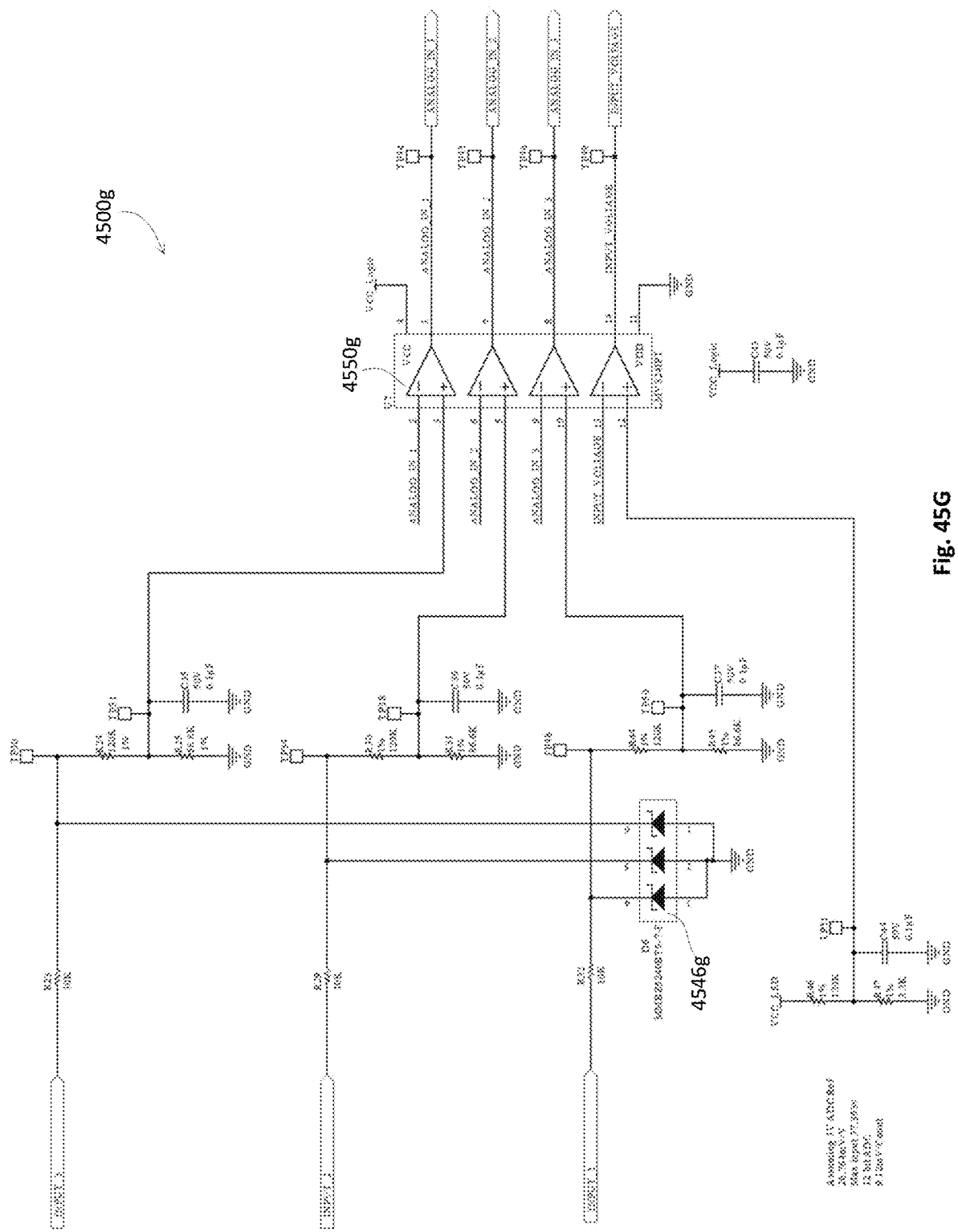
Figure 45H:
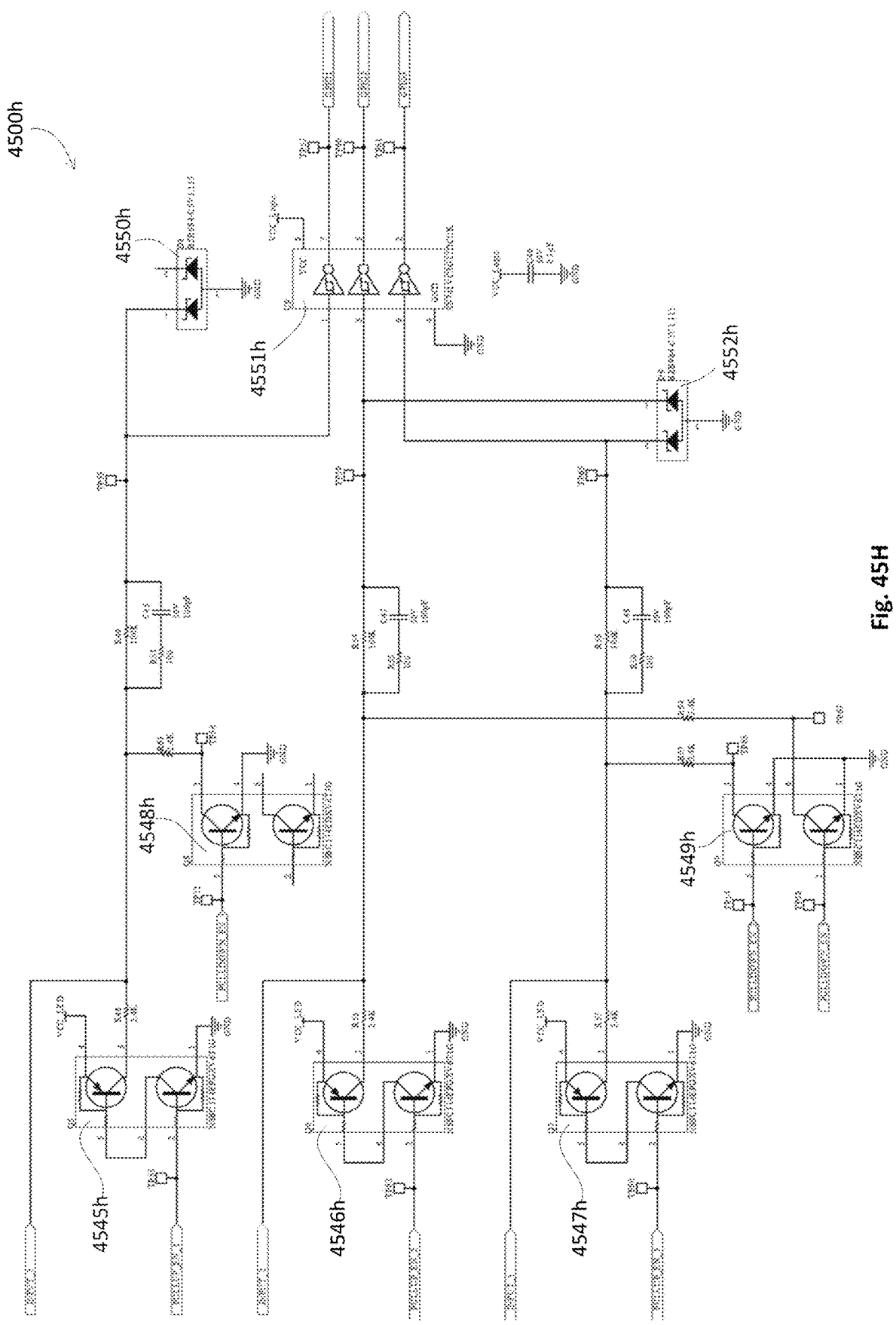

The input module 4505a may include a circuit 4500g,h as illustrated in, for example, FIGS. 45G and 45H. The circuit 4500g,h includes a hardware portion of an input configurator 4500a. An embedded portion of the input configurator 4500a may use a microprocessor 4506a for configuration control and a LIN circuit for communication with a Bluetooth module. A user may initiate a Bluetooth application to configure the three input control lines in any desired configuration. Accordingly, the user does not need to use different plugs/receptacles or rewire a plug/receptacle to reconfigure the three input control lines (i.e., the circuits 4500a,g,h enable a programmable configuration of the three input control lines.

In any event, the circuit 4500g,h may include a triple surface mount zener diode array 4546g, a low-voltage rail-to-rail output operational amplifier 4550g, a first complimentary bias resistor transistor 4545h, a second complimentary bias resistor transistor 4546h, a third complimentary bias resistor transistor 4547h, a fourth complimentary bias resistor transistor 4548h, a fifth complimentary bias resistor transistor 4549h, a first voltage regulator double diode 4550h, a triple Schmitt-trigger buffer 4551h, and a second voltage regulator double diode 4552h.

The power and control input circuitry 4500b may include an operational amplifier/regulator 4510b, a first input connector 4511b, a coupler 4512b, a second input connector 4516b, a NPN output 4513b, a PNP output 4514b, and an analog output 4515b. The power amplifier circuit 4500c may include a power amplifier 4523c having a NPN input 4520c, a PNP collector 4521c, and a PNP input 4522c. The communications circuit 4500d may include a Local Interconnect Network (LIN) 4529d having an enable connection 4525d, a transmit connection 4526d and a receive connection 4527d. The LIN 4529d may be, for example, a serial communication protocol device (e.g., part #MC33662, available from Freescale Semiconductor, Austin, Tex.). The LIN 4529d may be, for example, configured to serially communicate with a controller 1317b. The communications circuit 4500d may include an analog input 4528d and a scaled analog output 4531d.

The controller circuit 4500e may include a microcontroller 4538e (e.g., part #PIC18F26K42T-I/M available from Microchip Technologies, Chandler, Ariz.) having serial inputs 4536e (e.g., inputs 4526d, 4527d, 4528d), an LED temperature input 4537e, feedback inputs 4539e, LED drive outputs 4540e, serial outputs 4541e, and an auxiliary connector 4535e. The microcontroller 4538e may be configured to, for example, generate an LED drive signal 4540e based upon the LED temperature input 4537e (e.g., the LED drive signal may be inversely proportional to the temperature input 4537e). The LED drive outputs 4540e may be, for example, pulse width modulated signals. The microcontroller 4538e may be, for example, configured to either generate a LED drive output 4540e to continuously drive a corresponding LED and/or strobe the LED. The controller 4538e may generate any given LED drive output 4540e to provide as low as a nano-second LED on-time. The controller 4538e may be configured to, for example, generate a LED drive output 4540e based upon a LED feedback input 4536e (e.g., the controller 4538e may generate a LED drive output 4540e that causes an associated LED to emit a particular intensity and/or color based upon a LED feedback input 4536e, such as, a LED intensity sensor input or a LED color sensor, respectively). The controller 4538e may generate a respective one of the LED outputs 4540e to, for example, control a respective group of LEDs 4106a1,a2,a3,a4, or a group of LEDs associated with a particular zone 4107e4a-c of a multi-function illuminator 4100a-m of FIGS. 41A-M, a multi-function illuminator 4200a-d of FIGS. 42A-D, and/or a multi-function illuminator 4300a,b of FIGS. 43A and 43B.

An LED nano-driver circuit 4500f may include a reference enable input 4545f, a LED driver 4546f, and a LED reference output 4548d. The reference enable input 4545f may be, for example, any one of: a 20 kHz, 10 bit, pulse width modulated signal; a0-165 Off signal; a 166-1007 Partial current signal; a 1008-1024 maximum current signal; a 7.13 mA resolution signal; a 34 mA ripple signal; a sub-combination thereof; or a combination thereof. The LED driver may be, for example, a Part #MAX20078 available from Maxim Integrated, San Jose, Calif. The LED nano-driver 4500f may also include a power management device 4550f (e.g., a Part #UCC27536DBVR available from Texas Instruments, Dallas, Tex.) having a LED drive enable input 4549f and an LED output 4547f.

A light emitting diode (LED) driver circuit 4500a-f may, for example, cause light sources to reach full intensity in a shorter time (e.g., nano-second on time) to keep up with faster image acquisition by high speed cameras. A light emitting diode (LED) driver circuit 4500a-f may include a LED driver that is capable of delivering power to a light in 500 nanoseconds or less. A light emitting diode (LED) driver circuit 4500a-f may provide tens of amps to LEDs of a light source within nanoseconds, resulting in a light reaching full LED power/light intensity within that time frame. A light emitting diode (LED) driver circuit 4500a-f may include multi-drive and/or over drive having a constant current driver that allows for operating in a continuous operation mode or an over drive strobe operation mode.

A light emitting diode (LED) driver circuit 4500a-f may accommodate high-speed inspection that may require fast image acquisition or a short image exposure. Associated image acquisition may require lighting to be strobed at a rapid rate, providing enough light to "freeze" an image properly with little to no pixel blur. A light emitting diode (LED) driver circuit 4500a-f may be able to rapidly reach full intensity in nanoseconds when strobing, allowing for a very short image acquisition time and helping to minimize or remove ambient lighting. A light emitting diode (LED) driver circuit 4500a-f may facility area scan and line scan applications when using a high speed camera, and applications that may benefit from faster lighting, such as high speed bottling lines.

A light emitting diode (LED) driver circuit 4500a-f may enable for a very short image acquisition within a machine vision system. The very short on time may be comparable to the off time of the light, allowing for an increase in an amount of strobes the light can produce per second. When configuring a light emitting diode (LED) driver circuit 4500a-f to a 1 microsecond pulse width and a 10% duty cycle, the light may be capable of 100,000 strobes per second.

A light emitting diode (LED) driver circuit 4500a-f may operate with a frequency (Hz)=Duty Cycle/Pulse Width (seconds), for example, 100,000 Hz=0.1/0.000001 seconds. A light emitting diode (LED) driver circuit 4500a-f may be used for a line scan light that may be strobed at a rate of up to 100,000 strobes per second at maximum output. A light emitting diode (LED) driver circuit 4500a-f may reach full intensity within 272 nanoseconds of being powered on.

A machine vision system lighting design method may include: 1) determine features (target defects) of interest; 2) analyze part (target) access/presentation (e.g., clear or obstructed, moving/stationary, minimum/maximum WD range, sweet spot field of view (FOV), etc.); 3) analyze target surface characteristics (e.g., texture, reflectivity/specularity, effective contrast—object (target) vs. background, surface flat, curved, combination, etc.); 4) understand light types (e.g., ring lights, dome lights, bar lights, spot lights, controllers, etc.) and application techniques (e.g., bright field lighting, diffuse lighting, dark field lighting, back lighting, direct lighting, etc.); 5) determine cornerstone issues (e.g., 3-D geometry, structure, color, spectral filters, spatial filters, etc.); and/or 6) eliminate ambient light effects/environmental issues.

Figure 46A:
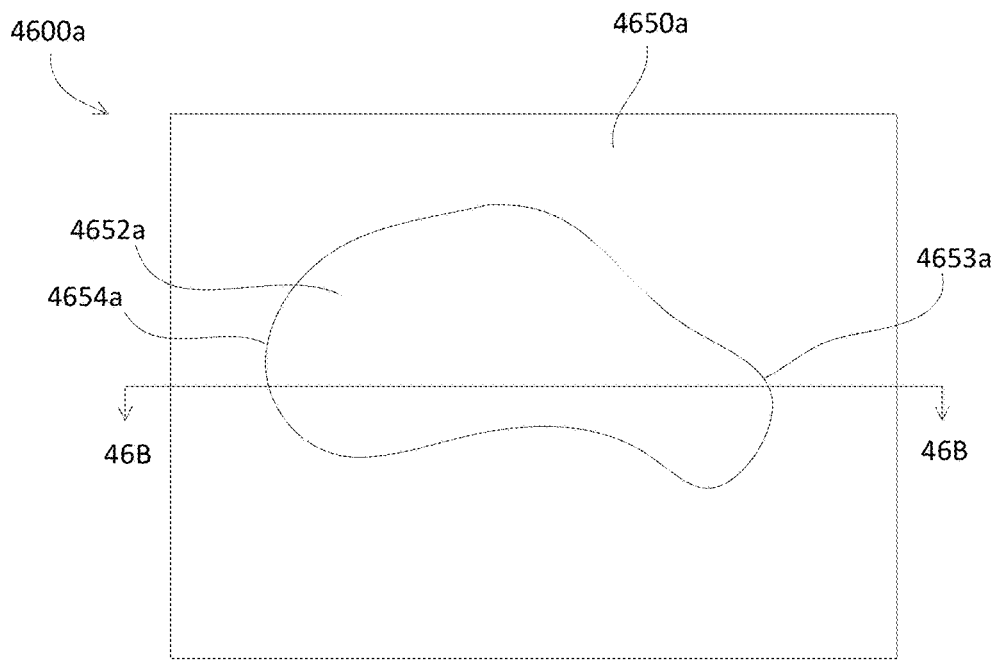
FIGS. 46A-C depict an example target having a defect with light rays and associated reflections.
Figure 46B:
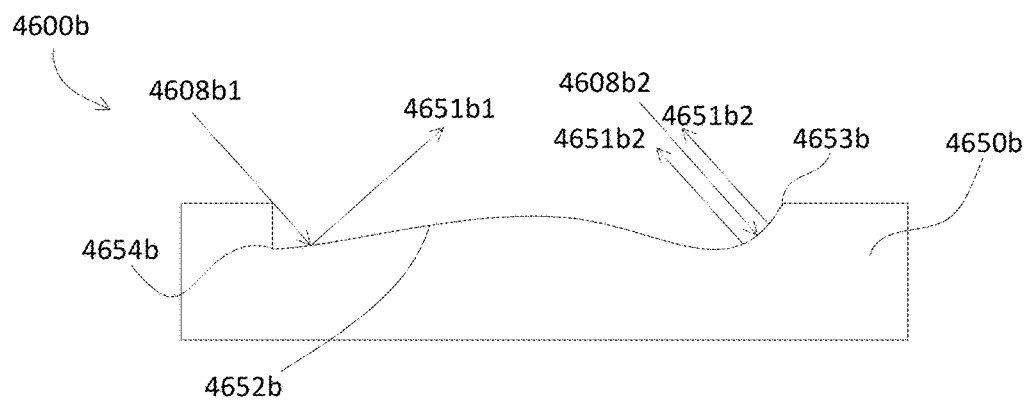
Figure 46C:
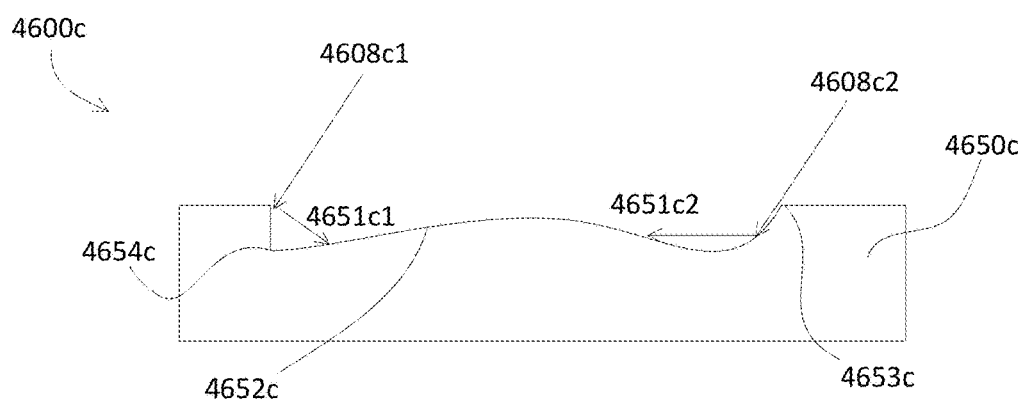

Turning to FIGS. 46A-C, a machine vision system 4600a-c may include a target 4650a-c with an associated defect 4652a-c. FIGS. 46B and C depict a cross-section view of the target/defect of FIG. 46A. The defect 4652a-c may include a first edge 4653a-c and a second edge 4654a-c.

As illustrated in FIG. 46B, an illumination source (not shown in FIG. 46B) may emit light rays 4608b1,b2. When the illumination source is oriented such that the light rays 4608b1 impact the target 4650b at an angle (e.g., angle 108a of FIG. 108a), the light rays 4608b1 may reflect as light rays 4651b1. Similarly, when the illumination source is oriented such that the light rays 4608b2 impact the target 4650b at an angle 108a, the light rays 4608b2 may reflect as light rays 4651b2. A processor (e.g., processor 4422a) may cause a camera (e.g., camera 160 of FIG. 1) to acquire an image, which may include reflected light rays 4651b1,b2, and process image data associated with the image to extract features corresponding to the target 4150b, the defect 4152b, the first edge 4153b, and/or the second edge 4154b. For example, the processor 4422a may execute an edge detection algorithm to extract the features corresponding to the first edge 4153b and/or the second edge 4154b. The first edge 4153b and/or the second edge 4154b may be, for example, associated with a high spatial frequency within the image data.

The processor 4422a may execute a Fourier transform algorithm and generate a Fourier transform of the image data representative of a current image. The processor 4422a may also acquire Fourier transform data that is representative of Fourier transforms of previously classified image data (i.e., Fourier transforms of image data that is representative of a target without any defects and/or Fourier transforms of image data that is representative of a target with at least one defect).

As illustrated in FIG. 46C, an illumination source (not shown in FIG. 46C) may emit light rays 4608c1,c2. The difference between light rays 4608c1,c2 compared to light rays 4608b1,b2, respectively, may be indicative of the face that illumination source has been repositioned/reoriented with respect to the target 4650b,c and/or the target 4650b,c has been repositioned/reoriented with respect to the illumination source. In any event, when the illumination source is oriented such that the light rays 4608c1 impact the target 4650c at an angle (e.g., angle 108a of FIG. 108a), the light rays 4608c1 may reflect as light rays 4651c1. Similarly, when the illumination source is oriented such that the light rays 4608c2 impact the target 4650c at an angle 108a, the light rays 4608c2 may reflect as light rays 4651c2. A processor (e.g., processor 4422a) may cause a camera (e.g., camera 160 of FIG. 1) to acquire an image, which may include the target 4650c. Because the light rays 4651c1,c2 reflect as shown in FIG. 46C, the image of the target 4650c may not indicate that the defect 4652c is present, let alone the first edge 4651c1 or the second edge 4651c2.

The example defect detection, as illustrated with regard to FIGS. 46B and 46C, may be improved by, for example, use of a gradient illumination source (e.g., gradient illumination source 2505c-f of FIGS. 25C-F). As the target, and hence any defect, transitions from a bright area (e.g., bright area 2580c-f) through a gradient area (e.g., gradient area 2581c-f) to a dark area (e.g., dark area 2582c-f), reflections from any edge(s) of any defect may transition as illustrated with reference to FIGS. 46B and 46C. Accordingly, the processor 4422a may cause a camera to acquire a series of images as, for example, the target moves relative the illumination source, and the processor 4422a may process image data, that is representative of the series of images, and improve defect detection when compared to taking a single image with a target illuminated using a uniform (e.g., non-gradient) illumination source.

Alternatively, or additionally, a processor 4422a may cause a single camera (e.g., camera 4260a2) to acquire a series of images as the processor 4422a simultaneously causes the camera 4260a2 to be move relative to a target, or may acquire a series of images from a plurality of cameras (e.g., cameras 4260a1, 4260a2 and/or 4260a3). In any event, the processor 4422a may generate three-dimensional (3D) data that is, for example, representative of a 3D image of at least a portion of the target. For example, the processor 4422a may acquire a series of images and may generate target data, based on pixel intensity values and associated incident angles (e.g., incident angles 108a of FIG. 1). The target data may be representative of a 3D plot of vectors that are normal to a surface of the target. The processor 4422a may compare currently generated target data (i.e., target data representative of a target currently being inspected) to previously generated target data (e.g., target data representative of a target that was previously determined to contain a defect and/or target data representative of a target that was previously determined to not contain a defect). In any event, a processor 4422a may cause a single camera to move relative a target while acquiring a series of images and/or cause a plurality of cameras to acquire a series of images, and the processor 4422a may generate target data representative of a stereoscopic image of the target based on target data that is representative of the series of images.

A processor 4422a may acquire current image data that is representative of, for example, a current image of a target. The processor 4422a may acquire previously classified image data that is representative of, for example, a previously classified image of a target (e.g., a previously classified image of a target without any defects or a previously classified image of a target having at least one defect). The processor 4422a may, for example, subtract the current image data from the previously classified image data (e.g., subtract pixel intensity values on a pixel by pixel basis) to determine if a target currently being inspected includes any defects (i.e., if the processor 4422a determines that the net image data is near zero, the processor 4422a may determine that the current image data is similar to the previously classified image data). As described elsewhere herein, the processor 4422a may use image data subtraction to provide a probability of a target having a defect and/or provide a term of a probability function.

A machine vision system may include at least one of, for example, dark field light on robotics, dome light on robotics, direct light on robotics, structured (patterned) lighting on robotics, different wave lengths—UV to IR, optics, inspection with robots, ring lights, direct light, angled light, diffusion, "Structured" lighting, and/or meta phase lighting. Lighting techniques for machine vision may create contrast between object features to be detected. A variety of parameters can determine a light source, which creates an interaction with the test object (target) and the target's individual material properties such as: interaction between light source, object and camera: (1) emission; (2) reflection; (3) diffusion; (4) fluorescence; (5) transmission; (6) absorption; (7) diffraction; and (8) polarization.

Depending on the material surface, a large number of effects may appear on a target. The incident light is partly absorbed and, depending on the material surface, parts of it are reflected and strayed. In case of opaque, semi-transparent or translucent materials, the light can penetrate through the body (transmission). In some cases, the light is even polarised or diffracted at the surface. Anyone of these effects may not appear alone, but the effect may appear in a combination of several effects. Even a high-quality mirror may reflect only about 95% of the incident light.

The following deals with possible parameters of illumination and different lighting techniques that may be selected in such a way that an evaluable image may be generated in combination with the material properties of the test object (target). Light may include on the test object at a certain angle of incidence 108a, may have a certain color (e.g., red, green, blue, white with a particular colour temperature, infrared, ultraviolet; may be direct or diffuse, and/or may have coherent light properties (e.g., a laser). One target illumination method may include use of light from different spatial directions: light beams can shine onto the object from above, at angles from one side or all around, shallowly or from the opposite side. Depending on the surface shape, material texture and structure, light may be scattered, absorbed, reflected or transmitted on the object or it can cast a shadow. In addition to the direction of the illumination, light may be collimated and diffuse. Classic lighting techniques may include direct incident light, diffuse incident lighting, lateral light at angles, illumination at a shallow angle from all sides: dark field transmitted light (backlit image). Direct illumination may cause strong reflections on a surface of a target. Diffuse illumination may create a homogenous lighting situation. Bright field, side-aligned, illumination may create a dark rippled border and matte surface. Sloped dark field lighting may be side orientated with lower angles emphasizes contour edges and little light on surface. Dark field may be extremely flat orientated illumination that emphasizes contour edges. Back lighting may result in a silhouette of an object (target).

An optical element (e.g., camera optical element 161 of FIG. 1, an illumination source optical element 1312a of FIG. 13A, etc.) may include smart glass or switchable glass (also smart windows or switchable windows in those applications) that may be a glass or glazing whose light transmission properties are altered when voltage, light or heat is applied. Generally, the glass may change from translucent to transparent, changing from blocking some (or all) wavelengths of light to letting light pass through. Smart glass technologies include electrochromic, photochromic, thermochromic, suspended-particle, micro-blind and polymer-dispersed liquid-crystal devices. When installed in the envelope of machine vision systems, smart glass may create climate adaptive shells, with the ability to save costs for ambient lighting, and may avoid cost of installing and maintaining motorized light screens, blinds or curtains. Blackout smart glass may block 99.4% of ultraviolet light, reducing, for example, fabric fading. For suspended particle device (SPD)-type smart glass, this may be achieved in conjunction with low emissivity coatings.

Aspects of smart glass include material costs, installation costs, electricity costs and durability, as well as functional features such as the speed of control, possibilities for dimming, and the degree of transparency. In suspended-particle devices (SPDs), a thin film laminate of rod-like nano-scale particles may be suspended in a liquid and placed between two pieces of glass or plastic, or attached to one layer. When no voltage is applied, the suspended particles may be randomly organized, thus blocking and absorbing light. When voltage is applied, the suspended particles may align and let light pass. Varying the voltage of the film may vary orientation of the suspended particles, thereby, may regulate tint of the glazing and the amount of light transmitted.

SPDs can be manually or automatically "tuned" to precisely control the amount of light, glare and heat passing through, reducing the need for air conditioning during the summer months and heating during winter. Smart glass can be controlled through a variety of mediums, such as automatic photosensors and motion detectors, smartphone applications, integration with intelligent building and vehicle systems, knobs or light switches.

An optical element (e.g., camera optical element 161 of FIG. 1, an illumination source optical element 1312a of FIG. 13A, etc.) may include an electrochromic device that may change light transmission properties in response to voltage and thus allow control over the amount of light and heat passing through. In electrochromic windows, the electrochromic material may change opacity between a transparent and a tinted state. A burst of electricity may result in changing its opacity, but once the change has been effected, no electricity is needed for maintaining the particular shade which has been reached.

First generation electrochromic technologies tend to have a yellow cast in their clear states and blue hues in their tinted states. Darkening occurs from the edges, moving inward, and is a slow process, ranging from many seconds to several minutes (20-30 minutes) depending on window size. Newer electrochromic technologies, also known as "smart-tinting glass," tackled the drawbacks of earlier versions by eliminating the yellow cast in the clear state and tinting to more neutral shades of gray, tinting evenly rather than from the outside in, and accelerating the tinting speeds to less than three minutes, regardless of the size of the glass. However, these newer electrochromic technologies have yet to pass ASTM-2141 for long term reliability and durability testing. This lack of third party independent ASTM certification is one of the limiting aspects of market acceptance in comparison to first generation electrochromic technologies that have successfully passed ASTM-2141 certification.

Electrochromic glass provides visibility even in the darkened state and thus preserves visible contact with the outside environment. It has been used in small-scale applications such as rearview mirrors. Electrochromic technology also finds use in indoor applications, for example, for protection of objects under the glass of museum display cases and picture frame glass from the damaging effects of the UV and visible wavelengths of artificial light. Electrochromic glass can be programmed to automatically tint according to the weather or the sun's position or user preferences. It can also be controlled via mobile applications and even via popular voice assistants.

Recent advances in electrochromic materials pertaining to transition-metal hydride electrochromic have led to the development of reflective hydrides, which become reflective rather than absorbing, and thus switch states between transparent and mirror-like. Recent advancements in modified porous nano-crystalline films have enabled the creation of an electrochromic display. The single substrate display structure consists of several stacked porous layers printed on top of each other on a substrate modified with a transparent conductor (such as ITO or PEDOT:PSS). Each printed layer has a specific set of functions. A working electrode may consist of a positive porous semiconductor (e.g., Titanium Dioxide, $TiO_2$) with adsorbed chromogens (different chromogens for different colors). These chromogens change color by reduction or oxidation. A passivator is used as the negative of the image to improve electrical performance. The insulator layer serves the purpose of increasing the contrast ratio and separating the working electrode electrically from the counter electrode. The counter electrode provides a high capacitance to counterbalances the charge inserted/extracted on the SEG electrode (and maintain overall device charge neutrality). Carbon is an example of charge reservoir film. A conducting carbon layer is typically used as the conductive back contact for the counter electrode. In the last printing step, the porous monolith structure is overprinted with a liquid or polymer-gel electrolyte, dried, and then may be incorporated into various encapsulation or enclosures, depending on the application requirements. Displays are very thin, typically 30 micrometer, or about ⅓ of a human hair. The device can be switched on by applying an electrical potential to the transparent conducting substrate relative to the conductive carbon layer. This causes a reduction of viologen molecules (coloration) to occur inside the working electrode. By reversing the applied potential or providing a discharge path, the device bleaches. A unique feature of the electrochromic monolith is the relatively low voltage (around 1 Volt) needed to color or bleach the viologens. This can be explained by the small over-potentials needed to drive the electrochemical reduction of the surface adsorbed viologens/chromogens.

An optical element (e.g., camera optical element 161 of FIG. 1, an illumination source optical element 1312a of FIG. 13A, etc.) may include a polymer-dispersed liquid-crystal device (PDLC) glass. In polymer-dispersed liquid-crystal devices (PDLCs), liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of the "smart window". Typically, the liquid mix of polymer and liquid crystals is placed between two layers of glass or plastic that include a thin layer of a transparent, conductive material followed by curing of the polymer, thereby forming the basic sandwich structure of the smart window. This structure is in effect a capacitor. Electrodes from a power supply may be attached to the transparent electrodes. With no applied voltage, the liquid crystals are randomly arranged in the droplets, resulting in scattering of light as it passes through the smart window assembly. This results in the translucent, "milky white" appearance. When a voltage is applied to the electrodes, the electric field formed between the two transparent electrodes on the glass causes the liquid crystals to align, allowing light to pass through the droplets with very little scattering and resulting in a transparent state. The degree of transparency can be controlled by the applied voltage. This is possible because at lower voltages, only a few of the liquid crystals align completely in the electric field, so only a small portion of the light passes through while most of the light is scattered. As the voltage is increased, fewer liquid crystals remain out of alignment, resulting in less light being scattered. It is also possible to control the amount of light and heat passing through, when tints and special inner layers are used. It is also possible to create fire-rated and anti X-Ray versions for use in special applications. Most of the devices offered today operate in on or off states only, even though the technology to provide for variable levels of transparency is easily applied. This technology is commercially available in rolls as adhesive-backed smart film that can be applied to existing windows and trimmed to size in the field.

The expression smart glass can be interpreted in a wider sense to include also glazings that change light transmission properties in response to an environmental signal such as light or temperature. Different types of glazing can show a variety of chromic phenomena, that is, based on photochemical effects the glazing changes its light transmission properties in response to an environmental signal such as light (photochromism), temperature (thermochromism), or voltage (electrochromism). Liquid crystals, when they are in a thermotropic state, can change light transmission properties in response to temperature. Various metals have been investigated. Thin Mg—Ni films have low visible transmittance and are reflective. When they are exposed to H2 gas or reduced by an alkaline electrolyte, they become transparent. This transition is attributed to the formation of magnesium nickel hydride, Mg2NiH4. Films were created by cosputtering from separate targets of Ni and Mg to facilitate variations in composition. Single-target d.c. magnetron sputtering could be used eventually which would be relatively simple compared to deposition of electrochromic oxides, making them more affordable. Lawrence Berkeley National Laboratory determined that new transition metals were cheaper and less reactive, but contained the same qualities, thus further reducing the cost. Tungsten-doped Vanadium dioxide VO2 coating reflects infrared light when the temperature rises over 29 degrees Celsius, to block out sunlight transmission through windows at high ambient temperatures. These types of glazings cannot be controlled manually. In contrast, all electrically switched smart windows can be made to automatically adapt their light transmission properties in response to temperature or brightness by integration with a thermometer or photosensor, respectively.

An optical element (e.g., camera optical element 161 of FIG. 1, an illumination source optical element 1312a of FIG. 13A, etc.) may include liquid-crystal display or a reflective twisted nematic liquid crystal display. Polarizing filter film with a vertical axis to polarize light as it enters. Glass substrate with ITO electrodes. The shapes of these electrodes will determine the shapes that will appear when the LCD is switched ON. Vertical ridges etched on the surface are smooth.

A twisted nematic liquid crystal may include a glass substrate with common electrode film (ITO) with horizontal ridges to line up with the horizontal filter, a polarizing filter film with a horizontal axis to block/pass light, and a reflective surface to send light back to viewer. (In a backlit LCD, this layer is replaced or complemented with a light source.) A liquid-crystal display (LCD) may be a flat-panel display or other electronically modulated optical device that uses the light-modulating properties of liquid crystals. Liquid crystals do not emit light directly, instead using a backlight or reflector to produce images in color or monochrome. LCDs are available to display arbitrary images (as in a general-purpose computer display) or fixed images with low information content, which can be displayed or hidden, such as preset words, digits, and seven-segment displays, as in a digital clock. They use the same basic technology, except that arbitrary images are made up of a large number of small pixels, while other displays have larger elements.

LCDs are used in a wide range of applications including LCD televisions, computer monitors, instrument panels, aircraft cockpit displays, and indoor and outdoor signage. Small LCD screens are common in portable consumer devices such as digital cameras, watches, calculators, and mobile telephones, including smartphones. LCD screens are also used on consumer electronics products such as DVD players, video game devices and clocks. LCD screens have replaced heavy, bulky cathode ray tube (CRT) displays in nearly all applications. LCD screens are available in a wider range of screen sizes than CRT and plasma displays, with LCD screens available in sizes ranging from tiny digital watches to very large television receivers.

Since LCD screens do not use phosphors, they do not suffer image burn-in when a static image is displayed on a screen for a long time, e.g., the table frame for an airline flight schedule on an indoor sign. LCDs are, however, susceptible to image persistence.[2] The LCD screen is more energy-efficient and can be disposed of more safely than a CRT can. Its low electrical power consumption enables it to be used in battery-powered electronic equipment more efficiently than CRTs can be. By 2008, annual sales of televisions with LCD screens exceeded sales of CRT units worldwide, and the CRT became obsolete for most purposes. An LCD screen used as a notification panel for travelers.

Each pixel of an LCD typically consists of a layer of molecules aligned between two transparent electrodes, and two polarizing filters (parallel and perpendicular), the axes of transmission of which are (in most of the cases) perpendicular to each other. Without the liquid crystal between the polarizing filters, light passing through the first filter would be blocked by the second (crossed) polarizer. Before an electric field is applied, the orientation of the liquid-crystal molecules is determined by the alignment at the surfaces of electrodes. In a twisted nematic (TN) device, the surface alignment directions at the two electrodes are perpendicular to each other, and so the molecules arrange themselves in a helical structure, or twist. This induces the rotation of the polarization of the incident light, and the device appears gray. If the applied voltage is large enough, the liquid crystal molecules in the center of the layer are almost completely untwisted and the polarization of the incident light is not rotated as it passes through the liquid crystal layer. This light will then be mainly polarized perpendicular to the second filter, and thus be blocked and the pixel will appear black. By controlling the voltage applied across the liquid crystal layer in each pixel, light can be allowed to pass through in varying amounts thus constituting different levels of gray. Color LCD systems use the same technique, with color filters used to generate red, green, and blue pixels.

An optical effect of a TN device in the voltage-on state is far less dependent on variations in the device thickness than that in the voltage-off state. Because of this, TN displays with low information content and no backlighting are usually operated between crossed polarizers such that they appear bright with no voltage (the eye is much more sensitive to variations in the dark state than the bright state). As most of 2010-era LCDs are used in television sets, monitors and smartphones, they have high-resolution matrix arrays of pixels to display arbitrary images using backlighting with a dark background. When no image is displayed, different arrangements are used. For this purpose, TN LCDs are operated between parallel polarizers, whereas IPS LCDs feature crossed polarizers. In many applications IPS LCDs have replaced TN LCDs, in particular in smartphones such as iPhones. Both the liquid crystal material and the alignment layer material contain ionic compounds. If an electric field of one particular polarity is applied for a long period of time, this ionic material is attracted to the surfaces and degrades the device performance. This is avoided either by applying an alternating current or by reversing the polarity of the electric field as the device is addressed (the response of the liquid crystal layer is identical, regardless of the polarity of the applied field).

Displays for a small number of individual digits or fixed symbols (as in digital watches and pocket calculators) can be implemented with independent electrodes for each segment. [4] In contrast, full alphanumeric or variable graphics displays are usually implemented with pixels arranged as a matrix consisting of electrically connected rows on one side of the LC layer and columns on the other side, which makes it possible to address each pixel at the intersections. The general method of matrix addressing consists of sequentially addressing one side of the matrix, for example by selecting the rows one-by-one and applying the picture information on the other side at the columns row-by-row. For details on the various matrix addressing schemes see passive-matrix and active-matrix addressed LCDs.

Since LCD panels produce no light of their own, they require external light to produce a visible image. In a transmissive type of LCD, this light is provided at the back of the glass stack and is called the backlight. While passive-matrix displays are usually not backlit (e.g. calculators, wristwatches), active-matrix displays almost always are. Over the last years (1990-2017), the LCD backlight technologies have strongly been emerged by lighting companies such as Philips, Lumileds (a Philips subsidiary) and more.

A LCD panel may be lit either by two cold cathode fluorescent lamps placed at opposite edges of the display or an array of parallel CCFLs behind larger displays. A diffuser then spreads the light out evenly across the whole display. For many years, this technology had been used almost exclusively. Unlike white LEDs, most CCFLs have an even-white spectral output resulting in better color gamut for the display. However, CCFLs are less energy efficient than LEDs and require a somewhat costly inverter to convert whatever DC voltage the device uses (usually 5 or 12 V) to ~1000 V needed to light a CCFL. The thickness of the inverter transformers also limits how thin the display can be made.

An LCD panel may be lit by a row of white LEDs placed at one or more edges of the screen. A light diffuser is then used to spread the light evenly across the whole display. As of 2012, this design is the most popular one in desktop computer monitors. It allows for the thinnest displays. Some LCD monitors using this technology have a feature called dynamic contrast. Using PWM (pulse-width modulation, a technology where the intensity of the LEDs are kept constant, but the brightness adjustment is achieved by varying a time interval of flashing these constant light intensity light sources), the backlight is dimmed to the brightest color that appears on the screen while simultaneously boosting the LCD contrast to the maximum achievable levels, allowing the 1000:1 contrast ratio of the LCD panel to be scaled to different light intensities, resulting in the "30000:1" contrast ratios seen in the advertising on some of these monitors. Since computer screen images usually have full white somewhere in the image, the backlight will usually be at full intensity, making this "feature" mostly a marketing gimmick for computer monitors, however for TV screens it drastically increases the perceived contrast ratio and dynamic range, improves the viewing angle dependency and drastically reducing the power consumption of conventional LCD televisions.

A WLED LCD panel may be lit by a full array of white LEDs placed behind a diffuser behind the panel. LCDs that use this implementation will usually have the ability to dim the LEDs in the dark areas of the image being displayed, effectively increasing the contrast ratio of the display. As of 2012, this design gets most of its use from upscale, larger-screen LCD televisions.

Similar to the WLED array, an RGB LCD may be lit by a full array of RGB LEDs. While displays lit with white LEDs usually have a poorer color gamut than CCFL lit displays, panels lit with RGB LEDs have very wide color gamuts. This implementation is most popular on professional graphics editing LCDs.

LCD screens are being designed with an LED backlight instead of the traditional CCFL backlight, while that backlight is dynamically controlled with the video information (dynamic backlight control). The combination with the dynamic backlight control may simultaneously increase dynamic range of the display system (also marketed as HDR, high dynamic range television.

A LCD backlight systems are made highly efficient by applying optical films such as prismatic structure to gain the light into the desired viewer directions and reflective polarizing films that recycle the polarized light that was formerly absorbed by the first polarizer of the LCD and generally achieved using so called DBEF films manufactured and supplied by 3M. These polarizers consist of a large stack of uniaxial oriented birefringent films that reflect the former absorbed polarization mode of the light. Such reflective polarizers using uniaxial oriented polymerized liquid crystals (birefringent polymers or birefringent glue). Due to the LCD layer that generates the desired high resolution images at flashing video speeds using very low power electronics in combination with these excellent LED based backlight technologies, LCD technology has become the dominant display technology for products such as televisions, desktop monitors, notebooks, tablets, smartphones and mobile phones. Although competing OLED technology is pushed to the market, such OLED displays does not feature the HDR capabilities like LCDs in combination with 2D LED backlight technologies have, reason why the annual market of such LCD-based products is still growing faster (in volume) than OLED-based products while the efficiency of LCDs (and products like portable computers, mobile phones and televisions) may even be further improved by preventing the light to be absorbed in the colour filters of the LCD. Although until today such reflective colour filter solutions are not yet implemented by the LCD industry and did not made it further than laboratory prototypes, such reflective colour filter solutions still likely will be implemented by the LCD industry to increase the performance gap with OLED technologies).

An LCD panel may include over six million pixels, and the pixels may be individually powered by a wire network embedded in the screen. The fine wires, or pathways, form a grid with vertical wires across the whole screen on one side of the screen and horizontal wires across the whole screen on the other side of the screen. To this grid each pixel has a positive connection on one side and a negative connection on the other side. So the total amount of wires needed is 3×1920 going vertically and 1080 going horizontally for a total of 6840 wires horizontally and vertically. That's three for red, green and blue and 1920 columns of pixels for each color for a total of 5760 wires going vertically and 1080 rows of wires going horizontally. For a panel that is 28.8 inches (73 centimeters) wide, that means a wire density of 200 wires per inch along the horizontal edge. A LCD panel may be powered by LCD drivers that are carefully matched up with the edge of the LCD panel at the factory level. LCD panels typically use thinly-coated metallic conductive pathways on a glass substrate to form the cell circuitry to operate the panel. It is usually not possible to use soldering techniques to directly connect the panel to a separate copper-etched circuit board. Instead, interfacing is accomplished using either adhesive plastic ribbon with conductive traces glued to the edges of the LCD panel, or with an elastomeric connector, which is a strip of rubber or silicone with alternating layers of conductive and insulating pathways, pressed between contact pads on the LCD and mating contact pads on a circuit board.

Monochrome and later color passive-matrix LCDs were standard in most early laptops (although a few used plasma displays[68][69]) and the original Nintendo Game Boy[70] until the mid-1990s, when color active-matrix became standard on all laptops. The commercially unsuccessful Macintosh Portable (released in 1989) was one of the first to use an active-matrix display (though still monochrome). Passive-matrix LCDs are still used in the 2010s for applications less demanding than laptop computers and TVs, such as inexpensive calculators. In particular, these are used on portable devices where less information content needs to be displayed, lowest power consumption (no backlight) and low cost are desired or readability in direct sunlight is needed.

Displays having a passive-matrix structure may employ super-twisted nematic STN technology (the latter of which addresses a color-shifting problem with the former), and color-STN (CSTN) in which color is added by using an internal filter. STN LCDs have been optimized for passive-matrix addressing. They exhibit a sharper threshold of the contrast-vs-voltage characteristic than the original TN LCDs. This is important, because pixels are subjected to partial voltages even while not selected. Crosstalk between activated and non-activated pixels has to be handled properly by keeping the RMS voltage of non-activated pixels below the threshold voltage, while activated pixels are subjected to voltages above threshold. Driving such STN displays according to the Alt & Pleshko drive scheme require very high line addressing voltages. Welzen and de Vaan invented an alternative drive scheme (a non "Alt & Pleshko" drive scheme) requiring much lower voltages, such that the STN display could be driven using low voltage CMOS technologies. STN LCDs have to be continuously refreshed by alternating pulsed voltages of one polarity during one frame and pulses of opposite polarity during the next frame. Individual pixels are addressed by the corresponding row and column circuits. This type of display is called passive-matrix addressed, because the pixel must retain its state between refreshes without the benefit of a steady electrical charge. As the number of pixels (and, correspondingly, columns and rows) increases, this type of display becomes less feasible. Slow response times and poor contrast are typical of passive-matrix addressed LCDs with too many pixels and driven according to the "Alt & Pleshko" drive scheme. Welzen and de Vaan also invented a non RMS drive scheme enabling to drive STN displays with video rates and enabling to show smooth moving video images on an STN display.[28] Citizen, amongst others, licensed these patents and successfully introduced several STN based LCD pocket televisions on the market.

Bistable LCDs may not require continuous refreshing. Rewriting may only be required for picture information changes. An STN type display may be operated in a bistable mode, enabling extreme high resolution images up to 4000 lines or more using only low voltages. Since a pixel however may be either in an on-state or in an off state at the moment new information needs to be written to that particular pixel, the addressing method of these bistable displays is rather complex, reason why these displays did not made it to the market. That changed when in the 2010 "zero-power" (bistable) LCDs became available. Potentially, passive-matrix addressing can be used with devices if their write/erase characteristics are suitable, which was the case for ebooks showing still pictures only. After a page is written to the display, the display may be cut from the power while that information remains readable. This has the advantage that such ebooks may be operated long time on just a small battery only. High-resolution color displays, such as modern LCD computer monitors and televisions, use an active-matrix structure. A matrix of thin-film transistors (TFTs) is added to the electrodes in contact with the LC layer. Each pixel has its own dedicated transistor, allowing each column line to access one pixel. When a row line is selected, all of the column lines are connected to a row of pixels and voltages corresponding to the picture information are driven onto all of the column lines. The row line is then deactivated and the next row line is selected. All of the row lines are selected in sequence during a refresh operation. Active-matrix addressed displays look brighter and sharper than passive-matrix addressed displays of the same size, and generally have quicker response times, producing much better images.

Twisted nematic displays contain liquid crystals that twist and untwist at varying degrees to allow light to pass through. When no voltage is applied to a TN liquid crystal cell, polarized light passes through the 90-degrees twisted LC layer. In proportion to the voltage applied, the liquid crystals untwist changing the polarization and blocking the light's path. By properly adjusting the level of the voltage almost any gray level or transmission can be achieved.

In-plane switching is an LCD technology that aligns the liquid crystals in a plane parallel to the glass substrates. In this method, the electrical field is applied through opposite electrodes on the same glass substrate, so that the liquid crystals can be reoriented (switched) essentially in the same plane, although fringe fields inhibit a homogeneous reorientation. This requires two transistors for each pixel instead of the single transistor needed for a standard thin-film transistor (TFT) display. Additional transistors resulted in blocking more transmission area, thus requiring a brighter backlight and consuming more power, making this type of display less desirable for notebook computers. Currently Panasonic is using an enhanced version eIPS for their large size.

Super-IPS was later introduced after in-plane switching with even better response times and color reproduction. Advanced fringe field switching (AFFS), also known as fringe field switching (FFS), may be similar to IPS or S-IPS offering superior performance and color gamut with high luminosity. AFFS-applied notebook applications minimize color distortion while maintaining a wider viewing angle for a professional display. Color shift and deviation caused by light leakage is corrected by optimizing the white gamut which also enhances white/gray reproduction.

Vertical-alignment displays are a form of LCDs in which the liquid crystals naturally align vertically to the glass substrates. When no voltage is applied, the liquid crystals remain perpendicular to the substrate, creating a black display between crossed polarizers. When voltage is applied, the liquid crystals shift to a tilted position, allowing light to pass through and create a gray-scale display depending on the amount of tilt generated by the electric field. It has a deeper-black background, a higher contrast ratio, a wider viewing angle, and better image quality at extreme temperatures than traditional twisted-nematic displays.

Blue phase mode LCDs may include very short switching times (~1 ms) that may be achieved, so time sequential color control can possibly be realized and expensive color filters would be obsolete. The zenithal bistable device (ZBD), can retain an image without power. The crystals may exist in one of two stable orientations ("black" and "white") and power is only required to change the image. ZBD Displays is a spin-off company from QinetiQ who manufactured both grayscale and color ZBD devices. A "no-power" display may use a polymer stabilized cholesteric liquid crystal (ChLCD) to cover the entire surface of a mobile phone, allowing it to change colors, and keep that color even when power is removed. Two types of zero-power bistable LCDs include 360° BTN and the bistable cholesteric, depend mainly on the bulk properties of the liquid crystal (LC) and use standard strong anchoring, with alignment films and LC mixtures similar to the traditional monostable materials. Other bistable technologies, e.g., BiNem technology, are based mainly on the surface properties and need specific weak anchoring materials.

Resolution of an LCD is expressed by the number of columns and rows of pixels (e.g., 1024×768). Each pixel is usually composed 3 sub-pixels, a red, a green, and a blue one. This had been one of the few features of LCD performance that remained uniform among different designs. However, there are newer designs that share sub-pixels among pixels and add Quattron which attempt to efficiently increase the perceived resolution of a display without increasing the actual resolution, to mixed results. Spatial performance resolution is often expressed in terms of dot pitch or pixels per inch, which is consistent with the printing industry. Display density varies per application, with televisions generally having a low density for long-distance viewing and portable devices having a high density for close-range detail. The Viewing Angle of an LCD may depend on the display and its usage, the limitations of certain display technologies mean the display only displays accurately at certain angles.

A temporal resolution of an LCD is how well it can display changing images, or the accuracy and the number of times per second the display draws the data it is being given. LCD pixels do not flash on/off between frames, so LCD monitors exhibit no refresh-induced flicker no matter how low the refresh rate. But a lower refresh rate can mean visual artefacts like ghosting or smearing, especially with fast moving images. Individual pixel response time is also important, as all displays have some inherent latency in displaying an image which can be large enough to create visual artifacts if the displayed image changes rapidly.

There are multiple terms to describe different aspects of color performance of a display. Color gamut is the range of colors that can be displayed, and color depth, which is the fineness with which the color range is divided. Color gamut is a relatively straight forward feature, but it is rarely discussed in marketing materials except at the professional level. Having a color range that exceeds the content being shown on the screen has no benefits, so displays are only made to perform within or below the range of a certain specification. There are additional aspects to LCD color and color management, such as white point and gamma correction, which describe what color white is and how the other colors are displayed relative to white.

Contrast ratio is the ratio of the brightness of a full-on pixel to a full-off pixel. The LCD itself is only a light valve and does not generate light; the light comes from a backlight that is either fluorescent or a set of LEDs. Brightness is usually stated as the maximum light output of the LCD, which can vary greatly based on the transparency of the LCD and the brightness of the backlight. In general, brighter is better[citation needed], but there is always a trade-off between brightness and power consumption. A LCD monitors are powered by a 12 V power supply, and if built into a computer can be powered by its 12 V power supply, and may be made with very narrow frame borders, allowing multiple LCD screens to be arrayed side-by-side to make up what looks like one big screen.

An illumination source (e.g., illumination source 105 of FIG. 1) may emit photons that may be considered a type of elementary particle, the quantum of the electromagnetic field including electromagnetic radiation such as light, and the force carrier for the electromagnetic force (even when static via virtual particles). The photon has zero rest mass and always moves at the speed of light within a vacuum. Like all elementary particles, photons are currently best explained by quantum mechanics and exhibit wave-particle duality, exhibiting properties of both waves and particles. For example, a single photon may be refracted by a lens and exhibit wave interference with itself, and it can behave as a particle with definite and finite measurable position or momentum, though not both at the same time. The photon's wave and quantum qualities are two observable aspects of a single phenomenon—they cannot be described by any mechanical model; a representation of this dual property of light that assumes certain points on the wavefront to be the seat of the energy is not possible. The quanta in a light wave are not spatially localized.

A machine vision system may benefit from the photon model because it may account for frequency dependence of a light's energy, and may explain the ability of matter and electromagnetic radiation to be in thermal equilibrium. The photon model may account for anomalous observations, including the properties of black-body radiation. Light was described by Maxwell's equations, but material objects emitted and absorbed light in quantized amounts (i.e., they change energy only by certain particular discrete amounts). Although these semiclassical models contributed to the development of quantum mechanics, many further experiments beginning with the phenomenon of Compton scattering of single photons by electrons, validated Einstein's hypothesis that light itself is quantized. Light quanta may have an independent existence, and the term "photon" is used herein. In the Standard Model of particle physics, photons and other elementary particles are described as a necessary consequence of physical laws having a certain symmetry at every point in spacetime. The intrinsic properties of particles, such as charge, mass, and spin, are determined by this gauge symmetry. The photon concept has led to momentous advances in experimental and theoretical physics, including lasers, Bose-Einstein condensation, quantum field theory, and the probabilistic interpretation of quantum mechanics. It has been applied to photochemistry, high-resolution microscopy, and measurements of molecular distances. Recently, photons have been studied as elements of quantum computers, and for applications in optical imaging and optical communication such as quantum cryptography.

The word quanta (singular quantum, Latin for how much) was used before 1900 to mean particles or amounts of different quantities, including electricity. In 1900, the German physicist Max Planck was studying black-body radiation: he suggested that the experimental observations would be explained if the energy carried by electromagnetic waves could only be released in "packets" of energy. In his 1901 article in Annalen der Physik he called these packets "energy elements". In 1905, Albert Einstein published a paper in which he proposed that many light-related phenomena— including black-body radiation and the photoelectric effect—would be better explained by modelling electromagnetic waves as consisting of spatially localized, discrete wave-packets. The name was suggested initially as a unit related to the illumination of the eye and the resulting sensation of light and was used later in a physiological context. Although Wolfers's and Lewis's theories were contradicted by many experiments and never accepted, the new name was adopted very soon by most physicists after Compton used it.

In physics, a photon is usually denoted by the symbol γ (the Greek letter gamma). This symbol for the photon probably derives from gamma rays, which were discovered in 1900 by Paul Villard, named by Ernest Rutherford in 1903, and shown to be a form of electromagnetic radiation in 1914 by Rutherford and Edward Andrade. In chemistry and optical engineering, photons are usually symbolized by hν, which is the photon energy, where h is Planck constant and the Greek letter ν (nu) is the photon's frequency. Much less commonly, the photon can be symbolized by hf, where its frequency is denoted by f.

The cone shows possible values of wave 4-vector of a photon. The "time" axis gives the angular frequency (rad·s−1) and the "space" axis represents the angular wavenumber (rad·m−1). Green and indigo represent left and right polarization. A photon is massless, has no electric charge, and is a stable particle. A photon has two possible polarization states. In the momentum representation of the photon, which is preferred in quantum field theory, a photon is described by its wave vector, which determines its wavelength $\lambda$ and its direction of propagation. A photon's wave vector may not be zero and can be represented either as a spatial 3-vector or as a (relativistic) four-vector; in the latter case it belongs to the light cone (pictured). Different signs of the four-vector denote different circular polarizations, but in the 3-vector representation one should account for the polarization state separately; it actually is a spin quantum number. In both cases the space of possible wave vectors is three-dimensional.

The photon is the gauge boson for electromagnetism, and therefore all other quantum numbers of the photon (such as lepton number, baryon number, and flavour quantum numbers) are zero. Also, the photon does not obey the Pauli exclusion principle. Photons are emitted in many natural processes. For example, when a charge is accelerated it emits synchrotron radiation. During a molecular, atomic or nuclear transition to a lower energy level, photons of various energy will be emitted, ranging from radio waves to gamma rays. Photons can also be emitted when a particle and its corresponding antiparticle are annihilated (for example, electron-positron annihilation). In empty space, the photon moves at c (the speed of light) and its energy and momentum are related by E=pc, where p is the magnitude of the momentum vector p. This derives from the following relativistic relation, with m=0: The energy and momentum of a photon depend only on its frequency ($\nu$) or inversely, its wavelength ($\lambda$): where k is the wave vector (where the wave number $k=|k|=2\pi/\lambda$), $\omega=2\pi\nu$ is the angular frequency, and $\hbar=h/2\pi$ is the reduced Planck constant.

Since p points in the direction of the photon's propagation, and the magnitude of the momentum. The photon may also carries a quantity called spin angular momentum that does not depend on its frequency. The magnitude of its spin is $\sqrt{2}\hbar$ and the component measured along its direction of motion, its helicity, must be $\pm\hbar$. These two possible helicities, called right-handed and left-handed, correspond to the two possible circular polarization states of the photon. To illustrate the significance of these formulae, the annihilation of a particle with its antiparticle in free space must result in the creation of at least two photons for the following reason. In the center of momentum frame, the colliding antiparticles have no net momentum, whereas a single photon always has momentum (since, as we have seen, it is determined by the photon's frequency or wavelength, which cannot be zero). Hence, conservation of momentum (or equivalently, translational invariance) requires that at least two photons are created, with zero net momentum. (However, it is possible if the system interacts with another particle or field for the annihilation to produce one photon, as when a positron annihilates with a bound atomic electron, it is possible for only one photon to be emitted, as the nuclear Coulomb field breaks translational symmetry.) The energy of the two photons, or, equivalently, their frequency, may be determined from conservation of four-momentum. Seen another way, the photon can be considered as its own antiparticle. The reverse process, pair production, is the dominant mechanism by which high-energy photons such as gamma rays lose energy while passing through matter. That process is the reverse of "annihilation to one photon" allowed in the electric field of an atomic nucleus. The classical formulae for the energy and momentum of electromagnetic radiation can be re-expressed in terms of photon events. For example, the pressure of electromagnetic radiation on an object derives from the transfer of photon momentum per unit time and unit area to that object, since pressure is force per unit area and force is the change in momentum per unit time. Each photon may carry two distinct and independent forms of angular momentum of light. The spin angular momentum of light of a particular photon is always either $+\hbar$ or $-\hbar$. The light orbital angular momentum of a particular photon can be any integer N, including zero.

Current commonly accepted physical theories imply or assume the photon to be strictly massless. If the photon is not a strictly massless particle, it would not move at the exact speed of light, c, in vacuum. Its speed would be lower and depend on its frequency. Relativity would be unaffected by this; the so-called speed of light, c, would then not be the actual speed at which light moves, but a constant of nature which is the upper bound on speed that any object could theoretically attain in spacetime. Thus, it would still be the speed of spacetime ripples (gravitational waves and gravitons), but it would not be the speed of photons. If a photon did have non-zero mass, there would be other effects as well. Coulomb's law would be modified and the electromagnetic field would have an extra physical degree of freedom. These effects yield more sensitive experimental probes of the photon mass than the frequency dependence of the speed of light. If Coulomb's law is not exactly valid, then that would allow the presence of an electric field to exist within a hollow conductor when it is subjected to an external electric field. This thus allows one to test Coulomb's law to very high precision. A null result of such an experiment has set a limit of $m \lesssim 10$-14 eV/c2.

Sharper upper limits on the speed of light have been obtained in experiments designed to detect effects caused by the galactic vector potential. Although the galactic vector potential is very large because the galactic magnetic field exists on very great length scales, only the magnetic field would be observable if the photon is massless. In the case that the photon has mass, the mass term $\frac{1}{2}m^2 A_\mu A^\mu$ would affect the galactic plasma. The fact that no such effects are seen implies an upper bound on the photon mass of m<3× 10-27 eV/c2. The galactic vector potential can also be probed directly by measuring the torque exerted on a magnetized ring. Such methods were used to obtain the sharper upper limit of 10-18 eV/c2 (the equivalent of 1.07×10-27 atomic mass units) given by the Particle Data Group. These sharp limits from the non-observation of the effects caused by the galactic vector potential have been shown to be model-dependent.[35] If the photon mass is generated via the Higgs mechanism then the upper limit of $m \lesssim 10$-14 eV/c2 from the test of Coulomb's law is valid.

In most theories up to the eighteenth century, light was pictured as being made up of particles. Since particle models cannot easily account for the refraction, diffraction and birefringence of light, wave theories of light were proposed by René Descartes (1637), Robert Hooke (1665),[38] and Christiaan Huygens (1678); however, particle models remained dominant, chiefly due to the influence of Isaac Newton. In the early nineteenth century, Thomas Young and August Fresnel clearly demonstrated the interference and diffraction of light and by 1850 wave models were generally accepted. In 1865, James Clerk Maxwell's prediction that light was an electromagnetic wave—which was confirmed experimentally in 1888 by Heinrich Hertz's detection of radio waves—seemed to be the final blow to particle models of light.

In 1900, Maxwell's theoretical model of light as oscillating electric and magnetic fields seemed complete. However, several observations could not be explained by any wave model of electromagnetic radiation, leading to the idea that light-energy was packaged into quanta described by E=hv. Later experiments showed that these light-quanta also carry momentum and, thus, can be considered particles: the photon concept was born, leading to a deeper understanding of the electric and magnetic fields themselves.

The Maxwell wave theory, however, does not account for all properties of light. The Maxwell theory predicts that the energy of a light wave depends only on its intensity, not on its frequency; nevertheless, several independent types of experiments show that the energy imparted by light to atoms depends only on the light's frequency, not on its intensity. For example, some chemical reactions are provoked only by light of frequency higher than a certain threshold; light of frequency lower than the threshold, no matter how intense, does not initiate the reaction. Similarly, electrons can be ejected from a metal plate by shining light of sufficiently high frequency on it (the photoelectric effect); the energy of the ejected electron is related only to the light's frequency, not to its intensity. At the same time, investigations of blackbody radiation carried out over four decades (1860-1900) by various researchers culminated in Max Planck's hypothesis that the energy of any system that absorbs or emits electromagnetic radiation of frequency v is an integer multiple of an energy quantum E=hv. As shown by Albert Einstein, some form of energy quantization must be assumed to account for the thermal equilibrium observed between matter and electromagnetic radiation; for this explanation of the photoelectric effect, Einstein received the 1921 Nobel Prize in physics.

Since the Maxwell theory of light allows for all possible energies of electromagnetic radiation, most physicists assumed initially that the energy quantization resulted from some unknown constraint on the matter that absorbs or emits the radiation. In 1905, Einstein was the first to propose that energy quantization was a property of electromagnetic radiation itself. Although he accepted the validity of Maxwell's theory, Einstein pointed out that many anomalous experiments could be explained if the energy of a Maxwellian light wave were localized into point-like quanta that move independently of one another, even if the wave itself is spread continuously over space. Einstein showed that, if Planck's law of black-body radiation is accepted, the energy quanta must also carry momentum $p=h/\lambda$, making them full-fledged particles. This photon momentum was observed experimentally by Arthur Compton, for which he received the Nobel Prize in 1927. The pivotal question was then: how to unify Maxwell's wave theory of light with its experimentally observed particle nature? The answer to this question occupied Albert Einstein for the rest of his life, and was solved in quantum electrodynamics and its successor, the Standard Model.

Unlike Planck, Einstein entertained the possibility that there might be actual physical quanta of light—what we now call photons. He noticed that a light quantum with energy proportional to its frequency would explain a number of troubling puzzles and paradoxes, including an unpublished law by Stokes, the ultraviolet catastrophe, and the photoelectric effect. Stokes's law said simply that the frequency of fluorescent light cannot be greater than the frequency of the light (usually ultraviolet) inducing it. Einstein eliminated the ultraviolet catastrophe by imagining a gas of photons behaving like a gas of electrons that he had previously considered. He was advised by a colleague to be careful how he wrote up this paper, in order to not challenge Planck, a powerful figure in physics, too directly, and indeed the warning was justified, as Planck never forgave him for writing it.

Up to 1923, most physicists were reluctant to accept that light itself was quantized. Instead, they tried to explain photon behavior by quantizing only matter, as in the Bohr model of the hydrogen atom (shown here). Even though these semiclassical models were only a first approximation, they were accurate for simple systems and they led to quantum mechanics. Einstein's 1905 predictions were verified experimentally in several ways in the first two decades of the 20th century, as recounted in Robert Millikan's Nobel lecture. However, before Compton's experiment showed that photons carried momentum proportional to their wave number (1922), most physicists were reluctant to believe that electromagnetic radiation itself might be particulate. (See, for example, the Nobel lectures of Wien, Planck and Millikan) Instead, there was a widespread belief that energy quantization resulted from some unknown constraint on the matter that absorbed or emitted radiation. Attitudes changed over time. In part, the change can be traced to experiments such as Compton scattering, where it was much more difficult not to ascribe quantization to light itself to explain the observed results. Even after Compton's experiment, Niels Bohr, Hendrik Kramers and John Slater made one last attempt to preserve the Maxwellian continuous electromagnetic field model of light, the so-called BKS model. To account for the data then available, two drastic hypotheses had to be made: 1. Energy and momentum are conserved only on the average in interactions between matter and radiation, but not in elementary processes such as absorption and emission. This allows one to reconcile the discontinuously changing energy of the atom (the jump between energy states) with the continuous release of energy as radiation, and 2. Causality is abandoned. For example, spontaneous emissions are merely emissions stimulated by a "virtual" electromagnetic field. However, refined Compton experiments showed that energy-momentum is conserved extraordinarily well in elementary processes; and also that the jolting of the electron and the generation of a new photon in Compton scattering obey causality to within 10 ps. Accordingly, Bohr and his co-workers gave their model "as honorable a funeral as possible".[51] Nevertheless, the failures of the BKS model inspired Werner Heisenberg in his development of matrix mechanics.

A few physicists persisted in developing semiclassical models in which electromagnetic radiation is not quantized, but matter appears to obey the laws of quantum mechanics. Although the evidence from chemical and physical experiments for the existence of photons was overwhelming by the 1970s, this evidence could not be considered as absolutely definitive; since it relied on the interaction of light with matter, and a sufficiently complete theory of matter could in principle account for the evidence. Nevertheless, all semiclassical theories were refuted definitively in the 1970s and 1980s by photon-correlation experiments. Hence, Einstein's hypothesis that quantization is a property of light itself is considered to be proven. Photons in a Mach-Zehnder interferometer exhibit wave-like interference and particle-like detection at single-photon detectors. Photons, like all quantum objects, exhibit wave-like and particle-like properties. Their dual wave-particle nature can be difficult to visualize. The photon displays clearly wave-like phenomena such as diffraction and interference on the length scale of its wavelength. For example, a single photon passing through a double-slit experiment exhibits interference phenomena but only if no measure was made at the slit. A single photon passing through a double-slit experiment lands on the screen with a probability distribution given by its interference pattern determined by Maxwell's equations. However, experiments confirm that the photon is not a short pulse of electromagnetic radiation; it does not spread out as it propagates, nor does it divide when it encounters a beam splitter. Rather, the photon seems to be a point-like particle since it is absorbed or emitted as a whole by arbitrarily small systems, systems much smaller than its wavelength, such as an atomic nucleus ($\approx$10-15 m across) or even the point-like electron. Nevertheless, the photon is not a point-like particle whose trajectory is shaped probabilistically by the electromagnetic field, as conceived by Einstein and others; that hypothesis was also refuted by the photon-correlation experiments cited above. According to our present understanding, the electromagnetic field itself is produced by photons, which in turn result from a local gauge symmetry and the laws of quantum field theory (See § Second quantization and § The photon as a gauge boson below). Heisenberg's thought experiment for locating an electron (shown in blue) with a high-resolution gamma-ray microscope. The incoming gamma ray (shown in green) is scattered by the electron up into the microscope's aperture angle $\theta$. The scattered gamma ray is shown in red. Classical optics shows that the electron position can be resolved only up to an uncertainty $\Delta x$ that depends on $\theta$ and the wavelength $\lambda$ of the incoming light. A key element of quantum mechanics is Heisenberg's uncertainty principle, which forbids the simultaneous measurement of the position and momentum of a particle along the same direction. Remarkably, the uncertainty principle for charged, material particles requires the quantization of light into photons, and even the frequency dependence of the photon's energy and momentum. An elegant illustration of the uncertainty principle is Heisenberg's thought experiment for locating an electron with an ideal microscope. The position of the electron can be determined to within the resolving power of the microscope, which is given by a formula from classical optics where $\theta$ is the aperture angle of the microscope and $\lambda$ is the wavelength of the light used to observe the electron. Thus, the position uncertainty can be made arbitrarily small by reducing the wavelength $\lambda$. Even if the momentum of the electron is initially known, the light impinging on the electron will give it a momentum "kick" of some unknown amount, rendering the momentum of the electron uncertain. If light were not quantized into photons, the uncertainty could be made arbitrarily small by reducing the light's intensity. In that case, since the wavelength and intensity of light can be varied independently, one could simultaneously determine the position and momentum to arbitrarily high accuracy, violating the uncertainty principle. By contrast, Einstein's formula for photon momentum preserves the uncertainty principle; since the photon is scattered anywhere within the aperture, the uncertainty of momentum transferred equals giving the product, which is Heisenberg's uncertainty principle. Thus, the entire world is quantized; both matter and fields must obey a consistent set of quantum laws, if either one is to be quantized.

The analogous uncertainty principle for photons forbids the simultaneous measurement of the number of photons (See Fock state and the Second quantization section below) in an electromagnetic wave and the phase of that wave. See coherent state and squeezed coherent state for more details. Both photons and electrons create analogous interference patterns when passed through a double-slit experiment. For photons, this corresponds to the interference of a Maxwell light wave whereas, for material particles (electron), this corresponds to the interference of the Schrödinger wave equation. Although this similarity might suggest that Maxwell's equations describing the photon's electromagnetic wave are simply Schrödinger's equation for photons, most physicists do not agree. For one thing, they are mathematically different; most obviously, Schrödinger's one equation for the electron solves for a complex field, whereas Maxwell's four equations solve for real fields. More generally, the normal concept of a Schrödinger probability wave function cannot be applied to photons. As photons are massless, they cannot be localized without being destroyed; technically, photons cannot have a position eigenstate, and, thus, the normal Heisenberg uncertainty principle does not pertain to photons. A few substitute wave functions have been suggested for the photon, but they have not come into general use. Instead, physicists generally accept the second-quantized theory of photons described below, quantum electrodynamics, in which photons are quantized excitations of electromagnetic modes.

Another interpretation, that avoids duality, is the De Broglie-Bohm theory: known also as the pilot-wave model. In that theory, the photon is both, wave and particle. "This idea seems to me so natural and simple, to resolve the wave-particle dilemma in such a clear and ordinary way, that it is a great mystery to me that it was so generally ignored", J. S. Bell. In 1924, Satyendra Nath Bose derived Planck's law of black-body radiation without using any electromagnetism, but rather by using a modification of coarse-grained counting of phase space. Einstein showed that this modification is equivalent to assuming that photons are rigorously identical and that it implied a "mysterious non-local interaction", now understood as the requirement for a symmetric quantum mechanical state. This work led to the concept of coherent states and the development of the laser. In the same papers, Einstein extended Bose's formalism to material particles (bosons) and predicted that they would condense into their lowest quantum state at low enough temperatures; this Bose-Einstein condensation was observed experimentally in 1995. It was later used by Lene Hau to slow, and then completely stop, light in 1999 and 2001. The modern view on this is that photons are, by virtue of their integer spin, bosons (as opposed to fermions with half-integer spin). By the spin-statistics theorem, all bosons obey Bose-Einstein statistics (whereas all fermions obey Fermi-Dirac statistics). Stimulated emission (in which photons "clone" themselves) was predicted by Einstein in his kinetic analysis, and led to the development of the laser. Einstein's derivation inspired further developments in the quantum treatment of light, which led to the statistical interpretation of quantum mechanics. In 1916, Albert Einstein showed that Planck's radiation law could be derived from a semi-classical, statistical treatment of photons and atoms, which implies a link between the rates at which atoms emit and absorb photons. The condition follows from the assumption that functions of the emission and absorption of radiation by the atoms are independent of each other, and that thermal equilibrium is made by way of the radiation's interaction with the atoms. Consider a cavity in thermal equilibrium with all parts of itself and filled with electromagnetic radiation and that the atoms can emit and absorb that radiation. Thermal equilibrium requires that the energy density of photons with frequency (which is proportional to their number density) is, on average, constant in time; hence, the rate at which photons of any particular frequency are emitted must equal the rate at which they absorb them.

Einstein began by postulating simple proportionality relations for the different reaction rates involved. In his model, the rate for a system to absorb a photon of frequency and transition from a lower energy to a higher energy is proportional to the number of atoms with energy and to the energy density of ambient photons of that frequency, where is the rate constant for absorption. For the reverse process, there are two possibilities: spontaneous emission of a photon, or the emission of a photon initiated by the interaction of the atom with a passing photon and the return of the atom to the lower-energy state. Following Einstein's approach, the corresponding rate for the emission of photons of frequency and transition from a higher energy to a lower energy is where is the rate constant for emitting a photon spontaneously, and is the rate constant for emissions in response to ambient photons (induced or stimulated emission). In thermodynamic equilibrium, the number of atoms in state i and those in state j must, on average, be constant; hence, the rates and must be equal. Also, by arguments analogous to the derivation of Boltzmann statistics, the ratio of and is where are the degeneracy of the state i and that of j, respectively, their energies, k the Boltzmann constant and T the system's temperature. From this, it is readily derived that and the A and Bs are collectively known as the Einstein coefficients.

Einstein could not fully justify his rate equations, but claimed that it should be possible to calculate the coefficients, and once physicists had obtained "mechanics and electrodynamics modified to accommodate the quantum hypothesis". In fact, in 1926, Paul Dirac derived the rate constants by using a semiclassical approach, and, in 1927, succeeded in deriving all the rate constants from first principles within the framework of quantum theory. Dirac's work was the foundation of quantum electrodynamics, i.e., the quantization of the electromagnetic field itself. Dirac's approach is also called second quantization or quantum field theory; earlier quantum mechanical treatments only treat material particles as quantum mechanical, not the electromagnetic field.

Einstein was troubled by the fact that his theory seemed incomplete, since it did not determine the direction of a spontaneously emitted photon. A probabilistic nature of light-particle motion was first considered by Newton in his treatment of birefringence and, more generally, of the splitting of light beams at interfaces into a transmitted beam and a reflected beam. Newton hypothesized that hidden variables in the light particle determined which of the two paths a single photon would take. Similarly, Einstein hoped for a more complete theory that would leave nothing to chance, beginning his separation from quantum mechanics. Ironically, Max Born's probabilistic interpretation of the wave function was inspired by Einstein's later work searching for a more complete theory.

Different electromagnetic modes (such as those depicted here) can be treated as independent simple harmonic oscillators. A photon corresponds to a unit of energy $E=h\nu$ in its electromagnetic mode. In 1910, Peter Debye derived Planck's law of black-body radiation from a relatively simple assumption. He correctly decomposed the electromagnetic field in a cavity into its Fourier modes, and assumed that the energy in any mode was an integer multiple of, where is the frequency of the electromagnetic mode. Planck's law of black-body radiation follows immediately as a geometric sum. However, Debye's approach failed to give the correct formula for the energy fluctuations of blackbody radiation, which were derived by Einstein in 1909. In 1925, Born, Heisenberg and Jordan reinterpreted Debye's concept in a key way. As may be shown classically, the Fourier modes of the electromagnetic field—a complete set of electromagnetic plane waves indexed by their wave vector k and polarization state are equivalent to a set of uncoupled simple harmonic oscillators. Treated quantum mechanically, the energy levels of such oscillators are known to be, where is the oscillator frequency. The key new step was to identify an electromagnetic mode with energy as a state with photons, each of energy. This approach gives the correct energy fluctuation formula. In quantum field theory, the probability of an event is computed by summing the probability amplitude (a complex number) for all possible ways in which the event can occur, as in the Feynman diagram shown here; the probability equals the square of the modulus of the total amplitude.

Dirac took this one step further. He treated the interaction between a charge and an electromagnetic field as a small perturbation that induces transitions in the photon states, changing the numbers of photons in the modes, while conserving energy and momentum overall. Dirac was able to derive Einstein's and coefficients from first principles, and showed that the Bose-Einstein statistics of photons is a natural consequence of quantizing the electromagnetic field correctly (Bose's reasoning went in the opposite direction; he derived Planck's law of black-body radiation by assuming B-E statistics). In Dirac's time, it was not yet known that all bosons, including photons, must obey Bose-Einstein statistics.

Dirac's second-order perturbation theory can involve virtual photons, transient intermediate states of the electromagnetic field; the static electric and magnetic interactions are mediated by such virtual photons. In such quantum field theories, the probability amplitude of observable events is calculated by summing over all possible intermediate steps, even ones that are unphysical; hence, virtual photons are not constrained to satisfy, and may have extra polarization states; depending on the gauge used, virtual photons may have three or four polarization states, instead of the two states of real photons. Although these transient virtual photons can never be observed, they contribute measurably to the probabilities of observable events. Indeed, such second-order and higher-order perturbation calculations can give apparently infinite contributions to the sum. Such unphysical results are corrected for using the technique of renormalization.

Other virtual particles may contribute to the summation as well; for example, two photons may interact indirectly through virtual electron-positron pairs. In fact, such photon-photon scattering (see two-photon physics), as well as electron-photon scattering, is meant to be one of the modes of operations of the planned particle accelerator, the International Linear Collider. In modern physics notation, the quantum state of the electromagnetic field is written as a Fock state, a tensor product of the states for each electromagnetic mode where represents the state in which photons are in the mode. In this notation, the creation of a new photon in mode (e.g., emitted from an atomic transition) is written as. This notation merely expresses the concept of Born, Heisenberg and Jordan described above, and does not add any physics. Measurements of the interaction between energetic photons and hadrons show that the interaction is much more intense than expected by the interaction of merely photons with the hadron's electric charge. Furthermore, the interaction of energetic photons with protons is similar to the interaction of photons with neutrons in spite of the fact that the electric charge structures of protons and neutrons are substantially different. A theory called Vector Meson Dominance (VMD) was developed to explain this effect. According to VMD, the photon is a superposition of the pure electromagnetic photon which interacts only with electric charges and vector mesons. However, if experimentally probed at very short distances, the intrinsic structure of the photon is recognized as a flux of quark and gluon components, quasi-free according to asymptotic freedom in QCD and described by the photon structure function. A comprehensive comparison of data with theoretical predictions was presented in a review in 2000.

The electromagnetic field can be understood as a gauge field, i.e., as a field that results from requiring that a gauge symmetry holds independently at every position in spacetime. For the electromagnetic field, this gauge symmetry is the Abelian U(1) symmetry of complex numbers of absolute value 1, which reflects the ability to vary the phase of a complex field without affecting observables or real valued functions made from it, such as the energy or the Lagrangian. The quanta of an Abelian gauge field must be massless, uncharged bosons, as long as the symmetry is not broken; hence, the photon is predicted to be massless, and to have zero electric charge and integer spin. The particular form of the electromagnetic interaction specifies that the photon must have spin ±1; thus, its helicity must be. These two spin components correspond to the classical concepts of right-handed and left-handed circularly polarized light. However, the transient virtual photons of quantum electrodynamics may also adopt unphysical polarization states.

In the prevailing Standard Model of physics, the photon is one of four gauge bosons in the electroweak interaction; the other three are denoted W+, W− and Z0 and are responsible for the weak interaction. Unlike the photon, these gauge bosons have mass, owing to a mechanism that breaks their SU(2) gauge symmetry. The unification of the photon with W and Z gauge bosons in the electroweak interaction was accomplished by Sheldon Glashow, Abdus Salam and Steven Weinberg, for which they were awarded the 1979 Nobel Prize in physics. Physicists continue to hypothesize grand unified theories that connect these four gauge bosons with the eight gluon gauge bosons of quantum chromodynamics; however, key predictions of these theories, such as proton decay, have not been observed experimentally. The energy of a system that emits a photon is decreased by the energy of the photon as measured in the rest frame of the emitting system, which may result in a reduction in mass in the amount. Similarly, the mass of a system that absorbs a photon is increased by a corresponding amount. As an application, the energy balance of nuclear reactions involving photons is commonly written in terms of the masses of the nuclei involved, and terms of the form for the gamma photons (and for other relevant energies, such as the recoil energy of nuclei). This concept is applied in key predictions of quantum electrodynamics (QED, see above). In that theory, the mass of electrons (or, more generally, leptons) is modified by including the mass contributions of virtual photons, in a technique known as renormalization. Such "radiative corrections" contribute to a number of predictions of QED, such as the magnetic dipole moment of leptons, the Lamb shift, and the hyperfine structure of bound lepton pairs, such as muonium and positronium.

Since photons contribute to the stress-energy tensor, they exert a gravitational attraction on other objects, according to the theory of general relativity. Conversely, photons are themselves affected by gravity; their normally straight trajectories may be bent by warped spacetime, as in gravitational lensing, and their frequencies may be lowered by moving to a higher gravitational potential, as in the Pound-Rebka experiment. However, these effects are not specific to photons; exactly the same effects would be predicted for classical electromagnetic waves.

Light that travels through transparent matter does so at a lower speed than c, the speed of light in a vacuum. For example, photons engage in so many collisions on the way from the core of the sun that radiant energy can take about a million years to reach the surface; however, once in open space, a photon takes only 8.3 minutes to reach Earth. The factor by which the speed is decreased is called the refractive index of the material. In a classical wave picture, the slowing can be explained by the light inducing electric polarization in the matter, the polarized matter radiating new light, and that new light interfering with the original light wave to form a delayed wave. In a particle picture, the slowing can instead be described as a blending of the photon with quantum excitations of the matter to produce quasi-particles known as polariton (other quasi-particles are phonons and excitons); this polariton has a nonzero effective mass, which means that it cannot travel at c. Light of different frequencies may travel through matter at different speeds; this is called dispersion (not to be confused with scattering). In some cases, it can result in extremely slow speeds of light in matter. The effects of photon interactions with other quasi-particles may be observed directly in Raman scattering and Brillouin scattering.

Photons can also be absorbed by nuclei, atoms or molecules, provoking transitions between their energy levels. A classic example is the molecular transition of retinal ($C_{20}H_{28}O$), which is responsible for vision, as discovered in 1958 by Nobel laureate biochemist George Wald and co-workers. The absorption provokes a cis-trans isomerization that, in combination with other such transitions, is transduced into nerve impulses. The absorption of photons can even break chemical bonds, as in the photodissociation of chlorine; this is the subject of photochemistry. Photons have many applications in technology. These examples are chosen to illustrate applications of photons per se, rather than general optical devices such as lenses, etc. that could operate under a classical theory of light. The laser is an extremely important application and is discussed above under stimulated emission.

Individual photons can be detected by several methods. The classic photomultiplier tube exploits the photoelectric effect: a photon of sufficient energy strikes a metal plate and knocks free an electron, initiating an ever-amplifying avalanche of electrons. Semiconductor charge-coupled device chips use a similar effect: an incident photon generates a charge on a microscopic capacitor that can be detected. Other detectors such as Geiger counters use the ability of photons to ionize gas molecules contained in the device, causing a detectable change of conductivity of the gas. Planck's energy formula is often used by engineers and chemists in design, both to compute the change in energy resulting from a photon absorption and to determine the frequency of the light emitted from a given photon emission. For example, the emission spectrum of a gas-discharge lamp can be altered by filling it with (mixtures of) gases with different electronic energy level configurations.

Under some conditions, an energy transition can be excited by "two" photons that individually would be insufficient. This allows for higher resolution microscopy, because the sample absorbs energy only in the spectrum where two beams of different colors overlap significantly, which can be made much smaller than the excitation volume of a single beam (see two-photon excitation microscopy). Moreover, these photons cause less damage to the sample, since they are of lower energy. In some cases, two energy transitions can be coupled so that, as one system absorbs a photon, another nearby system "steals" its energy and re-emits a photon of a different frequency. This is the basis of fluorescence resonance energy transfer, a technique that is used in molecular biology to study the interaction of suitable proteins. Several different kinds of hardware random number generators involve the detection of single photons. In one example, for each bit in the random sequence that is to be produced, a photon is sent to a beam-splitter. In such a situation, there are two possible outcomes of equal probability. The actual outcome is used to determine whether the next bit in the sequence is "0" or "1".

Much research has been devoted to applications of photons in the field of quantum optics. Photons seem well-suited to be elements of an extremely fast quantum computer, and the quantum entanglement of photons is a focus of research. Nonlinear optical processes are another active research area, with topics such as two-photon absorption, self-phase modulation, modulational instability and optical parametric oscillators. However, such processes generally do not require the assumption of photons per se; they may often be modeled by treating atoms as nonlinear oscillators.

Machine vision systems, as described in detail herein, may incorporate processors (e.g., processor 4422a of FIG. 44A) that may generate target inspection data based on the above mathematical photon models. Similarly, the machine vision systems, as described in detail herein, may incorporate processors (e.g., processor 4422a of FIG. 44A) that may generate target inspection data based on the following mathematical optics models.

The optical properties of a material define how it interacts with light. The optical properties of matter may be studied in optical physics, a subfield of optics. The optical properties of matter may include: refraction and the material's refraction index, polarization, reflection and the material's albedo or reflectance, absorption, photoluminescence (fluorescence), transmittance, diffraction, dispersion, dichroism, scattering, birefringence, color, and/or photosensitivity. A basic distinction is between isotropic materials, which exhibit the same properties regardless of the direction of the light, and anisotropic ones, which exhibit different properties when light passes through them in different directions. The optical properties of matter can lead to a variety of interesting optical phenomena.

Light on air-plexi surface in this experiment undergoes refraction (lower ray) and reflection (upper ray). An image of the Golden Gate Bridge is refracted and bent by many differing three-dimensional drops of water. This is how light refracts through different materials. Refraction is the change in direction of wave propagation due to a change in its transmission medium. An object (in this case a pencil) part immersed in water looks bent due to refraction: the light waves from X change direction and so seem to originate at Y. (More accurately, for any angle of view, Y should be vertically above X, and the pencil should appear shorter, not longer).

The phenomenon is explained by the conservation of energy and the conservation of momentum. Owing to the change of medium, the phase velocity of the wave is changed but its frequency remains constant. This is most commonly observed when a wave passes from one medium to another at any angle other than 0° from the normal. Refraction of light is the most commonly observed phenomenon, but any type of wave can refract when it interacts with a medium, for example when sound waves pass from one medium into another or when water waves move into water of a different depth. Refraction follows Snell's law, which states that, for a given pair of media and a wave with a single frequency, the ratio of the sines of the angle of incidence $\theta 1$ and angle of refraction $\theta 2$ is equivalent to the ratio of phase velocities (v1/v2) in the two media, or equivalently, to relative indices of refraction (n2/n1) of the two media. Epsilon( ) and mu( ) represent the dielectric constant and the magnetic moment of the different media.

In general, the incident wave is partially refracted and partially reflected (internal refraction); the details of this behavior are described by the Fresnel equations. Refraction of light at the interface between two media of different refractive indices, with n2>n1. Since the phase velocity is lower in the second medium (v2<v1), the angle of refraction $\theta 2$ is less than the angle of incidence $\theta 1$; that is, the ray in the higher-index medium is closer to the normal. In optics, refraction is a phenomenon that often occurs when waves travel from a medium with a given refractive index to a medium with another at an oblique angle. At the boundary between the media, the wave's phase velocity is altered, usually causing a change in direction. Its wavelength increases or decreases, but its frequency remains constant. For example, a light ray will refract as it enters and leaves glass, as there is a change in refractive index. A ray traveling along the normal (perpendicular to the boundary) will suffer change in speed, but not direction. Refraction still occurs in this case (by Snell's Law as angle of incidence will be 0°). Understanding of this concept led to the invention of lenses and the refracting telescope.

Refraction can be seen when looking into a bowl of water. Air has a refractive index of about 1.0003, and water has a refractive index of about 1.3333. If a person looks at a straight object, such as a pencil or straw, which is placed at a slant, partially in the water, the object appears to bend at the water's surface. This is due to the bending of light rays as they move from the water to the air. Once the rays reach the eye, the eye traces them back as straight lines (lines of sight). The lines of sight (shown as dashed lines) intersect at a higher position than where the actual rays originated. This causes the pencil to appear higher and the water to appear shallower than it really is. The depth that the water appears to be when viewed from above is known as the apparent depth. This is an important consideration for spearfishing from the surface because it will make the target fish appear to be in a different place, and the fisher must aim lower to catch the fish. Conversely, an object above the water has a higher apparent height when viewed from below the water. The opposite correction must be made by an archer fish. For small angles of incidence (measured from the normal, when $\sin \theta$ is approximately the same as $\tan \theta$), the ratio of apparent to real depth is the ratio of the refractive indexes of air to that of water. But, as the angle of incidence approaches 90°, the apparent depth approaches zero, albeit reflection increases, which limits observation at high angles of incidence. Conversely, the apparent height approaches infinity as the angle of incidence (from below) increases, but even earlier, as the angle of total internal reflection is approached, albeit the image also fades from view as this limit is approached.

Refraction is also responsible for rainbows and for the splitting of white light into a rainbow-spectrum as it passes through a glass prism. Glass has a higher refractive index than air. When a beam of white light passes from air into a material having an index of refraction that varies with frequency, a phenomenon known as dispersion occurs, in which different coloured components of the white light are refracted at different angles, i.e., they bend by different amounts at the interface, so that they become separated. The different colors correspond to different frequencies. While refraction allows for phenomena such as rainbows, it may also produce peculiar optical phenomena, such as mirages and Fata Morgana. These are caused by the change of the refractive index of air with temperature. The refractive index of materials can also be nonlinear, as occurs with the Kerr effect when high intensity light leads to a refractive index proportional to the intensity of the incident light. Some metamaterials have been created that have a negative refractive index. With metamaterials, we can also obtain total refraction phenomena when the wave impedances of the two media are matched. There is then no reflected wave. Also, since refraction can make objects appear closer than they are, it is responsible for allowing water to magnify objects. First, as light is entering a drop of water, it slows down. If the water's surface is not flat, then the light will be bent into a new path. This round shape will bend the light outwards and as it spreads out, the image you see gets larger. An analogy that is often put forward to explain the refraction of light is as follows: "Imagine a marching band as it marches at an oblique angle from a pavement (a fast medium) into mud (a slower medium). The marchers on the side that runs into the mud first will slow down first. This causes the whole band to pivot slightly toward the normal (make a smaller angle from the normal)."

Why refraction occurs when light travels from a medium with a given refractive index to a medium with another, can be explained by the path integral formulation of quantum mechanics (the complete method was developed in 1948 by Richard Feynman). Feynman humorously explained it himself in the recording "QED. The effects of refraction between materials can be minimised through index matching, the close matching of their respective indices of refraction. In medicine, particularly optometry, ophthalmology and orthoptics, refraction (also known as refractometry) is a clinical test in which a phoropter may be used by the appropriate eye care professional to determine the eye's refractive error and the best corrective lenses to be prescribed. A series of test lenses in graded optical powers or focal lengths are presented to determine which provides the sharpest, clearest vision.

Refractive index—A ray of light being refracted in a plastic block. In optics, the refractive index or index of refraction of a material is a dimensionless number that describes how light propagates through that medium. It is defined where c is the speed of light in vacuum and v is the phase velocity of light in the medium. For example, the refractive index of water is 1.333, meaning that light travels 1.333 times faster in vacuum than in the water. A refractive index may be used to determine how much the path of light is bent, or refracted, when entering a material. This is the first documented use of refractive indices and is described by Snell's law of refraction, $n1 \sin \theta 1 = n2 \sin \theta 2$, where $\theta 1$ and $\theta 2$ are the angles of incidence and refraction, respectively, of a ray crossing the interface between two media with refractive indices n1 and n2. The refractive indices also determine the amount of light that is reflected when reaching the interface, as well as the critical angle for total internal reflection and Brewster's angle.

The refractive index can be seen as the factor by which the speed and the wavelength of the radiation are reduced with respect to their vacuum values: the speed of light in a medium is $v=c/n$, and similarly the wavelength in that medium is $\lambda=\lambda 0/n$, where $\lambda 0$ is the wavelength of that light in vacuum. This implies that vacuum has a refractive index of 1, and that the frequency ($f=v/\lambda$) of the wave is not affected by the refractive index. As a result, the energy ($E=hf$) of the photon, and therefore the perceived color of the refracted light to a human eye which depends on photon energy, is not affected by the refraction or the refractive index of the medium. While the refractive index affects wavelength, it depends on photon frequency, color and energy so the resulting difference in the bending angle causes white light to split into its constituent colors. This is called dispersion. It can be observed in prisms and rainbows, and chromatic aberration in lenses. Light propagation in absorbing materials can be described using a complex-valued refractive index. The imaginary part then handles the attenuation, while the real part accounts for refraction.

The concept of refractive index applies within the full electromagnetic spectrum, from X-rays to radio waves. It can also be applied to wave phenomena such as sound. In this case the speed of sound is used instead of that of light and a reference medium other than vacuum must be chosen. The refractive index n of an optical medium is defined as the ratio of the speed of light in vacuum, c=299792458 m/s, and the phase velocity v of light in the medium. The phase velocity is the speed at which the crests or the phase of the wave moves, which may be different from the group velocity, the speed at which the pulse of light or the envelope of the wave moves. The definition above is sometimes referred to as the absolute refractive index or the absolute index of refraction to distinguish it from definitions where the speed of light in other reference media than vacuum is used. Historically air at a standardized pressure and temperature has been common as a reference medium.

Diamonds have a very high refractive index of 2.42. Selected refractive indices at λ=589 nm. For references, see the extended List of refractive indices. For visible light most transparent media have refractive indices between 1 and 2. A few examples are given in the adjacent table. These values are measured at the yellow doublet D-line of sodium, with a wavelength of 589 nanometers, as is conventionally done. Gases at atmospheric pressure have refractive indices close to 1 because of their low density. Almost all solids and liquids have refractive indices above 1.3, with aerogel as the clear exception. Aerogel is a very low density solid that can be produced with refractive index in the range from 1.002 to 1.265. Moissanite lies at the other end of the range with a refractive index as high as 2.65. Most plastics have refractive indices in the range from 1.3 to 1.7, but some high-refractive-index polymers can have values as high as 1.76.

For infrared light refractive indices can be considerably higher. Germanium is transparent in the wavelength region from 2 to 14 μm and has a refractive index of about 4. A type of new materials, called topological insulator, was recently found holding higher refractive index of up to 6 in near to mid infrared frequency range. Moreover, topological insulator material are transparent when they have nanoscale thickness. These excellent properties make them a type of significant materials for infrared optics.

According to the theory of relativity, no information can travel faster than the speed of light in vacuum, but this does not mean that the refractive index cannot be lower than 1. The refractive index measures the phase velocity of light, which does not carry information. The phase velocity is the speed at which the crests of the wave move and can be faster than the speed of light in vacuum, and thereby give a refractive index below 1. This can occur close to resonance frequencies, for absorbing media, in plasmas, and for X-rays. In the X-ray regime the refractive indices are lower than but very close to 1 (exceptions close to some resonance frequencies). As an example, water has a refractive index of $0.99999974=1-2.6\times10^{-7}$ for X-ray radiation at a photon energy of 30 keV (0.04 nm wavelength). An example of a plasma with an index of refraction less than unity is Earth's ionosphere. Since the refractive index of the ionosphere (a plasma), is less than unity, electromagnetic waves propagating through the plasma are bent "away from the normal" (see Geometric optics) allowing the radio wave to be refracted back toward earth, thus enabling long-distance radio communications. See also Radio Propagation and Skywave.

A split-ring resonator array arranged to produce a negative index of refraction for microwaves. Recent research has also demonstrated the existence of materials with a negative refractive index, which can occur if permittivity and permeability have simultaneous negative values. This can be achieved with periodically constructed metamaterials. The resulting negative refraction (i.e., a reversal of Snell's law) offers the possibility of the superlens and other exotic phenomena. At the atomic scale, an electromagnetic wave's phase velocity is slowed in a material because the electric field creates a disturbance in the charges of each atom (primarily the electrons) proportional to the electric susceptibility of the medium. (Similarly, the magnetic field creates a disturbance proportional to the magnetic susceptibility.) As the electromagnetic fields oscillate in the wave, the charges in the material will be "shaken" back and forth at the same frequency. The charges thus radiate their own electromagnetic wave that is at the same frequency, but usually with a phase delay, as the charges may move out of phase with the force driving them (see sinusoidally driven harmonic oscillator). The light wave traveling in the medium is the macroscopic superposition (sum) of all such contributions in the material: the original wave plus the waves radiated by all the moving charges. This wave is typically a wave with the same frequency but shorter wavelength than the original, leading to a slowing of the wave's phase velocity. Most of the radiation from oscillating material charges will modify the incoming wave, changing its velocity. However, some net energy will be radiated in other directions or even at other frequencies (see scattering).

Depending on the relative phase of the original driving wave and the waves radiated by the charge motion, there are several possibilities: If the electrons emit a light wave which is 90° out of phase with the light wave shaking them, it will cause the total light wave to travel slower. This is the normal refraction of transparent materials like glass or water, and corresponds to a refractive index which is real and greater than 1. If the electrons emit a light wave which is 270° out of phase with the light wave shaking them, it will cause the wave to travel faster. This is called "anomalous refraction", and is observed close to absorption lines (typically in infrared spectra), with X-rays in ordinary materials, and with radio waves in Earth's ionosphere. It corresponds to a permittivity less than 1, which causes the refractive index to be also less than unity and the phase velocity of light greater than the speed of light in vacuum c (note that the signal velocity is still less than c, as discussed above). If the response is sufficiently strong and out-of-phase, the result is a negative value of permittivity and imaginary index of refraction, as observed in metals or plasma. If the electrons emit a light wave which is 180° out of phase with the light wave shaking them, it will destructively interfere with the original light to reduce the total light intensity. This is light absorption in opaque materials and corresponds to an imaginary refractive index. If the electrons emit a light wave which is in phase with the light wave shaking them, it will amplify the light wave. This is rare, but occurs in lasers due to stimulated emission. It corresponds to an imaginary index of refraction, with the opposite sign to that of absorption. For most materials at visible-light frequencies, the phase is somewhere between 90° and 180°, corresponding to a combination of both refraction and absorption.

Light of different colors has slightly different refractive indices in water and therefore shows up at different positions in the rainbow. In a prism, dispersion causes different colors to refract at different angles, splitting white light into a rainbow of colors. The variation of refractive index with wavelength for various glasses. The shaded zone indicates the range of visible light. The refractive index of materials varies with the wavelength (and frequency) of light. This is called dispersion and causes prisms and rainbows to divide white light into its constituent spectral colors. As the refractive index varies with wavelength, so will the refraction angle as light goes from one material to another. Dispersion also causes the focal length of lenses to be wavelength dependent. This is a type of chromatic aberration, which often needs to be corrected for in imaging systems. In regions of the spectrum where the material does not absorb light, the refractive index tends to decrease with increasing wavelength, and thus increase with frequency. This is called "normal dispersion", in contrast to "anomalous dispersion", where the refractive index increases with wavelength. For visible light normal dispersion means that the refractive index is higher for blue light than for red. For optics in the visual range, the amount of dispersion of a lens material is often quantified by the Abbe number. For a more accurate description of the wavelength dependence of the refractive index, the Sellmeier equation can be used. It is an empirical formula that works well in describing dispersion. Sellmeier coefficients are often quoted instead of the refractive index in tables. Because of dispersion, it is usually important to specify the vacuum wavelength of light for which a refractive index is measured. Typically, measurements are done at various well-defined spectral emission lines; for example, nD usually denotes the refractive index at the Fraunhofer "D" line, the centre of the yellow sodium double emission at 589.29 nm wavelength. When light passes through a medium, some part of it will always be attenuated. This can be conveniently taken into account by defining a complex refractive index. Here, the real part n is the refractive index and indicates the phase velocity, while the imaginary part $\kappa$ is called the extinction coefficient—although $\kappa$ can also refer to the mass attenuation coefficient and indicates the amount of attenuation when the electromagnetic wave propagates through the material. That $\kappa$ corresponds to attenuation can be seen by inserting this refractive index into the expression for electric field of a plane electromagnetic wave traveling in the z-direction. We can do this by relating the complex wave number k to the complex refractive index n through $k=2\pi n/\lambda_0$, with $\lambda_0$ being the vacuum wavelength; this can be inserted into the plane wave expression. Here we see that $\kappa$ gives an exponential decay, as expected from the Beer-Lambert law. Since intensity is proportional to the square of the electric field, it will depend on the depth into the material as $\exp(-4\pi\kappa z/\lambda_0)$, and the attenuation coefficient becomes $\alpha=4\pi\kappa/\lambda_0$. This also relates it to the penetration depth, the distance after which the intensity is reduced by 1/e, $\delta_p=1/\alpha=\lambda_0/(4\pi\kappa)$. Both n and $\kappa$ are dependent on the frequency. In most circumstances $\kappa>0$ (light is absorbed) or $\kappa=0$ (light travels forever without loss). In special situations, especially in the gain medium of lasers, it is also possible that $\kappa<0$, corresponding to an amplification of the light. An alternative convention uses $n=n-i\kappa$ instead of $n=n+i\kappa$, but where $\kappa>0$ still corresponds to loss. Therefore, these two conventions are inconsistent and should not be confused. The difference is related to defining sinusoidal time dependence as $\text{Re}[\exp(-i\omega t)]$ versus $\text{Re}[\exp(+i\omega t)]$.

Dielectric loss and non-zero DC conductivity in materials cause absorption. Good dielectric materials such as glass have extremely low DC conductivity, and at low frequencies the dielectric loss is also negligible, resulting in almost no absorption. However, at higher frequencies (such as visible light), dielectric loss may increase absorption significantly, reducing the material's transparency to these frequencies.

The real, n, and imaginary, κ, parts of the complex refractive index are related through the Kramers-Kronig relations. In 1986 A. R. Forouhi and I. Bloomer deduced an equation describing κ as a function of photon energy, E, applicable to amorphous materials. Forouhi and Bloomer then applied the Kramers-Kronig relation to derive the corresponding equation for n as a function of E. The same formalism was applied to crystalline materials by Forouhi and Bloomer in 1988. The refractive index and extinction coefficient, n and κ, cannot be measured directly. They must be determined indirectly from measurable quantities that depend on them, such as reflectance, R, or transmittance, T, or ellipsometric parameters, ψ and δ. The determination of n and κ from such measured quantities will involve developing a theoretical expression for R or T, or ψ and δ in terms of a valid physical model for n and κ. By fitting the theoretical model to the measured R or T, or ψ and δ using regression analysis, n and κ can be deduced. For X-ray and extreme ultraviolet radiation the complex refractive index deviates only slightly from unity and usually has a real part smaller than 1. It is therefore normally written as n=1−δ+iβ (or n=1−δ−iβ with the alternative convention mentioned above). Far above the atomic resonance frequency delta where is the classical electron radius, is the X-ray wavelength, and is the electron density. One may assume the electron density is simply the number of electrons per atom Z multiplied by the atomic density, but more accurate calculation of the refractive index requires replacing Z with the complex atomic form factor. It follows that with and typically of the order of 10-5 and 10-6.

Optical path length (OPL) is the product of the geometric length d of the path light follows through a system, and the index of refraction of the medium through which it propagates. This is an important concept in optics because it determines the phase of the light and governs interference and diffraction of light as it propagates. According to Fermat's principle, light rays can be characterized as those curves that optimize the optical path length. Refraction of light at the interface between two media of different refractive indices, with n2>n1. Since the phase velocity is lower in the second medium (v2<v1), the angle of refraction θ2 is less than the angle of incidence θ1; that is, the ray in the higher-index medium is closer to the normal. When light moves from one medium to another, it changes direction, i.e. it is refracted. If it moves from a medium with refractive index n1 to one with refractive index n2, with an incidence angle to the surface normal of θ1, the refraction angle θ2 can be calculated from Snell's law: When light enters a material with higher refractive index, the angle of refraction will be smaller than the angle of incidence and the light will be refracted towards the normal of the surface. The higher the refractive index, the closer to the normal direction the light will travel. When passing into a medium with lower refractive index, the light will instead be refracted away from the normal, towards the surface.

Total internal reflection can be seen at the air-water boundary. If there is no angle θ2 fulfilling Snell's law, i.e., the light cannot be transmitted and will instead undergo total internal reflection. This occurs only when going to a less optically dense material, i.e., one with lower refractive index. To get total internal reflection the angles of incidence θ1 must be larger than the critical angle. Apart from the transmitted light there is also a reflected part. The reflection angle is equal to the incidence angle, and the amount of light that is reflected is determined by the reflectivity of the surface. The reflectivity can be calculated from the refractive index and the incidence angle with the Fresnel equations, which for normal incidence reduces. For common glass in air, n1=1 and n2=1.5, and thus about 4% of the incident power is reflected. At other incidence angles the reflectivity will also depend on the polarization of the incoming light. At a certain angle called Brewster's angle, p-polarized light (light with the electric field in the plane of incidence) will be totally transmitted. Brewster's angle can be calculated from the two refractive indices of the interface.

The power of a magnifying glass is determined by the shape and refractive index of the lens. The focal length of a lens is determined by its refractive index n and the radii of curvature R1 and R2 of its surfaces. The power of a thin lens in air is given by the Lensmaker's formula, where f is the focal length of the lens. The resolution of a good optical microscope is mainly determined by the numerical aperture (NA) of its objective lens. The numerical aperture in turn is determined by the refractive index n of the medium filling the space between the sample and the lens and the half collection angle of light θ. For this reason oil immersion is commonly used to obtain high resolution in microscopy. In this technique the objective is dipped into a drop of high refractive index immersion oil on the sample under study.

The refractive index of electromagnetic radiation where εr is the material's relative permittivity, and μr is its relative permeability. The refractive index is used for optics in Fresnel equations and Snell's law; while the relative permittivity and permeability are used in Maxwell's equations and electronics. Most naturally occurring materials are non-magnetic at optical frequencies, that is μr is very close to 1, therefore n is approximately √εr. In this particular case, the complex relative permittivity εr, with real and imaginary parts εr and ε̄r, and the complex refractive index n, with real and imaginary parts n and κ (the latter called the "extinction coefficient"), and their components are related where is the complex modulus.

Relation between the refractive index and the density of silicate and borosilicate glasses. In general, the refractive index of a glass increases with its density. However, there does not exist an overall linear relation between the refractive index and the density for all silicate and borosilicate glasses. A relatively high refractive index and low density can be obtained with glasses containing light metal oxides such as Li2O and MgO, while the opposite trend is observed with glasses containing PbO and BaO as seen in the diagram at the right. Many oils (such as olive oil) and ethyl alcohol are examples of liquids which are more refractive, but less dense, than water, contrary to the general correlation between density and refractive index. For gases, n−1 is proportional to the density of the gas as long as the chemical composition does not change.[40] This means that it is also proportional to the pressure and inversely proportional to the temperature for ideal gases.

Sometimes, a "group velocity refractive index", usually called the group index is defined where vg is the group velocity. This value should not be confused with n, which is always defined with respect to the phase velocity. When the dispersion is small, the group velocity can be linked to the phase velocity by the relation where λ is the wavelength in the medium. In this case the group index can thus be written in terms of the wavelength dependence of the refractive index. When the refractive index of a medium is known as a function of the vacuum wavelength (instead of the wavelength in the medium), the corresponding expressions for the group velocity and index are (for all values of dispersion) where λ0 is the wavelength in vacuum. Momentum (Abraham-Minkowski controversy) In 1908, Hermann Minkowski calculated the momentum p of a refracted ray where E is energy of the photon, c is the speed of light in vacuum and n is the refractive index of the medium. A 2010 study suggested that both equations are correct, with the Abraham version being the kinetic momentum and the Minkowski version being the canonical momentum, and claims to explain the contradicting experimental results using this interpretation. As shown in the Fizeau experiment, when light is transmitted through a moving medium, its speed relative to an observer traveling with speed v in the same direction as the light. The refractive index of a substance can be related to its polarizability with the Lorentz-Lorenz equation or to the molar refractivities of its constituents by the Gladstone-Dale relation.

In atmospheric applications, the refractivity is taken as N=n−1. Atmospheric refractivity is often expressed as either N=106(n−1) or N=108(n−1). The multiplication factors are used because the refractive index for air, n deviates from unity by at most a few parts per ten thousand. Molar refractivity, on the other hand, is a measure of the total polarizability of a mole of a substance and can be calculated from the refractive index where ρ is the density, and M is the molar mass. So far, we have assumed that refraction is given by linear equations involving a spatially constant, scalar refractive index. These assumptions can break down in different ways, to be described in the following subsections.

A calcite crystal laid upon a paper with some letters showing double refraction. Birefringent materials can give rise to colors when placed between crossed polarizers. This is the basis for photoelasticity. In some materials the refractive index depends on the polarization and propagation direction of the light. This is called birefringence or optical anisotropy. In the simplest form, uniaxial birefringence, there is only one special direction in the material. This axis is known as the optical axis of the material. Light with linear polarization perpendicular to this axis will experience an ordinary refractive index no while light polarized in parallel will experience an extraordinary refractive index ne. The birefringence of the material is the difference between these indices of refraction, Δn=ne−no. Light propagating in the direction of the optical axis will not be affected by the birefringence since the refractive index will be no independent of polarization. For other propagation directions the light will split into two linearly polarized beams. For light traveling perpendicularly to the optical axis the beams will have the same direction. This can be used to change the polarization direction of linearly polarized light or to convert between linear, circular and elliptical polarizations with waveplates.

Many crystals are naturally birefringent, but isotropic materials such as plastics and glass can also often be made birefringent by introducing a preferred direction through, e.g., an external force or electric field. This effect is called photoelasticity, and can be used to reveal stresses in structures. The birefringent material is placed between crossed polarizers. A change in birefringence alters the polarization and thereby the fraction of light that is transmitted through the second polarizer. In the more general case of trirefringent materials described by the field of crystal optics, the dielectric constant is a rank-2 tensor (a 3 by 3 matrix). In this case the propagation of light cannot simply be described by refractive indices except for polarizations along principal axes.

The strong electric field of high intensity light (such as output of a laser) may cause a medium's refractive index to vary as the light passes through it, giving rise to nonlinear optics. If the index varies quadratically with the field (linearly with the intensity), it is called the optical Kerr effect and causes phenomena such as self-focusing and self-phase modulation. If the index varies linearly with the field (a nontrivial linear coefficient is only possible in materials that do not possess inversion symmetry), it is known as the Pockels effect.

A gradient-index lens with a parabolic variation of refractive index (n) with radial distance (x). The lens focuses light in the same way as a conventional lens. If the refractive index of a medium is not constant, but varies gradually with position, the material is known as a gradient-index or GRIN medium and is described by gradient index optics. Light traveling through such a medium can be bent or focused, and this effect can be exploited to produce lenses, some optical fibers and other devices. Introducing GRIN elements in the design of an optical system can greatly simplify the system, reducing the number of elements by as much as a third while maintaining overall performance. The crystalline lens of the human eye is an example of a GRIN lens with a refractive index varying from about 1.406 in the inner core to approximately 1.386 at the less dense cortex. Some common mirages are caused by a spatially varying refractive index of air.

The refractive index of liquids or solids can be measured with refractometers. They typically measure some angle of refraction or the critical angle for total internal reflection. The first laboratory refractometers sold commercially were developed by Ernst Abbe in the late 19th century. The same principles are still used today. In this instrument a thin layer of the liquid to be measured is placed between two prisms. Light is shone through the liquid at incidence angles all the way up to 90°, i.e., light rays parallel to the surface. The second prism should have an index of refraction higher than that of the liquid, so that light only enters the prism at angles smaller than the critical angle for total reflection. This angle can then be measured either by looking through a telescope, [clarification needed] or with a digital photodetector placed in the focal plane of a lens. The refractive index n of the liquid can then be calculated from the maximum transmission angle θ as n=nG sin θ, where nG is the refractive index of the prism.

This type of devices are commonly used in chemical laboratories for identification of substances and for quality control. Handheld variants are used in agriculture by, e.g., wine makers to determine sugar content in grape juice, and inline process refractometers are used in, e.g., chemical and pharmaceutical industry for process control. In gemology a different type of refractometer is used to measure index of refraction and birefringence of gemstones. The gem is placed on a high refractive index prism and illuminated from below. A high refractive index contact liquid is used to achieve optical contact between the gem and the prism. At small incidence angles most of the light will be transmitted into the gem, but at high angles total internal reflection will occur in the prism. The critical angle is normally measured by looking through a telescope.

Unstained biological structures appear mostly transparent under Bright-field microscopy as most cellular structures do not attenuate appreciable quantities of light. Nevertheless, the variation in the materials that constitutes these structures also corresponds to a variation in the refractive index. The following techniques convert such variation into measurable amplitude differences. To measure the spatial variation of refractive index in a sample phase-contrast imaging methods are used. These methods measure the variations in phase of the light wave exiting the sample. The phase is proportional to the optical path length the light ray has traversed, and thus gives a measure of the integral of the refractive index along the ray path. The phase cannot be measured directly at optical or higher frequencies, and therefore needs to be converted into intensity by interference with a reference beam. In the visual spectrum this is done using Zernike phase-contrast microscopy, differential interference contrast microscopy (DIC) or interferometry. Zernike phase-contrast microscopy introduces a phase shift to the low spatial frequency components of the image with a phase-shifting annulus in the Fourier plane of the sample, so that high-spatial-frequency parts of the image can interfere with the low-frequency reference beam. In DIC the illumination is split up into two beams that are given different polarizations, are phase shifted differently, and are shifted transversely with slightly different amounts. After the specimen, the two parts are made to interfere, giving an image of the derivative of the optical path length in the direction of the difference in transverse shift.[36] In interferometry the illumination is split up into two beams by a partially reflective mirror. One of the beams is let through the sample before they are combined to interfere and give a direct image of the phase shifts. If the optical path length variations are more than a wavelength the image will contain fringes. There exist several phase-contrast X-ray imaging techniques to determine 2D or 3D spatial distribution of refractive index of samples in the X-ray regime.

The refractive index is a very important property of the components of any optical instrument that uses refraction. It determines the focusing power of lenses, the dispersive power of prisms, and generally the path of light through the system. It is the increase in refractive index in the core that guides the light in an optical fiber, and the variations in refractive index that reduces the reflectivity of a surface treated with an anti-reflective coating. Variant refractive index can generate resonant cavity that can enhance phase shift of output light. This is important for design and fabricate a variety of optoelectronic devices such as hologram and lens. Since refractive index is a fundamental physical property of a substance, it is often used to identify a particular substance, confirm its purity, or measure its concentration. Refractive index is used to measure solids, liquids, and gases. Most commonly it is used to measure the concentration of a solute in an aqueous solution. It can also be used as a useful tool to differentiate between different types of gemstone, due to the unique chatoyance each individual stone displays. A refractometer is the instrument used to measure refractive index. For a solution of sugar, the refractive index can be used to determine the sugar content (see Brix).

Polarization (also polarisation) is a property applying to transverse waves that specifies the geometrical orientation of the oscillations. In a transverse wave, the direction of the oscillation is transverse to the direction of motion of the wave, so the oscillations can have different directions perpendicular to the wave direction. A simple example of a polarized transverse wave is vibrations traveling along a taut string; for example, in a musical instrument like a guitar string. Depending on how the string is plucked, the vibrations can be in a vertical direction, horizontal direction, or at any angle perpendicular to the string. In contrast, in longitudinal waves, such as sound waves in a liquid or gas, the displacement of the particles in the oscillation is always in the direction of propagation, so these waves do not exhibit polarization. Transverse waves that exhibit polarization include electromagnetic waves such as light and radio waves, gravitational waves, and transverse sound waves (shear waves) in solids. In some types of transverse waves, the wave displacement is limited to a single direction, so these also do not exhibit polarization; for example, in surface waves in liquids (gravity waves), the wave displacement of the particles is always in a vertical plane.

An electromagnetic wave such as light consists of a coupled oscillating electric field and magnetic field which are always perpendicular; by convention, the "polarization" of electromagnetic waves refers to the direction of the electric field. In linear polarization, the fields oscillate in a single direction. In circular or elliptical polarization, the fields rotate at a constant rate in a plane as the wave travels. The rotation can have two possible directions; if the fields rotate in a right hand sense with respect to the direction of wave travel, it is called right circular polarization, or, if the fields rotate in a left hand sense, it is called left circular polarization.

Light or other electromagnetic radiation from many sources, such as the sun, flames, and incandescent lamps, consists of short wave trains with an equal mixture of polarizations; this is called unpolarized light. Polarized light can be produced by passing unpolarized light through a polarizing filter, which allows waves of only one polarization to pass through. The most common optical materials (such as glass) are isotropic and do not affect the polarization of light passing through them; however, some materials—those that exhibit birefringence, dichroism, or optical activity—can change the polarization of light. Some of these are used to make polarizing filters. Light is also partially polarized when it reflects from a surface.

According to quantum mechanics, electromagnetic waves can also be viewed as streams of particles called photons. When viewed in this way, the polarization of an electromagnetic wave is determined by a quantum mechanical property of photons called their spin[citation needed]. A photon has one of two possible spins: it can either spin in a right hand sense or a left hand sense about its direction of travel. Circularly polarized electromagnetic waves are composed of photons with only one type of spin, either right- or left-hand. Linearly polarized waves consist of equal numbers of right and left hand spinning photons, with their phase synchronized so they superpose to give oscillation in a plane. Polarization is an important parameter in areas of science dealing with transverse waves, such as optics, seismology, radio, and microwaves. Especially impacted are technologies such as lasers, wireless and optical fiber telecommunications, and radar.

Most sources of light are classified as incoherent and unpolarized (or only "partially polarized") because they consist of a random mixture of waves having different spatial characteristics, frequencies (wavelengths), phases, and polarization states. However, for understanding electromagnetic waves and polarization in particular, it is easiest to just consider coherent plane waves; these are sinusoidal waves of one particular direction (or wavevector), frequency, phase, and polarization state. Characterizing an optical system in relation to a plane wave with those given parameters can then be used to predict its response to a more general case, since a wave with any specified spatial structure can be decomposed into a combination of plane waves (its so-called angular spectrum). And incoherent states can be modeled stochastically as a weighted combination of such uncorrelated waves with some distribution of frequencies (its spectrum), phases, and polarizations.

A "vertically polarized" electromagnetic wave of wavelength λ has its electric field vector E (red) oscillating in the vertical direction. The magnetic field B (or H) is always at right angles to it (blue), and both are perpendicular to the direction of propagation (z). Electromagnetic waves (such as light), traveling in free space or another homogeneous isotropic non-attenuating medium, are properly described as transverse waves, meaning that a plane wave's electric field vector E and magnetic field H are in directions perpendicular to (or "transverse" to) the direction of wave propagation; E and H are also perpendicular to each other. Considering a monochromatic plane wave of optical frequency f (light of vacuum wavelength λ has a frequency of f=c/λ where c is the speed of light), let us take the direction of propagation as the z axis. Being a transverse wave the E and H fields must then contain components only in the x and y directions whereas Ez=Hz=0. Using complex (or phasor) notation, we understand the instantaneous physical electric and magnetic fields to be given by the real parts of the complex quantities occurring in the following equations. As a function of time t and spatial position z (since for a plane wave in the +z direction the fields have no dependence on x or y) where λ/n is the wavelength in the medium (whose refractive index is n) and T=1/f is the period of the wave. Here ex, ey, hx, and by are complex numbers. In the second more compact form, as these equations are customarily expressed, these factors are described using the wavenumber and angular frequency (or "radian frequency"). In a more general formulation with propagation not restricted to the +z direction, then the spatial dependence kz is replaced where is called the wave vector, the magnitude of which is the wavenumber.

Thus the leading vectors e and h each contain up to two nonzero (complex) components describing the amplitude and phase of the wave's x and y polarization components (again, there can be no z polarization component for a transverse wave in the +z direction). For a given medium with a characteristic impedance, h is related to e. In a dielectric, η is real and has the value η0/n, where n is the refractive index and η0 is the impedance of free space. The impedance will be complex in a conducting medium. [clarification needed] Note that given that relationship, the dot product of E and H must be zero indicating that these vectors are orthogonal (at right angles to each other), as expected.

So knowing the propagation direction (+z in this case) and η, one can just as well specify the wave in terms of just ex and ey describing the electric field. The vector containing ex and ey (but without the z component which is necessarily zero for a transverse wave) is known as a Jones vector. In addition to specifying the polarization state of the wave, a general Jones vector also specifies the overall magnitude and phase of that wave. Specifically, the intensity of the light wave is proportional to the sum of the squared magnitudes of the two electric field components, however the wave's state of polarization is only dependent on the (complex) ratio of ey to ex. So let us just consider waves whose |ex|2+|ey|2=1; this happens to correspond to an intensity of about 0.00133 watts per square meter in free space. And since the absolute phase of a wave is unimportant in discussing its polarization state, let us stipulate that the phase of ex is zero, in other words ex is a real number while ey may be complex. Under these restrictions, ex and ey can be represented where the polarization state is now fully parameterized by the value of Q (such that −1<Q<1) and the relative phase. By convention when one speaks of a wave's "polarization," if not otherwise specified, reference is being made to the polarization of the electric field. The polarization of the magnetic field always follows that of the electric field but with a 90 degree rotation, as detailed above.

In addition to transverse waves, there are many wave motions where the oscillation is not limited to directions perpendicular to the direction of propagation. These cases are far beyond the scope of the current article which concentrates on transverse waves (such as most electromagnetic waves in bulk media), however one should be aware of cases where the polarization of a coherent wave cannot be described simply using a Jones vector, as we have just done. Just considering electromagnetic waves, we note that the preceding discussion strictly applies to plane waves in a homogeneous isotropic non-attenuating medium, whereas in an anisotropic medium (such as birefringent crystals as discussed below) the electric or magnetic field may have longitudinal as well as transverse components. In those cases the electric displacement D and magnetic flux density B [clarification needed] still obey the above geometry but due to anisotropy in the electric susceptibility (or in the magnetic permeability), now given by a tensor, the direction of E (or H) may differ from that of D (or B). Even in isotropic media, so-called inhomogeneous waves can be launched into a medium whose refractive index has a significant imaginary part (or "extinction coefficient") such as metals; [clarification needed] these fields are also not strictly transverse. Surface waves or waves propagating in a waveguide (such as an optical fiber) are generally not transverse waves, but might be described as an electric or magnetic transverse mode, or a hybrid mode.

Even in free space, longitudinal field components can be generated in focal regions, where the plane wave approximation breaks down. An extreme example is radially or tangentially polarized light, at the focus of which the electric or magnetic field respectively is entirely longitudinal (along the direction of propagation). For longitudinal waves such as sound waves in fluids, the direction of oscillation is by definition along the direction of travel, so the issue of polarization is not normally even mentioned. On the other hand, sound waves in a bulk solid can be transverse as well as longitudinal, for a total of three polarization components. In this case, the transverse polarization is associated with the direction of the shear stress and displacement in directions perpendicular to the propagation direction, while the longitudinal polarization describes compression of the solid and vibration along the direction of propagation. The differential propagation of transverse and longitudinal polarizations is important in seismology.

Polarization is best understood by initially considering only pure polarization states, and only a coherent sinusoidal wave at some optical frequency. The vector in the adjacent diagram might describe the oscillation of the electric field emitted by a single-mode laser (whose oscillation frequency would be typically 1015 times faster). The field oscillates in the x-y plane, along the page, with the wave propagating in the z direction, perpendicular to the page. The first two diagrams below trace the electric field vector over a complete cycle for linear polarization at two different orientations; these are each considered a distinct state of polarization (SOP). Note that the linear polarization at 45° can also be viewed as the addition of a horizontally linearly polarized wave (as in the leftmost figure) and a vertically polarized wave of the same amplitude in the same phase.

Animation showing four different polarization states and two orthogonal projections. A circularly polarized wave as a sum of two linearly polarized components 90° out of phase.

A phase shift in between those horizontal and vertical polarization components, elliptical polarization may result. When the phase shift is exactly ±90°, then circular polarization is produced (fourth and fifth figures). Thus is circular polarization created in practice, starting with linearly polarized light and employing a quarter-wave plate to introduce such a phase shift. The result of two such phase-shifted components in causing a rotating electric field vector is depicted in the animation on the right. Note that circular or elliptical polarization can involve either a clockwise or counterclockwise rotation of the field. These correspond to distinct polarization states, such as the two circular polarizations shown above. Of course the orientation of the x and y axes used in this description is arbitrary. The choice of such a coordinate system and viewing the polarization ellipse in terms of the x and y polarization components, corresponds to the definition of the Jones vector (below) in terms of those basis polarizations. One would typically choose axes to suit a particular problem such as x being in the plane of incidence. Since there are separate reflection coefficients for the linear polarizations in and orthogonal to the plane of incidence (p and s polarizations, see below), that choice greatly simplifies the calculation of a wave's reflection from a surface. Moreover, one can use as basis functions any pair of orthogonal polarization states, not just linear polarizations. For instance, choosing right and left circular polarizations as basis functions simplifies the solution of problems involving circular birefringence (optical activity) or circular dichroism.

Consider a purely polarized monochromatic wave. If one were to plot the electric field vector over one cycle of oscillation, an ellipse would generally be obtained, as is shown in the figure, corresponding to a particular state of elliptical polarization. Note that linear polarization and circular polarization can be seen as special cases of elliptical polarization. A polarization state can then be described in relation to the geometrical parameters of the ellipse, and its "handedness", that is, whether the rotation around the ellipse is clockwise or counter clockwise. One parameterization of the elliptical figure specifies the orientation angle ψ, defined as the angle between the major axis of the ellipse and the x-axis along with the ellipticity ε=a/b, the ratio of the ellipse's major to minor axis. (also known as the axial ratio). The ellipticity parameter is an alternative parameterization of an ellipse's eccentricity, or the ellipticity angle, χ=arctan b/a=arctan 1/ε. The angle χ is also significant in that the latitude (angle from the equator) of the polarization state as represented on the Poincaré sphere (see below) is equal to ±2χ. The special cases of linear and circular polarization correspond to an ellipticity ε of infinity and unity (or χ of zero and 45°) respectively.

Full information on a completely polarized state is also provided by the amplitude and phase of oscillations in two components of the electric field vector in the plane of polarization. This representation was used above to show how different states of polarization are possible. The amplitude and phase information can be conveniently represented as a two-dimensional complex vector (the Jones vector). Here and denote the amplitude of the wave in the two components of the electric field vector, while and represent the phases. The product of a Jones vector with a complex number of unit modulus gives a different Jones vector representing the same ellipse, and thus the same state of polarization. The physical electric field, as the real part of the Jones vector, would be altered but the polarization state itself is independent of absolute phase. The basis vectors used to represent the Jones vector need not represent linear polarization states (i.e. be real). In general any two orthogonal states can be used, where an orthogonal vector pair is formally defined as one having a zero inner product. A common choice is left and right circular polarizations, for example to model the different propagation of waves in two such components in circularly birefringent media (see below) or signal paths of coherent detectors sensitive to circular polarization.

Regardless of whether polarization state is represented using geometric parameters or Jones vectors, implicit in the parameterization is the orientation of the coordinate frame. This permits a degree of freedom, namely rotation about the propagation direction. When considering light that is propagating parallel to the surface of the Earth, the terms "horizontal" and "vertical" polarization are often used, with the former being associated with the first component of the Jones vector, or zero azimuth angle. On the other hand, in astronomy the equatorial coordinate system is generally used instead, with the zero azimuth (or position angle, as it is more commonly called in astronomy to avoid confusion with the horizontal coordinate system) corresponding to due north. Electromagnetic vectors for, and with along with 3 planar projections and a deformation surface of total electric field. The light is always s-polarized in the xy plane. is the polar angle of and is the azimuthal angle. Another coordinate system frequently used relates to the plane of incidence. This is the plane made by the incoming propagation direction and the vector perpendicular to the plane of an interface, in other words, the plane in which the ray travels before and after reflection or refraction. The component of the electric field parallel to this plane is termed p-like (parallel) and the component perpendicular to this plane is termed s-like (from senkrecht, German for perpendicular). Polarized light with its electric field along the plane of incidence is thus denoted p-polarized, while light whose electric field is normal to the plane of incidence is called s-polarized. P polarization is commonly referred to as transverse-magnetic (TM), and has also been termed pi-polarized or tangential plane polarized. S polarization is also called transverse-electric (TE), as well as sigma-polarized or sagittal plane polarized.

Natural light, and most other common sources of visible light, are incoherent: radiation is produced independently by a large number of atoms or molecules whose emissions are uncorrelated and generally of random polarizations. In this case the light is said to be unpolarized. This term is somewhat inexact, since at any instant of time at one location there is a definite direction to the electric and magnetic fields, however it implies that the polarization changes so quickly in time that it will not be measured or relevant to the outcome of an experiment. A so-called depolarizer acts on a polarized beam to create one which is actually fully polarized at every point, but in which the polarization varies so rapidly across the beam that it may be ignored in the intended applications. Unpolarized light can be described as a mixture of two independent oppositely polarized streams, each with half the intensity. Light is said to be partially polarized when there is more power in one of these streams than the other. At any particular wavelength, partially polarized light can be statistically described as the superposition of a completely unpolarized component and a completely polarized one. One may then describe the light in terms of the degree of polarization and the parameters of the polarized component. That polarized component can be described in terms of a Jones vector or polarization ellipse, as is detailed above. However, in order to also describe the degree of polarization, one normally employs Stokes parameters (see below) to specify a state of partial polarization.

The transmission of plane waves through a homogeneous medium are fully described in terms of Jones vectors and 2×2 Jones matrices. However, in practice there are cases in which all of the light cannot be viewed in such a simple manner due to spatial inhomogeneities or the presence of mutually incoherent waves. So-called depolarization, for instance, cannot be described using Jones matrices. For these cases it is usual instead to use a 4×4 matrix that acts upon the Stokes 4-vector. Such matrices were first used by Paul Soleillet in 1929, although they have come to be known as Mueller matrices. While every Jones matrix has a Mueller matrix, the reverse is not true. Mueller matrices are then used to describe the observed polarization effects of the scattering of waves from complex surfaces or ensembles of particles, as shall now be presented.

The Jones vector perfectly describes the state of polarization and phase of a single monochromatic wave, representing a pure state of polarization as described above. However any mixture of waves of different polarizations (or even of different frequencies) do not correspond to a Jones vector. In so-called partially polarized radiation the fields are stochastic, and the variations and correlations between components of the electric field can only be described statistically. One such representation is the coherency matrix where angular brackets denote averaging over many wave cycles. Several variants of the coherency matrix have been proposed: the Wiener coherency matrix and the spectral coherency matrix of Richard Barakat measure the coherence of a spectral decomposition of the signal, while the Wolf coherency matrix averages over all time/frequencies.

The coherency matrix contains all second order statistical information about the polarization. This matrix can be decomposed into the sum of two idempotent matrices, corresponding to the eigenvectors of the coherency matrix, each representing a polarization state that is orthogonal to the other. An alternative decomposition is into completely polarized (zero determinant) and unpolarized (scaled identity matrix) components. In either case, the operation of summing the components corresponds to the incoherent superposition of waves from the two components. The latter case gives rise to the concept of the "degree of polarization"; i.e., the fraction of the total intensity contributed by the completely polarized component.

The coherency matrix is not easy to visualize, and it is therefore common to describe incoherent or partially polarized radiation in terms of its total intensity (I), (fractional) degree of polarization (p), and the shape parameters of the polarization ellipse. An alternative and mathematically convenient description is given by the Stokes parameters, introduced by George Gabriel Stokes in 1852. The relationship of the Stokes parameters to intensity and polarization ellipse parameters. Here Ip, 2ψ and 2χ are the spherical coordinates of the polarization state in the three-dimensional space of the last three Stokes parameters. Note the factors of two before ψ and χ corresponding respectively to the facts that any polarization ellipse is indistinguishable from one rotated by 180°, or one with the semi-axis lengths swapped accompanied by a 90° rotation. The Stokes parameters are sometimes denoted I, Q, U and V.

Neglecting the first Stokes parameter S0 (or I), the three other Stokes parameters can be plotted directly in three-dimensional Cartesian coordinates. For a given power in the polarized component the set of all polarization states are then mapped to points on the surface of the so-called Poincaré sphere (but of radius P), as shown in the accompanying diagram. Poincaré sphere, on or beneath which the three Stokes parameters [S1, S2, S3] (or [Q, U, V]) are plotted in Cartesian coordinates. Often the total beam power is not of interest, in which case a normalized Stokes vector is used by dividing the Stokes vector by the total intensity S0. The normalized Stokes vector then has unity power and the three significant Stokes parameters plotted in three dimensions will lie on the unity-radius Poincaré sphere for pure polarization states. Partially polarized states will lie inside the Poincaré sphere at a distance of from the origin. When the non-polarized component is not of interest, the Stokes vector can be further normalized. When plotted, that point will lie on the surface of the unity-radius Poincaré sphere and indicate the state of polarization of the polarized component. Any two antipodal points on the Poincaré sphere refer to orthogonal polarization states. The overlap between any two polarization states is dependent solely on the distance between their locations along the sphere. This property, which can only be true when pure polarization states are mapped onto a sphere, is the motivation for the invention of the Poincaré sphere and the use of Stokes parameters, which are thus plotted on (or beneath) it.

In a vacuum, the components of the electric field propagate at the speed of light, so that the phase of the wave varies in space and time while the polarization state does not. That is, the electric field vector e of a plane wave in the +z direction where k is the wavenumber. As noted above, the instantaneous electric field is the real part of the product of the Jones vector times the phase factor. When an electromagnetic wave interacts with matter, its propagation is altered according to the material's (complex) index of refraction. When the real or imaginary part of that refractive index is dependent on the polarization state of a wave, properties known as birefringence and polarization dichroism (or diattenuation) respectively, then the polarization state of a wave will generally be altered. In such media, an electromagnetic wave with any given state of polarization may be decomposed into two orthogonally polarized components that encounter different propagation constants. The effect of propagation over a given path on those two components is most easily characterized in the form of a complex 2×2 transformation matrix J known as a Jones matrix. The Jones matrix due to passage through a transparent material is dependent on the propagation distance as well as the birefringence. The birefringence (as well as the average refractive index) will generally be dispersive, that is, it will vary as a function of optical frequency (wavelength). In the case of non-birefringent materials, however, the 2×2 Jones matrix is the identity matrix (multiplied by a scalar phase factor and attenuation factor), implying no change in polarization during propagation.

For propagation effects in two orthogonal modes, the Jones matrix includes g1 and g2 that are complex numbers describing the phase delay and possibly the amplitude attenuation due to propagation in each of the two polarization eigenmodes. T is a unitary matrix representing a change of basis from these propagation modes to the linear system used for the Jones vectors; in the case of linear birefringence or diattenuation the modes are themselves linear polarization states so T and T-1 can be omitted if the coordinate axes have been chosen appropriately.

In media termed birefringent, in which the amplitudes are unchanged but a differential phase delay occurs, the Jones matrix is a unitary matrix: |g1|=|g2|=1. Media termed diattenuating (or dichroic in the sense of polarization), in which only the amplitudes of the two polarizations are affected differentially, may be described using a Hermitian matrix (generally multiplied by a common phase factor). In fact, since any matrix may be written as the product of unitary and positive Hermitian matrices, light propagation through any sequence of polarization-dependent optical components can be written as the product of these two basic types of transformations. In birefringent media there is no attenuation, but two modes accrue a differential phase delay. Well known manifestations of linear birefringence (that is, in which the basis polarizations are orthogonal linear polarizations) appear in optical wave plates/retarders and many crystals. If linearly polarized light passes through a birefringent material, its state of polarization will generally change, unless its polarization direction is identical to one of those basis polarizations. Since the phase shift, and thus the change in polarization state, is usually wavelength-dependent, such objects viewed under white light in between two polarizers may give rise to colorful effects, as seen in the accompanying photograph.

Circular birefringence is also termed optical activity, especially in chiral fluids, or Faraday rotation, when due to the presence of a magnetic field along the direction of propagation. When linearly polarized light is passed through such an object, it will exit still linearly polarized, but with the axis of polarization rotated. A combination of linear and circular birefringence will have as basis polarizations two orthogonal elliptical polarizations; however, the term "elliptical birefringence" is rarely used. Paths taken by vectors in the Poincaré sphere under birefringence. The propagation modes (rotation axes) are shown with red, blue, and yellow lines, the initial vectors by thick black lines, and the paths they take by colored ellipses (which represent circles in three dimensions). One can visualize the case of linear birefringence (with two orthogonal linear propagation modes) with an incoming wave linearly polarized at a 45° angle to those modes. As a differential phase starts to accrue, the polarization becomes elliptical, eventually changing to purely circular polarization (90° phase difference), then to elliptical and eventually linear polarization (180° phase) perpendicular to the original polarization, then through circular again (270° phase), then elliptical with the original azimuth angle, and finally back to the original linearly polarized state (360° phase) where the cycle begins anew. In general the situation is more complicated and can be characterized as a rotation in the Poincaré sphere about the axis defined by the propagation modes. Examples for linear (blue), circular (red), and elliptical (yellow) birefringence are shown in the figure on the left. The total intensity and degree of polarization are unaffected. If the path length in the birefringent medium is sufficient, the two polarization components of a collimated beam (or ray) can exit the material with a positional offset, even though their final propagation directions will be the same (assuming the entrance face and exit face are parallel). This is commonly viewed using calcite crystals, which present the viewer with two slightly offset images, in opposite polarizations, of an object behind the crystal. It was this effect that provided the first discovery of polarization, by Erasmus Bartholinus in 1669.

Media in which transmission of one polarization mode is preferentially reduced are called dichroic or diattenuating Like birefringence, diattenuation can be with respect to linear polarization modes (in a crystal) or circular polarization modes (usually in a liquid). Devices that block nearly all of the radiation in one mode are known as polarizing filters or simply "polarizers". This corresponds to $g2=0$ in the above representation of the Jones matrix. The output of an ideal polarizer is a specific polarization state (usually linear polarization) with an amplitude equal to the input wave's original amplitude in that polarization mode. Power in the other polarization mode is eliminated. Thus if unpolarized light is passed through an ideal polarizer (where $g1=1$ and $g2=0$) exactly half of its initial power is retained. Practical polarizers, especially inexpensive sheet polarizers, have additional loss so that $g1=1$. However, in many instances the more relevant figure of merit is the polarizer's degree of polarization or extinction ratio, which involve a comparison of $g1$ to $g2$. Since Jones vectors refer to waves' amplitudes (rather than intensity), when illuminated by unpolarized light the remaining power in the unwanted polarization will be $(g2/g1)2$ of the power in the intended polarization.

In addition to birefringence and dichroism in extended media, polarization effects describable using Jones matrices can also occur at (reflective) interface between two materials of different refractive index. These effects are treated by the Fresnel equations. Part of the wave is transmitted and part is reflected; for a given material those proportions (and also the phase of reflection) are dependent on the angle of incidence and are different for the s and p polarizations. Therefore, the polarization state of reflected light (even if initially unpolarized) is generally changed. A stack of plates at Brewster's angle to a beam reflects off a fraction of the s-polarized light at each surface, leaving (after many such plates) a mainly p-polarized beam. Any light striking a surface at a special angle of incidence known as Brewster's angle, where the reflection coefficient for p polarization is zero, will be reflected with only the s-polarization remaining. This principle is employed in the so-called "pile of plates polarizer" (see figure) in which part of the s polarization is removed by reflection at each Brewster angle surface, leaving only the p polarization after transmission through many such surfaces. The generally smaller reflection coefficient of the p polarization is also the basis of polarized sunglasses; by blocking the s (horizontal) polarization, most of the glare due to reflection from a wet street, for instance, is removed.

In the important special case of reflection at normal incidence (not involving anisotropic materials) there is no particular s or p polarization. Both the x and y polarization components are reflected identically, and therefore the polarization of the reflected wave is identical to that of the incident wave. However, in the case of circular (or elliptical) polarization, the handedness of the polarization state is thereby reversed, since by convention this is specified relative to the direction of propagation. The circular rotation of the electric field around the x-y axes called "right-handed" for a wave in the +z direction is "left-handed" for a wave in the −z direction. But in the general case of reflection at a nonzero angle of incidence, no such generalization can be made. For instance, right-circularly polarized light reflected from a dielectric surface at a grazing angle, will still be right-handed (but elliptically) polarized. Linear polarized light reflected from a metal at non-normal incidence will generally become elliptically polarized. These cases are handled using Jones vectors acted upon by the different Fresnel coefficients for the s and p polarization components.

Some optical measurement techniques are based on polarization. In many other optical techniques polarization is crucial or at least must be taken into account and controlled; such examples are too numerous to mention. In engineering, the phenomenon of stress induced birefringence allows for stresses in transparent materials to be readily observed. As noted above and seen in the accompanying photograph, the chromaticity of birefringence typically creates colored patterns when viewed in between two polarizers. As external forces are applied, internal stress induced in the material is thereby observed. Additionally, birefringence is frequently observed due to stresses "frozen in" at the time of manufacture. This is famously observed in cellophane tape whose birefringence is due to the stretching of the material during the manufacturing process.

Ellipsometry is a powerful technique for the measurement of the optical properties of a uniform surface. It involves measuring the polarization state of light following specular reflection from such a surface. This is typically done as a function of incidence angle or wavelength (or both). Since ellipsometry relies on reflection, it is not required for the sample to be transparent to light or for its back side to be accessible. Ellipsometry can be used to model the (complex) refractive index of a surface of a bulk material. It is also very useful in determining parameters of one or more thin film layers deposited on a substrate. Due to their reflection properties, not only are the predicted magnitude of the p and s polarization components, but their relative phase shifts upon reflection, compared to measurements using an ellipsometer. A normal ellipsometer does not measure the actual reflection coefficient (which requires careful photometric calibration of the illuminating beam) but the ratio of the p and s reflections, as well as change of polarization ellipticity (hence the name) induced upon reflection by the surface being studied. In addition to use in science and research, ellipsometers are used in situ to control production processes for instance.

Sound waves in solid materials exhibit polarization. Differential propagation of the three polarizations through the earth is a crucial in the field of seismology. Horizontally and vertically polarized seismic waves (shear waves) are termed SH and SV, while waves with longitudinal polarization (compressional waves) are termed P-waves. We have seen (above) that the birefringence of a type of crystal is useful in identifying it, and thus detection of linear birefringence is especially useful in geology and mineralogy. Linearly polarized light generally has its polarization state altered upon transmission through such a crystal, making it stand out when viewed in between two crossed polarizers, as seen in the photograph, above. Likewise, in chemistry, rotation of polarization axes in a liquid solution can be a useful measurement. In a liquid, linear birefringence is impossible, however there may be circular birefringence when a chiral molecule is in solution. When the right and left handed enantiomers of such a molecule are present in equal numbers (a so-called racemic mixture) then their effects cancel out. However, when there is only one (or a preponderance of one), as is more often the case for organic molecules, a net circular birefringence (or optical activity) is observed, revealing the magnitude of that imbalance (or the concentration of the molecule itself, when it can be assumed that only one enantiomer is present). This is measured using a polarimeter in which polarized light is passed through a tube of the liquid, at the end of which is another polarizer which is rotated in order to null the transmission of light through it.

Effect of a polarizer on reflection from mud flats. In the picture on the left, the horizontally oriented polarizer preferentially transmits those reflections; rotating the polarizer by 90° (right) as one would view using polarized sunglasses blocks almost all specularly reflected sunlight. One can test whether sunglasses are polarized by looking through two pairs, with one perpendicular to the other. If both are polarized, all light will be blocked. Unpolarized light, after being reflected by a specular (shiny) surface, generally obtains a degree of polarization. This phenomenon was observed in 1808 by the mathematician Étienne-Louis Malus, after whom Malus's law is named. Polarizing sunglasses exploit this effect to reduce glare from reflections by horizontal surfaces, notably the road ahead viewed at a grazing angle.

Wearers of polarized sunglasses will occasionally observe inadvertent polarization effects such as color-dependent birefringent effects, for example in toughened glass (e.g., car windows) or items made from transparent plastics, in conjunction with natural polarization by reflection or scattering. The polarized light from LCD monitors (see below) is very conspicuous when these are worn. Polarization is observed in the light of the sky, as this is due to sunlight scattered by aerosols as it passes through the earth's atmosphere. The scattered light produces the brightness and color in clear skies. This partial polarization of scattered light can be used to darken the sky in photographs, increasing the contrast. This effect is most strongly observed at points on the sky making a 90° angle to the sun. Polarizing filters use these effects to optimize the results of photographing scenes in which reflection or scattering by the sky is involved.

Sky polarization has been used for orientation in navigation. The Pfund sky compass was used in the 1950s when navigating near the poles of the Earth's magnetic field when neither the sun nor stars were visible (e.g., under daytime cloud or twilight). It has been suggested, controversially, that the Vikings exploited a similar device (the "sunstone") in their extensive expeditions across the North Atlantic in the 9th-11th centuries, before the arrival of the magnetic compass from Asia to Europe in the 12th century. Related to the sky compass is the "polar clock", invented by Charles Wheatstone in the late 19th century.

The principle of liquid-crystal display (LCD) technology relies on the rotation of the axis of linear polarization by the liquid crystal array. Light from the backlight (or the back reflective layer, in devices not including or requiring a backlight) first passes through a linear polarizing sheet. That polarized light passes through the actual liquid crystal layer which may be organized in pixels (for a TV or computer monitor) or in another format such as a seven-segment display or one with custom symbols for a particular product. The liquid crystal layer is produced with a consistent right (or left) handed chirality, essentially consisting of tiny helices. This causes circular birefringence, and is engineered so that there is a 90 degree rotation of the linear polarization state. However, when a voltage is applied across a cell, the molecules straighten out, lessening or totally losing the circular birefringence. On the viewing side of the display is another linear polarizing sheet, usually oriented at 90 degrees from the one behind the active layer. Therefore, when the circular birefringence is removed by the application of a sufficient voltage, the polarization of the transmitted light remains at right angles to the front polarizer, and the pixel appears dark. With no voltage, however, the 90 degree rotation of the polarization causes it to exactly match the axis of the front polarizer, allowing the light through. Intermediate voltages create intermediate rotation of the polarization axis and the pixel has an intermediate intensity. Displays based on this principle are widespread, and now are used in the vast majority of televisions, computer monitors and video projectors, rendering the previous CRT technology essentially obsolete. The use of polarization in the operation of LCD displays is immediately apparent to someone wearing polarized sunglasses, often making the display unreadable.

In a totally different sense, polarization encoding has become the leading (but not sole) method for delivering separate images to the left and right eye in stereoscopic displays used for 3D movies. This involves separate images intended for each eye either projected from two different projectors with orthogonally oriented polarizing filters or, more typically, from a single projector with time multiplexed polarization (a fast alternating polarization device for successive frames). Polarized 3D glasses with suitable polarizing filters ensure that each eye receives only the intended image. Historically such systems used linear polarization encoding because it was inexpensive and offered good separation. However circular polarization makes separation of the two images insensitive to tilting of the head, and is widely used in 3-D movie exhibition today, such as the system from RealD. Projecting such images requires screens that maintain the polarization of the projected light when viewed in reflection (such as silver screens); a normal diffuse white projection screen causes depolarization of the projected images, making it unsuitable for this application.

Although now obsolete, CRT computer displays suffered from reflection by the glass envelope, causing glare from room lights and consequently poor contrast. Several anti-reflection solutions were employed to ameliorate this problem. One solution utilized the principle of reflection of circularly polarized light. A circular polarizing filter in front of the screen allows for the transmission of (say) only right circularly polarized room light. Now, right circularly polarized light (depending on the convention used) has its electric (and magnetic) field direction rotating clockwise while propagating in the +z direction. Upon reflection, the field still has the same direction of rotation, but now propagation is in the −z direction making the reflected wave left circularly polarized. With the right circular polarization filter placed in front of the reflecting glass, the unwanted light reflected from the glass will thus be in very polarization state that is blocked by that filter, eliminating the reflection problem. The reversal of circular polarization on reflection and elimination of reflections in this manner can be easily observed by looking in a mirror while wearing 3-D movie glasses which employ left- and right-handed circular polarization in the two lenses. Closing one eye, the other eye will see a reflection in which it cannot see itself; that lens appears black. However the other lens (of the closed eye) will have the correct circular polarization allowing the closed eye to be easily seen by the open one.

It is well known that electromagnetic radiation carries a certain linear momentum in the direction of propagation. In addition, however, light carries a certain angular momentum if it is circularly polarized (or partially so). In comparison with lower frequencies such as microwaves, the amount of angular momentum in light, even of pure circular polarization, compared to the same wave's linear momentum (or radiation pressure) is very small and difficult to even measure. However it was utilized in an experiment to achieve speeds of up to 600 million revolutions per minute.

Reflection is the change in direction of a wavefront at an interface between two different media so that the wavefront returns into the medium from which it originated. Common examples include the reflection of light, sound and water waves. The law of reflection says that for specular reflection the angle at which the wave is incident on the surface equals the angle at which it is reflected. Mirrors exhibit specular reflection. In acoustics, reflection causes echoes and is used in sonar. In geology, it is important in the study of seismic waves. Reflection is observed with surface waves in bodies of water. Reflection is observed with many types of electromagnetic wave, besides visible light. Reflection of VHF and higher frequencies is important for radio transmission and for radar. Even hard X-rays and gamma rays can be reflected at shallow angles with special "grazing" mirrors.

Reflection of light is either specular (mirror-like) or diffuse (retaining the energy, but losing the image) depending on the nature of the interface. In specular reflection the phase of the reflected waves depends on the choice of the origin of coordinates, but the relative phase between s and p (TE and TM) polarizations is fixed by the properties of the media and of the interface between them. A mirror provides the most common model for specular light reflection, and typically consists of a glass sheet with a metallic coating where the significant reflection occurs. Reflection is enhanced in metals by suppression of wave propagation beyond their skin depths. Reflection also occurs at the surface of transparent media, such as water or glass. A light ray PO strikes a vertical mirror at point O, and the reflected ray is OQ. By projecting an imaginary line through point O perpendicular to the mirror, known as the normal, we can measure the angle of incidence, $\theta i$ and the angle of reflection, $\theta r$. The law of reflection states that $\theta i = \theta r$, or in other words, the angle of incidence equals the angle of reflection. In fact, reflection of light may occur whenever light travels from a medium of a given refractive index into a medium with a different refractive index. In the most general case, a certain fraction of the light is reflected from the interface, and the remainder is refracted. Solving Maxwell's equations for a light ray striking a boundary allows the derivation of the Fresnel equations, which can be used to predict how much of the light is reflected, and how much is refracted in a given situation. This is analogous to the way impedance mismatch in an electric circuit causes reflection of signals. Total internal reflection of light from a denser medium occurs if the angle of incidence is greater than the critical angle.

Total internal reflection may be used within a machine vision system as a means of focusing waves that cannot effectively be reflected by common means. X-ray telescopes are constructed by creating a converging "tunnel" for the waves. As the waves interact at low angle with the surface of this tunnel they are reflected toward the focus point (or toward another interaction with the tunnel surface, eventually being directed to the detector at the focus). A conventional reflector would be useless as the X-rays would simply pass through the intended reflector.

When light reflects off a material denser (with higher refractive index) than the external medium, it undergoes a phase inversion. In contrast, a less dense, lower refractive index material will reflect light in phase. This is an important principle in the field of thin-film optics. Specular reflection forms images. Reflection from a flat surface forms a mirror image, which appears to be reversed from left to right because we compare the image we see to what we would see if we were rotated into the position of the image. Specular reflection at a curved surface forms an image which may be magnified or demagnified; curved mirrors have optical power. Such mirrors may have surfaces that are spherical or parabolic.

If the reflecting surface is very smooth, the reflection of light that occurs is called specular or regular reflection. The laws of reflection are as follows: 1. The incident ray, the reflected ray and the normal to the reflection surface at the point of the incidence lie in the same plane, 2. The angle which the incident ray makes with the normal is equal to the angle which the reflected ray makes to the same normal, and 3. The reflected ray and the incident ray are on the opposite sides of the normal.

In classical electrodynamics, light is considered as an electromagnetic wave, which is described by Maxwell's equations. Light waves incident on a material induce small oscillations of polarisation in the individual atoms (or oscillation of electrons, in metals), causing each particle to radiate a small secondary wave in all directions, like a dipole antenna. All these waves add up to give specular reflection and refraction, according to the Huygens-Fresnel principle. In the case of dielectrics such as glass, the electric field of the light acts on the electrons in the material, and the moving electrons generate fields and become new radiators. The refracted light in the glass is the combination of the forward radiation of the electrons and the incident light. The reflected light is the combination of the backward radiation of all of the electrons.

In metals, electrons with no binding energy are called free electrons. When these electrons oscillate with the incident light, the phase difference between their radiation field and the incident field is $\pi$ (180°), so the forward radiation cancels the incident light, and backward radiation is just the reflected light. Light-matter interaction in terms of photons is a topic of quantum electrodynamics, and is described in detail by Richard Feynman in his popular book QED: The Strange Theory of Light and Matter.

When light strikes the surface of a (non-metallic) material it bounces off in all directions due to multiple reflections by the microscopic irregularities inside the material (e.g. the grain boundaries of a polycrystalline material, or the cell or fiber boundaries of an organic material) and by its surface, if it is rough. Thus, an 'image' is not formed. This is called diffuse reflection. The exact form of the reflection depends on the structure of the material. One common model for diffuse reflection is Lambertian reflectance, in which the light is reflected with equal luminance (in photometry) or radiance (in radiometry) in all directions, as defined by Lambert's cosine law. The light sent to our eyes by most of the objects we see is due to diffuse reflection from their surface, so that this is our primary mechanism of physical observation.

Some surfaces exhibit retroreflection. The structure of these surfaces is such that light is returned in the direction from which it came. When flying over clouds illuminated by sunlight the region seen around the aircraft's shadow will appear brighter, and a similar effect may be seen from dew on grass. This partial retro-reflection is created by the refractive properties of the curved droplet's surface and reflective properties at the backside of the droplet.

A simple retroreflector can be made by placing three ordinary mirrors mutually perpendicular to one another (a corner reflector). The image produced is the inverse of one produced by a single mirror. A surface can be made partially retroreflective by depositing a layer of tiny refractive spheres on it or by creating small pyramid like structures. In both cases internal reflection causes the light to be reflected back to where it originated. This is used to make traffic signs and automobile license plates reflect light mostly back in the direction from which it came. In this application perfect retroreflection is not desired, since the light would then be directed back into the headlights of an oncoming car rather than to the driver's eyes.

When light reflects off a mirror, one image appears. Two mirrors placed exactly face to face give the appearance of an infinite number of images along a straight line. The multiple images seen between two mirrors that sit at an angle to each other lie over a circle. The center of that circle is located at the imaginary intersection of the mirrors. A square of four mirrors placed face to face give the appearance of an infinite number of images arranged in a plane. The multiple images seen between four mirrors assembling a pyramid, in which each pair of mirrors sits an angle to each other, lie over a sphere. If the base of the pyramid is rectangle shaped, the images spread over a section of a torus. Note that these are theoretical ideals, requiring perfect alignment of perfectly smooth, perfectly flat perfect reflectors that absorb none of the light. In practice, these situations can only be approached but not achieved because the effects of any surface imperfections in the reflectors propagate and magnify, absorption gradually extinguishes the image, and any observing equipment (biological or technological) will interfere.

In this process (which is also known as phase conjugation), light bounces exactly back in the direction from which it came due to a nonlinear optical process. Not only the direction of the light is reversed, but the actual wavefronts are reversed as well. A conjugate reflector can be used to remove aberrations from a beam by reflecting it and then passing the reflection through the aberrating optics a second time.

Materials that reflect neutrons, for example beryllium, are used in nuclear reactors and nuclear weapons. In the physical and biological sciences, the reflection of neutrons off of atoms within a material is commonly used to determine the material's internal structure.

Spectral reflectance curves for aluminium (Al), silver (Ag), and gold (Au) metal mirrors at normal incidence. Reflectance of the surface of a material is its effectiveness in reflecting radiant energy. It is the fraction of incident electromagnetic power that is reflected at an interface. The reflectance spectrum or spectral reflectance curve is the plot of the reflectance as a function of wavelength. The hemispherical reflectance of a surface may be denoted R, where $\Phi$er is the radiant flux reflected by that surface; $\Phi$ei is the radiant flux received by that surface.

The spectral hemispherical reflectance in frequency and spectral hemispherical reflectance in wavelength of a surface, denoted $R\nu$ and $R\lambda$ respectively, may be defined where $\Phi$e,$\nu$r is the spectral radiant flux in frequency reflected by that surface; $\Phi$e,$\nu$i is the spectral radiant flux in frequency received by that surface; $\Phi$e,$\lambda$r is the spectral radiant flux in wavelength reflected by that surface; $\Phi$e,$\lambda$i is the spectral radiant flux in wavelength received by that surface.

The directional reflectance of a surface, denoted $R\Omega$, may be defined where Le,$\Omega$r is the radiance reflected by that surface; Le,$\Omega$i is the radiance received by that surface.

The spectral directional reflectance in frequency and spectral directional reflectance inwavelength of a surface, denoted $R\Omega,\nu$ and $R\Omega,\lambda$ respectively, may be defined where Le,$\Omega$,$\nu$r is the spectral radiance in frequency reflected by that surface; Le,$\Omega$,$\nu$i is the spectral radiance received by that surface; Le,$\Omega$,$\lambda$r is the spectral radiance in wavelength reflected by that surface; Le,$\Omega$,$\lambda$i is the spectral radiance in wavelength received by that surface.

Fresnel reflection coefficients for a boundary surface between air and a variable material in dependence of the complex refractive index and the angle of incidence. "Reflectivity" redirects here. For the EM formulation, see Fresnel power reflection. For homogeneous and semi-infinite (see halfspace) materials, reflectivity is the same as reflectance. Reflectivity is the square of the magnitude of the Fresnel reflection coefficient, which is the ratio of the reflected to incident electric field; as such the reflection coefficient can be expressed as a complex number as determined by the Fresnel equations for a single layer, whereas the reflectance is always a positive real number. For layered and finite media, according to the CIE, reflectivity is distinguished from reflectance by the fact that reflectivity is a value that applies to thick reflecting objects. When reflection occurs from thin layers of material, internal reflection effects can cause the reflectance to vary with surface thickness. Reflectivity is the limit value of reflectance as the sample becomes thick; it is the intrinsic reflectance of the surface, hence irrespective of other parameters such as the reflectance of the rear surface. Another way to interpret this is that the reflectance is the fraction of electromagnetic power reflected from a specific sample, while reflectivity is a property of the material itself, which would be measured on a perfect machine if the material filled half of all space.

Given that reflectance is a directional property, most surfaces can be divided into those that give specular reflection and those that give diffuse reflection: for specular surfaces, such as glass or polished metal, reflectance will be nearly zero at all angles except at the appropriate reflected angle; that is, reflected radiation will follow a different path from incident radiation for all cases other than radiation normal to the surface; for diffuse surfaces, such as matte white paint, reflectance is uniform; radiation is reflected in all angles equally or near-equally. Such surfaces are said to be Lambertian. Most real objects have some mixture of diffuse and specular reflective properties.

Reflectance of smooth water at 20° C. (refractive index 1.333). Reflection occurs when light moves from a medium with one index of refraction into a second medium with a different index of refraction. Specular reflection from a body of water is calculated by the Fresnel equations. Fresnel reflection is directional and therefore does not contribute significantly to albedo which primarily diffuses reflection. A real water surface may be wavy. Reflectance, which assumes a flat surface as given by the Fresnel equations, can be adjusted to account for waviness.

The generalization of reflectance to a diffraction grating, which disperses light by wavelength, is called diffraction efficiency. Reflectance is an important concept in the fields of optics, solar thermal energy, telecommunication and radar. SI radiometry units v, t, e, joule J, Energy of electromagnetic radiation. Radiant energy density joule per cubic metre J/m3. Radiant energy per unit volume. Radiant flux $\Phi e$[nb 2] watt W=J/s. Radiant energy emitted, reflected, transmitted or received, per unit time. This is sometimes also called "radiant power". Spectral flux $\Phi c,v$[nb 3] or $\Phi c,\lambda$[nb 4] watt per hertz or watt per metre W/Hz or W/m or Radiant flux per unit frequency or wavelength. The latter is commonly measured in W·nm−1. Radiant intensity Ie,$\Omega$[nb 5] watt per steradian W/sr Radiant flux emitted, reflected, transmitted or received, per unit solid angle. This is a directional quantity. Spectral intensity Ie,$\Omega$,v[nb 3] or Ie,$\Omega$,$\lambda$[nb 4] watt per steradian per hertz or watt per steradian per metre W·sr−1·Hz−1 or W·sr−1·m−1 or Radiant intensity per unit frequency or wavelength. The latter is commonly measured in W·sr−1·nm−1. This is a directional quantity. Radiance Le,$\Omega$[nb 5] watt per steradian per square metre W·sr−1·m−2 M·T−3 Radiant flux emitted, reflected, transmitted or received by a surface, per unit solid angle per unit projected area. This is a directional quantity. This is sometimes also confusingly called "intensity". Spectral radiance Le,$\Omega$,v[nb 3] or Le,$\Omega$,$\lambda$[nb 4] watt per steradian per square metre per hertz or watt per steradian per square metre, per metre W·sr−1·m−2·Hz−1 or W·sr−1·m−3 M·T−2 or M·L−1·T−3 Radiance of a surface per unit frequency or wavelength. The latter is commonly measured in W·sr−1·m−2·nm−1. This is a directional quantity. This is sometimes also confusingly called "spectral intensity". Irradiance Flux density Ee[nb 2] watt per square metre W/m2 M·T−3 Radiant flux received by a surface per unit area. This is sometimes also confusingly called "intensity". Spectral irradiance Spectral flux density Ee,v[nb 3] or Ee,$\lambda$[nb 4] watt per square metre per hertz or watt per square metre, per metre W·m−2·Hz−1 or W/m3 M·T−2 or M·L−1·T−3 Irradiance of a surface per unit frequency or wavelength. This is sometimes also confusingly called "spectral intensity". Non-SI units of spectral flux density include jansky (1 Jy=10−26 W·m−2·Hz−1) and solar flux unit (1 sfu=10−22 W·m−2·Hz−1=104 Jy). Radiosity Je[nb 2] watt per square metre W/m2 M·T−3 Radiant flux leaving (emitted, reflected and transmitted by) a surface per unit area. This is sometimes also confusingly called "intensity". Spectral radiosity Je,v[nb 3] or Je,$\lambda$[nb 4] watt per square metre per hertz or watt per square metre, per metre W·m−2·Hz−1 or W/m3M·T−2 or M·L−1·T−3 Radiosity of a surface per unit frequency or wavelength. The latter is commonly measured in W·m−2·nm−1. This is sometimes also confusingly called "spectral intensity". Radiant exitance Me[nb 2] watt per square metre W/m2 M·T−3 Radiant flux emitted by a surface per unit area. This is the emitted component of radiosity. "Radiant emittance" is an old term for this quantity. This is sometimes also confusingly called "intensity". Spectral exitance Me,v[nb 3] or Me,$\lambda$[nb 4] watt per square metre per hertz or watt per square metre, per metre W·m−2·Hz−1 or W/m3 M·T−2 or M·L−1·T−3 Radiant exitance of a surface per unit frequency or wavelength. The latter is commonly measured in W·m−2·nm−1. "Spectral emittance" is an old term for this quantity. This is sometimes also confusingly called "spectral intensity". Radiant exposure He joule per square metre J/m2 M·T−2 Radiant energy received by a surface per unit area, or equivalently irradiance of a surface integrated over time of irradiation. This is sometimes also called "radiant fluence". Spectral exposure He,v[nb 3] or He,$\lambda$[nb 4] joule per square metre per hertz or joule per square metre, per metre J·m−2·Hz−1 or J/m3 M·T−1 or M·L−1·T−2 Radiant exposure of a surface per unit frequency or wavelength. The latter is commonly measured in J·m−2·nm−1. This is sometimes also called "spectral fluence". Hemispherical emissivity $\epsilon$1 Radiant exitance of a surface, divided by that of a black body at the same temperature as that surface. Spectral hemispherical emissivity $\epsilon v$ or $\epsilon \lambda$ 1 Spectral exitance of a surface, divided by that of a black body at the same temperature as that surface. Directional emissivity $\epsilon \Omega$ 1 Radiance emitted by a surface, divided by that emitted by a black body at the same temperature as that surface. Spectral directional emissivity $\epsilon \Omega,v$ or $\epsilon \Omega,\lambda$1 Spectral radiance emitted by a surface, divided by that of a black body at the same temperature as that surface. Hemispherical absorptance A 1 Radiant flux absorbed by a surface, divided by that received by that surface. This should not be confused with "absorbance". Spectral hemispherical absorptance Av or A$\lambda$ 1 Spectral flux absorbed by a surface, divided by that received by that surface. This should not be confused with "spectral absorbance". Directional absorptance A$\Omega$ 1 Radiance absorbed by a surface, divided by the radiance incident onto that surface. This should not be confused with "absorbance". Spectral directional absorptance A$\Omega$,v or A$\Omega$,$\lambda$1 Spectral radiance absorbed by a surface, divided by the spectral radiance incident onto that surface. This should not be confused with "spectral absorbance". Hemispherical reflectance R 1Radiant flux reflected by a surface, divided by that received by that surface. Spectral hemispherical reflectance Rv or R$\lambda$ 1 Spectral flux reflected by a surface, divided by that received by that surface. Directional reflectance R$\Omega$ 1 Radiance reflected by a surface, divided by that received by that surface. Spectral directional reflectance R$\Omega$,v or R$\Omega$,$\lambda$ 1 Spectral radiance reflected by a surface, divided by that received by that surface. Hemispherical transmittance T 1 Radiant flux transmitted by a surface, divided by that received by that surface. Spectral hemispherical transmittance Tv or Tλ 1 Spectral flux transmitted by a surface, divided by that received by that surface. Directional transmittance TΩ 1 Radiance transmitted by a surface, divided by that received by that surface. Spectral directional transmittance TΩ,v or TΩ,λ 1 Spectral radiance transmitted by a surface, divided by that received by that surface. Hemispherical attenuation coefficient μ reciprocal metre m−1 L−1 Radiant flux absorbed and scattered by a volume per unit length, divided by that received by that volume. Spectral hemispherical attenuation coefficient μv or μλ reciprocal metre m−1 L−1 Spectral radiant flux absorbed and scattered by a volume per unit length, divided by that received by that volume. Directional attenuation coefficient μΩ reciprocal metre m−1 L−1 Radiance absorbed and scattered by a volume per unit length, divided by that received by that volume. Spectral directional attenuation coefficient μΩ, v or μΩ,λ reciprocal metre m−1 L−1Spectral radiance absorbed and scattered by a volumeper unit length, divided by that received by that volume. See also: SI·Radiometry· Photometry 1. Jump up ˆ Standards organizations recommend that radiometric quantities should be denoted with suffix "e" (for "energetic") to avoid confusion with photometric or photon quantities. 2.ˆ Jump up to: a b c d e Alternative symbols sometimes seen: W or E for radiant energy, P or F for radiant flux, I for irradiance, W for radiant exitance. 3.ˆ Jump up to: a b c d e f g Spectral quantities given per unit frequency are denoted with suffix "v" (Greek)—not to be confused with suffix "v" (for "visual") indicating a photometric quantity. 4.ˆ Jump up to: a b c de f g Spectral quantities given per unit wavelength are denoted with suffix "λ" (Greek). 5.ˆ Jump up to: a b Directional quantities are denoted with suffix "Ω" (Greek).

An overview of electromagnetic radiation absorption. This example discusses the general principle using visible light as specific example. A white light source—emitting light of multiple wavelengths—is focused on a sample (the pairs of complementary colors are indicated by the yellow dotted lines). Upon striking the sample, photons that match the energy gap of the molecules present (green light in this example) are absorbed, exciting the molecules. Other photons are transmitted unaffected and, if the radiation is in the visible region (400-700 nm), the transmitted light appears as the complementary color (here red). By recording the attenuation of light for various wavelengths, an absorption spectrum can be obtained.

In physics, absorption of electromagnetic radiation is the way in which the energy of a photon is taken up by matter, typically the electrons of an atom. Thus, the electromagnetic energy is transformed into internal energy of the absorber, for example thermal energy.[1] The reduction in intensity of a light wave propagating through a medium by absorption of a part of its photons is often called attenuation. Usually, the absorption of waves does not depend on their intensity (linear absorption), although in certain conditions (usually, in optics), the medium changes its transparency dependently on the intensity of waves going through, and saturable absorption (or nonlinear absorption) occurs.

There are a number of ways to quantify how quickly and effectively radiation is absorbed in a certain medium, for example: The absorption coefficient, and some closely related derived quantities: The attenuation coefficient, which is sometimes but not always synonymous with the absorption coefficient Molar absorptivity, also called "molar extinction coefficient", which is the absorption coefficient divided by molarity (see also Beer-Lambert law). The mass attenuation coefficient, also called "mass extinction coefficient", which is the absorption coefficient divided by density. The absorption cross section and scattering cross-section are closely related to the absorption and attenuation coefficients, respectively. "Extinction" in astronomy is equivalent to the attenuation coefficient. Penetration depth and skin effect, Propagation constant, attenuation constant, phase constant, and complex wavenumber, Complex refractive index and extinction coefficient, Complex dielectric constant, Electrical resistivity and conductivity. Absorbance (also called "optical density") and optical depth (also called "optical thickness") are two related measures All these quantities measure, at least to some extent, how well a medium absorbs radiation. However, practitioners of different fields and techniques tend to conventionally use different quantities drawn from the list above.

The absorbance of an object quantifies how much of the incident light is absorbed by it (instead of being reflected or refracted). This may be related to other properties of the object through the Beer-Lambert law. Precise measurements of the absorbance at many wavelengths allow the identification of a substance via absorption spectroscopy, where a sample is illuminated from one side, and the intensity of the light that exits from the sample in every direction is measured. A few examples of absorption are ultraviolet-visible spectroscopy, infrared spectroscopy, and X-ray absorption spectroscopy.

Rough plot of Earth's atmospheric transmittance (or opacity) to various wavelengths of electromagnetic radiation, including visible light. Understanding and measuring the absorption of electromagnetic radiation has a variety of applications. Here are a few examples: In meteorology and climatology, global and local temperatures depend in part on the absorption of radiation by atmospheric gases (such as in the greenhouse effect) and land and ocean surfaces (see albedo). In medicine, X-rays are absorbed to different extents by different tissues (bone in particular), which is the basis for X-ray imaging. For example, see computation of radiowave attenuation in the atmosphere used in satellite link design. In chemistry and materials science, because different materials and molecules will absorb radiation to different extents at different frequencies, which allows for material identification. In optics, sunglasses, colored filters, dyes, and other such materials are designed specifically with respect to which visible wavelengths they absorb, and in what proportions. In biology, photosynthetic organisms require that light of the appropriate wavelengths be absorbed within the active area of chloroplasts, so that the light energy can be converted into chemical energy within sugars and other molecules. In physics, the D-region of Earth's ionosphere is known to significantly absorb radio signals that fall within the high-frequency electromagnetic spectrum. In nuclear physics, absorption of nuclear radiations can be used for measuring the fluid levels, densitometry or thickness measurements.

Fluorescent solutions under UV-light. Absorbed photons are rapidly re-emitted under longer electromagnetic wavelengths. Photoluminescence (abbreviated as PL) is light emission from any form of matter after the absorption of photons (electromagnetic radiation). It is one of many forms of luminescence (light emission) and is initiated by photo-excitation (i.e. photons that excite electrons to a higher energy level in an atom), hence the prefix photo-. Following excitation various relaxation processes typically occur in which other photons are re-radiated. Time periods between absorption and emission may vary: ranging from short femtosecond-regime for emission involving free-carrier plasma in inorganic semiconductors up to milliseconds for phosphorescent processes in molecular systems; and under special circumstances delay of emission may even span to minutes or hours. Observation of photoluminescence at a certain energy can be viewed as an indication that an electron populated an excited state associated with this transition energy. While this is generally true in atoms and similar systems, correlations and other more complex phenomena also act as sources for photoluminescence in many-body systems such as semiconductors. A theoretical approach to handle this is given by the Photoluminescence processes can be classified by various parameters such as the energy of the exciting photon with respect to the emission. Resonant excitation describes a situation in which photons of a particular wavelength are absorbed and equivalent photons are very rapidly re-emitted. This is often referred to as resonance fluorescence. For materials in solution or in the gas phase, this process involves electrons but no significant internal energy transitions involving molecular features of the chemical substance between absorption and emission. In crystalline inorganic semiconductors where an electronic band structure is formed, secondary emission can be more complicated as events may contain both coherent contributions such as resonant Rayleigh scattering where a fixed phase relation with the driving light field is maintained (i.e. energetically elastic processes where no losses are involved), and incoherent contributions (or inelastic modes where some energy channels into an auxiliary loss mode). The latter originate, e.g., from the radiative recombination of excitons, Coulomb-bound electron-hole pair states in solids. Resonance fluorescence may also show significant quantum optical correlations.

More processes may occur when a substance undergoes internal energy transitions before re-emitting the energy from the absorption event. Electrons change energy states by either resonantly gaining energy from absorption of a photon or losing energy by emitting photons. In chemistry-related disciplines, one often distinguishes between fluorescence and phosphorescence. The former is typically a fast process, yet some amount of the original energy is dissipated so that re-emitted light photons will have lower energy than did the absorbed excitation photons. The re-emitted photon in this case is said to be red shifted, referring to the reduced energy it carries following this loss (as the Jablonski diagram shows). For phosphorescence, electrons which absorbed photons, undergo intersystem crossing where they enter into a state with altered spin multiplicity (see term symbol), usually a triplet state. Once the excited electron is transferred into this triplet state, electron transition (relaxation) back to the lower singlet state energies is quantum mechanically forbidden, meaning that it happens much more slowly than other transitions. The result is a slow process of radiative transition back to the singlet state, sometimes lasting minutes or hours. This is the basis for "glow in the dark" substances.

Photoluminescence is an important technique for measuring the purity and crystalline quality of semiconductors such as GaN and InP and for quantification of the amount of disorder present in a system. Time-resolved photoluminescence (TRPL) is a method where the sample is excited with a light pulse and then the decay in photoluminescence with respect to time is measured. This technique is useful for measuring the minority carrier lifetime of III-V semiconductors like gallium arsenide (GaAs).

In a typical PL experiment, a semiconductor is excited with a light-source that provides photons with an energy larger than the bandgap energy. The incoming light excites a polarization that can be described with the semiconductor Bloch equations.[7][8] Once the photons are absorbed, electrons and holes are formed with finite momenta in the conduction and valence bands, respectively. The excitations then undergo energy and momentum relaxation towards the band gap minimum. Typical mechanisms are Coulomb scattering and the interaction with phonons. Finally, the electrons recombine with holes under emission of photons.

Ideal, defect-free semiconductors are many-body systems where the interactions of charge-carriers and lattice vibrations have to be considered in addition to the light-matter coupling. In general, the PL properties are also extremely sensitive to internal electric fields and to the dielectric environment (such as in photonic crystals) which impose further degrees of complexity. A precise microscopic description is provided by the semiconductor luminescence equations. An ideal, defect-free semiconductor quantum well structure is a useful model system to illustrate the fundamental processes in typical PL experiments. The discussion is based on results published in Klingshirn (2012) and Balkan (1998). The fictive model structure for this discussion has two confined quantized electronic and two hole subbands, e1, e2 and h1, h2, respectively. The linear absorption spectrum of such a structure shows the exciton resonances of the first (e1$h$1) and the second quantum well subbands (e2, h2), as well as the absorption from the corresponding continuum states and from the barrier.

In general, three different excitation conditions are distinguished: resonant, quasi-resonant, and non-resonant. For the resonant excitation, the central energy of the laser corresponds to the lowest exciton resonance of the quantum well. No or only a negligible amount of the excess energy is injected to the carrier system. For these conditions, coherent processes contribute significantly to the spontaneous emission. The decay of polarization creates excitons directly. The detection of PL is challenging for resonant excitation as it is difficult to discriminate contributions from the excitation, i.e., stray-light and diffuse scattering from surface roughness. Thus, speckle and resonant Rayleigh-scattering are always superimposed to the incoherent emission. In case of the non-resonant excitation, the structure is excited with some excess energy. This is the typical situation used in most PL experiments as the excitation energy can be discriminated using a spectrometer or an optical filter. One has to distinguish between quasi-resonant excitation and barrier excitation.

For quasi-resonant conditions, the energy of the excitation is tuned above the ground state but still below the barrier absorption edge, for example, into the continuum of the first subband. The polarization decay for these conditions is much faster than for resonant excitation and coherent contributions to the quantum well emission are negligible. The initial temperature of the carrier system is significantly higher than the lattice temperature due to the surplus energy of the injected carriers. Finally, only the electron-hole plasma is initially created. It is then followed by the formation of excitons. In case of barrier excitation, the initial carrier distribution in the quantum well strongly depends on the carrier scattering between barrier and the well.

Initially, the laser light induces coherent polarization in the sample, i.e., the transitions between electron and hole states oscillate with the laser frequency and a fixed phase. The polarization dephases typically on a sub-100 fs time-scale in case of nonresonant excitation due to ultra-fast Coulomb- and phonon-scattering. The dephasing of the polarization leads to creation of populations of electrons and holes in the conduction and the valence bands, respectively.

The lifetime of the carrier populations is rather long, limited by radiative and non-radiative recombination such as Auger recombination. During this lifetime a fraction of electrons and holes may form excitons, this topic is still controversially discussed in the literature. The formation rate depends on the experimental conditions such as lattice temperature, excitation density, as well as on the general material parameters, e.g., the strength of the Coulomb-interaction or the exciton binding energy. The characteristic time-scales are in the range of hundreds of picoseconds in GaAs; they appear to be much shorter in wide-gap semiconductors.

Directly after the excitation with short (femtosecond) pulses and the quasi-instantaneous decay of the polarization, the carrier distribution is mainly determined by the spectral width of the excitation, e.g., a laser pulse. The distribution is thus highly non-thermal and resembles a Gaussian distribution, centered at a finite momentum. In the first hundreds of femtoseconds, the carriers are scattered by phonons, or at elevated carrier densities via Coulomb-interaction. The carrier system successively relaxes to the Fermi-Dirac distribution typically within the first picosecond. Finally, the carrier system cools down under the emission of phonons. This can take up to several nanoseconds, depending on the material system, the lattice temperature, and the excitation conditions such as the surplus energy. Initially, the carrier temperature decreases fast via emission of optical phonons. This is quite efficient due to the comparatively large energy associated with optical phonons, (36 meV or 420K in GaAs) and their rather flat dispersion, allowing for a wide range of scattering processes under conservation of energy and momentum. Once the carrier temperature decreases below the value corresponding to the optical phonon energy, acoustic phonons dominate the relaxation. Here, cooling is less efficient due their dispersion and small energies and the temperature decreases much slower beyond the first tens of picoseconds. At elevated excitation densities, the carrier cooling is further inhibited by the so-called hot-phonon effect. The relaxation of a large number of hot carriers leads to a high generation rate of optical phonons which exceeds the decay rate into acoustic phonons. This creates a non-equilibrium "over-population" of optical phonons and thus causes their increased reabsorption by the charge-carriers significantly suppressing any cooling. Thus, a system cools slower, the higher the carrier density is.

The emission directly after the excitation is spectrally very broad, yet still centered in the vicinity of the strongest exciton resonance. As the carrier distribution relaxes and cools, the width of the PL peak decreases and the emission energy shifts to match the ground state of the exciton (such as an electron) for ideal samples without disorder. The PL spectrum approaches its quasi-steady-state shape defined by the distribution of electrons and holes. Increasing the excitation density will change the emission spectra. They are dominated by the excitonic ground state for low densities. Additional peaks from higher subband transitions appear as the carrier density or lattice temperature are increased as these states get more and more populated. Also, the width of the main PL peak increases significantly with rising excitation due to excitation-induced dephasing and the emission peak experiences a small shift in energy due to the Coulomb-renormalization and phase-filling. In general, both exciton populations and plasma, uncorrelated electrons and holes, can act as sources for photoluminescence as described in the semiconductor-luminescence equations. Both yield very similar spectral features which are difficult to distinguish; their emission dynamics, however, vary significantly. The decay of excitons yields a single-exponential decay function since the probability of their radiative recombination does not depend on the carrier density. The probability of spontaneous emission for uncorrelated electrons and holes, is approximately proportional to the product of electron and hole populations eventually leading to a non-single-exponential decay described by a hyperbolic function.

Real material systems always incorporate disorder. Examples are structural defects in the lattice or disorder due to variations of the chemical composition. Their treatment is extremely challenging for microscopic theories due to the lack of detailed knowledge about perturbations of the ideal structure. Thus, the influence of the extrinsic effects on the PL is usually addressed phenomenologically. In experiments, disorder can lead to localization of carriers and hence drastically increase the photoluminescence life times as localized carriers cannot as easily find nonradiative recombination centers as can free ones.

Researchers from the King Abdullah University of Science and Technology (KAUST) have studied the photoinduced entropy (i.e. thermodynamic disorder) of InGaN/GaN p-i-n double-heterostructure and AlGaN nanowires using temperature-dependent photoluminescence. They defined the photoinduced entropy as a thermodynamic quantity that represents the unavailability of a system's energy for conversion into useful work due to carrier recombination and photon emission. They have also related the change in entropy generation to the change in photocarrier dynamics in the nanowire active regions using results from time-resolved photoluminescence study. They hypothesized that the amount of generated disorder in the InGaN layers eventually increases as the temperature approaches room temperature because of the thermal activation of surface states, while an insignificant increase was observed in AlGaN nanowires, indicating lower degrees of disorder-induced uncertainty in the wider bandgap semiconductor. To study the photoinduced entropy, the scientists have developed a mathematical model that considers the net energy exchange resulting from photoexcitation and photoluminescence.

Photoluminescence spectroscopy is a widely used technique for characterisation of the optical and electronic properties of semiconductors and molecules. In chemistry, it is more often referred to as fluorescence spectroscopy, but the instrumentation is the same. The relaxation processes can be studied using Time-resolved fluorescence spectroscopy to find the decay lifetime of the photoluminescence. These techniques can be combined with microscopy, to map the intensity (Confocal microscopy) or the lifetime (Fluorescence-lifetime imaging microscopy) of the photoluminescence across a sample (e.g. a semiconducting wafer, or a biological sample that has been marked with fluorescent molecules).

Fluorescent minerals emit visible light when exposed to ultraviolet light. Fluorescence is the emission of light by a substance that has absorbed light or other electromagnetic radiation. It is a form of luminescence. In most cases, the emitted light has a longer wavelength, and therefore lower energy, than the absorbed radiation. The most striking example of fluorescence occurs when the absorbed radiation is in the ultraviolet region of the spectrum, and thus invisible to the human eye, while the emitted light is in the visible region, which gives the fluorescent substance a distinct color that can be seen only when exposed to UV light. Fluorescent materials cease to glow nearly immediately when the radiation source stops, unlike phosphorescent materials, which continue to emit light for some time after. Fluorescence has many practical applications, including mineralogy, gemology, medicine, chemical sensors (fluorescence spectroscopy), fluorescent labelling, dyes, biological detectors, cosmic-ray detection, and, most commonly, fluorescent lamps. Fluorescence also occurs frequently in nature in some minerals and in various biological states in many branches of the animal kingdom. Fluorescence occurs when an orbital electron of a molecule, atom, or nanostructure, relaxes to its ground state by emitting a photon from an excited singlet state: Excitation: Fluorescence (emission): Here is a generic term for photon energy with h=Planck's constant and v=frequency of light. The specific frequencies of exciting and emitted light are dependent on the particular system. S0 is called the ground state of the fluorophore (fluorescent molecule), and S1 is its first (electronically) excited singlet state. A molecule in S1 can relax by various competing pathways. It can undergo non-radiative relaxation in which the excitation energy is dissipated as heat (vibrations) to the solvent. Excited organic molecules can also relax via conversion to a triplet state, which may subsequently relax via phosphorescence, or by a secondary non-radiative relaxation step. Relaxation from S1 can also occur through interaction with a second molecule through fluorescence quenching. Molecular oxygen (O2) is an extremely efficient quencher of fluorescence just because of its unusual triplet ground state. In most cases, the emitted light has a longer wavelength, and therefore lower energy, than the absorbed radiation; this phenomenon is known as the Stokes shift. However, when the absorbed electromagnetic radiation is intense, it is possible for one electron to absorb two photons; this two-photon absorption can lead to emission of radiation having a shorter wavelength than the absorbed radiation. The emitted radiation may also be of the same wavelength as the absorbed radiation, termed "resonance fluorescence". Molecules that are excited through light absorption or via a different process (e.g. as the product of a reaction) can transfer energy to a second 'sensitized' molecule, which is converted to its excited state and can then fluoresce.

The fluorescence quantum yield gives the efficiency of the fluorescence process. It is defined as the ratio of the number of photons emitted to the number of photons absorbed. The maximum possible fluorescence quantum yield is 1.0 (100%); each photon absorbed results in a photon emitted. Compounds with quantum yields of 0.10 are still considered quite fluorescent. Another way to define the quantum yield of fluorescence is by the rate of excited state decay where is the rate constant of spontaneous emission of radiation and is the sum of all rates of excited state decay. Other rates of excited state decay are caused by mechanisms other than photon emission and are, therefore, often called "non-radiative rates", which can include: dynamic collisional quenching, near-field dipole-dipole interaction (or resonance energy transfer), internal conversion, and intersystem crossing. Thus, if the rate of any pathway changes, both the excited state lifetime and the fluorescence quantum yield will be affected. Fluorescence quantum yields are measured by comparison to a standard. The quinine salt quinine sulfate in a sulfuric acid solution is a common fluorescence standard.

Jablonski diagram. After an electron absorbs a high-energy photon the system is excited electronically and vibrationally. The system relaxes vibrationally, and eventually fluoresces at a longer wavelength. The fluorescence lifetime refers to the average time the molecule stays in its excited state before emitting a photon. Fluorescence typically follows first-order kinetics where is the concentration of excited state molecules at time, is the initial concentration and is the decay rate or the inverse of the fluorescence lifetime. This is an instance of exponential decay. Various radiative and non-radiative processes can de-populate the excited state. In such case the total decay rate is the sum over all rates: where is the total decay rate, the radiative decay rate and the non-radiative decay rate. It is similar to a first-order chemical reaction in which the first-order rate constant is the sum of all of the rates (a parallel kinetic model). If the rate of spontaneous emission, or any of the other rates are fast, the lifetime is short. For commonly used fluorescent compounds, typical excited state decay times for photon emissions with energies from the UV to near infrared are within the range of 0.5 to 20 nanoseconds. The fluorescence lifetime is an important parameter for practical applications of fluorescence such as fluorescence resonance energy transfer and fluorescence-lifetime imaging microscopy.

The Jablonski diagram describes most of the relaxation mechanisms for excited state molecules. The diagram alongside shows how fluorescence occurs due to the relaxation of certain excited electrons of a molecule. Fluorophores are more likely to be excited by photons if the transition moment of the fluorophore is parallel to the electric vector of the photon. The polarization of the emitted light will also depend on the transition moment. The transition moment is dependent on the physical orientation of the fluorophore molecule. For fluorophores in solution this means that the intensity and polarization of the emitted light is dependent on rotational diffusion. Therefore, anisotropy measurements can be used to investigate how freely a fluorescent molecule moves in a particular environment. Fluorescence anisotropy can be defined quantitatively where is the emitted intensity parallel to polarization of the excitation light and is the emitted intensity perpendicular to the polarization of the excitation light.

Strongly fluorescent pigments often have an unusual appearance which is often described colloquially as a "neon color." This phenomenon was termed "Farbenglut" by Hermann von Helmholtz and "fluorence" by Ralph M. Evans. It is generally thought to be related to the high brightness of the color relative to what it would be as a component of white. Fluorescence shifts energy in the incident illumination from shorter wavelengths to longer (such as blue to yellow) and thus can make the fluorescent color appear brighter (more saturated) than it could possibly be by reflection alone. There are several general rules that deal with fluorescence. Each of the following rules has exceptions but they are useful guidelines for understanding fluorescence (these rules do not necessarily apply to two-photon absorption).

Kasha's rule dictates that the quantum yield of luminescence is independent of the wavelength of exciting radiation. This occurs because excited molecules usually decay to the lowest vibrational level of the excited state before fluorescence emission takes place. The Kasha-Vavilov rule does not always apply and is violated severely in many simple molecules. A somewhat more reliable statement, although still with exceptions, would be that the fluorescence spectrum shows very little dependence on the wavelength of exciting radiation.

For many fluorophores the absorption spectrum is a mirror image of the emission spectrum. This is known as the mirror image rule and is related to the Franck-Condon principle which states that electronic transitions are vertical, that is energy changes without distance changing as can be represented with a vertical line in Jablonski diagram. This means the nucleus does not move and the vibration levels of the excited state resemble the vibration levels of the ground state.

In general, emitted fluorescence light has a longer wavelength and lower energy than the absorbed light. This phenomenon, known as Stokes shift, is due to energy loss between the time a photon is absorbed and when a new one is emitted. The causes and magnitude of Stokes shift can be complex and are dependent on the fluorophore and its environment. However, there are some common causes. It is frequently due to non-radiative decay to the lowest vibrational energy level of the excited state. Another factor is that the emission of fluorescence frequently leaves a fluorophore in a higher vibrational level of the ground state.

Biofluorescence is the absorption of electromagnetic wavelengths from the visible light spectrum by fluorescent proteins in a living organism, and the emission of light at a lower energy level. This causes the light that is emitted to be a different color than the light that is absorbed. Stimulating light excites an electron, raising energy to an unstable level. This instability is unfavorable, so the energized electron is returned to a stable state almost as immediately as it becomes unstable. This return to stability corresponds with the release of excess energy in the form of fluorescence light. This emission of light is only observable when the stimulant light is still providing light to the organism/object and is typically yellow, pink, orange, red, green, or purple. Biofluorescence is often confused with the following forms of biotic light, bioluminescence and biophosphorescence.

Bioluminescence differs from biofluorescence in that it is the natural production of light by chemical reactions within an organism, whereas biofluorescence is the absorption and reemission of light from the environment. Biophosphorescence is similar to biofluorescence in its requirement of light wavelengths as a provider of excitation energy. The difference here lies in the relative stability of the energized electron. Unlike with biofluorescence, here the electron retains stability, emitting light that continues to "glow-in-the-dark" even long after the stimulating light source has been removed.

Pigment cells that exhibit fluorescence are called fluorescent chromatophores, and function somatically similar to regular chromatophores. These cells are dendritic, and contain pigments called fluorosomes. These pigments contain fluorescent proteins which are activated by K+ (potassium) ions, and it is their movement, aggregation, and dispersion within the fluorescent chromatophore that cause directed fluorescence patterning. Fluorescent cells are innervated the same as other chromatphores, like melanophores, pigment cells that contain melanin. Short term fluorescent patterning and signaling is controlled by the nervous system. Fluorescent chromatophores can be found in the skin (e.g. in fish) just below the epidermis, amongst other chromatophores. Epidermal fluorescent cells in fish also respond to hormonal stimuli by the α-MSH and MCH hormones much the same as melanophores. This suggests that fluorescent cells may have color changes throughout the day that coincide with their circadian rhythm.[26] Fish may also be sensitive to cortisol induced stress responses to environmental stimuli, such as interaction with a predator or engaging in a mating ritual.

The incidence of fluorescence across the tree of life is widespread, and has been studied most extensively in a phylogenetic sense in fish. The phenomenon appears to have evolved multiple times in multiple taxa such as in the anguilliformes (eels), gobioidei (gobies and cardinalfishes), and tetradontiformes (triggerfishes), along with the other taxa discussed later in the article. Fluorescence is highly genotypically and phenotypically variable even within ecosystems, in regards to the wavelengths emitted, the patterns displayed, and the intensity of the fluorescence. Generally, the species relying upon camouflage exhibit the greatest diversity in fluorescence, likely because camouflage is one of the most common uses of fluorescence. Currently, relatively little is known about the functional significance of fluorescence and fluorescent proteins. However, it is suspected that biofluorescence may serve important functions in signaling and communication, mating, lures, camouflage, UV protection and antioxidation, photoacclimation, dinoflagellate regulation, and in coral health.

Water absorbs light of long wavelengths, so less light from these wavelengths reflects back to reach the eye. Therefore, warm colors from the visual light spectrum appear less vibrant at increasing depths. Water scatters light of shorter wavelengths, meaning cooler colors dominate the visual field in the photic zone. Light intensity decreases 10 fold with every 75 m of depth, so at depths of 75 m, light is 10% as intense as it is on the surface, and is only 1% as intense at 150 m as it is on the surface. Because the water filters out the wavelengths and intensity of water reaching certain depths, different proteins, because of the wavelengths and intensities of light they are capable of absorbing, are better suited to different depths. Theoretically, some fish eyes can detect light as deep as 1000 m. At these depths of the aphotic zone, the only sources of light are organisms themselves, giving off light through chemical reactions in a process called bioluminescence.

Fluorescence is simply defined as the absorption of electromagnetic radiation at one wavelength and its reemission at another, lower energy wavelength. Thus any type of fluorescence depends on the presence of external sources of light. Biologically functional fluorescence is found in the photic zone, where there is not only enough light to cause biofluorescence, but enough light for other organisms to detect it. The visual field in the photic zone is naturally blue, so colors of fluorescence can be detected as bright reds, oranges, yellows, and greens. Green is the most commonly found color in the biofluorescent spectrum, yellow the second most, orange the third, and red is the rarest. Fluorescence can occur in organisms in the aphotic zone as a byproduct of that same organism's bioluminescence. Some biofluorescence in the aphotic zone is merely a byproduct of the organism's tissue biochemistry and does not have a functional purpose. However, some cases of functional and adaptive significance of biofluorescence in the aphotic zone of the deep ocean is an active area of research.

Another adaptive use of fluorescence is to generate red light from the ambient blue light of the photic zone to aid vision. Red light can only be seen across short distances due to attenuation of red light wavelengths by water.

Organic solutions such anthracene or stilbene, dissolved in benzene or toluene, fluoresce with ultraviolet or gamma ray irradiation. The decay times of this fluorescence are on the order of nanoseconds, since the duration of the light depends on the lifetime of the excited states of the fluorescent material, in this case anthracene or stilbene. Scintillation is defined a flash of light produced in a transparent material by the passage of a particle (an electron, an alpha particle, an ion, or a high-energy photon). Stilbene and derivatives are used in scintillation counters to detect such particles. Stilbene is also one of the gain mediums used in dye lasers. Fluorescence is observed in the atmosphere when the air is under energetic electron bombardment. In cases such as the natural aurora, high-altitude nuclear explosions, and rocket-borne electron gun experiments, the molecules and ions formed have a fluorescent response to light.

The common fluorescent lamp relies on fluorescence. Inside the glass tube is a partial vacuum and a small amount of mercury. An electric discharge in the tube causes the mercury atoms to emit mostly ultraviolet light. The tube is lined with a coating of a fluorescent material, called the phosphor, which absorbs the ultraviolet and re-emits visible light. Fluorescent lighting is more energy-efficient than incandescent lighting elements. However, the uneven spectrum of traditional fluorescent lamps may cause certain colors to appear different than when illuminated by incandescent light or daylight. The mercury vapor emission spectrum is dominated by a short-wave UV line at 254 nm (which provides most of the energy to the phosphors), accompanied by visible light emission at 436 nm (blue), 546 nm (green) and 579 nm (yellow-orange). These three lines can be observed superimposed on the white continuum using a hand spectroscope, for light emitted by the usual white fluorescent tubes. These same visible lines, accompanied by the emission lines of trivalent europium and trivalent terbium, and further accompanied by the emission continuum of divalent europium in the blue region, comprise the more discontinuous light emission of the modern trichromatic phosphor systems used in many compact fluorescent lamp and traditional lamps where better color rendition is a goal.

White light-emitting diodes (LEDs) became available in the mid-1990s as LED lamps, in which blue light emitted from the semiconductor strikes phosphors deposited on the tiny chip. The combination of the blue light that continues through the phosphor and the green to red fluorescence from the phosphors produces a net emission of white light. Glow sticks sometimes utilize fluorescent materials to absorb light from the chemiluminescent reaction and emit light of a different color.

Many analytical procedures involve the use of a fluorometer, usually with a single exciting wavelength and single detection wavelength. Because of the sensitivity that the method affords, fluorescent molecule concentrations as low as 1 part per trillion can be measured. Fluorescence in several wavelengths can be detected by an array detector, to detect compounds from HPLC flow. Also, TLC plates can be visualized if the compounds or a coloring reagent is fluorescent. Fluorescence is most effective when there is a larger ratio of atoms at lower energy levels in a Boltzmann distribution. There is, then, a higher probability of excitement and release of photons by lower-energy atoms, making analysis more efficient.

Usually the setup of a fluorescence assay involves a light source, which may emit many different wavelengths of light. In general, a single wavelength is required for proper analysis, so, in order to selectively filter the light, it is passed through an excitation monochromator, and then that chosen wavelength is passed through the sample cell. After absorption and re-emission of the energy, many wavelengths may emerge due to Stokes shift and various electron transitions. To separate and analyze them, the fluorescent radiation is passed through an emission monochromator, and observed selectively by a detector.

Endothelial cells under the microscope with three separate channels marking specific cellular components. Fluorescence in the life sciences is used generally as a non-destructive way of tracking or analysis of biological molecules by means of the fluorescent emission at a specific frequency where there is no background from the excitation light, as relatively few cellular components are naturally fluorescent (called intrinsic or autofluorescence). In fact, a protein or other component can be "labelled" with an extrinsic fluorophore, a fluorescent dye that can be a small molecule, protein, or quantum dot, finding a large use in many biological applications. The quantification of a dye is done with a spectrofluorometer and finds additional applications in: When scanning the fluorescence intensity across a plane one has fluorescence microscopy of tissues, cells, or subcellular structures, which is accomplished by labeling an antibody with a fluorophore and allowing the antibody to find its target antigen within the sample. Labelling multiple antibodies with different fluorophores allows visualization of multiple targets within a single image (multiple channels). DNA microarrays are a variant of this. Immunology: An antibody is first prepared by having a fluorescent chemical group attached, and the sites (e.g., on a microscopic specimen) where the antibody has bound can be seen, and even quantified, by the fluorescence. FLIM (Fluorescence Lifetime Imaging Microscopy) can be used to detect certain bio-molecular interactions that manifest themselves by influencing fluorescence lifetimes. Cell and molecular biology: detection of colocalization using fluorescence-labelled antibodies for selective detection of the antigens of interest using specialized software, such as CoLocalizer Pro. FRET (Förster resonance energy transfer, also known as fluorescence resonance energy transfer) is used to study protein interactions, detect specific nucleic acid sequences and used as biosensors, while fluorescence lifetime (FLIM) can give an additional layer of information. Biotechnology: biosensors using fluorescence are being studied as possible Fluorescent glucose biosensors. Automated sequencing of DNA by the chain termination method; each of four different chain terminating bases has its own specific fluorescent tag. As the labelled DNA molecules are separated, the fluorescent label is excited by a UV source, and the identity of the base terminating the molecule is identified by the wavelength of the emitted light. FACS (fluorescence-activated cell sorting). One of several important cell sorting techniques used in the separation of different cell lines (especially those isolated from animal tissues). DNA detection: the compound ethidium bromide, in aqueous solution, has very little fluorescence, as it is quenched by water. Ethidium bromide's fluorescence is greatly enhanced after it binds to DNA, so this compound is very useful in visualising the location of DNA fragments in agarose gel electrophoresis. Intercalated ethidium is in a hydrophobic environment when it is between the base pairs of the DNA, protected from quenching by water which is excluded from the local environment of the intercalated ethidium. Ethidium bromide may be carcinogenic—an arguably safer alternative is the dye SYBR Green. FIGS (Fluorescence image-guided surgery) is a medical imaging technique that uses fluorescence to detect properly labeled structures during surgery. Intravascular fluorescence is a catheter-based medical imaging technique that uses fluorescence to detect high-risk features of atherosclerosis and unhealed vascular stent devices. Plaque autofluorescence has been used in a first-in-man study in coronary arteries in combination with optical coherence tomography. Molecular agents has been also used to detect specific features, such as stent fibrin accumulation and enzymatic activity related to artery inflammation. SAFI (species altered fluorescence imaging) an imaging technique in electrokinetics and microfluidics. It uses non-electromigrating dyes whose fluorescence is easily quenched by migrating chemical species of interest. The dye(s) are usually seeded everywhere in the flow and differential quenching of their fluorescence by analytes is directly observed. Fluorescence-based assays for screening toxic chemicals. The optical assays consist of a mixture of environmental-sensitive fluorescent dyes and human skin cells that generate fluorescence spectra patterns. This approach can reduce the need for laboratory animals in biomedical research and pharmaceutical industry.

Fingerprints can be visualized with fluorescent compounds such as ninhydrin or DFO (1,8-Diazafluoren-9-one). Blood and other substances are sometimes detected by fluorescent reagents, like fluorescein. Fibers, and other materials that may be encountered in forensics or with a relationship to various collectibles, are sometimes fluorescent. Fluorescent penetrant inspection is used to find cracks and other defects on the surface of a part. Dye tracing, using fluorescent dyes, is used to find leaks in liquid and gas plumbing systems. Fluorescent colors are frequently used in signage, particularly road signs. Fluorescent colors are generally recognizable at longer ranges than their non-fluorescent counterparts, with fluorescent orange being particularly noticeable. This property has led to its frequent use in safety signs and labels. Fluorescent compounds are often used to enhance the appearance of fabric and paper, causing a "whitening" effect. A white surface treated with an optical brightener can emit more visible light than that which shines on it, making it appear brighter. The blue light emitted by the brightener compensates for the diminishing blue of the treated material and changes the hue away from yellow or brown and toward white. Optical brighteners are used in laundry detergents, high brightness paper, cosmetics, high-visibility clothing and more.

Earth's atmospheric transmittance over 1 nautical mile sea level path (infrared region). Because of the natural radiation of the hot atmosphere, the intensity of radiation is different from the transmitted part. Transmittance of ruby in optical and near-IR spectra. Note the two broad blue and green absorption bands and one narrow absorption band on the wavelength of 694 nm, which is the wavelength of the ruby laser. Transmittance of the surface of a material is its effectiveness in transmitting radiant energy. It is the fraction of incident electromagnetic power that is transmitted through a sample, in contrast to the transmission coefficient, which is the ratio of the transmitted to incident electric field. Internal transmittance refers to energy loss by absorption, whereas (total) transmittance is that due to absorption, scattering, reflection, etc. Hemispherical transmittance of a surface, denoted T, is defined where $\Phi_{et}$ is the radiant flux transmitted by that surface; $\Phi_{ei}$ is the radiant flux received by that surface.

Spectral hemispherical transmittance in frequency and spectral hemispherical transmittance in wavelength of a surface, denoted $T_\nu$ and $T_\lambda$ respectively, are defined where $\Phi_{e,\nu t}$ is the spectral radiant flux in frequency transmitted by that surface; $\Phi_{e,\nu i}$ is the spectral radiant flux in frequency received by that surface; $\Phi_{e,\lambda t}$ is the spectral radiant flux in wavelength transmitted by that surface; $\Phi_{e,\lambda i}$ is the spectral radiant flux in wavelength received by that surface.

Directional transmittance of a surface, denoted $T\Omega$, is defined where $L_{e,\Omega t}$ is the radiance transmitted by that surface; $L_{e,\Omega i}$ is the radiance received by that surface. Spectral directional transmittance in frequency and spectral directional transmittance in wavelength of a surface, denoted $T_{\nu,\Omega}$ and $T_{\lambda,\Omega}$ respectively, are defined where $L_{e,\Omega,\nu t}$ is the spectral radiance in frequency transmitted by that surface; $L_{e,\Omega,\nu i}$ is the spectral radiance received by that surface; $L_{e,\Omega,\lambda t}$ is the spectral radiance in wavelength transmitted by that surface; $L_{e,\Omega,\lambda i}$ is the spectral radiance in wavelength received by that surface.

By definition, transmittance is related to optical depth and to absorbance where $\tau$ is the optical depth; A is the absorbance. The Beer-Lambert law states that, for N attenuating species in the material sample, or equivalently where $\sigma_i$ is the attenuation cross section of the attenuating specie i in the material sample; $n_i$ is the number density of the attenuating specie i in the material sample; $\epsilon_i$ is the molar attenuation coefficient of the attenuating specie i in the material sample; $c_i$ is the amount concentration of the attenuating specie i in the material sample; l is the path length of the beam of light through the material sample.

Attenuation cross section and molar attenuation coefficient are related by number density and amount concentration where NA is the Avogadro constant. In case of uniform attenuation, these relations become cases of non-uniform attenuation occur in atmospheric science applications and radiation shielding theory for instance.

Diffraction refers to various phenomena that occur when a wave encounters an obstacle or a slit. It is defined as the bending of waves around the corners of an obstacle or aperture into the region of geometrical shadow of the obstacle. In classical physics, the diffraction phenomenon is described as the interference of waves according to the Huygens-Fresnel principle that treats each point in the wave-front as a collection of individual spherical wavelets. These characteristic behaviors are exhibited when a wave encounters an obstacle or a slit that is comparable in size to its wavelength. Similar effects occur when a light wave travels through a medium with a varying refractive index, or when a sound wave travels through a medium with varying acoustic impedance. Diffraction has an impact on the acoustic space. Diffraction occurs with all waves, including sound waves, water waves, and electromagnetic waves such as visible light, X-rays and radio waves.

Since physical objects have wave-like properties (at the atomic level), diffraction also occurs with matter and can be studied according to the principles of quantum mechanics. Italian scientist Francesco Maria Grimaldi coined the word "diffraction" and was the first to record accurate observations of the phenomenon in 1660. While diffraction occurs whenever propagating waves encounter such changes, its effects are generally most pronounced for waves whose wavelength is roughly comparable to the dimensions of the diffracting object or slit. If the obstructing object provides multiple, closely spaced openings, a complex pattern of varying intensity can result. This is due to the addition, or interference, of different parts of a wave that travel to the observer by different paths, where different path lengths result in different phases (see diffraction grating and wave superposition). The formalism of diffraction can also describe the way in which waves of finite extent propagate in free space. For example, the expanding profile of a laser beam, the beam shape of a radar antenna and the field of view of an ultrasonic transducer can all be analyzed using diffraction equations. A glory is an optical phenomenon produced by light backscattered (a combination of diffraction, reflection and refraction) towards its source by a cloud of uniformly sized water droplets. The effects of diffraction are often seen in everyday life. The most striking examples of diffraction are those that involve light; for example, the closely spaced tracks on a CD or DVD act as a diffraction grating to form the familiar rainbow pattern seen when looking at a disc. This principle can be extended to engineer a grating with a structure such that it will produce any diffraction pattern desired; the hologram on a credit card is an example. Diffraction in the atmosphere by small particles can cause a bright ring to be visible around a bright light source like the sun or the moon. A shadow of a solid object, using light from a compact source, shows small fringes near its edges. The speckle pattern which is observed when laser light falls on an optically rough surface is also a diffraction phenomenon. When deli meat appears to be iridescent, that is diffraction off the meat fibers. All these effects are a consequence of the fact that light propagates as a wave.

Diffraction can occur with any kind of wave. Ocean waves diffract around jetties and other obstacles. Sound waves can diffract around objects, which is why one can still hear someone calling even when hiding behind a tree. Diffraction can also be a concern in some technical applications; it sets a fundamental limit to the resolution of a camera, telescope, or microscope.

In traditional classical physics diffraction arises because of the way in which waves propagate; this is described by the Huygens-Fresnel principle and the principle of superposition of waves. The propagation of a wave can be visualized by considering every particle of the transmitted medium on a wavefront as a point source for a secondary spherical wave. The wave displacement at any subsequent point is the sum of these secondary waves. When waves are added together, their sum is determined by the relative phases as well as the amplitudes of the individual waves so that the summed amplitude of the waves can have any value between zero and the sum of the individual amplitudes. Hence, diffraction patterns usually have a series of maxima and minima.

In the modern quantum mechanical understanding of light propagation through a slit (or slits) every photon has what is known as a wavefunction which describes its path from the emitter through the slit to the screen. The wavefunction (the path the photon will take) is determined by the physical surroundings such as slit geometry, screen distance and initial conditions when the photon is created. In important experiments (A low-intensity double-slit experiment was first performed by G. I. Taylor in 1909, see double-slit experiment) the existence of the photon's wavefunction was demonstrated. In the quantum approach the diffraction pattern is created by the distribution of paths, the observation of light and dark bands is the presence or absence of photons in these areas (no interference!). The quantum approach has some striking similarities to the Huygens-Fresnel principle, in that principle the light becomes a series of individually distributed light sources across the slit which is similar to the limited number of paths (or wave functions) available for the photons to travel through the slit.

There are various analytical models which allow the diffracted field to be calculated, including the Kirchhoff-Fresnel diffraction equation which is derived from wave equation, the Fraunhofer diffraction approximation of the Kirchhoff equation which applies to the far field and the Fresnel diffraction approximation which applies to the near field. Most configurations cannot be solved analytically, but can yield numerical solutions through finite element and boundary element methods. It is possible to obtain a qualitative understanding of many diffraction phenomena by considering how the relative phases of the individual secondary wave sources vary, and in particular, the conditions in which the phase difference equals half a cycle in which case waves will cancel one another out. The simplest descriptions of diffraction are those in which the situation can be reduced to a two-dimensional problem. For water waves, this is already the case; water waves propagate only on the surface of the water. For light, we can often neglect one direction if the diffracting object extends in that direction over a distance far greater than the wavelength. In the case of light shining through small circular holes we will have to take into account the full three-dimensional nature of the problem.

Single-slit diffraction—Diffraction of a scalar wave passing through a 1-wavelength-wide slit. Diffraction of a scalar wave passing through a 4-wavelength-wide slit. Numerical approximation of diffraction pattern from a slit of width four wavelengths with an incident plane wave. The main central beam, nulls, and phase reversals are apparent. A long slit of infinitesimal width which is illuminated by light diffracts the light into a series of circular waves and the wavefront which emerges from the slit is a cylindrical wave of uniform intensity. A slit which is wider than a wavelength produces interference effects in the space downstream of the slit. These can be explained by assuming that the slit behaves as though it has a large number of point sources spaced evenly across the width of the slit. The analysis of this system is simplified if we consider light of a single wavelength. If the incident light is coherent, these sources all have the same phase. Light incident at a given point in the space downstream of the slit is made up of contributions from each of these point sources and if the relative phases of these contributions vary by $2\pi$ or more, we may expect to find minima and maxima in the diffracted light. Such phase differences are caused by differences in the path lengths over which contributing rays reach the point from the slit.

We can find the angle at which a first minimum is obtained in the diffracted light by the following reasoning. The light from a source located at the top edge of the slit interferes destructively with a source located at the middle of the slit, when the path difference between them is equal to $\lambda/2$. Similarly, the source just below the top of the slit will interfere destructively with the source located just below the middle of the slit at the same angle. We can continue this reasoning along the entire height of the slit to conclude that the condition for destructive interference for the entire slit is the same as the condition for destructive interference between two narrow slits a distance apart that is half the width of the slit. The path difference is approximately so that the minimum intensity occurs at an angle $\theta$ min given where d is the width of the slit, is the angle of incidence at which the minimum intensity occurs, and is the wavelength of the light. A similar argument can be used to show that if we imagine the slit to be divided into four, six, eight parts, etc., minima are obtained at angles $\theta$ n given where n is an integer other than zero. There is no such simple argument to enable us to find the maxima of the diffraction pattern. The intensity profile can be calculated using the Fraunhofer diffraction equation where is the intensity at a given angle, is the original intensity, and the unnormalized sinc function above is given by if, and This analysis applies only to the far field, that is, at a distance much larger than the width of the slit. 2-slit (top) and 5-slit diffraction of red laser light Diffraction of a red laser using a diffraction grating. A diffraction pattern of a 633 nm laser through a grid of 150 slits.

A diffraction grating is an optical component with a regular pattern. The form of the light diffracted by a grating depends on the structure of the elements and the number of elements present, but all gratings have intensity maxima at angles $\theta$m which are given by the grating equation where $\theta$i is the angle at which the light is incident, d is the separation of grating elements, and m is an integer which can be positive or negative. The light diffracted by a grating is found by summing the light diffracted from each of the elements, and is essentially a convolution of diffraction and interference patterns. Light diffracted by 2-element and 5-element gratings where the grating spacings are the same; it can be seen that the maxima are in the same position, but the detailed structures of the intensities are different.

Computer generated light diffraction pattern from a circular aperture of diameter 0.5 micrometre at a wavelength of 0.6 micrometre (red-light) at distances of 0.1 cm-1 cm in steps of 0.1 cm. One can see the image moving from the Fresnel region into the Fraunhofer region where the Airy pattern is seen. The far-field diffraction of a plane wave incident on a circular aperture is often referred to as the Airy Disk. The variation in intensity with angle is given where a is the radius of the circular aperture, k is equal to $2\pi/\lambda$ and J1 is a Bessel function. The smaller the aperture, the larger the spot size at a given distance, and the greater the divergence of the diffracted beams.

The wave that emerges from a point source has amplitude at location r that is given by the solution of the frequency domain wave equation for a point source (The Helmholtz Equation), where is the 3-dimensional delta function. The delta function has only radial dependence, so the Laplace operator (a.k.a. scalar Laplacian) in the spherical coordinate system simplifies del in cylindrical and spherical coordinates). By direct substitution, the solution to this equation can be readily shown to be the scalar Green's function, which in the spherical coordinate system (and using the physics time convention). This solution assumes that the delta function source is located at the origin. If the source is located at an arbitrary source point, denoted by the vector and the field point is located at the point, then we may represent the scalar Green's function (for arbitrary source location). Therefore, if an electric field, Einc(x,y) is incident on the aperture, the field produced by this aperture distribution is given by the surface integral. On the calculation of Fraunhofer region fields where the source point in the aperture is given by a vector. In the far field, wherein the parallel rays approximation can be employed, the Green's function simplifies. The expression for the far-zone (the Fraunhofer region field) of the planar aperture assumes the form of a Fourier transform. In the far-field/Fraunhofer region, this becomes the spatial Fourier transform of the aperture distribution. Huygens' principle when applied to an aperture simply says that the far-field diffraction pattern is the spatial Fourier transform of the aperture shape, and this is a direct by-product of using the parallel-rays approximation, which is identical to doing a plane wave decomposition of the aperture plane fields (see Fourier optics).

The way in which the beam profile of a laser beam changes as it propagates is determined by diffraction. When the entire emitted beam has a planar, spatially coherent wave front, it approximates Gaussian beam profile and has the lowest divergence for a given diameter. The smaller the output beam, the quicker it diverges. It is possible to reduce the divergence of a laser beam by first expanding it with one convex lens, and then collimating it with a second convex lens whose focal point is coincident with that of the first lens. The resulting beam has a larger diameter, and hence a lower divergence. Divergence of a laser beam may be reduced below the diffraction of a Gaussian beam or even reversed to convergence if the refractive index of the propagation media increases with the light intensity. This may result in a self-focusing effect. When the wave front of the emitted beam has perturbations, only the transverse coherence length (where the wave front perturbation is less than ¼ of the wavelength) should be considered as a Gaussian beam diameter when determining the divergence of the laser beam. If the transverse coherence length in the vertical direction is higher than in horizontal, the laser beam divergence will be lower in the vertical direction than in the horizontal.

The Airy disk around each of the stars from the 2.56 m telescope aperture can be seen in this lucky image of the binary star zeta Boötis. The ability of an imaging system to resolve detail is ultimately limited by diffraction. This is because a plane wave incident on a circular lens or mirror is diffracted as described above. The light is not focused to a point but forms an Airy disk having a central spot in the focal plane with radius to first null where $\lambda$ is the wavelength of the light and N is the f-number (focal length divided by diameter) of the imaging optics. In object space, the corresponding angular resolution where D is the diameter of the entrance pupil of the imaging lens (e.g., of a telescope's main mirror). Two point sources will each produce an Airy pattern—see the photo of a binary star. As the point sources move closer together, the patterns will start to overlap, and ultimately they will merge to form a single pattern, in which case the two point sources cannot be resolved in the image. The Rayleigh criterion specifies that two point sources can be considered to be resolvable if the separation of the two images is at least the radius of the Airy disk, i.e. if the first minimum of one coincides with the maximum of the other. Thus, the larger the aperture of the lens, and the smaller the wavelength, the finer the resolution of an imaging system. This is why telescopes have very large lenses or mirrors, and why optical microscopes are limited in the detail which they can see.

The speckle pattern which is seen when using a laser pointer is another diffraction phenomenon. It is a result of the superposition of many waves with different phases, which are produced when a laser beam illuminates a rough surface. They add together to give a resultant wave whose amplitude, and therefore intensity, varies randomly. Babinet's Principle is a useful theorem stating that the diffraction pattern from an opaque body is identical to that from a hole of the same size and shape, but with differing intensities. This means that the interference conditions of a single obstruction would be the same as that of a single slit. Several qualitative observations can be made of diffraction in general: The angular spacing of the features in the diffraction pattern is inversely proportional to the dimensions of the object causing the diffraction. In other words: The smaller the diffracting object, the 'wider' the resulting diffraction pattern, and vice versa. (More precisely, this is true of the sines of the angles.) The diffraction angles are invariant under scaling; that is, they depend only on the ratio of the wavelength to the size of the diffracting object. When the diffracting object has a periodic structure, for example in a diffraction grating, the features generally become sharper. The third figure, for example, shows a comparison of a double-slit pattern with a pattern formed by five slits, both sets of slits having the same spacing, between the center of one slit and the next.

Quantum theory tells us that every particle exhibits wave properties. In particular, massive particles can interfere and therefore diffract. Diffraction of electrons and neutrons stood as one of the powerful arguments in favor of quantum mechanics. The wavelength associated with a particle is the de Broglie wavelength where h is Planck's constant and p is the momentum of the particle (mass×velocity for slow-moving particles). For most macroscopic objects, this wavelength is so short that it is not meaningful to assign a wavelength to them. A sodium atom traveling at about 30,000 m/s would have a De Broglie wavelength of about 50 pico meters. Because the wavelength for even the smallest of macroscopic objects is extremely small, diffraction of matter waves is only visible for small particles, like electrons, neutrons, atoms and small molecules. The short wavelength of these matter waves makes them ideally suited to study the atomic crystal structure of solids and large molecules like proteins. Relatively larger molecules like buckyballs were also shown to diffract.

Following Bragg's law, each dot (or reflection) in a diffraction pattern may form from a constructive interference of X-rays passing through a crystal. The data can be used to determine the crystal's atomic structure. Diffraction from a three-dimensional periodic structure such as atoms in a crystal is called Bragg diffraction. It is similar to what occurs when waves are scattered from a diffraction grating. Bragg diffraction is a consequence of interference between waves reflecting from different crystal planes. The condition of constructive interference is given by Bragg's law where λ is the wavelength, d is the distance between crystal planes, θ is the angle of the diffracted wave and m is an integer known as the order of the diffracted beam. Bragg diffraction may be carried out using either light of very short wavelength like X-rays or matter waves like neutrons (and electrons) whose wavelength is on the order of (or much smaller than) the atomic spacing.[16] The pattern produced gives information of the separations of crystallographic planes d, allowing one to deduce the crystal structure. Diffraction contrast, in electron microscopes and x-topography devices in particular, is also a powerful tool for examining individual defects and local strain fields in crystals.

The description of diffraction relies on the interference of waves emanating from the same source taking different paths to the same point on a screen. In this description, the difference in phase between waves that took different paths is only dependent on the effective path length. This does not take into account the fact that waves that arrive at the screen at the same time were emitted by the source at different times. The initial phase with which the source emits waves can change over time in an unpredictable way. This means that waves emitted by the source at times that are too far apart can no longer form a constant interference pattern since the relation between their phases is no longer time independent. The length over which the phase in a beam of light is correlated, is called the coherence length. In order for interference to occur, the path length difference must be smaller than the coherence length. This is sometimes referred to as spectral coherence, as it is related to the presence of different frequency components in the wave. In the case of light emitted by an atomic transition, the coherence length is related to the lifetime of the excited state from which the atom made its transition. If waves are emitted from an extended source, this can lead to incoherence in the transversal direction. When looking at a cross section of a beam of light, the length over which the phase is correlated is called the transverse coherence length. In the case of Young's double slit experiment, this would mean that if the transverse coherence length is smaller than the spacing between the two slits, the resulting pattern on a screen would look like two single slit diffraction patterns. In the case of particles like electrons, neutrons and atoms, the coherence length is related to the spatial extent of the wave function that describes the particle.

In optics, a dichroic material is either one which causes visible light to be split up into distinct beams of different wavelengths (colours) (not to be confused with dispersion), or one in which light rays having different polarizations are absorbed by different amounts. The original meaning of dichroic, from the Greek dikhroos, two-coloured, refers to any optical device which can split a beam of light into two beams with differing wavelengths. Such devices include mirrors and filters, usually treated with optical coatings, which are designed to reflect light over a certain range of wavelengths, and transmit light which is outside that range. An example is the dichroic prism, used in some camcorders, which uses several coatings to split light into red, green and blue components for recording on separate CCD arrays, however it is now more common to have a Bayer filter to filter individual pixels on a single CCD array. This kind of dichroic device does not usually depend on the polarization of the light. The term dichromatic is also used in this sense.

The second meaning of dichroic refers to the property of a material in which light in different polarization states traveling through it experiences a different absorption coefficient; this is also known as diattenuation. When the polarization states in question are right and left-handed circular polarization, it is then known as circular dichroism. Since the left- and right-handed circular polarizations represent two spin angular momentum (SAM) states, in this case for a photon, this dichroism can also be thought of as Spin Angular Momentum Dichroism. In some crystals, [which?] the strength of the dichroic effect varies strongly with the wavelength of the light, making them appear to have different colours when viewed with light having differing polarizations.[dubious-discuss] This is more generally referred to as pleochroism, and the technique can be used in mineralogy to identify minerals. In some materials, such as herapathite (iodoquinine sulfate) or Polaroid sheets, the effect is not strongly dependent on wavelength.

Dichroism, in the second meaning above, occurs in liquid crystals due to either the optical anisotropy of the molecular structure or the presence of impurities or the presence of dichroic dyes. The latter is also called a guest-host effect. In a dispersive prism, material dispersion (a wavelength-dependent refractive index) causes different colors to refract at different angles, splitting white light into a spectrum (e.g., a compact fluorescent lamp seen through an Amici prism). In optics, dispersion is the phenomenon in which the phase velocity of a wave depends on its frequency. Media having this common property may be termed dispersive media. Sometimes the term chromatic dispersion is used for specificity. Although the term is used in the field of optics to describe light and other electromagnetic waves, dispersion in the same sense can apply to any sort of wave motion such as acoustic dispersion in the case of sound and seismic waves, in gravity waves (ocean waves), and for telecommunication signals along transmission lines (such as coaxial cable) or optical fiber.

In optics, one important and familiar consequence of dispersion is the change in the angle of refraction of different colors of light, as seen in the spectrum produced by a dispersive prism and in chromatic aberration of lenses. Design of compound achromatic lenses, in which chromatic aberration is largely cancelled, uses a quantification of a glass's dispersion given by its Abbe number V, where lower Abbe numbers correspond to greater dispersion over the visible spectrum. In some applications such as telecommunications, the absolute phase of a wave is often not important but only the propagation of wave packets or "pulses"; in that case one is interested only in variations of group velocity with frequency, so-called group-velocity dispersion. The most familiar example of dispersion is probably a rainbow, in which dispersion causes the spatial separation of a white light into components of different wavelengths (different colors). However, dispersion also has an effect in many other circumstances: for example, group velocity dispersion (GVD) causes pulses to spread in optical fibers, degrading signals over long distances; also, a cancellation between group-velocity dispersion and nonlinear effects leads to soliton waves.

Most often, chromatic dispersion refers to bulk material dispersion, that is, the change in refractive index with optical frequency. However, in a waveguide there is also the phenomenon of waveguide dispersion, in which case a wave's phase velocity in a structure depends on its frequency simply due to the structure's geometry. More generally, "waveguide" dispersion can occur for waves propagating through any inhomogeneous structure (e.g., a photonic crystal), whether or not the waves are confined to some region. [dubious-discuss] In a waveguide, both types of dispersion will generally be present, although they are not strictly additive. [citation needed] For example, in fiber optics the material and waveguide dispersion can effectively cancel each other out to produce a zero-dispersion wavelength, important for fast fiber-optic communication.

The variation of refractive index vs. vacuum wavelength for various glasses. The wavelengths of visible light are shaded in grey. Influences of selected glass component additions on the mean dispersion of a specific base glass (nF valid for $\lambda$=486 nm (blue), nC valid for $\lambda$=656 nm (red)). Material dispersion can be a desirable or undesirable effect in optical applications. The dispersion of light by glass prisms is used to construct spectrometers and spectroradiometers. Holographic gratings are also used, as they allow more accurate discrimination of wavelengths. However, in lenses, dispersion causes chromatic aberration, an undesired effect that may degrade images in microscopes, telescopes, and photographic objectives. The phase velocity, v, of a wave in a given uniform medium where c is the speed of light in a vacuum and n is the refractive index of the medium. In general, the refractive index is some function of the frequency f of the light, thus n=n(f), or alternatively, with respect to the wave's wavelength n=n($\lambda$). The wavelength dependence of a material's refractive index is usually quantified by its Abbe number or its coefficients in an empirical formula such as the Cauchy or Sellmeier equations. Because of the Kramers-Kronig relations, the wavelength dependence of the real part of the refractive index is related to the material absorption, described by the imaginary part of the refractive index (also called the extinction coefficient). In particular, for non-magnetic materials ($\mu=\mu 0$), the susceptibility $\chi$ that appears in the Kramers-Kronig relations is the electric susceptibility $\chi e=n2-1$. The most commonly seen consequence of dispersion in optics is the separation of white light into a color spectrum by a prism. From Snell's law it can be seen that the angle of refraction of light in a prism depends on the refractive index of the prism material. Since that refractive index varies with wavelength, it follows that the angle that the light is refracted by will also vary with wavelength, causing an angular separation of the colors known as angular dispersion. For visible light, refraction indices n of most transparent materials (e.g., air, glasses) decrease with increasing wavelength $\lambda$. In this case, the medium is said to have normal dispersion. Whereas, if the index increases with increasing wavelength (which is typically the case in the ultraviolet), the medium is said to have anomalous dispersion. At the interface of such a material with air or vacuum (index of ~1), Snell's law predicts that light incident at an angle $\theta$ to the normal will be refracted at an angle arcsin(sin $\theta$/n). Thus, blue light, with a higher refractive index, will be bent more strongly than red light, resulting in the well-known rainbow pattern.

Another consequence of dispersion manifests itself as a temporal effect. The formula v=c/n calculates the phase velocity of a wave; this is the velocity at which the phase of any one frequency component of the wave will propagate. This is not the same as the group velocity of the wave, that is the rate at which changes in amplitude (known as the envelope of the wave) will propagate. For a homogeneous medium, the group velocity vg is related to the phase velocity v by (here $\lambda$ is the wavelength in vacuum, not in the medium). The group velocity vg is often thought of as the velocity at which energy or information is conveyed along the wave. In most cases this is true, and the group velocity can be thought of as the signal velocity of the waveform. In some unusual circumstances, called cases of anomalous dispersion, the rate of change of the index of refraction with respect to the wavelength changes sign (becoming negative), in which case it is possible for the group velocity to exceed the speed of light (vg>c). Anomalous dispersion occurs, for instance, where the wavelength of the light is close to an absorption resonance of the medium. When the dispersion is anomalous, however, group velocity is no longer an indicator of signal velocity. Instead, a signal travels at the speed of the wavefront, which is c irrespective of the index of refraction.[5] Recently, it has become possible to create gases in which the group velocity is not only larger than the speed of light, but even negative. In these cases, a pulse can appear to exit a medium before it enters.[6] Even in these cases, however, a signal travels at, or less than, the speed of light, as demonstrated by Stenner, et al. The group velocity itself is usually a function of the wave's frequency. This results in group velocity dispersion (GVD), which causes a short pulse of light to spread in time as a result of different frequency components of the pulse travelling at different velocities. GVD is often quantified as the group delay dispersion parameter (again, this formula is for a uniform medium only). If D is greater than zero, the medium is said to have positive dispersion (anomalous dispersion). If D is less than zero, the medium has negative dispersion (normal dispersion). If a light pulse is propagated through a normally dispersive medium, the result is the shorter wavelength components travel slower than the longer wavelength components. The pulse therefore becomes positively chirped, or up-chirped, increasing in frequency with time. Conversely, if a pulse travels through an anomalously dispersive medium, high frequency components travel faster than the lower ones, and the pulse becomes negatively chirped, or down-chirped, decreasing in frequency with time.

The result of GVD, whether negative or positive, is ultimately temporal spreading of the pulse. This makes dispersion management extremely important in optical communications systems based on optical fiber, since if dispersion is too high, a group of pulses representing a bit-stream will spread in time and merge, rendering the bit-stream unintelligible. This limits the length of fiber that a signal can be sent down without regeneration. One possible answer to this problem is to send signals down the optical fibre at a wavelength where the GVD is zero (e.g., around 1.3-1.5 µm in silica fibres), so pulses at this wavelength suffer minimal spreading from dispersion. In practice, however, this approach causes more problems than it solves because zero GVD unacceptably amplifies other nonlinear effects (such as four wave mixing). Another possible option is to use soliton pulses in the regime of negative dispersion, a form of optical pulse which uses a nonlinear optical effect to self-maintain its shape. Solitons have the practical problem, however, that they require a certain power level to be maintained in the pulse for the nonlinear effect to be of the correct strength. Instead, the solution that is currently used in practice is to perform dispersion compensation, typically by matching the fiber with another fiber of opposite-sign dispersion so that the dispersion effects cancel; such compensation is ultimately limited by nonlinear effects such as self-phase modulation, which interact with dispersion to make it very difficult to undo. Dispersion control is also important in lasers that produce short pulses. The overall dispersion of the optical resonator is a major factor in determining the duration of the pulses emitted by the laser. A pair of prisms can be arranged to produce net negative dispersion, which can be used to balance the usually positive dispersion of the laser medium. Diffraction gratings can also be used to produce dispersive effects; these are often used in high-power laser amplifier systems. Recently, an alternative to prisms and gratings has been developed: chirped mirrors. These dielectric mirrors are coated so that different wavelengths have different penetration lengths, and therefore different group delays. The coating layers can be tailored to achieve a net negative dispersion.

Waveguides are highly dispersive due to their geometry (rather than just to their material composition). Optical fibers are a sort of waveguide for optical frequencies (light) widely used in modern telecommunications systems. The rate at which data can be transported on a single fiber is limited by pulse broadening due to chromatic dispersion among other phenomena. In general, for a waveguide mode with an angular frequency $\omega(\beta)$ at a propagation constant $\beta$ (so that the electromagnetic fields in the propagation direction z oscillate proportional to $ei(\beta z-\omega t)$), the group-velocity dispersion parameter D is defined where $\lambda=2\pi c/\omega$ is the vacuum wavelength and $vg=d\omega/d\beta$ is the group velocity. This formula generalizes the one in the previous section for homogeneous media, and includes both waveguide dispersion and material dispersion. The reason for defining the dispersion in this way is that IDI is the (asymptotic) temporal pulse spreading $\Delta t$ per unit bandwidth $\Delta\lambda$ per unit distance travelled, commonly reported in ps/nm/km for optical fibers. In the case of multi-mode optical fibers, so-called modal dispersion will also lead to pulse broadening. Even in single-mode fibers, pulse broadening can occur as a result of polarization mode dispersion (since there are still two polarization modes). These are not examples of chromatic dispersion as they are not dependent on the wavelength or bandwidth of the pulses propagated.

When a broad range of frequencies (a broad bandwidth) is present in a single wavepacket, such as in an ultrashort pulse or a chirped pulse or other forms of spread spectrum transmission, it may not be accurate to approximate the dispersion by a constant over the entire bandwidth, and more complex calculations are required to compute effects such as pulse spreading. In particular, the dispersion parameter D defined above is obtained from only one derivative of the group velocity. Higher derivatives are known as higher-order dispersion. These terms are simply a Taylor series expansion of the dispersion relation $\beta(\omega)$ of the medium or waveguide around some particular frequency. Their effects can be computed via numerical evaluation of Fourier transforms of the waveform, via integration of higher-order slowly varying envelope approximations, by a split-step method (which can use the exact dispersion relation rather than a Taylor series), or by direct simulation of the full Maxwell's equations rather than an approximate envelope equation.

In the technical terminology of gemology, dispersion is the difference in the refractive index of a material at the B and G (686.7 nm and 430.8 nm) or C and F (656.3 nm and 486.1 nm) Fraunhofer wavelengths, and is meant to express the degree to which a prism cut from the gemstone demonstrates "fire". Fire is a colloquial term used by gemologists to describe a gemstone's dispersive nature or lack thereof. Dispersion is a material property. The amount of fire demonstrated by a given gemstone is a function of the gemstone's facet angles, the polish quality, the lighting environment, the material's refractive index, the saturation of color, and the orientation of the viewer relative to the gemstone.

In photographic and microscopic lenses, dispersion causes chromatic aberration, which causes the different colors in the image not to overlap properly. Various techniques have been developed to counteract this, such as the use of achromats, multielement lenses with glasses of different dispersion. They are constructed in such a way that the chromatic aberrations of the different parts cancel out. Pulsars are spinning neutron stars that emit pulses at very regular intervals ranging from milliseconds to seconds. Astronomers believe that the pulses are emitted simultaneously over a wide range of frequencies. However, as observed on Earth, the components of each pulse emitted at higher radio frequencies arrive before those emitted at lower frequencies. This dispersion occurs because of the ionized component of the interstellar medium, mainly the free electrons, which make the group velocity frequency dependent. The extra delay added at a frequency ν where the dispersion constant kDM and the dispersion measure (DM) is the column density of free electrons (total electron content)—i.e. the number density of electrons ne (electrons/cm3) integrated along the path traveled by the photon from the pulsar to the Earth—and is with units of parsecs per cubic centimetre (1 pc/cm3=30.857×1021 m−2).

Typically for astronomical observations, this delay cannot be measured directly, since the emission time is unknown. What can be measured is the difference in arrival times at two different frequencies. The delay $\Delta t$ between a high frequency νhi and a low frequency νlo component of a pulse. Rewriting the above equation in terms of $\Delta t$ allows one to determine the DM by measuring pulse arrival times at multiple frequencies. This in turn can be used to study the interstellar medium, as well as allow for observations of pulsars at different frequencies to be combined.

Scattering is a general physical process where some forms of radiation, such as light, sound, or moving particles, are forced to deviate from a straight trajectory by one or more paths due to localized non-uniformities in the medium through which they pass. In conventional use, this also includes deviation of reflected radiation from the angle predicted by the law of reflection. Reflections that undergo scattering are often called diffuse reflections and unscattered reflections are called specular (mirror-like) reflections. Scattering may also refer to particle-particle collisions between molecules, atoms, electrons, photons and other particles. Examples include: cosmic ray scattering in the Earth's upper atmosphere; particle collisions inside particle accelerators; electron scattering by gas atoms in fluorescent lamps; and neutron scattering inside nuclear reactors. The types of non-uniformities which can cause scattering, sometimes known as scatterers or scattering centers, are too numerous to list, but a small sample includes particles, bubbles, droplets, density fluctuations in fluids, crystallites in polycrystalline solids, defects in monocrystalline solids, surface roughness, cells in organisms, and textile fibers in clothing. The effects of such features on the path of almost any type of propagating wave or moving particle can be described in the framework of scattering theory. Some areas where scattering and scattering theory are significant include radar sensing, medical ultrasound, semiconductor wafer inspection, polymerization process monitoring, acoustic tiling, free-space communications and computer-generated imagery. Particle-particle scattering theory is important in areas such as particle physics, atomic, molecular, and optical physics, nuclear physics and astrophysics.

Zodiacal light is a faint, diffuse glow visible in the night sky. The phenomenon stems from the scattering of sunlight by interplanetary dust spread throughout the plane of the Solar System. When radiation is only scattered by one localized scattering center, this is called single scattering. It is very common that scattering centers are grouped together; in such cases, radiation may scatter many times, in what is known as multiple scattering. The main difference between the effects of single and multiple scattering is that single scattering can usually be treated as a random phenomenon, whereas multiple scattering, somewhat counterintuitively, can be modeled as a more deterministic process because the combined results of a large number of scattering events tend to average out. Multiple scattering can thus often be modeled well with diffusion theory.

Because the location of a single scattering center is not usually well known relative to the path of the radiation, the outcome, which tends to depend strongly on the exact incoming trajectory, appears random to an observer. This type of scattering would be exemplified by an electron being fired at an atomic nucleus. In this case, the atom's exact position relative to the path of the electron is unknown and would be unmeasurable, so the exact trajectory of the electron after the collision cannot be predicted. Single scattering is therefore often described by probability distributions. With multiple scattering, the randomness of the interaction tends to be averaged out by the large number of scattering events, so that the final path of the radiation appears to be a deterministic distribution of intensity. This is exemplified by a light beam passing through thick fog. Multiple scattering is highly analogous to diffusion, and the terms multiple scattering and diffusion are interchangeable in many contexts. Optical elements designed to produce multiple scattering are thus known as diffusers. Coherent backscattering, an enhancement of backscattering that occurs when coherent radiation is multiply scattered by a random medium, is usually attributed to weak localization.

Not all single scattering is random, however. A well-controlled laser beam can be exactly positioned to scatter off a microscopic particle with a deterministic outcome, for instance. Such situations are encountered in radar scattering as well, where the targets tend to be macroscopic objects such as people or aircraft. Similarly, multiple scattering can sometimes have somewhat random outcomes, particularly with coherent radiation. The random fluctuations in the multiply scattered intensity of coherent radiation are called speckles. Speckle also occurs if multiple parts of a coherent wave scatter from different centers. In certain rare circumstances, multiple scattering may only involve a small number of interactions such that the randomness is not completely averaged out. These systems are considered to be some of the most difficult to model accurately. The description of scattering and the distinction between single and multiple scattering are tightly related to wave-particle duality.

Scattering theory is a framework for studying and understanding the scattering of waves and particles. Prosaically, wave scattering corresponds to the collision and scattering of a wave with some material object, for instance sunlight scattered by rain drops to form a rainbow. Scattering also includes the interaction of billiard balls on a table, the Rutherford scattering (or angle change) of alpha particles by gold nuclei, the Bragg scattering (or diffraction) of electrons and X-rays by a cluster of atoms, and the inelastic scattering of a fission fragment as it traverses a thin foil. More precisely, scattering consists of the study of how solutions of partial differential equations, propagating freely "in the distant past", come together and interact with one another or with a boundary condition, and then propagate away "to the distant future".

A Feynman diagram may illustrate scattering between two electrons by emission of a virtual photon. Electromagnetic waves are one of the best known and most commonly encountered forms of radiation that undergo scattering. Scattering of light and radio waves (especially in radar) is particularly important. Several different aspects of electromagnetic scattering are distinct enough to have conventional names. Major forms of elastic light scattering (involving negligible energy transfer) are Rayleigh scattering and Mie scattering. Inelastic scattering includes Brillouin scattering, Raman scattering, inelastic X-ray scattering. Light scattering is one of the two major physical processes that contribute to the visible appearance of most objects, the other being absorption. Surfaces described as white owe their appearance to multiple scattering of light by internal or surface inhomogeneities in the object, for example by the boundaries of transparent microscopic crystals that make up a stone or by the microscopic fibers in a sheet of paper. More generally, the gloss (or lustre or sheen) of the surface is determined by scattering. Highly scattering surfaces are described as being dull or having a matte finish, while the absence of surface scattering leads to a glossy appearance, as with polished metal or stone. Spectral absorption, the selective absorption of certain colors, determines the color of most objects with some modification by elastic scattering. The apparent blue color of veins in skin is a common example where both spectral absorption and scattering play important and complex roles in the coloration. Light scattering can also create color without absorption, often shades of blue, as with the sky (Rayleigh scattering), the human blue iris, and the feathers of some birds (Prum et al. 1998). However, resonant light scattering in nanoparticles can produce many different highly saturated and vibrant hues, especially when surface plasmon resonance is involved (Roqué et al. 2006). Models of light scattering can be divided into three domains based on a dimensionless size parameter, a which is defined where $\pi D p$ is the circumference of a particle and $\lambda$ is the wavelength of incident radiation. Based on the value of $\alpha$, these domains are: $\alpha \ll 1$: Rayleigh scattering (small particle compared to wavelength of light); $\alpha \approx 1$: Mie scattering (particle about the same size as wavelength of light, valid only for spheres); $\alpha \gg 1$: geometric scattering (particle much larger than wavelength of light).

Rayleigh scattering is a process in which electromagnetic radiation (including light) is scattered by a small spherical volume of variant refractive index, such as a particle, bubble, droplet, or even a density fluctuation. This effect was first modeled successfully by Lord Rayleigh, from whom it gets its name. In order for Rayleigh's model to apply, the sphere must be much smaller in diameter than the wavelength ($\lambda$) of the scattered wave; typically the upper limit is taken to be about $\frac{1}{10}$ the wavelength. In this size regime, the exact shape of the scattering center is usually not very significant and can often be treated as a sphere of equivalent volume. The inherent scattering that radiation undergoes passing through a pure gas is due to microscopic density fluctuations as the gas molecules move around, which are normally small enough in scale for Rayleigh's model to apply. This scattering mechanism is the primary cause of the blue color of the Earth's sky on a clear day, as the shorter blue wavelengths of sunlight passing overhead are more strongly scattered than the longer red wavelengths according to Rayleigh's famous $1/\lambda 4$ relation. Along with absorption, such scattering is a major cause of the attenuation of radiation by the atmosphere. The degree of scattering varies as a function of the ratio of the particle diameter to the wavelength of the radiation, along with many other factors including polarization, angle, and coherence.

For larger diameters, the problem of electromagnetic scattering by spheres was first solved by Gustav Mie, and scattering by spheres larger than the Rayleigh range is therefore usually known as Mie scattering. In the Mie regime, the shape of the scattering center becomes much more significant and the theory only applies well to spheres and, with some modification, spheroids and ellipsoids. Closed-form solutions for scattering by certain other simple shapes exist, but no general closed-form solution is known for arbitrary shapes. Both Mie and Rayleigh scattering are considered elastic scattering processes, in which the energy (and thus wavelength and frequency) of the light is not substantially changed. However, electromagnetic radiation scattered by moving scattering centers does undergo a Doppler shift, which can be detected and used to measure the velocity of the scattering center/s in forms of techniques such as lidar and radar. This shift involves a slight change in energy. At values of the ratio of particle diameter to wavelength more than about 10, the laws of geometric optics are mostly sufficient to describe the interaction of light with the particle, and at this point the interaction is not usually described as scattering. For modeling of scattering in cases where the Rayleigh and Mie models do not apply such as irregularly shaped particles, there are many numerical methods that can be used. The most common are finite-element methods which solve Maxwell's equations to find the distribution of the scattered electromagnetic field. Sophisticated software packages exist which allow the user to specify the refractive index or indices of the scattering feature in space, creating a 2- or sometimes 3-dimensional model of the structure. For relatively large and complex structures, these models usually require substantial execution times on a computer.

A calcite crystal laid upon a graph paper with blue lines illustrates double refraction. A doubly refracted image may be seen through a calcite crystal, seen through a rotating polarizing filter illustrating the opposite polarization states of the two images. Birefringence is the optical property of a material having a refractive index that depends on the polarization and propagation direction of light. These optically anisotropic materials are said to be birefringent (or birefractive). The birefringence is often quantified as the maximum difference between refractive indices exhibited by the material. Crystals with non-cubic crystal structures are often birefringent, as are plastics under mechanical stress. Birefringence is responsible for the phenomenon of double refraction whereby a ray of light, when incident upon a birefringent material, is split by polarization into two rays taking slightly different paths. This effect was first described by the Danish scientist Rasmus Bartholin in 1669, who observed it in calcite, a crystal having one of the strongest birefringences. However it was not until the 19th century that Augustin-Jean Fresnel described the phenomenon in terms of polarization, understanding light as a wave with field components in transverse polarizations (perpendicular to the direction of the wave vector).

Incoming light in a parallel (p) polarization experiences a different effective index of refraction than light in a perpendicular (s) polarization, and is thus refracted at a different angle. A mathematical description of wave propagation in a birefringent medium is presented below. Following is a qualitative explanation of the phenomenon. The simplest type of birefringence is described as uniaxial, meaning that there is a single direction governing the optical anisotropy whereas all directions perpendicular to it (or at a given angle to it) are optically equivalent. Thus rotating the material around this axis does not change its optical behavior. This special direction is known as the optic axis of the material. Light whose polarization is perpendicular to the optic axis is governed by a refractive index no (for "ordinary"). Light whose polarization is in the direction of the optic axis sees an optical index ne (for "extraordinary"). For any ray direction there is a linear polarization direction perpendicular to the optic axis, and this is called an ordinary ray. However, for ray directions not parallel to the optic axis, the polarization direction perpendicular to the ordinary ray's polarization will be partly in the direction of the optic axis, and this is called an extraordinary ray. The ordinary ray will always experience a refractive index of no, whereas the refractive index of the extraordinary ray will be in between no and ne, depending on the ray direction as described by the index ellipsoid. The magnitude of the difference may be quantified by the birefringence.

The propagation (as well as reflection coefficient) of the ordinary ray is simply described by no as if there were no birefringence involved. However the extraordinary ray, as its name suggests, propagates unlike any wave in a homogenous optical material. Its refraction (and reflection) at a surface can be understood using the effective refractive index (a value in between no and ne). However it is in fact an inhomogeneous wave whose power flow (given by the Poynting vector) is not exactly in the direction of the wave vector. This causes an additional shift in that beam, even when launched at normal incidence, as is popularly observed using a crystal of calcite as photographed above. Rotating the calcite crystal will cause one of the two images, that of the extraordinary ray, to rotate slightly around that of the ordinary ray, which remains fixed. When the light propagates either along or orthogonal to the optic axis, such a lateral shift does not occur. In the first case, both polarizations see the same effective refractive index, so there is no extraordinary ray. In the second case the extraordinary ray propagates at a different phase velocity (corresponding to ne) but is not an inhomogeneous wave. A crystal with its optic axis in this orientation, parallel to the optical surface, may be used to create a waveplate, in which there is no distortion of the image but an intentional modification of the state of polarization of the incident wave. For instance, a quarter-wave plate is commonly used to create circular polarization from a linearly polarized source.

The case of so-called biaxial crystals is substantially more complex. These are characterized by three refractive indices corresponding to three principal axes of the crystal. For most ray directions, both polarizations would be classified as extraordinary rays but with different effective refractive indices. Being extraordinary waves, however, the direction of power flow is not identical to the direction of the wave vector in either case. The two refractive indices can be determined using the index ellipsoids for given directions of the polarization. Note that for biaxial crystals the index ellipsoid will not be an ellipsoid of revolution ("spheroid") but is described by three unequal principle refractive indices $n\alpha$, $n\beta$ and $n\gamma$. Thus there is no axis around which a rotation leaves the optical properties invariant (as there is with uniaxial crystals whose index ellipsoid is a spheroid).

Although there is no axis of symmetry, there are two optical axes or binormals which are defined as directions along which light may propagate without birefringence, i.e., directions along which the wavelength is independent of polarization.[3] For this reason, birefringent materials with three distinct refractive indices are called biaxial. Additionally, there are two distinct axes known as optical ray axes or biradials along which the group velocity of the light is independent of polarization.

When an arbitrary beam of light strikes the surface of a birefringent material, the polarizations corresponding to the ordinary and extraordinary rays generally take somewhat different paths. Unpolarized light consists of equal amounts of energy in any two orthogonal polarizations, and even polarized light (except in special cases) will have some energy in each of these polarizations. According to Snell's law of refraction, the angle of refraction will be governed by the effective refractive index which is different between these two polarizations. This is clearly seen, for instance, in the Wollaston prism which is designed to separate incoming light into two linear polarizations using a birefringent material such as calcite. The different angles of refraction for the two polarization components are shown in the figure at the top of the page, with the optic axis along the surface (and perpendicular to the plane of incidence), so that the angle of refraction is different for the p polarization (the "ordinary ray" in this case, having its polarization perpendicular to the optic axis) and the s polarization (the "extraordinary ray" with a polarization component along the optic axis). In addition, a distinct form of double refraction occurs in cases where the optic axis is not along the refracting surface (nor exactly normal to it); in this case the electric polarization of the birefringent material is not exactly in the direction of the wave's electric field for the extraordinary ray. The direction of power flow (given by the Poynting vector) for this inhomogeneous wave is at a finite angle from the direction of the wave vector resulting in an additional separation between these beams. So even in the case of normal incidence, where the angle of refraction is zero (according to Snell's law, regardless of effective index of refraction), the energy of the extraordinary ray may be propagated at an angle. This is commonly observed using a piece of calcite cut appropriately with respect to its optic axis, placed above a paper with writing, as in the above two photographs.

Much of the work involving polarization preceded the understanding of light as a transverse electromagnetic wave, and this has affected some terminology in use. Isotropic materials have symmetry in all directions and the refractive index is the same for any polarization direction. An anisotropic material is called "birefringent" because it will generally refract a single incoming ray in two directions, which we now understand correspond to the two different polarizations. This is true of either a uniaxial or biaxial material. In a uniaxial material, one ray behaves according to the normal law of refraction (corresponding to the ordinary refractive index), so an incoming ray at normal incidence remains normal to the refracting surface. However, as explained above, the other polarization can be deviated from normal incidence, which cannot be described using the law of refraction. This thus became known as the extraordinary ray. The terms "ordinary" and "extraordinary" are still applied to the polarization components perpendicular to and not perpendicular to the optic axis respectively, even in cases where no double refraction is involved. A material is termed uniaxial when it has a single direction of symmetry in its optical behavior, which we term the optic axis. It also happens to be the axis of symmetry of the index ellipsoid (a spheroid in this case). The index ellipsoid could still be described according to the refractive indices, $n\alpha$, $n\beta$ and $n\gamma$, along three coordinate axes, however in this case two are equal. So if $n\alpha=n\beta$ corresponding to the x and y axes, then the extraordinary index is $n\gamma$ corresponding to the z axis, which is also called the optic axis in this case.

However materials in which all three refractive indices are different are termed biaxial and the origin of this term is more complicated and frequently misunderstood. In a uniaxial crystal, different polarization components of a beam will travel at different phase velocities, except for rays in the direction of what we call the optic axis. Thus the optic axis has the particular property that rays in that direction do not exhibit birefringence, with all polarizations in such a beam experiencing the same index of refraction. It is very different when the three principal refractive indices are all different; then an incoming ray in any of those principle directions will still encounter two different refractive indices. But it turns out that there are two special directions (at an angle to all of the 3 axes) where the refractive indices for different polarizations are again equal. For this reason, these crystals were designated as biaxial, with the two "axes" in this case referring to ray directions in which propagation does not experience birefringence.

In a birefringent material, a wave consists of two polarization components which generally are governed by different effective refractive indices. The so-called slow ray is the component for which the material has the higher effective refractive index (slower phase velocity), while the fast ray is the one with a lower effective refractive index. When a beam is incident on such a material from air (or any material with a lower refractive index), the slow ray is thus refracted more towards the normal than the fast ray. In the figure at the top of the page, it can be seen that refracted ray with s polarization in the direction of the optic axis (thus the extraordinary ray) is the slow ray in this case. Using a thin slab of that material at normal incidence, one would implement a waveplate. In this case there is essentially no spatial separation between the polarizations, however the phase of the wave in the parallel polarization (the slow ray) will be retarded with respect to the perpendicular polarization. These directions are thus known as the slow axis and fast axis of the waveplate.

Uniaxial birefringence is classified as positive when the extraordinary index of refraction ne is greater than the ordinary index no. Negative birefringence means that $\Delta n=ne-no$ is less than zero.[4] In other words, the polarization of the fast (or slow) wave is perpendicular to the optic axis when the birefringence of the crystal is positive (or negative, respectively). In the case of biaxial crystals, all three of the principal axes have different refractive indices, so this designation does not apply. But for any defined ray direction one can just as well designate the fast and slow ray polarizations.

While birefringence is usually obtained using an anisotropic crystal, it can result from an optically isotropic material in a few ways: Stress birefringence results when isotropic materials are stressed or deformed (i.e., stretched or bent) causing a loss of physical isotropy and consequently a loss of isotropy in the material's permittivity tensor. Circular birefringence in liquids where there is an enantiomeric excess in a solution containing a molecule which has stereo isomers. Form birefringence, whereby structure elements such as rods, having one refractive index, are suspended in a medium with a different refractive index. When the lattice spacing is much smaller than a wavelength, such a structure is described as a metamaterial. By the Kerr effect, whereby an applied electric field induces birefringence at optical frequencies through the effect of nonlinear optics; By the Faraday effect, where a magnetic field causes some materials to become circularly birefringent (having slightly different indices of refraction for left- and right-handed circular polarizations), making the material optically active until the field is removed; By the self or forced alignment into thin films of amphiphilic molecules such as lipids, some surfactants or liquid crystals Light polarization may be illustrated on, for example, clear polystyrene cutlery between crossed polarizers. The best characterized birefringent materials are crystals. Due to their specific crystal structures their refractive indices are well defined. Depending on the symmetry of a crystal structure (as determined by one of the 32 possible crystallographic point groups), crystals in that group may be forced to be isotropic (not birefringent), to have uniaxial symmetry, or neither in which case it is a biaxial crystal. The crystal structures permitting uniaxial and biaxial birefringence are noted in the two tables, below, listing the two or three principal refractive indices (at wavelength 590 nm) of some better known crystals. Many plastics are birefringent because their molecules are "frozen" in a stretched conformation when the plastic is molded or extruded. For example, ordinary cellophane is birefringent. Polarizers are routinely used to detect stress in plastics such as polystyrene and polycarbonate.

Cotton fiber is birefringent because of high levels of cellulosic material in the fiber's secondary cell wall. Polarized light microscopy is commonly used in biological tissue, as many biological materials are birefringent. Collagen, found in cartilage, tendon, bone, corneas, and several other areas in the body, is birefringent and commonly studied with polarized light microscopy. Some proteins are also birefringent, exhibiting form birefringence. Inevitable manufacturing imperfections in optical fiber leads to birefringence, which is one cause of pulse broadening in fiber-optic communications. Such imperfections can be geometrical (lack of circular symmetry), due to stress applied to the optical fiber and/or due to bending of the fiber. Birefringence is intentionally introduced (for instance, by making the cross-section elliptical) in order to produce polarization-maintaining optical fibers. In addition to anisotropy in the electric polarizability (electric susceptibility), anisotropy in the magnetic polarizability (magnetic permeability) can also cause birefringence. However, at optical frequencies, values of magnetic permeability for natural materials are not measurably different from µ0, so this is not a source of optical birefringence in practice.

Birefringence and other polarization-based optical effects (such as optical rotation and linear or circular dichroism) can be measured by measuring the changes in the polarization of light passing through the material. These measurements are known as polarimetry. Polarized light microscopes, which contain two polarizers that are at 90° to each other on either side of the sample, are used to visualize birefringence. The addition of quarter-wave plates permit examination of circularly polarized light. Birefringence measurements have been made with phase-modulated systems for examining the transient flow behavior of fluids. Birefringence of lipid bilayers can be measured using dual polarization interferometry. This provides a measure of the degree of order within these fluid layers and how this order is disrupted when the layer interacts with other biomolecules.

Reflective twisted-nematic liquid-crystal display. Light reflected by surface (6) (or coming from a backlight) is horizontally polarized (5) and passes through the liquid-crystal modulator (3) sandwiched in between transparent layers (2, 4) containing electrodes. Horizontally polarized light is blocked by the vertically oriented polarizer (1), except where its polarization has been rotated by the liquid crystal (3), appearing bright to the viewer. Birefringence is used in many optical devices. Liquid-crystal displays, the most common sort of flat panel display, cause their pixels to become lighter or darker through rotation of the polarization (circular birefringence) of linearly polarized light as viewed through a sheet polarizer at the screen's surface. Similarly, light modulators modulate the intensity of light through electrically induced birefringence of polarized light followed by a polarizer. The Lyot filter is a specialized narrowband spectral filter employing the wavelength dependence of birefringence. Wave plates are thin birefringent sheets widely used in certain optical equipment for modifying the polarization state of light passing through it. Birefringence also plays an important role in second-harmonic generation and other nonlinear optical components, as the crystals used for this purpose are almost always birefringent. By adjusting the angle of incidence, the effective refractive index of the extraordinary ray can be tuned in order to achieve phase matching, which is required for efficient operation of these devices.

Birefringence is utilized in medical diagnostics. One powerful accessory used with optical microscopes is a pair of crossed polarizing filters. Light from the source is polarized in the x direction after passing through the first polarizer, but above the specimen is a polarizer (a so-called analyzer) oriented in the y direction. Therefore, no light from the source will be accepted by the analyzer, and the field will appear dark. However areas of the sample possessing birefringence will generally couple some of the x-polarized light into the y polarization; these areas will then appear bright against the dark background. Modifications to this basic principle can differentiate between positive and negative birefringence. Urate crystals, with the crystals' long axis seen as horizontal may be illustrated being parallel to that of a red compensator filter. These may appear as yellow, and thereby of negative birefringence.

For instance, needle aspiration of fluid from a gouty joint will reveal negatively birefringent monosodium urate crystals. Calcium pyrophosphate crystals, in contrast, show weak positive birefringence. Urate crystals appear yellow, and calcium pyrophosphate crystals appear blue when their long axes are aligned parallel to that of a red compensator filter, or a crystal of known birefringence is added to the sample for comparison. Birefringence can be observed in amyloid plaques such as are found in the brains of Alzheimer's patients when stained with a dye such as Congo Red. Modified proteins such as immunoglobulin light chains abnormally accumulate between cells, forming fibrils. Multiple folds of these fibers line up and take on a beta-pleated sheet conformation. Congo red dye intercalates between the folds and, when observed under polarized light, causes birefringence. In ophthalmology, binocular retinal birefringence screening of the Henle fibers (photoreceptor axons that go radially outward from the fovea) provides a reliable detection of strabismus and possibly also of anisometropic amblyopia. Furthermore, scanning laser polarimetry utilises the birefringence of the optic nerve fibre layer to indirectly quantify its thickness, which is of use in the assessment and monitoring of glaucoma. Birefringence characteristics in sperm heads allow the selection of spermatozoa for intracytoplasmic sperm injection. Likewise, zona imaging uses birefringence on oocytes to select the ones with highest chances of successful pregnancy. Birefringence of particles biopsied from pulmonary nodules indicates silicosis. Dermatologists use dermatascopes to view skin lesions. Dermatascopes use polarized light, allowing the user to view crystalline structures corresponding to dermal collagen in the skin. These structures may appear as shiny white lines or rosette shapes and are only visible under polarized dermoscopy. Stress-induced birefringence may illustrate color pattern of a plastic box with "frozen in" mechanical stress placed between two crossed polarizers.

Isotropic solids do not exhibit birefringence. However, when they are under mechanical stress, birefringence results. The stress can be applied externally or is "frozen in" after a birefringent plastic ware is cooled after it is manufactured using injection molding. When such a sample is placed between two crossed polarizers, colour patterns can be observed, because polarization of a light ray is rotated after passing through a birefringent material and the amount of rotation is dependent on wavelength. The experimental method called photoelasticity used for analyzing stress distribution in solids is based on the same principle. There has been recent research on using stress induced birefringence in a glass plate to generate an Optical vortex and full Poincare beams (optical beams that have every possible polarization states across its cross-section).

Birefringent rutile may be observed in different polarizations using a rotating polarizer (or analyzer). Birefringence is observed in anisotropic elastic materials. In these materials, the two polarizations split according to their effective refractive indices, which are also sensitive to stress. The study of birefringence in shear waves traveling through the solid Earth (the Earth's liquid core does not support shear waves) is widely used in seismology. Birefringence is widely used in mineralogy to identify rocks, minerals, and gemstones.

In an isotropic medium (including free space) the so-called electric displacement (D) is just proportional to the electric field (E) according to $D=\varepsilon E$ where the material's permittivity $\varepsilon$ is just a scalar (and equal to $n^2\varepsilon 0$ where n is the index of refraction). However, in an anisotropic material exhibiting birefringence, the relationship between D and E must now be described using a tensor equation where $\varepsilon$ is now a 3×3 permittivity tensor. We assume linearity and no magnetic permeability in the medium: $\mu=\mu 0$. The electric field of a plane wave of angular frequency $\omega$ can be written in the general form where r is the position vector, t is time, and E0 is a vector describing the electric field at $r=0$, $t=0$. Then we shall find the possible wave vectors k. By combining Maxwell's equations for $\nabla \times E$ and $\nabla \times H$, we can eliminate $H=1/\mu 0 B$. With no free charges, Maxwell's equation for the divergence of D vanishes. We can apply the vector identity $\nabla \times (\nabla \times A) = \nabla (\nabla \cdot A) - \nabla^2 A$ to the left hand side of eq. 3a, and use the spatial dependence in which each differentiation in x (for instance) results in multiplication by $ik_x$. The right hand side of eq. 3a can be expressed in terms of E through application of the permittivity tensor $\varepsilon$ and noting that differentiation in time results in multiplication by $-i\omega$. This indicates that D is orthogonal to the direction of the wavevector k, even though that is no longer generally true for E as would be the case in an isotropic medium. Eq. 4b will not be needed for the further steps in the following derivation.

Finding the allowed values of k for a given $\omega$ is easiest done by using Cartesian coordinates with the x, y and z axes chosen in the directions of the symmetry axes of the crystal (or simply choosing z in the direction of the optic axis of a uniaxial crystal), resulting in a diagonal matrix for the permittivity tensor $\varepsilon$. where the diagonal values are squares of the refractive indices for polarizations along the three principal axes x, y and z. With $\varepsilon$ in this form, and substituting in the speed of light c using $c^2=1/\mu 0 \varepsilon 0$ where Ex, Ey, Ez are the components of E (at any given position in space and time) and kx, ky, kz are the components of k. Rearranging, we can write (and similarly for the y and z components. This is a set of linear equations in Ex, Ey, Ez, so it can have a nontrivial solution (that is, one other than $E=0$) as long as the following determinant is zero. Evaluating the determinant of eq. 6, and rearranging the terms. In the case of a uniaxial material, choosing the optic axis to be in the z direction so that $nx=ny=no$ and $nz=ne$, this expression can be factored. Setting either of the factors in eq. 8 to zero will define an ellipsoidal surface[note 1] in the space of wavevectors k that are allowed for a given $\omega$. The first factor being zero defines a sphere; this is the solution for so-called ordinary rays, in which the effective refractive index is exactly no regardless of the direction of k. The second defines a spheroid symmetric about the z axis. This solution corresponds to the so-called extraordinary rays in which the effective refractive index is in between no and ne, depending on the direction of k. Therefore, for any arbitrary direction of propagation (other than in the direction of the optic axis), two distinct wavevectors k are allowed corresponding to the polarizations of the ordinary and extraordinary rays.

For a biaxial material a similar but more complicated condition on the two waves can be described; the allowed k vectors in a specified direction now lie on one of two ellipsoids. By inspection one can see that eq. 6 is generally satisfied for two positive values of $\omega$. Or, for a specified optical frequency $\omega$ and direction normal to the wavefronts $k/|k|$, it is satisfied for two wavenumbers (or propagation constants) $|k|$ (and thus effective refractive indices) corresponding to the propagation of two linear polarizations in that direction. When those two propagation constants are equal then the effective refractive index is independent of polarization, and there is consequently no birefringence encountered by a wave traveling in that particular direction. For a uniaxial crystal, this is the optic axis, the z direction according to the above construction. But when all three refractive indices (or permittivities), nx, ny and nz are distinct, it can be shown that there are exactly two such directions (where the two ellipsoids intersect); these directions are not at all obvious and do not lie along any of the three principal axes (x, y, z according to the above convention). Historically that accounts for the use of the term "biaxial" for such crystals, as the existence of exactly two such special directions (considered "axes") was discovered well before polarization and birefringence were understood physically. However these two special directions are generally not of particular interest; biaxial crystals are rather specified by their three refractive indices corresponding to the three axes of symmetry.

A general state of polarization launched into the medium can always be decomposed into two waves, one in each of those two polarizations, which will then propagate with different wavenumbers $|k|$. Applying the different phase of propagation to those two waves over a specified propagation distance will result in a generally different net polarization state at that point; this is the principle of the waveplate for instance. However, when you have a wave launched into a birefringent material at non-normal incidence, the problem is yet more complicated since the two polarization components will now not only have distinct wavenumbers but the k vectors will not even be in exactly the same direction. In this case the two k vectors are rather solutions constrained by the boundary condition which requires that the components of the two transmitted waves' k vectors, and the k vector of the incident wave, as projected onto the surface of the interface, must all be identical.

Colors can appear different depending on their surrounding colors and shapes. The two small squares have exactly the same color, but the right one looks slightly darker, the Chubb illusion. Color (American English) or colour (Commonwealth English) is the characteristic of human visual perception described through color categories, with names such as red, orange, yellow, green, blue, or purple. This perception of color derives from the stimulation of cone cells in the human eye by electromagnetic radiation in the visible spectrum. Color categories and physical specifications of color are associated with objects through the wavelength of the light that is reflected from them. This reflection is governed by the object's physical properties such as light absorption, emission spectra, etc. By defining a color space, colors can be identified numerically by coordinates, which in 1931 were also named in global agreement with internationally agreed color names like mentioned above (red, orange, etc.) by the International Commission on Illumination. The RGB color space for instance is a color space corresponding to human trichromacy and to the three cone cell types that respond to three bands of light: long wavelengths, peaking near 564-580 nm (red); medium-wavelength, peaking near 534-545 nm (green); and short-wavelength light, near 420-440 nm (blue). There may also be more than three color dimensions in other color spaces, such as in the CMYK color model, wherein one of the dimensions relates to a color's colorfulness). The photo-receptivity of the "eyes" of other species also varies considerably from that of humans and so results in correspondingly different color perceptions that cannot readily be compared to one another. Honeybees and bumblebees for instance have trichromatic color vision sensitive to ultraviolet but is insensitive to red. Papilio butterflies possess six types of photoreceptors and may have pentachromatic vision. The most complex color vision system in the animal kingdom has been found in stomatopods (such as the mantis shrimp) with up to 12 spectral receptor types thought to work as multiple dichromatic units. The science of color is sometimes called chromatics, colorimetry, or simply color science. It includes the study of the perception of color by the human eye and brain, the origin of color in materials, color theory in art, and the physics of electromagnetic radiation in the visible range (that is, what is commonly referred to simply as light).

Continuous optical spectrum rendered into the sRGB color space. The colors of the visible light spectrum Red~700-635 nm~430-480 THz, Orange~635-590 nm~480-510 THz, Yellow~590-560 nm~510-540 THz, Green~560-520 nm~540-580 THz, Cyan~520-490 nm~580-610 THz, Blue~490-450 nm~610-670 THz, Violet or Purple~450-400 nm~670-750 THz. Electromagnetic radiation is characterized by its wavelength (or frequency) and its intensity. When the wavelength is within the visible spectrum (the range of wavelengths humans can perceive, approximately from 390 nm to 700 nm), it is known as "visible light".

Most light sources emit light at many different wavelengths; a source's spectrum is a distribution giving its intensity at each wavelength. Although the spectrum of light arriving at the eye from a given direction determines the color sensation in that direction, there are many more possible spectral combinations than color sensations. In fact, one may formally define a color as a class of spectra that give rise to the same color sensation, although such classes would vary widely among different species, and to a lesser extent among individuals within the same species. In each such class the members are called metamers of the color in question.

The familiar colors of the rainbow in the spectrum—named using the Latin word for appearance or apparition by Isaac Newton in 1671—include all those colors that can be produced by visible light of a single wavelength only, the pure spectral or monochromatic colors. The table at right shows approximate frequencies (in terahertz) and wavelengths (in nanometers) for various pure spectral colors. The wavelengths listed are as measured in air or vacuum (see refractive index). The color table should not be interpreted as a definitive list—the pure spectral colors form a continuous spectrum, and how it is divided into distinct colors linguistically is a matter of culture and historical contingency (although people everywhere have been shown to perceive colors in the same way). A common list identifies six main bands: red, orange, yellow, green, blue, and violet. Newton's conception included a seventh color, indigo, between blue and violet. It is possible that what Newton referred to as blue is nearer to what today is known as cyan, and that indigo was simply the dark blue of the indigo dye that was being imported at the time. The intensity of a spectral color, relative to the context in which it is viewed, may alter its perception considerably; for example, a low-intensity orange-yellow is brown, and a low-intensity yellow-green is olive green.

The color of an object depends on both the physics of the object in its environment and the characteristics of the perceiving eye and brain. Physically, objects can be said to have the color of the light leaving their surfaces, which normally depends on the spectrum of the incident illumination and the reflectance properties of the surface, as well as potentially on the angles of illumination and viewing. Some objects not only reflect light, but also transmit light or emit light themselves, which also contributes to the color. A viewer's perception of the object's color depends not only on the spectrum of the light leaving its surface, but also on a host of contextual cues, so that color differences between objects can be discerned mostly independent of the lighting spectrum, viewing angle, etc. This effect is known as color constancy.

An upper disk and a lower disk may have exactly the same objective color, and may be in identical gray surroundings; based on context differences, however, humans may perceive squares as having different reflectances, and may interpret the colors as different color categories. Some generalizations of the physics can be drawn, neglecting perceptual effects for now: Light arriving at an opaque surface is either reflected "specularly" (that is, in the manner of a mirror), scattered (that is, reflected with diffuse scattering), or absorbed—or some combination of these. Opaque objects that do not reflect specularly (which tend to have rough surfaces) have their color determined by which wavelengths of light they scatter strongly (with the light that is not scattered being absorbed). If objects scatter all wavelengths with roughly equal strength, they appear white. If they absorb all wavelengths, they appear black. Opaque objects that specularly reflect light of different wavelengths with different efficiencies look like mirrors tinted with colors determined by those differences. An object that reflects some fraction of impinging light and absorbs the rest may look black but also be faintly reflective; examples are black objects coated with layers of enamel or lacquer. Objects that transmit light are either translucent (scattering the transmitted light) or transparent (not scattering the transmitted light). If they also absorb (or reflect) light of various wavelengths differentially, they appear tinted with a color determined by the nature of that absorption (or that reflectance). Objects may emit light that they generate from having excited electrons, rather than merely reflecting or transmitting light. The electrons may be excited due to elevated temperature (incandescence), as a result of chemical reactions (chemoluminescence), after absorbing light of other frequencies ("fluorescence" or "phosphorescence") or from electrical contacts as in light emitting diodes, or other light sources. To summarize, the color of an object is a complex result of its surface properties, its transmission properties, and its emission properties, all of which contribute to the mix of wavelengths in the light leaving the surface of the object. The perceived color is then further conditioned by the nature of the ambient illumination, and by the color properties of other objects nearby, and via other characteristics of the perceiving eye and brain.

When viewed in full size, an image may contain about 16 million pixels, each corresponding to a different color on a full set of RGB colors. The human eye may, at most, distinguish about 10 million different colors. Although Aristotle and other ancient scientists had already written on the nature of light and color vision, it was not until Newton that light was identified as the source of the color sensation. In 1810, Goethe published his comprehensive Theory of Colors in which he ascribed physiological effects to color that are now understood as psychological. In 1801 Thomas Young proposed his trichromatic theory, based on the observation that any color could be matched with a combination of three lights. This theory was later refined by James Clerk Maxwell and Hermann von Helmholtz. As Helmholtz puts it, "the principles of Newton's law of mixture were experimentally confirmed by Maxwell in 1856. Young's theory of color sensations, like so much else that this marvelous investigator achieved in advance of his time, remained unnoticed until Maxwell directed attention to it." At the same time as Helmholtz, Ewald Hering developed the opponent process theory of color, noting that color blindness and afterimages typically come in opponent pairs (red-green, blue-orange, yellow-violet, and black-white). Ultimately these two theories were synthesized in 1957 by Hurvich and Jameson, who showed that retinal processing corresponds to the trichromatic theory, while processing at the level of the lateral geniculate nucleus corresponds to the opponent theory. In 1931, an international group of experts known as the Commission internationale de Péclairage (CIE) developed a mathematical color model, which mapped out the space of observable colors and assigned a set of three numbers to each. The ability of the human eye to distinguish colors is based upon the varying sensitivity of different cells in the retina to light of different wavelengths. Humans are trichromatic—the retina contains three types of color receptor cells, or cones. One type, relatively distinct from the other two, is most responsive to light that is perceived as blue or blue-violet, with wavelengths around 450 nm; cones of this type are sometimes called short-wavelength cones, S cones, or blue cones. The other two types are closely related genetically and chemically: middle-wavelength cones, M cones, or green cones are most sensitive to light perceived as green, with wavelengths around 540 nm, while the long-wavelength cones, L cones, or red cones, are most sensitive to light is perceived as greenish yellow, with wavelengths around 570 nm.

Light, no matter how complex its composition of wavelengths, is reduced to three color components by the eye. Each cone type adheres to the principle of univariance, which is that each cone's output is determined by the amount of light that falls on it over all wavelengths. For each location in the visual field, the three types of cones yield three signals based on the extent to which each is stimulated. These amounts of stimulation are sometimes called tristimulus values. The response curve as a function of wavelength varies for each type of cone. Because the curves overlap, some tristimulus values do not occur for any incoming light combination. For example, it is not possible to stimulate only the mid-wavelength (so-called "green") cones; the other cones will inevitably be stimulated to some degree at the same time. The set of all possible tristimulus values determines the human color space. It has been estimated that humans can distinguish roughly 10 million different colors. The other type of light-sensitive cell in the eye, the rod, has a different response curve. In normal situations, when light is bright enough to strongly stimulate the cones, rods play virtually no role in vision at all. On the other hand, in dim light, the cones are understimulated leaving only the signal from the rods, resulting in a colorless response. (Furthermore, the rods are barely sensitive to light in the "red" range.) In certain conditions of intermediate illumination, the rod response and a weak cone response can together result in color discriminations not accounted for by cone responses alone. These effects, combined, are summarized also in the Kruithof curve, that describes the change of color perception and pleasingness of light as function of temperature and intensity.

While the mechanisms of color vision at the level of the retina are well-described in terms of tristimulus values, color processing after that point is organized differently. A dominant theory of color vision proposes that color information is transmitted out of the eye by three opponent processes, or opponent channels, each constructed from the raw output of the cones: a red-green channel, a blue-yellow channel, and a black-white "luminance" channel. This theory has been supported by neurobiology, and accounts for the structure of our subjective color experience. Specifically, it explains why humans cannot perceive a "reddish green" or "yellowish blue", and it predicts the color wheel: it is the collection of colors for which at least one of the two color channels measures a value at one of its extremes. The exact nature of color perception beyond the processing already described, and indeed the status of color as a feature of the perceived world or rather as a feature of our perception of the world—a type of qualia—is a matter of complex and continuing philosophical dispute.

If one or more types of a person's color-sensing cones are missing or less responsive than normal to incoming light, that person can distinguish fewer colors and is said to be color deficient or color blind (though this latter term can be misleading; almost all color deficient individuals can distinguish at least some colors). Some kinds of color deficiency are caused by anomalies in the number or nature of cones in the retina. Others (like central or cortical achromatopsia) are caused by neural anomalies in those parts of the brain where visual processing takes place. While most humans are trichromatic (having three types of color receptors), many animals, known as tetrachromats, have four types. These include some species of spiders, most marsupials, birds, reptiles, and many species of fish. Other species are sensitive to only two axes of color or do not perceive color at all; these are called dichromats and monochromats respectively. A distinction is made between retinal tetrachromacy (having four pigments in cone cells in the retina, compared to three in trichromats) and functional tetrachromacy (having the ability to make enhanced color discriminations based on that retinal difference). As many as half of all women are retinal tetrachromats. The phenomenon arises when an individual receives two slightly different copies of the gene for either the medium- or long-wavelength cones, which are carried on the X chromosome. To have two different genes, a person must have two X chromosomes, which is why the phenomenon only occurs in women. There is one scholarly report that confirms the existence of a functional tetrachromat.

In certain forms of synesthesia/ideasthesia, perceiving letters and numbers (grapheme-color synesthesia) or hearing musical sounds (music-color synesthesia) will lead to the unusual additional experiences of seeing colors. Behavioral and functional neuroimaging experiments have demonstrated that these color experiences lead to changes in behavioral tasks and lead to increased activation of brain regions involved in color perception, thus demonstrating their reality, and similarity to real color percepts, albeit evoked through a non-standard route. After exposure to strong light in their sensitivity range, photoreceptors of a given type become desensitized. For a few seconds after the light ceases, they will continue to signal less strongly than they otherwise would. Colors observed during that period will appear to lack the color component detected by the desensitized photoreceptors. This effect is responsible for the phenomenon of afterimages, in which the eye may continue to see a bright figure after looking away from it, but in a complementary color. Afterimage effects have also been utilized by artists, including Vincent van Gogh. When an artist uses a limited color palette, the eye tends to compensate by seeing any gray or neutral color as the color which is missing from the color wheel. For example, in a limited palette consisting of red, yellow, black, and white, a mixture of yellow and black will appear as a variety of green, a mixture of red and black will appear as a variety of purple, and pure gray will appear bluish.

The trichromatic theory is strictly true when the visual system is in a fixed state of adaptation. In reality, the visual system is constantly adapting to changes in the environment and compares the various colors in a scene to reduce the effects of the illumination. If a scene is illuminated with one light, and then with another, as long as the difference between the light sources stays within a reasonable range, the colors in the scene appear relatively constant to us. This was studied by Edwin Land in the 1970s and led to his retinex theory of color constancy. Both phenomena are readily explained and mathematically modeled with modern theories of chromatic adaptation and color appearance (e.g. CIECAM02, iCAM). There is no need to dismiss the trichromatic theory of vision, but rather it can be enhanced with an understanding of how the visual system adapts to changes in the viewing environment.

Colors vary in several different ways, including hue (shades of red, orange, yellow, green, blue, and violet), saturation, brightness, and gloss. Some color words are derived from the name of an object of that color, such as "orange" or "salmon", while others are abstract, like "red". In the 1969 study Basic Color Terms: Their Universality and Evolution, Brent Berlin and Paul Kay describe a pattern in naming "basic" colors (like "red" but not "red-orange" or "dark red" or "blood red", which are "shades" of red). All languages that have two "basic" color names distinguish dark/cool colors from bright/warm colors. The next colors to be distinguished are usually red and then yellow or green. All languages with six "basic" colors include black, white, red, green, blue, and yellow. The pattern holds up to a set of twelve: black, gray, white, pink, red, orange, yellow, green, blue, purple, brown, and azure (distinct from blue in Russian and Italian, but not English). Individual colors have a variety of cultural associations such as national colors (in general described in individual color articles and color symbolism). The field of color psychology attempts to identify the effects of color on human emotion and activity. Chromotherapy is a form of alternative medicine attributed to various Eastern traditions. Colors have different associations in different countries and cultures. Different colors have been demonstrated to have effects on cognition. For example, researchers at the University of Linz in Austria demonstrated that the color red significantly decreases cognitive functioning in men.

A CIE 1931 color space chromaticity diagram may include an outer curved boundary is the spectral (or monochromatic) locus, with wavelengths shown in nanometers. The colors depicted may depend on the color space of the device on which you are viewing the image, and therefore may not be a strictly accurate representation of the color at a particular position, and especially not for monochromatic colors. Most light sources are mixtures of various wavelengths of light. Many such sources can still effectively produce a spectral color, as the eye cannot distinguish them from single-wavelength sources. For example, most computer displays reproduce the spectral color orange as a combination of red and green light; it appears orange because the red and green are mixed in the right proportions to allow the eye's cones to respond the way they do to the spectral color orange. A useful concept in understanding the perceived color of a non-monochromatic light source is the dominant wavelength, which identifies the single wavelength of light that produces a sensation most similar to the light source. Dominant wavelength is roughly akin to hue. There are many color perceptions that by definition cannot be pure spectral colors due to desaturation or because they are purples (mixtures of red and violet light, from opposite ends of the spectrum). Some examples of necessarily non-spectral colors are the achromatic colors (black, gray, and white) and colors such as pink, tan, and magenta. Two different light spectra that have the same effect on the three color receptors in the human eye will be perceived as the same color. They are metamers of that color. This is exemplified by the white light emitted by fluorescent lamps, which typically has a spectrum of a few narrow bands, while daylight has a continuous spectrum. The human eye cannot tell the difference between such light spectra just by looking into the light source, although reflected colors from objects can look different. (This is often exploited; for example, to make fruit or tomatoes look more intensely red.) Similarly, most human color perceptions can be generated by a mixture of three colors called primaries. This is used to reproduce color scenes in photography, printing, television, and other media. There are a number of methods or color spaces for specifying a color in terms of three particular primary colors. Each method has its advantages and disadvantages depending on the particular application. No mixture of colors, however, can produce a response truly identical to that of a spectral color, although one can get close, especially for the longer wavelengths, where the CIE 1931 color space chromaticity diagram has a nearly straight edge. For example, mixing green light (530 nm) and blue light (460 nm) produces cyan light that is slightly desaturated, because response of the red color receptor would be greater to the green and blue light in the mixture than it would be to a pure cyan light at 485 nm that has the same intensity as the mixture of blue and green. Because of this, and because the primaries in color printing systems generally are not pure themselves, the colors reproduced are never perfectly saturated spectral colors, and so spectral colors cannot be matched exactly. However, natural scenes rarely contain fully saturated colors, thus such scenes can usually be approximated well by these systems. The range of colors that can be reproduced with a given color reproduction system is called the gamut. The CIE chromaticity diagram can be used to describe the gamut. Another problem with color reproduction systems is connected with the acquisition devices, like cameras or scanners. The characteristics of the color sensors in the devices are often very far from the characteristics of the receptors in the human eye. In effect, acquisition of colors can be relatively poor if they have special, often very "jagged", spectra caused for example by unusual lighting of the photographed scene. A color reproduction system "tuned" to a human with normal color vision may give very inaccurate results for other observers. The different color response of different devices can be problematic if not properly managed. For color information stored and transferred in digital form, color management techniques, such as those based on ICC profiles, can help to avoid distortions of the reproduced colors. Color management does not circumvent the gamut limitations of particular output devices, but can assist in finding good mapping of input colors into the gamut that can be reproduced.

Additive color mixing: combining red and green yields yellow; combining all three primary colors together yields white. Additive color is light created by mixing together light of two or more different colors. Red, green, and blue are the additive primary colors normally used in additive color systems such as projectors and computer terminals. Subtractive color mixing: combining yellow and magenta yields red; combining all three primary colors together yields black. Subtractive coloring uses dyes, inks, pigments, or filters to absorb some wavelengths of light and not others. The color that a surface displays comes from the parts of the visible spectrum that are not absorbed and therefore remain visible. Without pigments or dye, fabric fibers, paint base and paper are usually made of particles that scatter white light (all colors) well in all directions. When a pigment or ink is added, wavelengths are absorbed or "subtracted" from white light, so light of another color reaches the eye. If the light is not a pure white source (the case of nearly all forms of artificial lighting), the resulting spectrum will appear a slightly different color. Red paint, viewed under blue light, may appear black. Red paint is red because it scatters only the red components of the spectrum. If red paint is illuminated by blue light, it will be absorbed by the red paint, creating the appearance of a black object. Structural colors are colors caused by interference effects rather than by pigments. Color effects are produced when a material is scored with fine parallel lines, formed of one or more parallel thin layers, or otherwise composed of microstructures on the scale of the color's wavelength. If the microstructures are spaced randomly, light of shorter wavelengths will be scattered preferentially to produce Tyndall effect colors: the blue of the sky (Rayleigh scattering, caused by structures much smaller than the wavelength of light, in this case air molecules), the luster of opals, and the blue of human irises. If the microstructures are aligned in arrays, for example the array of pits in a CD, they behave as a diffraction grating: the grating reflects different wavelengths in different directions due to interference phenomena, separating mixed "white" light into light of different wavelengths. If the structure is one or more thin layers then it will reflect some wavelengths and transmit others, depending on the layers' thickness.

Structural color is studied in the field of thin-film optics. A layman's term that describes particularly the most ordered or the most changeable structural colors is iridescence. Structural color is responsible for the blues and greens of the feathers of many birds (the blue jay, for example), as well as certain butterfly wings and beetle shells. Variations in the pattern's spacing often give rise to an iridescent effect, as seen in peacock feathers, soap bubbles, films of oil, and mother of pearl, because the reflected color depends upon the viewing angle. Numerous scientists have carried out research in butterfly wings and beetle shells, including Isaac Newton and Robert Hooke. Since 1942, electron micrography has been used, advancing the development of products that exploit structural color, such as "photonic" cosmetics. Color wheel: an illustrative organization of color hues in a circle that shows relationships. Colorfulness, chroma, purity, or saturation: how "intense" or "concentrated" a color is. Technical definitions distinguish between colorfulness, chroma, and saturation as distinct perceptual attributes and include purity as a physical quantity. These terms, and others related to light and color are internationally agreed upon and published in the CIE Lighting Vocabulary. More readily available texts on colorimetry also define and explain these terms. Dichromatism: a phenomenon where the hue is dependent on concentration and thickness of the absorbing substance. Hue: the color's direction from white, for example in a color wheel or chromaticity diagram. Shade: a color made darker by adding black. Tint: a color made lighter by adding white. Value, brightness, lightness, or luminosity: how light or dark a color is.

Photosensitivity is the amount to which an object reacts upon receiving photons, especially visible light. In medicine, the term is principally used for abnormal reactions of the skin, and two types are distinguished, photoallergy and phototoxicity. The photosensitive ganglion cells in the mammalian eye are a separate class of light-detecting cells from the photoreceptor cells that function in vision. Sensitivity of the skin to a light source can take various forms. People with particular skin types are more sensitive to sunburn. Particular medications make the skin more sensitive to sunlight; these include most of the tetracycline antibiotics, heart drugs amiodarone, and sulfonamides. Some dietary supplements, such as St. John's Wort, include photosensitivity as a possible side effect. Particular conditions lead to increased light sensitivity. Patients with systemic lupus erythematosus experience skin symptoms after sunlight exposure; some types of porphyria are aggravated by sunlight. A rare hereditary condition xeroderma pigmentosum (a defect in DNA repair) is thought to increase the risk of UV-light-exposure-related cancer by increasing photosensitivity.

Photosensitivity occurs in multiple species including sheep, bovine, and horses. They are classified as primary if an ingested plant contains a photosensitive substance, like hypericin in St John's wort poisoning and ingestion of biserrula (*Biserrula pelecinus*) in sheep, or buckwheat plants (green or dried) in horses. In hepatogenous photosensitization, the photosensitzing substance is phylloerythrin, a normal end-product of chlorophyll metabolism. It accumulates in the body because of liver damage, reacts with UV light on the skin, and leads to free radical formation. These free radicals damage the skin, leading to ulceration, necrosis, and sloughing. Non-pigmented skin is most commonly affected.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A machine vision system, comprising:
   at least one patterned area light source;
   at least one digital camera oriented at a first angle relative to surface of an object to be inspected, wherein the at least one patterned area light source defines a backlight with respect to the object to be inspected and relative the at least one digital camera, and wherein the at least one patterned area light source is oriented at a second angle relative to the surface of the object to be inspected such that a field of view of the at least one digital camera encompasses reflection of at least a portion of light emitted by the at least one patterned area light source from the surface of the object to be inspected;
   a digital image data receiving module stored on a memory of a computing device that, when executed by a processor of the computing device, causes the processor to receive digital image data from the at least one digital camera, wherein the digital image data is representative of the reflection of at least a portion of light emitted by the at least one patterned area light source from the surface of the object to be inspected; and
   a phase measuring deflectometry module stored on the memory of the computing device that, when executed by the processor of the computing device, causes the processor to determine whether the surface of the object to be inspected includes a defect based on the digital image data.

2. The machine vision system of claim 1, wherein the surface of the object to be inspected is a specular surface, and wherein the processor further executes the phase measuring deflectometry module to identify defects associated with the specular surface.

3. The machine vision system of claim 2, wherein the specular surface is a painted surface, and wherein the processor further executes the phase measuring deflectometry module to identify an orange-peel effect on the painted surface.

4. The machine vision system of claim 2, wherein the specular surface is a surface of screen of a cellular telephone, and wherein the processor further executes the phase measuring deflectometry module to identify chip in the surface.

5. The machine vision system of claim 1, wherein the processor further executes the phase measuring deflectometry module to identify at least one of: a shape on the surface, surface variations, a scratch on the surface, or a pit in the surface, and wherein the digital image data is representative of a single image acquisition from the at least one digital camera.

6. The machine vision system of claim 1, wherein light emitted from the at least one patterned area light source defines at least one pattern selected from: a pattern including at least two lines, a pattern including at least one circle, a pattern including at least one square, a checkerboard pattern, or a pattern including at least two zigzag lines.

7. The machine vision system of claim 1, wherein the at least one patterned area light source includes a backlight diffuser, and wherein patterns are printed directly on a surface of the backlight diffuser.

8. The machine vision system of claim 1, wherein the surface is either flat or curved.

9. A machine vision system, comprising:
   at least one patterned area light source oriented to emit light toward an object to be inspected;
   at least one digital camera with a field of view oriented toward the object to be inspected, wherein the at least one patterned area light source defines a backlight with respect to the object to be inspected and relative the at least one digital camera, and wherein the field of view of the at least one digital camera encompasses at least a portion of light emitted by the at least one patterned area light source;
   a digital image data receiving module stored on a memory of a computing device that, when executed by a processor of the computing device, causes the processor to receive digital image data from the at least one digital camera, wherein the digital image data is representative of at least a portion of light emitted by the at least one patterned area light source; and
   a phase measuring deflectometry module stored on the memory of the computing device that, when executed by the processor of the computing device, causes the processor to determine whether the object to be inspected includes a defect based on the digital image data.

10. The machine vision system of claim 9, wherein the object to be inspected is at least partially transparent.

11. The machine vision system of claim 9, wherein, when light emitted by the at least one patterned area light source passes through a defect in the object, light is deflected or refracted at an angle out of phase with an incident light ray angle.

12. The machine vision system of claim 9, wherein the at least one camera is a single camera defining a monoscopic system.

13. A machine vision system, comprising:
   at least one patterned area light source oriented to emit light toward an object to be inspected;
   at least one digital camera with a field of view oriented toward the object to be inspected, wherein the at least one patterned area light source defines a backlight with respect to the object to be inspected and relative the at least one digital camera, and wherein the field of view of the at least one digital camera encompasses at least a portion of light emitted by the at least one patterned area light source;
   a digital image data receiving module stored on a memory of a computing device that, when executed by a processor of the computing device, causes the processor to receive digital image data from the at least one digital camera, wherein the digital image data is representative of at least a portion of light emitted by the at least one patterned area light source or light emitted by the at least one patterned area light source that is reflected from a surface of the object to be inspected; and
   a phase measuring deflectometry module stored on the memory of the computing device that, when executed by the processor of the computing device, causes the processor to determine whether the object to be inspected includes a defect based on the digital image data.

14. The machine vision system of claim 13, wherein the at least one patterned area light source includes a backlight diffuser.

15. The machine vision system of claim 13, comprising at least two digital cameras defining a stereoscopic system.

16. The machine vision system of claim 13, wherein the at least one patterned area light source emits a high-contrast pattern.

17. The machine vision system of claim 16, wherein the digital image data is representative of an amount of phase shift based on a divergence of a surface of the object.

18. The machine vision system of claim 13 including a single digital camera and a single patterned area light source, wherein the digital image data is representative of a two-dimensional image of at least a portion of the object.

19. The machine vision system of claim 13 including at least two digital cameras, wherein the digital image data is representative of a three-dimensional image of at least a portion of the object.

20. The machine vision system of claim 13, including at least two digital cameras and at least two patterned area light sources, and wherein the digital image data is representative of a three-dimensional image of at least a portion of the object.

21. The machine vision system of claim 13, wherein the digital image data is representative of light that is refracted by the object.

22. The machine vision system of claim 13, wherein the processor further executes the phase measuring deflectometry module to cause the processor to detect at least one defect based on mathematical relations of light reflection and surface shape.

* * * * *